(12) United States Patent
Holmes et al.

(10) Patent No.: US 10,257,594 B2
(45) Date of Patent: Apr. 9, 2019

(54) OPTICAL DEVICE AND METHODS

(71) Applicant: Thomas Swan and Co., Ltd., Consett, Durham (GB)

(72) Inventors: Melanie Holmes, Consett (GB); Adrian Perrin Janssen, Exeter (GB)

(73) Assignee: Thomas Swan and Co., Ltd., Consett, Durham (GB)

( * ) Notice: Subject to any disclaimer, the term of this patent is extended or adjusted under 35 U.S.C. 154(b) by 316 days.

(21) Appl. No.: 14/421,694

(22) PCT Filed: Aug. 15, 2013

(86) PCT No.: PCT/GB2013/052174
§ 371 (c)(1),
(2) Date: Feb. 13, 2015

(87) PCT Pub. No.: WO2014/027204
PCT Pub. Date: Feb. 20, 2014

(65) Prior Publication Data
US 2015/0208144 A1    Jul. 23, 2015

(30) Foreign Application Priority Data

Aug. 15, 2012    (GB) .................................. 1214555.3

(51) Int. Cl.
*H04J 14/00* (2006.01)
*H04Q 11/00* (2006.01)
*H04J 14/02* (2006.01)

(52) U.S. Cl.
CPC .......... *H04Q 11/0005* (2013.01); *H04J 14/02* (2013.01); *H04J 14/0212* (2013.01); *H04Q 11/0003* (2013.01); *H04Q 2011/0009* (2013.01)

(58) Field of Classification Search
CPC .......... H04Q 11/0005; H04Q 11/0003; H04Q 2011/0009; H04Q 11/0001;
(Continued)

(56) References Cited

U.S. PATENT DOCUMENTS 3,773,401 A    11/1973    Douklias et al.
3,917,380 A    11/1975    Kato et al.
(Continued)

FOREIGN PATENT DOCUMENTS

EP    0878729 A2    11/1998
EP    1 050 775 A1    11/2000
(Continued)

OTHER PUBLICATIONS

U.S. Appl. No. 60/277,217, "Reconfigurable optical add-drop multiplexer with dynamic spectral equalization capabillity for DWDM optical networking applications"; filed Mar. 19, 2001. Inventor: Jeffrey P. Wilde.
(Continued)

*Primary Examiner* — Mohammad R Sedighian
(74) *Attorney, Agent, or Firm* — Hamilton, Brook, Smith & Reynolds, P.C.

(57) ABSTRACT

A device and method for controlling light by wavelength in a device with a switch plane and a dispersion plane uses optics providing an imaging function in the dispersion plane, and a Fourier transform function in the switch plane, so as to enable crosstalk to be reduced.

34 Claims, 57 Drawing Sheets

(58) Field of Classification Search
CPC ......... H04Q 2011/0039; H04Q 11/0062; H04J 14/02; H04J 14/0212; H04J 14/0227
See application file for complete search history.

(56) References Cited

U.S. PATENT DOCUMENTS

| | | |
|---|---|---|
| 3,975,082 A | 8/1976 | Winzer |
| 4,317,610 A | 3/1982 | Breglia et al. |
| 4,758,090 A | 7/1988 | Schuma |
| 4,952,010 A | 8/1990 | Healey et al. |
| 4,964,701 A | 10/1990 | Dorschner et al. |
| 5,018,835 A | 5/1991 | Dorschner |
| 5,040,864 A | 8/1991 | Hong |
| 5,107,359 A | 4/1992 | Ohuchida |
| 5,121,231 A | 6/1992 | Jenkins et al. |
| 5,140,448 A | 8/1992 | Bone et al. |
| 5,153,751 A | 10/1992 | Ishikawa et al. |
| 5,159,473 A | 10/1992 | Feldman |
| 5,222,071 A | 6/1993 | Pezeshki et al. |
| 5,230,005 A | 7/1993 | Rubino et al. |
| 5,285,308 A | 2/1994 | Jenkins et al. |
| 5,293,038 A | 3/1994 | Kadowaki et al. |
| 5,311,360 A | 5/1994 | Bloom et al. |
| 5,315,423 A | 5/1994 | Hong |
| 5,325,224 A | 6/1994 | Lang et al. |
| 5,329,384 A | 7/1994 | Setani et al. |
| 5,414,540 A | 5/1995 | Patel et al. |
| 5,416,616 A | 5/1995 | Jenkins et al. |
| 5,424,866 A | 6/1995 | Kikinis |
| 5,428,466 A | 6/1995 | Rejman-Greene et al. |
| 5,436,760 A | 7/1995 | Nakabayashi |
| 5,438,449 A | 8/1995 | Chabot et al. |
| 5,440,654 A | 8/1995 | Lambert |
| 5,461,475 A | 10/1995 | Lerner et al. |
| 5,495,356 A | 2/1996 | Sharony et al. |
| 5,515,354 A | 5/1996 | Miyake et al. |
| 5,526,171 A | 6/1996 | Warren |
| 5,539,543 A | 7/1996 | Liu et al. |
| 5,548,418 A | 8/1996 | Gaynor et al. |
| 5,552,916 A | 9/1996 | O'Callaghan et al. |
| 5,576,873 A | 11/1996 | Crossland et al. |
| 5,589,955 A | 12/1996 | Amako et al. |
| 5,629,802 A | 5/1997 | Clark |
| 5,661,577 A | 8/1997 | Jenkins et al. |
| 5,661,591 A | 8/1997 | Lin et al. |
| 5,757,536 A | 5/1998 | Rico et al. |
| 5,802,222 A | 9/1998 | Rasch et al. |
| 5,832,155 A | 11/1998 | Rasch et al. |
| 5,856,048 A | 1/1999 | Tahara et al. |
| 5,912,751 A | 6/1999 | Ford et al. |
| 5,917,625 A | 6/1999 | Ogusu et al. |
| 5,930,012 A | 7/1999 | Mears et al. |
| 5,938,309 A | 8/1999 | Taylor |
| 5,953,143 A | 9/1999 | Sharony et al. |
| 5,959,747 A | 9/1999 | Psaltis et al. |
| 5,960,133 A | 9/1999 | Tomlinson |
| 5,963,682 A | 10/1999 | Dorschner et al. |
| 5,986,782 A | 11/1999 | Alexander et al. |
| 5,995,251 A | 11/1999 | Hesselink et al. |
| 6,072,608 A | 6/2000 | Psaltis et al. |
| 6,084,694 A | 7/2000 | Milton et al. |
| 6,097,859 A | 8/2000 | Solgaard et al. |
| 6,115,123 A | 9/2000 | Stappaerts et al. |
| 6,130,872 A | 10/2000 | Sugiura et al. |
| 6,141,361 A | 10/2000 | Mears et al. |
| 6,175,432 B1 | 1/2001 | Wu et al. |
| 6,195,184 B1 | 2/2001 | Chao et al. |
| 6,222,954 B1 | 4/2001 | Riza |
| 6,243,176 B1 | 6/2001 | Ishikawa et al. |
| 6,263,123 B1 | 7/2001 | Bishop et al. |
| 6,263,127 B1 | 7/2001 | Dragone et al. |
| 6,275,623 B1 | 8/2001 | Brophy et al. |
| 6,317,231 B1 | 11/2001 | Al-Salameh et al. |
| 6,327,019 B1 | 12/2001 | Patel et al. |
| 6,342,960 B1 | 1/2002 | McCullough |
| 6,374,008 B2 | 4/2002 | Solgaard et al. |
| 6,415,070 B1 | 7/2002 | Munoz-Bustamante et al. |
| 6,430,328 B1 | 8/2002 | Culver et al. |
| 6,445,470 B1 | 9/2002 | Jenkins et al. |
| 6,456,419 B1 | 9/2002 | Winker et al. |
| 6,504,976 B1 | 1/2003 | Polynkin et al. |
| 6,507,685 B1 | 1/2003 | Polynkin et al. |
| 6,529,307 B1 | 3/2003 | Peng et al. |
| 6,542,268 B1 | 4/2003 | Rotolo et al. |
| 6,549,691 B1 | 4/2003 | Street et al. |
| 6,549,692 B1 | 4/2003 | Harel et al. |
| 6,549,699 B2 | 4/2003 | Belser et al. |
| 6,549,865 B2 | 4/2003 | Tomlinson |
| 6,559,986 B1 | 5/2003 | Sauer et al. |
| 6,570,681 B1 | 5/2003 | Favalora et al. |
| 6,574,026 B2 | 6/2003 | Jin et al. |
| 6,577,417 B1 | 6/2003 | Khoury |
| 6,583,901 B1 | 6/2003 | Hung |
| 6,594,082 B1 | 7/2003 | Li et al. |
| 6,603,894 B1 | 8/2003 | Pu |
| 6,614,572 B2 | 9/2003 | Kelley et al. |
| 6,614,953 B2 | 9/2003 | Strasser et al. |
| 6,625,346 B2 | 9/2003 | Wilde |
| 6,633,693 B1 | 10/2003 | Peale et al. |
| 6,654,516 B2 | 11/2003 | So |
| 6,657,770 B2 | 12/2003 | Marom et al. |
| 6,661,948 B2 | 12/2003 | Wilde |
| 6,687,431 B2 | 2/2004 | Chen et al. |
| 6,690,850 B1 | 2/2004 | Greywall |
| 6,707,959 B2 | 3/2004 | Ducellier et al. |
| 6,710,292 B2 | 3/2004 | Fukuchi et al. |
| 6,711,316 B2 | 3/2004 | Ducellier |
| 6,714,309 B2 | 3/2004 | May |
| 6,738,337 B2 | 5/2004 | Xu et al. |
| 6,738,540 B2 | 5/2004 | Marom |
| 6,747,774 B2 | 6/2004 | Kelly et al. |
| 6,760,511 B2 | 7/2004 | Garrett et al. |
| 6,762,873 B1 | 7/2004 | Coker et al. |
| 6,765,635 B1 | 7/2004 | Kelley et al. |
| 6,781,691 B2 | 8/2004 | MacKinnon et al. |
| 6,782,205 B2 | 8/2004 | Trisnadi et al. |
| 6,795,182 B2 | 9/2004 | Rakuljic et al. |
| 6,801,310 B2 | 10/2004 | Kewitsch et al. |
| 6,804,412 B1 | 10/2004 | Wilkinson |
| 6,804,428 B1 | 10/2004 | Garrett et al. |
| 6,809,853 B2 | 10/2004 | Culver |
| 6,813,408 B2 | 11/2004 | Bortolini |
| 6,816,640 B2 | 11/2004 | Tew |
| 6,826,330 B1 | 11/2004 | Godil et al. |
| 6,839,136 B2 | 1/2005 | Mikes |
| 6,842,549 B2 | 1/2005 | So |
| 6,845,195 B2 | 1/2005 | Tedesco |
| 6,864,944 B1 | 3/2005 | Scattergood et al. |
| 6,865,346 B1 | 3/2005 | Miller et al. |
| 6,867,888 B2 | 3/2005 | Sutherland et al. |
| 6,873,447 B2 | 3/2005 | Buzzetta |
| 6,879,426 B1 | 4/2005 | Weiner |
| 6,891,676 B2 | 5/2005 | Ford et al. |
| 6,920,261 B2 | 7/2005 | Inada et al. |
| 6,922,277 B2 | 7/2005 | Moon |
| 6,922,513 B2 | 7/2005 | Holmes |
| 6,950,609 B2 | 9/2005 | Marom |
| 6,954,252 B1 | 10/2005 | Crossland et al. |
| 6,956,687 B2 | 10/2005 | Moon et al. |
| 6,958,841 B2 | 10/2005 | Rancuret et al. |
| 6,975,786 B1 | 12/2005 | Warr et al. |
| 6,990,268 B2 | 1/2006 | Weverka |
| 7,019,883 B2 | 3/2006 | Moon et al. |
| 7,039,259 B2 | 5/2006 | Corem et al. |
| 7,079,723 B2 | 7/2006 | Bortolini et al. |
| 7,092,599 B2 | 8/2006 | Frisken |
| 7,106,966 B1 | 9/2006 | Lalonde et al. |
| 7,113,702 B2 | 9/2006 | Yamada et al. |
| 7,126,740 B2 | 10/2006 | Szczepanek et al. |
| 7,127,168 B2 | 10/2006 | Kani et al. |
| 7,145,710 B2 | 12/2006 | Holmes |
| 7,151,601 B2 | 12/2006 | MacKinnon et al. |
| 7,177,081 B2 | 2/2007 | Tomita et al. |
| 7,177,496 B1 | 2/2007 | Polynkin et al. |

(56) References Cited

U.S. PATENT DOCUMENTS

| | | |
|---|---|---|
| 7,190,858 B1 | 3/2007 | Greiner |
| 7,230,746 B2 | 6/2007 | Cameron et al. |
| 7,298,540 B2 | 11/2007 | Peng et al. |
| 7,397,980 B2 | 7/2008 | Frisken |
| 7,417,706 B2 | 8/2008 | Holmes |
| 7,436,588 B2 | 10/2008 | Rothenberg et al. |
| 7,442,909 B2 | 10/2008 | Holmes |
| 7,457,547 B2 | 11/2008 | Frisken et al. |
| 7,468,840 B2 | 12/2008 | Cohen et al. |
| 7,536,108 B2 | 5/2009 | Hirano et al. |
| 7,593,608 B2 | 9/2009 | Frisken |
| 7,612,930 B2 | 11/2009 | Holmes |
| 7,664,395 B2 | 2/2010 | Holmes |
| 7,787,720 B2 | 8/2010 | Frisken et al. |
| 7,796,319 B2 | 9/2010 | MacKinnon et al. |
| 7,847,227 B2 | 12/2010 | Holmes |
| 8,089,683 B2 | 1/2012 | Holmes |
| 8,260,139 B2 | 9/2012 | Suzuki |
| 8,335,033 B2 | 12/2012 | Holmes |
| 8,531,756 B2 | 9/2013 | Wagener et al. |
| 8,867,917 B2 | 10/2014 | Frisken et al. |
| 8,937,759 B2 | 1/2015 | Holmes |
| 9,019,612 B2 | 4/2015 | Wagener |
| 9,147,990 B2 | 9/2015 | Dueck |
| 9,529,325 B2 | 12/2016 | Holmes |
| 2001/0050787 A1 | 12/2001 | Crossland et al. |
| 2002/0060760 A1 | 5/2002 | Weiner |
| 2002/0079432 A1 | 6/2002 | Lee et al. |
| 2002/0081070 A1 | 6/2002 | Tew |
| 2002/0090878 A1 | 7/2002 | Holmes |
| 2002/0181910 A1 | 12/2002 | Holmes |
| 2003/0142378 A1 | 7/2003 | Mears et al. |
| 2003/0184843 A1 | 10/2003 | Moon et al. |
| 2004/0126120 A1 | 7/2004 | Cohen et al. |
| 2004/0135965 A1 | 7/2004 | Holmes |
| 2005/0018259 A1 | 1/2005 | Holmes |
| 2005/0219457 A1 | 10/2005 | Crossland et al. |
| 2005/0270616 A1 | 12/2005 | Weiner |
| 2006/0209250 A1 | 9/2006 | Holmes |
| 2007/0035803 A1 | 2/2007 | Holmes |
| 2007/0052694 A1 | 3/2007 | Holmes |
| 2007/0076163 A1 | 4/2007 | Crossland et al. |
| 2007/0268537 A1 | 11/2007 | Holmes |
| 2008/0145053 A1 | 6/2008 | Holmes |
| 2008/0265150 A1* | 10/2008 | Holmes .................. G01J 9/00 250/252.1 |
| 2009/0028501 A1 | 1/2009 | Wagener et al. |
| 2009/0220192 A1 | 9/2009 | Presley et al. |
| 2010/0209109 A1 | 8/2010 | Holmes |
| 2011/0033151 A1 | 2/2011 | Cohen et al. |
| 2011/0318006 A1 | 12/2011 | Uehara |
| 2012/0002917 A1 | 1/2012 | Colbourne |
| 2012/0020664 A1 | 1/2012 | Sakurai et al. |
| 2012/0236216 A1 | 9/2012 | Sharma et al. |
| 2012/0237218 A1 | 9/2012 | Yang et al. |
| 2012/0275744 A1 | 11/2012 | Yang et al. |
| 2013/0070320 A1 | 3/2013 | Holmes |
| 2014/0146395 A1 | 5/2014 | Wagener |
| 2015/0177685 A1 | 6/2015 | Holmes |
| 2015/0208144 A1 | 7/2015 | Holmes |
| 2016/0139559 A2 | 5/2016 | Holmes |
| 2017/0102603 A1 | 4/2017 | Holmes |

FOREIGN PATENT DOCUMENTS

| | | |
|---|---|---|
| EP | 1 207 418 A1 | 5/2002 |
| EP | 1 053 501 B1 | 7/2003 |
| EP | 1 682 931 | 5/2005 |
| GB | 9923428.8 | 10/1999 |
| JP | 54-005454 | 1/1979 |
| JP | 57-026720 | 2/1982 |
| JP | 62-025709 | 2/1987 |
| JP | 63-148725 | 6/1988 |
| JP | 02-143203 | 1/1990 |
| JP | 03-179332 | 5/1991 |
| JP | 04-221927 | 12/1992 |
| JP | 09-189809 | 7/1997 |
| JP | 09-096841 | 8/1997 |
| JP | 09-281917 | 10/1997 |
| WO | WO 96/09727 | 3/1996 |
| WO | WO 96/10776 | 4/1996 |
| WO | WO 98/06192 | 2/1998 |
| WO | WO 99/39240 | 8/1999 |
| WO | WO 01/25840 A1 | 4/2001 |
| WO | WO 01/25848 A2 | 4/2001 |
| WO | WO 01/40832 A2 | 6/2001 |
| WO | WO 01/90823 A1 | 11/2001 |
| WO | WO 02/079870 A2 | 10/2002 |
| WO | WO 02/101451 A1 | 12/2002 |
| WO | WO 03/021341 A2 | 3/2003 |
| WO | WO 2003/040775 | 5/2003 |
| WO | WO 03/087902 | 10/2003 |
| WO | WO 03/098856 | 11/2003 |
| WO | WO 2005/057149 A1 | 6/2005 |
| WO | WO 2012/125722 A1 | 9/2012 |
| WO | WO 2014/015129 A1 | 1/2014 |

OTHER PUBLICATIONS

U.S. Appl. No. 60/281,079, "Reconfigurable pixelated optical filter"; filed Apr. 3, 2001. Inventors: John A. Moon, et al.

U.S. Appl. No. 60/303,759, "Diffractive fourier optics for optical communications"; filed Jul. 6, 2001. Inventor: George A. Rakuljic.

U.S. Appl. No. 60/304,407, "Wavelength switch with multiple tunable optical ports"; filed Jul. 12, 2001. Inventors: Thomas Ducellier, et al.

U.S. Appl. No. 60/311,002, "Dynamic optical filter having an array of micromirrors"; filed Aug. 8, 2001. Inventors: James R. Dunphy, et al.

U.S. Appl. No. 60/310,991, "Dynamically reconfigurable optical smart node"; filed Aug. 9, 2001. Inventors: Paul S. Szczepanek, et al.

U.S. Appl. No. 60/325,065, "Reconfigurable optical add/drop multiplexer having an array of micro-mirrors"; filed Sep. 25, 2001. Inventors: John A. Moon, et al.

U.S. Appl. No. 60/347,964, "Optical communication beam control units and systems and methods using the same"; filed Nov. 7, 2001. Inventors: George Rakuljic, et al.

U.S. Appl. No. 60/283,197, "Adaptive Filter/Attenuator Using Pixelated Reflector", filed Apr. 11, 2001. Inventors: John A. Moon, et al.

Notification of Transmittal of the International Search Report and the Written Opinion of the International Searching Authority, PCT/GB2013/052174, dated Nov. 14, 2013.

Search Report, GB1214555.3, dated Nov. 30, 2012.

Robertson, B., et al., "Reduction of Crosstalk in a Colourless, Multicasting LCOS Based Wavelength Selective Switch by the Application of Wavefront Encoding," Next-Generation Optical Communication: Components, Sub-Systems, and Systems, Proc. of SPIE, vol. 8284, No. 1, pp. 1-8, Jan. 21, 2012.

Sinefeld, D., et al., "Insertion Loss and Crosstalk Analysis of a Fiber Switch Based on a Pixelized Phase Modulator," Journal of Lightwave Technology, IEEE Service Center, vol. 29, No. 1, pp. 69-77, Jan. 1, 2011.

Ronzitti, E., et al., "LCoS Nematic SLM Characterization and Modeling for Diffraction Efficiency Optimization, Zero and Ghost Orders Suppression," Optics Express, vol. 20, No. 16, pp. 81-101, Jul. 20, 2012.

U.S. Appl. No. 60/277,217.

"Adaptive Spectral Attenuator Using Fourier Synthesis," CiDRA, 6028397 (Apr. 11, 2001).

"Method of Analysis," Chapter 1, pp. 1-5, produced in *Thomas Swan & Co., Ltd v. Finisar Corp. & Fujitsu Network Communications, Inc.*, No. 2:13-cv-178 (E.D. Texas), Bates # PARKER-TS_0001373-PARKER-TS_0001377, 5 pages. (no Date).

"Optical Switching Testbed Report," University of Cambridge, pp. 1-10, produced in *Thomas Swan & Co., Ltd. v. Finisar Corp. &*

(56) References Cited

OTHER PUBLICATIONS

*Fujitsu Network Communications, Inc.*, No. 2:13-cv-178 (E.D. Texas), Bates #PARKER-TS_0000738-PARKER-TS_0000747, 10 pages. (no Date).
"Overview of Routing Architectures," Chapter 1, pp. 1-8, produced in *Thomas Swan & Co., Ltd.* v. *Finisar Corp. & Fujitsu Network Communications, Inc.*, No. 2:13-cv-178 (E.D. Texas), Bates # PARKER-TS_0001350-PARKER-TS_0001357, 8 pages. (no Date).
"Polarisation Insensitive Continuous-Phase Modulation Using Ferroelectric Liquid Crystal," p. 1-2, (1995), produced in *Thomas Swan & Co., Ltd.* v. *Finisar Corp. & Fujitsu Network Communications, Inc.*, No. 2:13-cv-178 (E.D. Texas), Bates # PARKER-TS_0000227-PARKER-TS_0000228, 2 pages.
"Why Use LCoS in a Wavelength Selective Switch?," [online] Retrieved from the Internet URL: http://www.finisar.com/blogs/lightspeed/why-use-lcos-in-a-wavelength-selective-switch/ [retrieved on Oct. 3, 2014].
Agranat, Aharon, "Electroholographic Wavelength Selective Crossconnect," IEEE (Jul. 1999).
Ahderom, S., "Applications of Liquid Crystal Spatial Light Modulators in Communications," Optical IEEE (Jul. 2002).
Amako, J., et al., "Kinoform Using an Electrically Controlled Birefringent Liquid-Crystal Spatial Light Modulator," *Applied Optics*, vol. 30, No. 32, pp. 4622-4628, (1991).
Barnes, T. H. et al.,"Reconfigurable Holographic Optical Interconnections Using a Phase-Only Newmatic Liquid Crystal Spatial Light Modulators," Heriot-Watt University (1991).
Barrett, C.P. et al., "Components for the implementation of free-space optical crossbars," Optical Society of America (1996).
Bengtsson, J., "Design of Fan-Out Kinoforms in the Entire Scalar Diffraction Regime with an Optical-Rotation-Angle Method," *Applied Optics*, vol. 36, No. 32, pp. 8435-8444, (1997).
Bergeron, Alain et al., "Phase calibration and applications of a liquid-crystal spatial light modulator," Optical Society of America (Aug. 10, 1995).
Berthele, Patrick et al., "Design and characterization of a liquid-crystal spatial light modulator for a polarization-insensitive optical space switch," Optical Society of America, Applied Optics (1998).
Birch, M. J. et al., "The Design of Scaleable Optical Crossbar Structures Using FELV/VLSI Technology and Free Space Optics," Kings College (No date).
Boysel, R. M. et al., "Integration of Deformable Mirror Devices with optical fibers and waveguides," Integrated Optics and Microstructures (1992).
Burns, David M., "Microelectromechanical Optical Beam Steering Systems," UMI, ProQuest Dissertations (Dec. 1997).
Carranza, C. de Castro et al., "Holographic grating with two spatial frequencies for the simultaneous study of two spectral profiles," Optical Society of America (1992).
Chan, et al., "Miniature Information Display Systems," (Mar. 17, 2000).
Chu, "Optical Beam-Steering Switches, Thesis," Kings College (Dec. 2001).
Chu, "Polarisation-induced beating in Spatial Light Modulator based Optical Switches," Kings College (2000).
Chu, H. H., "Design Issues in Compact Optical Switches Using Spatial Light Modulators," The Institution of Electrical Engineers (1998).
Cohen, A. D. et al., "Fast polymer spatial light modulators for dynamic holographic WDM Network Components," SPIE (1998).
Cohen, A.D. et al., "Active management of 100-GHz-spaced WDM channels," OSA/OFC (Feb. 21, 1999).
Cohen, A.D. et al.,"Applications of FLC SLM Dynamic Holograms to WDM Network Components," OPA, Ferroelectrics (1998).
Cohen, A.D., "Spatial Light Modulator Technologies for WDM," Thesis, Pembroke College (1998).
Cohen, A.D., et al., "Dynamic Gain Equalisation for Optical Amplifiers in WDM Networks Using Programmable Holographic Elements," Cambridge University, consisting of 2 pages, produced in *Thomas Swan & Co., Ltd.* v. *Finisar Corp. & Fujitsu Network Communications, Inc.*, No. 2:13-cv-178 (E.D. Texas), Bates # PARKER-TS_0001023-PARKER-TS_0001024, 2 pages.
Cohen, Adam D. et al., "100-GHz-Resolution Dynamic Holographic Channel Management for WDM," IEEE, Photonics Technology Letters (Jul. 1999).
Cohen, Adam D. et al., "Dynamic Holographic Eight-channel Spectral Equaliser for WDM," IEEE, LEOS Summer Topical Meeting on WDM Components Technology (Aug. 13, 1997).
Cohen, Adam D. et al., "Dynamic holographic telecommunications components based on spatial light modulation with pixelated x2 polymers in a Fabry-Perot cavity," Society of Photo-Optical Instrumentation Engineers (Mar. 2000).
Coleman, Christopher Lamar, "Computer Generated Holograms for Free-Space Optical Interconnects," UMI (1998).
Collings, N. et al., "Evolutionary development of advanced liquid crystal spatial light modulators," Applied Optics (Nov. 15, 1989).
Collings, N. et al., "Packet switching network based on optical fan-in," SPIE, Optics in Computing (May 24, 2000).
Cotter, L. K. et al., "Ferroelectric-Liquid-Crystal/Silicon-Integrated Circuit Spatial Light Modulator," *Optics Letters*, vol. 15, No. 5, pp. 291-293, (1990.
Crossland, B., et al.,"An Optical Switching Testbed," p. 1-4, University of Cambridge, produced in *Thomas Swan & Co., Ltd.* v. *Finisar Corp. & Fujitsu Network Communications, Inc.*, No. 2:13-cv-178 (E.D. Texas), Bates # PARKER-TS_0000734-PARKER-TS_0000737, 4 pages.
Crossland, W. A. et al., "Holographic Optical Switching: The 'ROSES' Demonstrator," IEEE, Journal of Lightwave Technology (Dec. 2000).
Crossland, W. A. et al., "Liquid crystal polarization independent beam steering switches for operation at 1.5 microns," IEEE (Nov. 2000).
Crossland, W. A. et al., "Liquid Crystal Spatial Light Modulators for Optical Interconnects and Space Switching," IEEE (1990).
Crossland, W. A. et al., "Some Applications of Optical Networks in the Architecture of Electronic Computers," IEEE, Optical Connection and Switching Networks for Communication and Computing (May 14, 1990).
Crossland, W.A. et al., "Beam Steering Optical Switches using LCOS: The 'ROSES' Demonstrator," IEEE (Jul. 2000).
Crossland, W.A. et al.,"Nondisplay Applications of Liquid Crystals, Handbook of Liquid Crystals," Wiley (1998).
Crossland, W.A. et al., "Optically Transparent Switching in Telecommunications using Ferroelectric liquic crystals over silicon VLSI circuits," IEEE, LEOS (1996).
Crossland, W.A., et al., "Spatial-Light-Modulator Based Routing Switches," Inst. Phys. Conf., IOP Publishing (1995).
Dames, Mark P. et al.,"Three-stage high-performance optoelectronic asynchronous transfer mode switch; design and performance," SPIE, Optical Engineering (1996).
Davey, "Ultrashort pulse generation and processing at 1.3 mm for ultra high speed photonic," networks IEE (1999).
Davey, A.B. et al., "Potential and Limitation of the Electroclinic Effect in Device Applications," Ferroelectrics, Gordon & Breach Science Publishers (1991).
Davey, R.P. et al.,"Subpicosecond pulse generation from al.3mm DFB laser gain-switched at 1 GHz," Electronics Letters (Feb. 15, 1996).
Davis, Jeffrey et al.," Anamorphic optical systems using programmable spatial light modulators," OSA, Applied Optics (1992).
Davis, Jeffrey et al., "Encoding complex diffractive optical elements onto a phase-only liquid-crystal spatial light modulator," SPIE, Optical Engineering (Feb. 2001).
Devaney, J., "Scientists Explore the Outer Limits," *Analyisis, FibreSystems Europe*, pp. 17-18 (2002), produced in *Thomas Swan & Co., Ltd.* v. *Finisar Corp. & Fujitsu Network Communications, Inc.*, No. 2:13-cv-178 (E.D. Texas), Bates # PARKER-TS_0001806-PARKER-TS_0001807, 2 pages.
Dias, Antonio R. et al., "Fiber-optic crossbar switch with broadcast capability," Optical Engineering (Nov. 1988).
Document, produced in *Thomas Swan & Co., Ltd.* v. *Finisar Corp. & Fujitsu Network Communications, Inc.*, No. 2:13-cv-178 (E.D. Texas), Bates # PARKER00177-PARKER00251, 75 pages.

(56) References Cited

OTHER PUBLICATIONS

Drabik, T. J., "Optoelectronic Integrated Systems Based on Free-Space Interconnects with an Arbitrary Degree of Space Variance," *Proceedings of the IEEE*, vol. 82, No. 11, pp. 1595-1622 (1994).
Drabik, T. J., et al., "2D Silicon/Ferroelectric Liquid Crystal Spatial Light Modulators," *IEEE Micro*, vol. 15, No. 4, pp. 67-76, (1995).
Durrani, et al., "Relaxed space switch crosstalk requirements: Crosstalk Requirements in the Presence of Laser Wavelength Referencing Error and Drift," OSA/OFC (2000).
Durrani, et al., "WDM Network Modeling; Probability Analysis of Optical Crosstalk Accumulation and Network Performance Confidence Limits," JOLT (2000).
Durrani, Khurram et al., "Optical Crosstalk accumulation in WDM Networks," IEE (1998).
Fancey, et al., "Smart-Pixel based Free-Space Optoelectronic Interconnect to Demonstrate Terabits Regime IO to Silicon," CMOS IEE (2000).
Ford, J.E. et al., "Dynamic Spectral Equalization Using Micro-Opto-Mechanics," IEEE, Photonics Technology Letters (Oct. 1998).
Ford, Joseph E. et al., "Wavelength Add/Drop Switching Using Tilting Micromirrors," IEEE, Journal of Lightwave Tech. (May 1, 1999).
Fouquet, J.E., et al, "A Compact Scalable Cross-Connect Switch Using Total Internal Reflection Due to Thermally-Generated Bubbles," in *Tech. Dig. IEEE LEOS Annual Meeting*, Orlando, FL, pp. 169-170 (1998).
Fracasso, B. et al.,"Performance assessment of a liquid crystal multichannel photonic space-switch," OSA (2001).
Georgiou et al., "Simulation of the Functionality of Liquid Crystal Phase Holograms for Application in Optical Telecommunication Networks," IEEE (2002).
Giles, Randy C. et al., "The Wavelength Add-Drop Multiplexer for Lightwave Communication Networks," Lucent Technologies Inc. (1999).
Gilleo, Ken, "MOEMS the Word," Circuits Assembly (Nov. 2000).
Gourlay, J. et al., "Real-time binary phase holograms on a reflective ferroelectric liquid-crystal spatial light modulator," Applied Optics (1994).
Hattori, Kuninori et al., "PLC-Based Optical Add/Drop Switch with Automatic Level Control," IEEE, Lightwave Technology Journal (Dec. 1999).
Heritage, J. P. et al., "Picosecond pulse shaping by spectral phase and amplitude manipulation," Optical Society of America (1985).
Hinton, H. Scott, "Progress in Smart Pixel Technologies," IEEE, Journal of Selected Topics in Quantum Electronics (Apr. 1996).
Hirabayashi, K. et al., "Free-space optical interconnections with liquid-crystal microprism arrays", Applied Optics, 34(14): 2571-2580 (May 10, 1995).
Hirabayashi, Katsuhiko et al., "Board-to-board free-space optical interconnections passing through boards for a bookself-assembled terabit-per second-class ATM switch," OSA, Applied Optics (May 10, 1998).
Holmes, "Optimization of WDM Demultiplexers," 1994.
Holmes, M.J. et al., "Crosstalk Calculations for Semiconductor Laser Optical Aplifires," J Opt Comm, (1988).
Holmes, M.J. et al., "Design of non-linear optical fibres," OSA, Technical Digest Series vol. 15, (1993).
Holmes, M.J. et al., "Development of Radiation-Mode Filters for WDM," IEE (1998).
Holmes, M.J. et al., "Highly Nonlinear Optical Fiber for All Optical Processing Applications," IEEE, Photonics Technology Letters (1995).
Holmes, M.J. et al., "Low Crosstalk Devices for Wavelength-Routed Networks," IEEE Colloquium on Guided Wave Optical Signal Processing, pp. 1-10 (Jun. 8, 1995).
Holmes, M.J. et al., "New Guassian-Based Approximation for Modelling Non-Linear Effects in Optical Fibers," IEE, Journal of Lightwave Technology (Feb. 2, 1994).
Holmes, M.J. et al., "Sidetap Optical Fibre Grating Filters," OSA, Trends in Optics and Photonics (1996).
Holmes, M.J. et al., "Ultra Narrow-Band Optical Fibre Sidetap Filters," ECOC '98 (1998).
Holmes, M.J., "Matching Fibres for Low Loss Coupling Into Fibre Amplifiers," Electronics Letters (Dec. 6, 1990).
Holmes, M.J., "Optimisation of Refractive Index Profile for high gain Fibre Amplifiers," Electronics Letters (Oct. 25, 1990).
Holmes, Melanie et al., "Novel Fibre Design for Narrow-Band Symmetric Response Sidetap Filters with Suppressed Leaky Mode Resonance," (Sep. 30, 1999).
Holmes, Melanie et al., "Physical Properties of Optical Fiber Sidetap Grating Filters; Free-Space Model," IEEE Journal of Selected Topics in Quantum Electronics (1999).
Holton, Carvel E. et al., "Patterned Alignment, Liquid Crystal Diffractive Spatial Light Modulators & Devices," SPIE, Liquid Crystal SLMs (Apr. 20, 1998).
Husain, A.,"MEMS-Based Photonic Switching in Communications Networks," in *Tech. Dig. OSA Conference on Optical Fiber Communication*, pp. WX1-1-WX1-3 (2001).
Jackman, Neil A. et al., "Optical Cross Connects for Optical Networking," Lucent Technologies Inc., Bell Labs Tech. Journal (1999).
Johansson, Mathias et al., "Adaptive beam steering implemented in a ferroelectric liquid-crystal spatial-lightmodulator free-space, fiber-optic," Applied Optics (Aug. 10, 2002).
Johansson, Mathias et al., "Computer-controlled, adaptive beam steering, implemented in a FLC-SLM free-space optical switch," OSA-DOMO (Jun. 18, 2000).
Juday, Richard D. et al., "Full face, full complex characterization of a reflective SLM," SPIE, Optical Pattern Recognition (Mar. 31, 2000).
Kirk, A.G. et al.,"A Compact and Scalable Free-Space Optical Crossbar," Holographic Systems, Components and Applications (Sep. 1991).
Klaus, Werner et al., "Efficient beam deflector with a blazed liquid crystal phase grating," Optical Computing, Technical Digest (Apr. 21, 1996).
Kondis, John et al., "Liquid Crystals in Bulk Optics-Based DWDM Optical Switches and Spectral Equalizers," IEEE, Lasers and Electro-Optics Society (2001).
Koulaxouzidis, "A shear and vertical stress sensor for physiological measurements," IEEE (2000).
Koulaxouzidis, "Development of a fibre Bragg grating sensor for in-shoe shear stress measurement: design and preliminary results," SPIE (2000).
Krishnamoorthy, U. et al., "Surface-micromachined mirrors for scalable fiber optic switching applications," SPIE, MOEMS and Miniaturized Systems (Aug. 22, 2000).
Krishnamoorthy,"Optoelectronic-VLSI; direct attachment of photonic devices to Silicon VLSI circuits," Lucent Technologies (Mar. 17, 2000).
Lamers, Kristina Lee, "Components of an Improved Design Process for Micro-Electro-Mechanical Systems," ProQuest LLC (Sep. 1, 2008).
Laor, H., "Construction and performance of a 576x576 single-stage OXC," in *Tech. Dig. LEOS '99* (vol. 2), pp. 481-482 (1999).
Latham, et al., "A Reconfigurable 2-D Optical Interconnect System Using a Liquid Crystal Spatial Light Modulator," IEE (1988).
Latham, S.G. et al.,"A Programmable Optical Interconnection System Using an Amorphous Silicon Ferroelectric Spatial Light Modulator," IEEE, Optical Connection and Switching Networks for Communication and Computing (May 14, 1990).
Lee, Hyuk, "Acoustoelectrooptic multichannel spectrum analyzer," Optical Society of America (Dec. 1, 1986).
Lee, S.-S., "Surface-Micromachined Free-Space Fiber Optic Switches With Integrated Microactuators for Optical Fiber Communications Systems," in *Tech. Dig. 1997 International Conference on Solid-State Sensors and Actuators*, Chicago, pp. 85-88 (1997).
Leyva, D. Gil, et al., "Free Space Optical Interconnect Using an FLC for Active Beam Steering and Wave Front Correction," Proceedings of SPIE, vol. 5453 (2004).
Lin, L.Y., "Free-Space Micromachined Optical Switches for Optical Networking," *IEEE Journal of Selected Topics in Quantum Electronics*, vol. 5, No. 1, pp. 4-9, (1999).

(56) References Cited

OTHER PUBLICATIONS

Lin, Lih Y. et al., "Micro-Electro-Mechanical Systems (MEMS) for WDM Optical-Crossconnect Networks," IEEE (1999).
Lin, Shiuan Huei et al., "Optical Wavelength Add-Drop Multiplexer using Localized Volume Holographic Gratings," OSA-OC (Jan. 9, 2001).
Liu, A. Q. et al.,"Microelectromechanical fiber optical switches," SPIE, Conference on Advanced Photonic Sensors and Apps (Dec. 1999).
Livescu, Gabriela, "Channel monitoring in WDM networks; a system perspective," OSA-IPR (1998).
Lofving, Bjorn et al., "Beam Steering with two ferroelectric liquid-crystal spatial light modulators," Optics Letters (Oct. 1, 1998).
Lofving, Bjorn, "Self-adjusting dynamic binary phase holograms," Optical Society of America (Apr. 10, 1997).
Love, Gordon, "Liquid-crystal phase modulator for unpolarized light," Optical Society of America, Applied Optics (May 1, 1993).
Love, Gordon, "Wave-front correction and production of Zernike modes with a liquid-crystal spatial light modulator," Optical Society of America (Mar. 1, 1997).
Makihara, M., et al., "Strictly Non-Blocking N×N Thermo-Capillarity Optical Matrix Switch using Silica-based Waveguide," in *Tech. Dig. OSA Conference on Optical Fiber Communication*, pp. TuM2-1-TuM2-4 (2000).
Manolis, I. G., "Electrically Addressed Liquid Crystal Phase Gratings for Optical Switches", Thesis, Kings College (Jul. 2002).
Manolis, I. G., et al., "Control of the Electro-Optic Bistability of Some Ferroelectric Liquid Crystals Useful for Binary Phase Optical Mod," OPA (2000).
Manolis, I. I G. et al. "Reconfigurable Multi-level Holograms Phase Holograms for Optical Switches," IEEE Photonics Technology Letters (2002).
Marom, D.M., et al., "Wavelength-Selective 1×4 Switch for 128 WDM Channels at 50 Ghz Spacing," OFC Postdeadline Paper, pp. FB7-1-FB7-3 (Mar. 2002).
Marques, A. et al., "Simultaneous encoding of amplitude apodizers and Fresnel lenses in spatial light modulators," SPIE, 4th Iberoamerican Meeting on Optics (2001).
Matic, Roy M., "Blazed phase liquid crystal beam steering," SPIE (1994).
McKnight, Douglas J., "An Electronically Addressed Spatial Light Modulator," Univ. of Edinburgh (1989).
McManamon, Paul F. et al., "Optical Phased Array Technology," IEEE (Feb. 1996).
Mears, R. J., et al., "Telecommunications Applications of Ferroelectric Liquid-Crystal Smart Pixels," IEEE Journal of Selected Topics in Quantum Electronics, vol. 2, No. 1, Apr. 1996, pp. 35-46.
Mears, R. J., et al., "WDM Channel Management using Programmable Holographic Elements," IEE Colloquim on Multiwavelength Optical Networks: Devices, Systems and Network Implementations, IEE, London, GB, Jun. 18, 1998, pp. 11-1-11-6.
Mears, Robert J. et al. "OADM and WDM channel management using programmable holographic filters," OSA-IPR (1999).
Natarajan, L. V. et al., "Holographic PDLCs for optical beam modulation, deflection, and dynamic filter applications," SPIE (1998).
Neff, John A., "Optical Interconnects Based on Two-Dimensional VCSEL Arrays," IEEE (1994).
O'Brien, D.C. et al., "Holographically Routed Optical Crossbar using Ferroelectric Liquid-Crystal Over Silicon Spatial Light Modulator," SSLM OPA, Ferroelectrics, 181: 79-86 (1996).
O'Brien, D. C. et al., "Optical Crossbar Switching Using Dynamic Holograms Written to Ferroelectric Liquid Crystal Spatial Light Modulators," IEEE, Optical Switching (1993).
O'Brien, D.C. et al.,"A holographically routed optical crossbar theory and simulation," Optical Computing and Processing, vol. 1, No. 3: 233-243 (1991).
O'Brien, D.C. et al., "Computer Generated holograms optimised for illumination with partially coherent light using Silicon Backplane Spatial Light Modulators as the recording device," SPIE, Optics for Computers (1991).
O'Brien, D.C. et al., "Dynamic holographic interconnects that use ferroelectric liquid-crystal spatial light modulators," OSA, Applied Optics (May 10, 1994).
O'Brien, D.C. et al., "Programmable Computer Generated Holograms with Large Space Bandwidth Product," Cambridge (1993).
O'Brien, Dominic C., "Dynamic Holograms for Optical Interconnection," Thesis, King's College (1993).
Paige, E. G. S. et al., "Feedback generated holograms," Electronics Letters (Jul. 7, 1994).
Pan, Ci-Ling, et al., "Tunable Semiconductor Laser with Liquid Crystal Pixel Mirror in Grating-Loaded External Cavity," Electronics Letters, IEE, vol. 35, No. 17, Aug. 19, 1999, pp. 1472-1473.
Pan, J. J. et al., "New 1×N fiber coupler employing diffractive optical element," Lasers and Electro-Optics, CLEO '99 (May 25, 1999).
Pan, Ru-Pin et al., "Electronically Tunable Single and Multiple Wavelength Broad-Area Semiconductor Laser by Using a Liquid Crystal Pixel Mirror," IEEE (Nov. 2000).
Pan, Ru-Pin et al., "Wavelength tuning and multiple wavelength generation using a reflection-type liquid crystal spatial light modulator," SPIE, Spatial Light Modulators: Technology and Applications (Nov. 8, 2001).
Pan, Ru-Pin, et al., "Liquid-crystal-based tunable optical filtering devices for DWDM," SPIE, Active and Passive Optical Components for WDM Communication (Jul. 30, 2001).
Parker, "Applications of Active Arrayed-Waveguide Gratings in Dynamic WDM Networking and Routing," JOLT (Dec. 2000).
Parker, "Binary-Phase Holograms as a Sum of Orthogonal Base Vectors," consisting of 19 pages (1993), produced in *Thomas Swan & Co., Ltd.* v. *Finisar Corp. & Fujitsu Network Communications, Inc.*, No. 2:13-cv-178 (E.D. Texas), Bates # PARKER-TS_0001510-PARKER-TS_0001528, 19 pages.
Parker, "The Digitally Tuneable Optical Wavelength Filter," *Telecom Wavelength Switching [Applications For] 1-D Holographic Systems*, Chapter 4, pp. 1-23, produced in *Thomas Swan & Co., Ltd.* v. *Finisar Corp. & Fujitsu Network Communications, Inc.*, No. 2:13-cv-178 (E.D. Texas), Bates # PARKER-TS_0000686-PARKER-TS_0000697, 12 pages.
Parker, et al., "Dynamic Digital Holographic Wavelength Filtering," *Journal of Lightwave Technology*, vol. 16, No. 7 (Jul. 1998).
Parker, M, "Optoelectronics Project Lent Term 1991 Report," Sidney Sussex College, Cambridge, consisting of 18 pages (1991), produced in *Thomas Swan & Co., Ltd.* v. *Finisar Corp. & Fujitsu Network Communications, Inc.*, No. 2:13-cv-178 (Ed. Texas), Bates # PARKER-TS_0000856-PARKER-TS_0000873, 18 pages.
Parker, M. C. et al., "Active holographic spectral equalization and channel management for WDM," OSA/OFC (1997).
Parker, M. C. et al., "Digital Holographic Tuning Mechanism for WDM," IEEE (1996).
Parker, M. C. et al., "Digitally Tunable Wavelength Filter and Laser," IEEE, Photonics Technology Letters (Aug. 1996).
Parker, M. C. et al., "Dynamic Holographic Spectral Equalization for WDM," IEEE, Photonics Technology Letters (Apr. 1997).
Parker, M., "Optical Switching in Telecommunications Networks," *1st Year PhD Report, Cambridge University Engineering Department*, consisting of 8 pages (1993), produced in *Thomas Swan & Co., Ltd.* v. *Finisar Corp. & Fujitsu Network Communications, Inc.*, No. 2:13-cv-178 (Ed. Texas), Bates # PARKER00005-PARKER00012, 8 pages.
Parker, M.C. et al., "Arrayed-Wavedguide grating passband by Flattening by Combined Phasing Amplitude Apodisation," ECOC '98 (1998).
Parker, M.C. et al., "High Usage Optical Access Architecture Featuring Coarse Space-Wavelength Routing," ECOC '98 (1998).
Parker, M.C. et al., "Programmable Holographic Elements for WDM," IEE (1997).
Parker, M.C. et al., "Reduced Wavelength-Count Vector Addressed Multi-Stage Access Network Based on Phased Array Optical Routers," CWC—Practical Applications of Coherent Sources (1998).
Parker, M.C. et al., "Space-wavelength-routed ATM access architecture based on cascaded programmable arrayed-waveguide gratings," CLEO '98, Thursday Afternoon (1998).

(56) References Cited

OTHER PUBLICATIONS

Parker, M.C. et al., "Wavelength-Tolerant Optical Access Architectures Featuring N-Dimensional Addressing Cascaded Arrayed Waveguide Gratings," IEEE, Journal of Lightwave Technology (1998).
Parker, M.C., et al., "Digitally Tunable Erbium Doped Fibre Laser," pp. 1-2, Cambridge University, produced in *Thomas Swan & Co., Ltd.* v. *Finisar Corp. & Fujitsu Network Communications, Inc.*, No. 2:13-cv-178 (E.D. Texas), Bates # PARKER-TS_0000224-PARKER-TS_0000225, 2 pages.
Parker, M.C., et al., "Digitally Tunable Fibre Ring Laser," consisting of 9 pages, Cambridge University, produced in *Thomas Swan & Co., Ltd.* v. *Finisar Corp. & Fujitsu Network Communications, Inc.*, No. 2:13-cv-178 (E.D. Texas), Bates # PARKER-TS_0000345-PARKER-TS_0000353, 9 pages. (no Date).
Parker, M.C., et al., "Free Space Optical Switching," consisting of 9 pages, Cambridge University, produced in *Thomas Swan & Co., Ltd.* v. *Finisar Corp. & Fujitsu Network Communications, Inc.*, No. 2:13-cv-178 (E.D. Texas), Bates # PARKER-TS_0000673-PARKER-TS_0000681, 9 pages. (no Date).
Parker, M.C., et al., "Tunable Holographic Wavelength Filter," pp. 1-4, Cambridge University (1995), produced in *Thomas Swan & Co., Ltd.* v. *Finisar Corp. & Fujitsu Network Communications, Inc.*, No. 2:13-cv-178 (E.D. Texas), Bates # PARKER-TS_0000198 — PARKER-TS_0000202, 5 pages. (no Date).
Parker, M.C., et al., "WDM Channel Management Using Programmable Holographic Elements," Cambridge University, consisting of 1 page, produced in *Thomas Swan & Co., Ltd.* v. *Finisar Corp. & Fujitsu Network Communications, Inc.*, No. 2:13-cv-178 (E.D. Texas), Bates # PARKER-TS_0001025, 1 page. (no Date).
Parker, Michael C. et al., "A novel active holographic arrayed waveguide grating for WDM Subsystems," (2000).
Parker, Michael C. et al., "Design of Arrayed-Waveguide Gratings Using Hybrid Fourier-Fesnel Transform Techniques," IEEE (1999).
Parker, Michael C., "Dynamic Holograms for Wavelength Division Multiplexing," Thesis, Sidney Sussex College (1996).
Patel, J. S. et al., "Liquid Crystal and Grating-Based Multiple-Wavelength Cross-Connect Switch," IEEE, Photonics Technology Letters (1995).
Patel, J. S. et al., "Tunable Polarization Diversity Liquid-Crystal Wavelength Filter," IEEE Photonics Technology Letters (Aug. 1991).
Payne, F., "Part II EIST Paper E6, Optical Fibres and Integrated Optics," Cambridge University, pp. 1-35, produced in *Thomas Swan & Co., Ltd.* v. *Finisar Corp. & Fujitsu Network Communications, Inc.*, No. 2:13-cv-178 (E.D. Texas), Bates # PARKER-TS_0000875-PARKER-TS_0000894, 20 pages.
Pu' Chuan et al., "Micro-Machined Optical Add-Drop Multiplexer with Client Configurability," IEEE (Aug. 2000).
Ramaswami, R. et al., Chapter 3, Components, Optical Networks, Morgan Kaufman Publishers (1998).
Rhee, et al., "Variable Passband Optical Add-Drop Multiplexer Using Wavelength Selective Switch," ECOC01 (2001).
Riza, Nabeel A. et al., "Fault-tolerant dense multiwavelength add-drop filter with a two-dimensional digital micromirror device," Optical Society of America (1998).
Riza, Nabeel A. et al., "Micromechanics-based wavelength-sensitive photonic beam control architectures and applications," Optical Society of America (Feb. 20, 2000).
Riza, Nabeel A. et al., "Multi-Wavelength 2×2 Switch Structure using Mirror Array," IEEE (1999).
Riza, Nabeel A. et al., "Wavelength Sensitive Photonic Modules for Signal Conditioning," Photonics Info Processing Systems Laboratory UCF (Apr. 1, 2000).
Riza, Nabeel A., "Liquid Crystal Electro-Optical Switching Approaches," OSA-IPR (Jul. 12, 2000).
Roberts, Nicholas, "Binary phase gratings for hexagonal array generation," OptComm (1992).
Ryf, R., "1296-port MEMS Transparent Optical Crossconnect with 2.07 Petabit/s Switch Capacity," in *Tech. Dig. OSA Conference on Optical Fiber Communication*, pp. PD28-1-PD28-3 (2001).
Scarr, R. W. A. et al., "Highly parallel optics in ATM switching networks," IEEE, Proc.-Optoelectron. (Apr. 1997).
Seekola D. L. et al., "Liquid Crystal Technology Development for Telecommunication Applications," SPIE, Liquid Crystals (Oct. 24, 2000).
Shirai, Seiiti et al., "Optical beam shifter module with high extinction ration for 1024-input-port optical switching network," SPIE, Photonic Switching (1992).
Shirai, T. et al., "Adaptive wave-front correction by means of all-optical feedback interferometry," OSA, Optics Letters (Jun. 1, 2000).
Shirasaki, M. et al., "Polarization-independent grating type optical spectrum analyzer with fiber interface," OSA/OFC (1991).
Slack, J. K., et al., "Multiplexing/Demultiplexing Architectures for WDM Optical Communications," Kings College, pp. 1-32 (1995), produced in *Thomas Swan & Co., Ltd.* v. *Finisar Corp. & Fujitsu Network Communications, Inc.*, No. 2:13-cv-178 (E. D. Texas), Bates # PARKER-TS_0001530-PARKER-TS_0001561, 32 pages.
Stalder, M. et al., "Electrically switchable diffractive optical element for image processing," OSA, Optics Letters (Jan. 1, 1994).
Stanley et al., "A novel electro-optic modulator system for the production of dynamic images from Giga-pixel computer generated holograms," SPIE (2000).
Sumriddetchkajorn, Sarun, "Fiber-Optic Beam Control Systems Using Microelectromechanical Systems (MEMS)," UMI, ProQuest Dissertations (2000).
Tan, Kim L. et al., "Dynamic holography for optical interconnections. I. Noise floor of lowcross-talk holographic switches," OSA (Jan. 2001).
Tan, Kim L. et al., "Dynamic holography for optical interconnections. II. Routing holograms with predictable location and intensity of each diffraction Order," OSA (Jan. 2001).
Tan, Kim L. et al., "Dynamic Holography Using Ferroelectric Liquid Crystal on Silicon Spatial Light Modulators Thesis," University of Cambridge (1999).
Tan, Kim L. et al., "The Design and Fabrication of a Silicon Backplane Spatial Light Modulator for Silicon-transparent 1.5 mm IR Quarternary Operation," OECC '98, Technical Digest (1998).
Tee C.A., et al., "Design of a free space optical switch demonstrator for a VCSEL-based photonic packet switch," OSA/OC (2000).
Tee, Clarence A. T. H. et al., "Binary phase modulation using electrically addressed transmissive and silicon backplane spatial light modulators," SPIE (Sep. 1, 2000).
Tee, Clarence A. T. H. et al., "Phase modulation using the silicon backplane spatial light modulator and transmissive glass," SPIE, Optical Computing and Interconnects (Oct. 1, 1999).
Thompson, G.H.B., "Effect of Injected Carriers on Dielectric Constant of Semiconductor," *Physics of Semiconductor Laser Devices*, pp. 535-537 (1980), produced in *Thomas Swan & Co., Ltd.* v. *Finisar Corp. & Fujitsu Network Communications, Inc.*, No. 2:13-cv-178 (E.D. Texas), Bates # PARKER-TS_0000682-PARKER-TS_0000683, 2 pages.
Timofeev, F.N. et al.,"1.5um free-space grating multi/demultiplexer and routing switch," IEE, Electronics Letters (Jul. 4, 1996).
Tomlinson, W.J., "Technologies and Architectures for Multiwavelength Optical Cross-Connects," *LEOS*, vol. 1, *IEEE*, pp. 53-54 (1995).
Tooley, et al., "Optoelectronics Crossbar for Avionics Star," IEE (2000).
Travers, Christine M. et al., "4×4 ATM Crossbar using N4 Global FSOI," IEEE, LEOS Summer Topical Meetings (Jul. 1998).
Tricoles, G., "Computer Generated Holograms: an Historical Review," *Applied Optics*, vol. 26, No. 20, pp. 4351-4360, (1987).
Turnbach, S. et al., "Special Technology Area Review on Micro-Opto-Electro-Mechanical-Systems (MOEMS)," Dept. of Defense (Dec. 1, 1997).
U.S. Appl. No. 60/293,126, filed May 23, 200, entitled "Method for Pattern Generation". Inventors Rancuret, et al.
Ulrich, D. et al.,"A Diffraction Based Polarisation Independent Lightvalve," IEE, (2000).
Underwood, et al., "VLSI Design and Fabrication for Liquid Crystal on Silicon," IEE (2000).
Underwood, I. et al., "A high performance spatial light modulator," SPIE, Devices for Optical Processing (1991).

(56) References Cited

OTHER PUBLICATIONS

Underwood, I. et al.,"Antiferroelectric Liquid Crystal on Silicon," IEEE (2000).
Underwood, I. et al., "Evaluation of an nMOS VLSI array for an adaptive liquid-crystal spatial light modulator," IEE Proceedings, 133, Part J(1): 77-82 (Feb. 1986).
Underwood, I., "An nMOS Addressed Liquid Crystal Spatial Light Modulator," Univ. of Edinburgh (1987).
Vinouze, B. et al., "Optical switches for cross-connects using high efficiency nematic liquid crystal gratings," SPIE, Conference on Optoelectronic Interconnects VI (1999).
Walker, A.C. et al., "Construction of a Matrix-Matrix Crossbar Optical Interconnect Employing Diffractive Fan-Out and Fan-In Elements," Holographic Systems, Components and Applications (Sep. 1993).
Walker, Steven J. et al., "Optics & MEMS," Naval Research Laboratory (1999).
Wang, Xu et al., "Liquid crystal on silicon beam deflector," SPIE, Conference on Diffractive and Holographic Technologies (1999).
Wang, Yalou et al., "Modelling for Optically Interconnected Packet Switches," SPIE, Terabit Optical Networking: Architecture, Control, and Management Issues, pp. 44-55, (2000).
Warr, "Free-Space Switching for Optical Fibre Networks, Thesis," Christ's College (1996).
Warr, S T., et al, "High Capacity Optical Hybrid Communication Switch," In Confidence, Draft 2.2, consisting of 14 pages (1994), produced in *Thomas Swan & Co., Ltd.* v. *Finisar Corp. & Fujitsu Network Communications, Inc.*, No. 2:13-cv-178 (E.D. Texas), Bates # WARR00693-WARR00706, 14 pages.
Warr, S. T. et al, "Optically transparent digitally tunable wavelength filter," Electronics Letters (Jan. 19, 1995).
Warr, S. T. et al, "Polarisation insensitive operation of ferreoelectric liquid crystal devices," IEE, Electronics Letters (Mar. 6, 1995).
Warr, S. T., et al., "Polarisation Insensitive One-to-Any Single-Mode Fibre Switch," *Cambridge University, Department of Engineering*, pp. 1-3, produced in *Thomas Swan & Co., Ltd.* v. *Finisar Corp. & Fujitsu Network Communications, Inc.*, No. 2:13-cv-178 (E.D. Texas), Bates # WARR00683-WARR00685, 3 pages.
Warr, S. T., et al., "Optically Transparent Wavelength Selective Switch," In Confidence, Draft 2.2, consisting of 11 pages (1994), produced in *Thomas Swan & Co., Ltd.* v. *Finisar Corp. & Fujitsu Network Communications, Inc.*, No. 2:13-cv-178 (E.D. Texas), Bates # WARR00103-WARR00113, 11 pages.
Warr, S., et al., "Tripping the Light Fantastic," *Photonics & Optoelectronics Group, Cambridge University Engineering Department*, consisting of 17 pages, produced in *Thomas Swan & Co., Ltd.* v. *Finisar Corp. & Fujitsu Network Communications, Inc.*, No. 2:13-cv-178 (Ed. Texas), Bates 14 WARR00066-WARR00082, 17 pages.
Warr, Stephen et al., "Polarisation Insensitive Diffractive FLC Systems," OPA, Ferroelectrics (1996).
Weiner, A. M. et al., "Electronically Programmable Femtosecond Pulse Shaping Using a Multielement Phase Modulator," Springer-Verlag Berlin, Heidelberg (1990).
Weiner, A. M. et al., "High-resolution femtosecond pulse shaping," J. Opt. Society of America (Aug. 1988).
Weiner, A. M. et al.,"Synthesis of phase-coherent, picosecond optical square pulses," Optical Society of America (Mar. 1, 1986).
Weiner, A.M., "Femtosecond pulse shaping using spatial light modulators," American Institute of Physics, Review of Scientific Instruments (May 2000).
White, H. et al., "SLM-Based Optical Crossbars Based on the Matrix-Matrix Principle," IEEE, Optical Switching (1993).
White, H. J. et al., "Optically connected parallel machine; Design, performance and application," IEEE, Proc.-Optoelectron. (Jun. 1999).
White, H.J. et al.,"The OCPM Demonstration System," OSA, Photonics in Switching (Mar. 15, 1995).
Wilkinson, T.D. et al., "Dynamic asymmetric binary holograms using a ferroelectric liquid crystal spatial light modulator," Optics Communications (1994).
Wilkinson, T.D. et al.,"Ferroelectric Liquid Crystal on Silicon Spatial Light Modulator Designed for High Yield and Low Cost Fabrication: The Fast Bitplane SLM," OPA, Ferroelectrics (1998).
Wilkinson, T.D. et al., "High Tilt Angle FLC SLM for Optical Interconnects," IEEE The Institute of Electrical Engineers (2000).
Wilkinson, T.D. et al., "Holographic Crossbar Switch Using Asymmeetric Binary Holograms," Cambridge (1994).
Wilkinson, T.D. et al., "New Applications for Ferroelectric Liquid Crystals," Liquid Crystals Today (Dec. 1994).
Wilkinson, T.D. et al., "Optical Comparator based on FLC LCOS tech," Cambridge University (2000).
Wilkinson, T.D. et al., "Opto-RAM a device for high bit rate packet switching," OSA-SLM (1999).
Wilkinson, T.D., "Phase Modulation Using Spatial Light Modulators," pp. 1-7 (1993), produced in *Thomas Swan & Co., Ltd.* v. *Finisar Corp. & Fujitsu Network Communications, Inc.*, No. 2:13-cv-178 (E.D. Texas), Bates # PARKER-TS_0001389-PARKER-TS_0001395, 7 pages.
Wilkinson, T.D., et al., "Applications of Ferroelectric Liquid Crystal LCOS Devices Ferroelectrics", Gordon & Breach Science Publishers (2002).
Wilkinson, T.D., et al., "Breaking Symmetry in the Binary Phase Only Matched Filter," *Optics Communications 115*, pp. 26-28 (1995), produced in *Thomas Swan & Co., Ltd.* v. *Finisar Corp. & Fujitsu Network Communications, Inc.*, No. 2:13-cv-178 (Ed. Texas), Bates # WARR00780-WARR00785, 6 pages.
Wilkinson, T.D.,"Optical Routing with Liquid Crystal Arrays," SPIE (2001).
Wilkinson, T.D.,"Spatial light modulator designed for high-speed binary phase modulation," OSA-SLM (1999).
Williams, D.L. et al., "Optical mode locking of an EDFL at 10GHz by using 20 m of highly nonlinear silica-base fiber" OFC Technical Digest, 8: 293-294 (1995).
Williams, D.L. et al., "Optical modelocking at 10GHz using a highly nonlinear germanosilicate optical fibre," Electronics Letters, 31(15): 1256-1257 (Jul. 20, 1995).
Wilmsen, Carl et al.,"VCSEL Based High Performance ATM Switch," Vertical-Cavity Lasers, Technologues for a Global Information Infrastructure (Aug. 13, 1997).
Wilmsen, Carl et al., "Vertical cavity surface emitting laser based optoelectronic asynchronous transfer mode switch," SPIE Optical Engineering (Jul. 1, 1999).
Wolffer, N. et al., "8×8 holographic single mode fiber switch based on electrically addressed nematic liquid crystal deflectors," SPIE, Optics in Computing (May 24, 2000).
Wolffer, N. et al., "Holographic switching between single mode fibers based on electrically addressed nematic liquid crystal gratings with high deflection accuracy," Elsevier Science, Optics Communication (Feb. 1, 1999).
Wu, Ming, "An overview of micromachining for optical communications," OFC, Technical Digest (1997).
Xu H., et al., "A simple method for optically enhancing the small electro-optical effects of fast switching electroclinic liquid crystals," Applied Physics Letters (1999).
Xu H., et al., "Fast Switching Electroclinic Mixtures Based on a Series of Chloroester Homolgues," OPA (1999).
Yamamoto, Tsuyoshi et al., "A multi-channel free-space optical switch using liquid crystal polarization control devices," SPIE, Photonic Switching (1992).
Yamazaki, H., and Yamaguchi, M., "4×4 Free-Space Optical Switching Using Real-Time Binary Phase-Only Holograms Generated by a Liquid-Crystal Display," Optics Letters, vol. 16, No. 18, pp. 1415-1417, Sep. 15, 1991.
Yamazaki, Hirofumi et al., "1X1104 holographic switching with a ferroelectric liquid-crystal spatial light modulator," OSA, Optics Letters (1995).
Yamazaki, Hirofumi et al., "Experiments on a multichannel holographic optical switch with the use of a liquid-crystal display," OSA, Optics Letters (Sep. 1, 1992).
Yamazaki, Hirofumi et al., "Holographic optical switching using a ferroelectric liquid crystal spatial light modulator," SPIE, Photonic Switching (1992).

(56) References Cited

OTHER PUBLICATIONS

Yamazaki, Hirofumi et al., "Large-scale holographic switch with a ferroelectric liquid-crystal spatial light modulator," IEEE (1997).
Yim, L.W.K. et al., "Comparison of operation parameters between binary and analogue switching pixellated light valves," IEE, Proc.-Optoelectron. (Aug. 1998).
Yiptong, A. et al., "Holographic Equalisation using active Arrayed Waveguide Gratings," IEEE (1998).
Yu, T.C.B et al., "Optical Learning in a Smart Spatical Light Modulator," Cambridge (1994).
Zhang, L.M., et al., "Dynamic response of colliding-pulse mode-locked quantum-well lasers," *Quantum Electronics, IEEE Journal of*, vol. 31, No. 2, pp. 240,243 (1995), produced in *Thomas Swan & Co., Ltd.* v. *Finisar Corp. & Fujitsu Network Communications, Inc.*, No. 2:13-cv-178 (Ed. Texas), Bates # PARKER-TS_0000684-PARKER-TS_0000685, 2 pages.
European Examination Report for EP Application No. 13750928.7, dated Jun. 20, 2018.
Sorimoto, K. et al., "Phase Error Compensation for Multilayered AWG in LCOS-based WSS," IEICE Electronics Express, 8(24): pp. 2054-2060 (2011).

\* cited by examiner

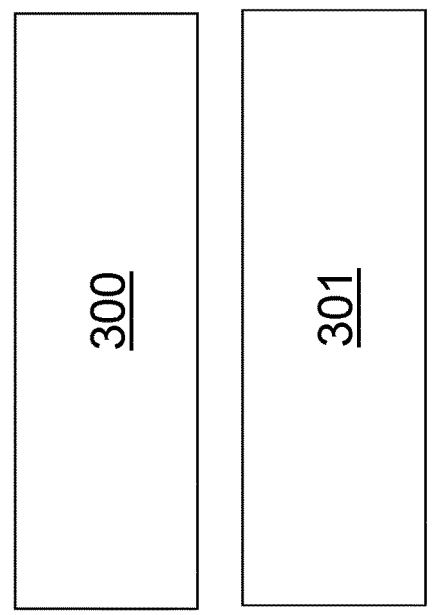
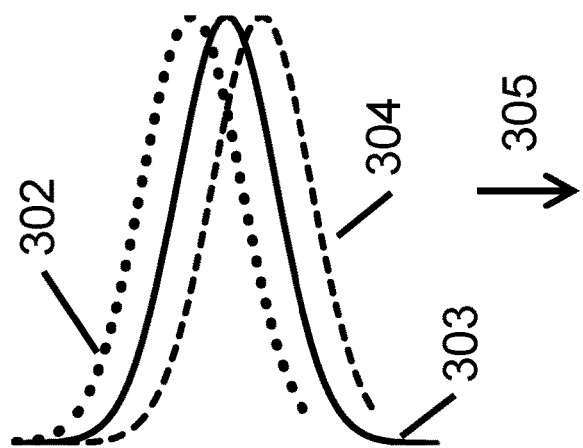
Figure 3

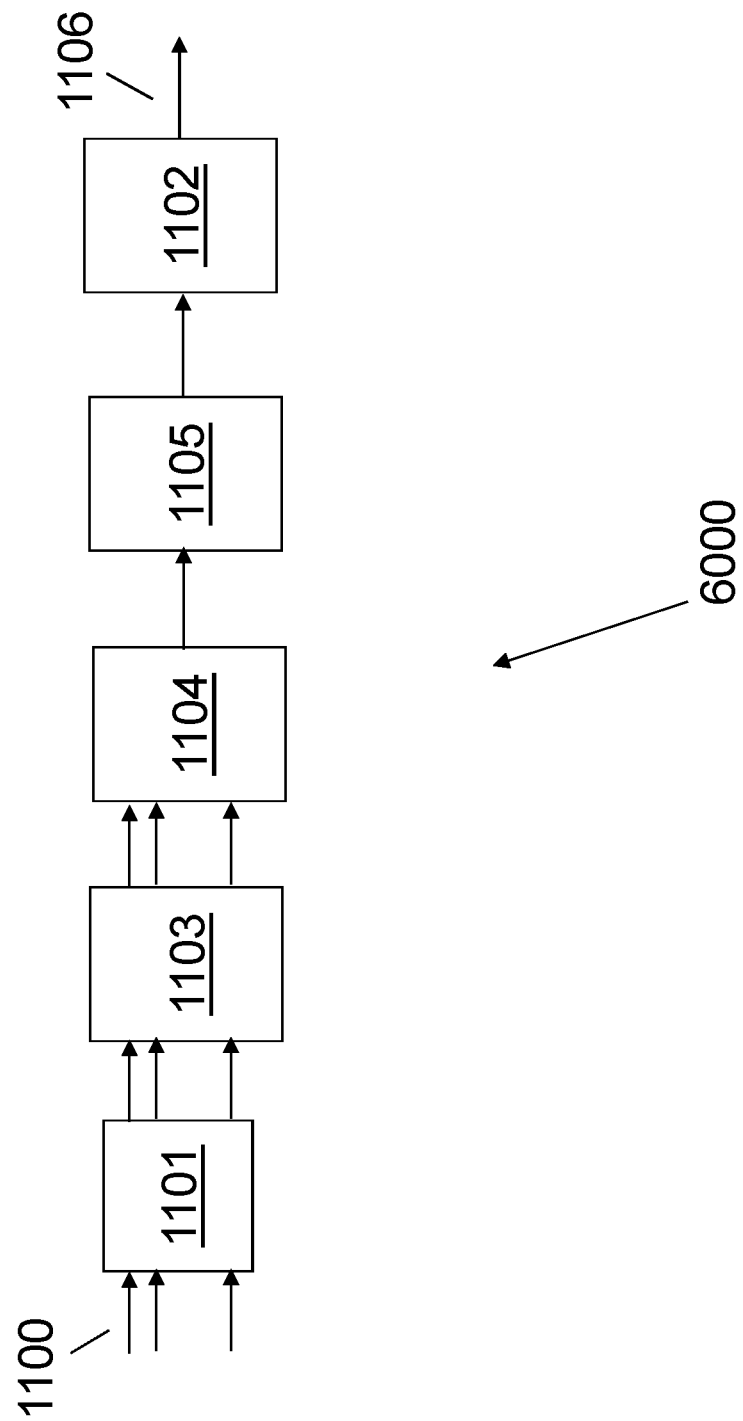

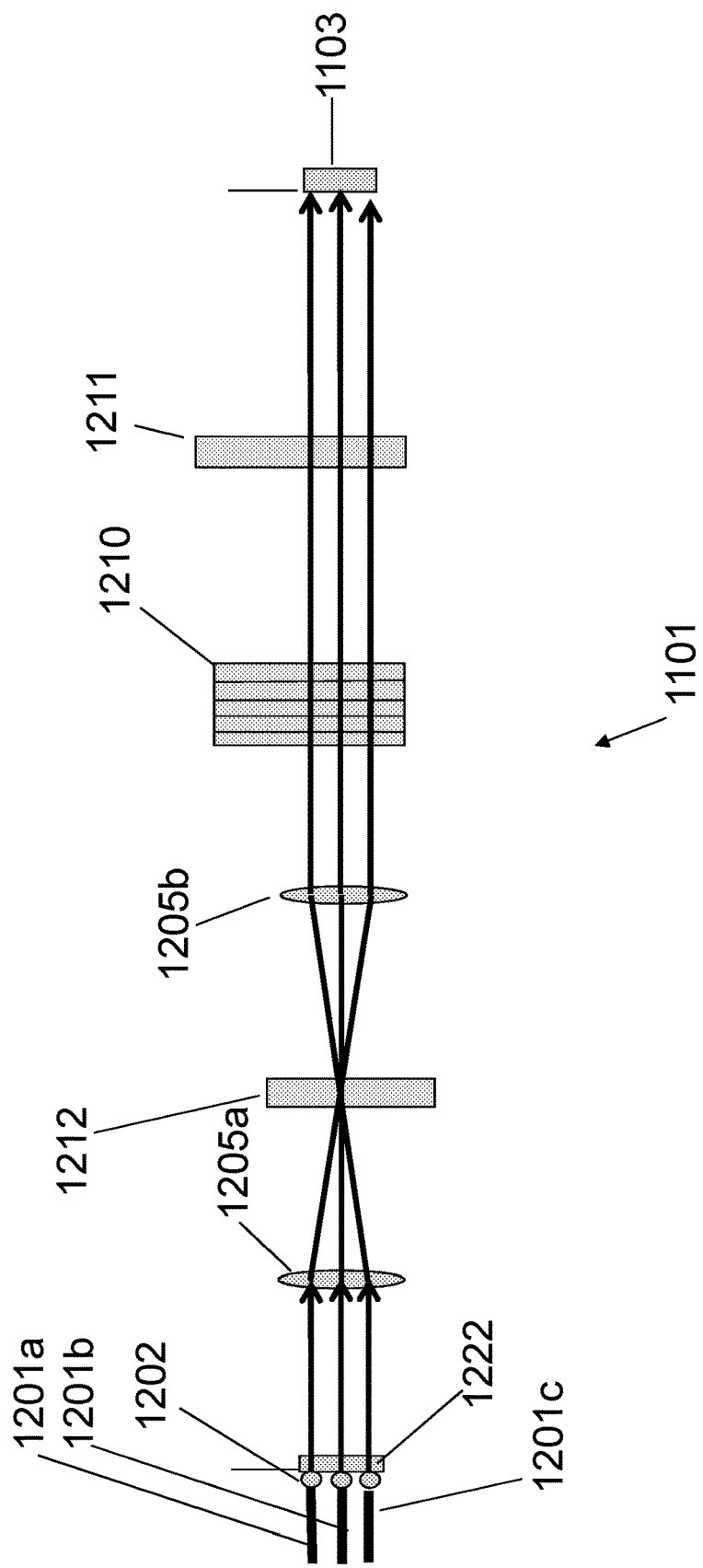

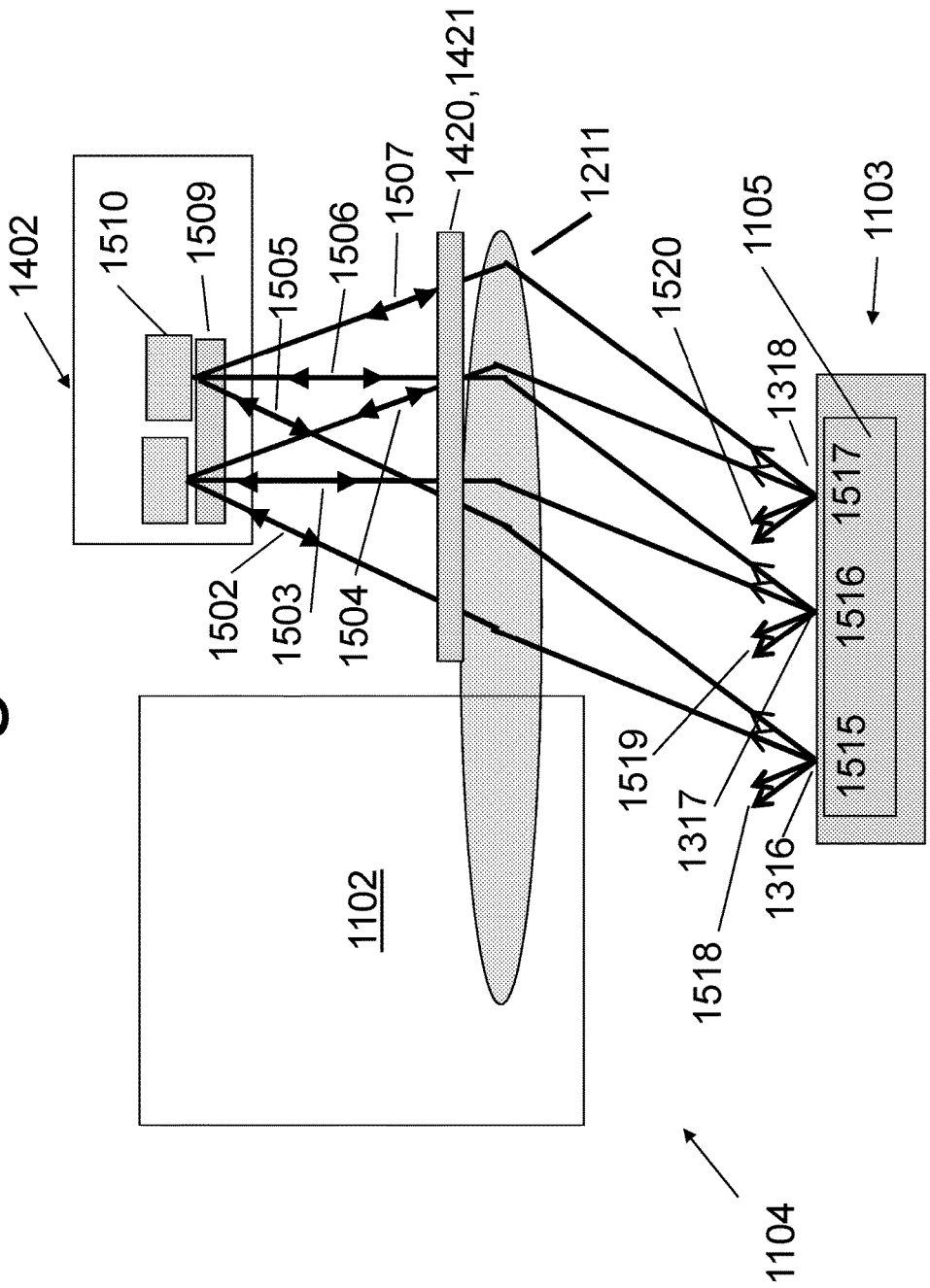

OPTICAL DEVICE AND METHODS

This application is the U.S. National Stage of International Application No. PCT/GB2013/052174, filed Aug. 15, 2013, which designates the U.S., published in English, and claims priority under 35 U.S.C. § § 119 or 365(c) to Great Britain Application No. 1214555.3, filed Aug. 15, 2012.

1 FIELD

The present disclosure concerns optical systems, device and methods. Some embodiments relate to optical switches, others to devices and methods of controlling light.

2 BACKGROUND

2.1 WSS Technology

Wavelength selective switches—hereinafter "WSS"—are now an established component in WDM—wavelength division multiplexing—networks. The main technologies are MEMS, LC and 2D LCOS, the latter being a two dimensional array of pixels implemented in a Liquid Crystal on Silicon device.

As in known to those skilled in the art, WDM requires plural wavelength channels. Each channel has a channel width or passband, i.e. the channel comprises more than one wavelength, usually a continuum of wavelengths. Channels are usually spaced apart by wavelength regions that do not or should not have light in them. Light does not necessarily mean visible light. As is well known, communications may use NIR.

A consequence of WDM is the need to demultiplex, i.e. extract one or more wavelength channels from a light beam carrying an ensemble of different channels, to allow the information content of the extracted channels to be passed, for example to a data consumer. Another consequence is the need to multiplex, i.e. add into such a light beam one or more wavelength channels. The operations are sometimes referred to as "drop" operations and "add" operations. The device performing these operations is sometimes referred to as an "add/drop multiplexer". Add drop multiplexers typically use a first type of routing device for dropping wavelength channels and a second type of routing device for adding wavelength channels. The simplest add drop multiplexer drops and adds wavelength channels from and to a single WDM transmission system, with a single dropping device and a single adding device. More complex add drop multiplexers are used at WDM routing nodes, and might have a set of dropping devices, one for each transmission system bringing optical signals into the node and a set of adding devices, one for each transmission system carrying optical signals away from the node. Either the routing devices that drop wavelengths, or the routing devices that add wavelengths, or both types of routing device, may be a wavelength selective switch (WSS). As well as selecting wavelength channels to be dropped at the node, and selecting wavelength channels to be added at the node, a further operation inside the node, is to route incoming wavelength channels that are not dropped, to a particular outgoing transmission system. Such channels are usually called express channels.

WSS are reconfigurable, allowing the selected added, dropped and express channels to be reconfigured without manual intervention. WSS also typically provide channel equalisation functions, to equalise the power in express channels as they enter an outgoing transmission system. Further, WSS may block wavelength channels. Such blocking, known as wavelength blocking, allows a passive splitting device to be used as the dropping routing device, with a WSS used as the adding routing device, leading to the so called broadcast and select architecture. Similarly, a passive combining device may be used as the adding routing device, with a WSS used as the dropping routing device.

LCOS WSS are advantageous over MEMS WSS in that the use of LCOS allows channel passbands and centre wavelengths to be reconfigured to support emerging requirements for "flexspectrum".

Using an LCOS WSS for both types of routing device, that is both the adding device and the dropping device, in the so-called route and select architecture, helps to achieve crosstalk (port isolation) targets for express channels, but adds cost, compared to the broadcast and select architecture. Crosstalk targets are considered to be stricter for coherent systems, than for direct detection. Hence a WSS with intrinsically lower crosstalk has the potential to both improve performance, as required for coherent systems, while also reducing costs by allowing crosstalk targets to be met without the route and select architecture.

Embodiments are not restricted to WDM applications, and may be applied to situations where a broad continuum of wavelengths is processed.

2.2 WSS Prior Art

Prior to the first known WSS, Tomlinson describes a switch that acts like an independent crossbar switch for every wavelength: a single mirror is provided for each of the anticipated WDM channels at the main input to the device. A signal at a particular wavelength entering the main input or any of the add inputs, will be routed to the same mirror. If this mirror is set to the express state, the signal for the corresponding channel entering the main input will be routed to the main (express) output: what happens to any signal at the same wavelength entering the add input(s), depends on how the switch is arranged. If this mirror is set to the "add state", the signal entering the add input will be routed to the express output, while the signal entering the main input will be routed to the drop port. The device may have more than one pair of add/drop ports so configured. Although this generic architecture could easily be developed to include channel equalisation, it has two fundamental problems. Firstly, the add and drop routing configurations are not independent, secondly, any channel equalisation applied to an added signal, would automatically be added to a dropped signal. These two constraints make the device impractical for use in a real network.

The first known WSS patent was from Capella. In this architecture, separate routing devices are used to add and drop signals: hence the selection and control of added and dropped channels is independent. The provisional application (March 2001) U.S. 60/277,217 described a switch with an individual MEMS mirror per wavelength channel, aligned dynamically with a servo mechanism to the incident beam, providing "dynamic drop of one or more wavelength channels on any one of multiple drop ports", which is the WSS functionality. The August 2001 application teaches that the "input multiwavelength beam is preferably collimated and circular in cross section", however the February 2002 application Ser. No. 10/076,145, their first to deal with polarisation diversity, teaches "an anamorphic beam magnification by a beam modifying unit [ . . . which] preferentially enlarges the beam size in the direction perpendicular to the groove lines on the diffraction grating", i.e. in the dispersion plane. Later the application teaches that "the beam modifying unit may comprise an assembly of cylindrical lenses or prisms; [ . . . ] any optical structure that is capable of magnifying the input optical signal and demagnifying the reflected optical beams according to a predetermined ratio [and that] such a unit may be particularly useful in applications that call for a refined spectral resolution, such as DWDM optical networking applications". In this application, a polarisation diversity scheme is described in which the polarisation components are displaced transversely, either in the dispersion plane of the grating, or in the orthogonal plane (herein called the switch plane), so that they travel parallel towards the focusing lens, and such that both polarisation components for a given wavelength, are focused to the same point on the MEMS array.

The use of anamorphic beam magnification was already known at this time, albeit not combined with the WSS functionality. Lucent [Bishop and Giles] in a March 1999 application, describe the use of a 2D array of micromirrors to act as a "pixellated WDM component" to apply spectral equalisation. They teach that the "different wavelength components are displaced in a horizontal direction to be incident on different vertical columns of micromirrors. It would also be advantageous if each component is spread a uniform amount in the vertical direction to utilize a large number of pixels in each vertical column" . . . "so that the attenuation level introduced can be controlled with a continuous fine grain structure".

Anamorphic beam magnification was taught by Arroyo Optics to "reduce the height of the internal optical components and the overall package size". In their first provisional application (July 2001) they describe an optical architecture with 1 or 2 inputs and 1 or 2 outputs: its functionality is based on MEMS mirrors or amplitude modulating LC devices, and acts like the Tomlinson architecture, so it is not a WSS. In their second provisional application (November 2001) they describe an optical architecture using "LC-SLMs" to process beams, consisting of "individual pixels or cells" that can be "analog, functioning as attenuators, limiters or equalisers, or digital, [varying between] essentially full transmission or full extinction". The aspect ratio of the beams incident on the LC device is 7:1, however, in their August 2002 application the aspect ratio is "more than an order of magnitude", with quoted beam dimensions at the LC SLM being 8 to 11 µm in the dispersion plane, and 200 to 250 µm orthogonal to this direction, that is an aspect ratio between 18 and 31.

They describe a different polarisation diversity scheme, using a "Wollaston prism beamsplitter system which diverges the polarisation components of the DWDM beam by a small separation angle [converging] as separate polarisation components towards a liquid crystal array at a focal plane" [ . . . ] "Separate polarisation components may be superimposed, to be coincident on the liquid crystal surface, or they may be separate". This application also taught the use of subchannel processing to provide a "smoothly distributed response". However the applications were limited to at most 4 port devices, with single drop and add ports.

The present inventor filed a patent application in September 2001, published as WO03021341. A first class consisted of inventions necessary to adapt LCOS to the WSS application, a second class consisted of inventions using the flexibility provided by LCOS, to improve the functionality of a WSS, A third class consisted of inventions in the way WSS may be connected together, a fourth class consisted of inventions using the programmability of LCOS, to improve the optical performance of the system and a fifth class used the predetermined assignment of at least approximate positions on the array to particular wavelengths, to simplify the control system and improve the wavelength dependence of LCOS switching.

JDS Uniphase filed their provisional application in July 2001, but the WSS functionality was described as "MEMS specific. It cannot be realized with LC architecture". However the full application in January 2002 also teaches the use of a "liquid crystal deflection array", also described as a "transmissive deflector array (e.g. a liquid crystal optical phase array (LC OPA) [ . . . ] The LC deflection array includes at least one row of liquid crystal cells or pixels. Typically each pixel in the array includes an optical phase array acting as an electro-writable diffraction grating [ . . . ] An addressing module selects an angle of deflection."

As the demands on the network capacity have increased, there is now an emerging need for WSS with 20 or more ports. Furthermore, flexible spectrum functionality, enabled by reconfiguring the channels, is now becoming an industry standard.

At this point techniques commonly used to control crosstalk in optical switches using LCOS become a design bottleneck. They also add control complexity, operating costs and manufacturing overheads. Further, "modular" innovation is required, introducing new design paradigms to overcome these problems. These new design paradigms make further use of anamorphic beam transformations, for example, using orthogonal (crossed) cylindrical or acylindrical optical elements that have qualitatively different effects in orthogonal planes, such as an imaging function in one plane and a Fourier transform function in the orthogonal plane.

2.3 Problems with the Current State of the Art in LCOS WSS

An LCOS array used in a WSS operates by controlling the physical direction of optical beams that travel through the switch. These optical beams have a start location at a switch input, and a destination location at a switch output. Therefore the physical route taken by each beam defines an optical pathway through the switch.

An LCOS WSS operates by forming optical pathways, (sometimes referred to as "switch channels") through the switch and distributing incident light by wavelength into those pathways. The incoming light is typically dispersed by wavelength onto a LCOS SLM. The light modulating elements (sometimes referred to as "pixels") of the LCOS SLM are grouped together, and each group is assigned to a wavelength of light. As noted above, in practice, incoming light to the LCOS WSS is unlikely to be a set of purely monochromatic wavelengths. It is instead likely that each nominal wavelength will in fact consist of a range of wavelengths; for any nominal wavelength this range will be spread across the light modulating elements of the relevant group, again spatially spread by frequency.

Each switch channel has a filter function which corresponds to the relationship between the light at the switch input and at the switch output when broadband light is applied. Then when an input channel is applied to the switch input, concatenation of the filter function with the input channel creates the channel spectrum at the output.

The filter function for the switch channel in a current LCOS WSS can be derived mathematically by decomposing or measuring the distribution of the monochromatic frequency components of input broadband light by wavelength across each group of pixels as a frequency-dependent summation of spots of incident light, each spot having a position and size, and taking into account the relative size, shape and position of the group of pixels relative to each spot, and the coupling efficiency into the output fibre or waveguide.

A second optical pathway is, in some instances, created by an immediately adjacent hologram applied to an immediately adjacent group of pixels. However this is likely to cause crosstalk due to light spilling over from the first pathway into the second.

To improve the crosstalk performance, there may be an intermediate group of pixels, deflecting light in a 3rd direction. This intermediate region has the effect of improving the extinction of light for the first pathway.

The group of pixels for each nominal wavelength of light is typically controlled to cause light that was incident upon the group at a first angle to leave the group at a different angle. This is achieved by a so-called "routing hologram".

In phase-only SLMs this routing hologram is ideally a piecewise linear phase ramp. In an idealised device, the phase varies like a staircase up the ramp to reach a maximum, then drops to zero over an infinitesimal region; the phase levels for a given digital voltage are independent of the state of a neighbouring pixel, uniform across the array, pre-determined, and the whole hologram is applied instantaneously. Such a device would have known predictable properties, and can be simulated offline to generate an ideal hologram, with a strong diffraction order aligned to land at or near a desired output port, and a set of other known, predictable diffraction orders that may cause crosstalk, according to their relative strength and the transverse offset between their output position and the output port(s) of the WSS. In a real LCOS device, the situation is much more complex, as will be described later. As a consequence of this complexity, it is quicker and easier to train holograms experimentally, using simple models to provide insight into training strategies to achieve good diffraction efficiency while controlling the unwanted diffraction orders that cause crosstalk.

Crosstalk has to be controlled within strict limits in a wavelength-routed network, e.g. to avoid homodyne beat noise. Unfortunately, crosstalk from unwanted diffraction orders is a natural consequence of using LCOS to route optical beams. The crosstalk problem has been studied extensively since the late 1980's. The effect of this technological problem is to add cost and complexity to design, LCOS quality control, hologram training (to be described), assembly and WSS quality control. These issues need to be addressed as the market matures and therefore prices drop, in order for LCOS WSS manufacture to stay profitable. Also, reducing the impact of a problem of this nature makes the product and process design much less interdependent and tightly coupled, therefore reducing time to market and design risk. Hence it is desirable to find a new solution to the crosstalk problem in LCOS WSS.

Typical design tricks to suppress crosstalk, dating from the mid 1990's onwards, include the use of irregular port spacing, geometric design so unwanted orders land away from the ports, microlenses to couple light into each output fibre or waveguide, to act as a spatial filter, not using the symmetric order for routing, and a lower limit to the phase ramp period ~10 times the pixel pitch. The effect of these constraints is to reduce the number of switch ports that fit within a given module height. Conversely, without these constraints we can have more ports in the same height. Therefore a method to ease crosstalk targets for the routing holograms is attractive for both profitability and performance.

In a real LCOS device used to apply routing holograms, the actual applied phase distribution, for a given distribution of RMS voltages across the pixels, depends on the local thickness (often called the cell gap) of the liquid crystal layer and any dielectric layers within the cell structure. Further, fringing fields act to smear out the applied field and hence smear out the applied phase distribution: in particular this creates the so-called flyback region inside the phase ramps, which makes a significant contribution to the unwanted diffraction orders causing crosstalk. Such effects are very time-intensive to model, making offline hologram design to achieve crosstalk targets a lengthy and expensive process.

Due to the cell gap dependence of the applied phase distribution, and also because the flyback length tends to increase with cell gap, the required distribution of RMS voltages to suppress crosstalk to acceptable levels depends on the local cell gap which naturally tends to vary across the LCOS device, enough so that the LCOS device has to be characterised as separate regions, each trained separately to achieve crosstalk targets. This increases manufacturing costs for training the holograms, also for testing the assembled WSS. Hence a method to relax crosstalk targets for the routing holograms is desirable. One method is to pass express channels through two WSS in series, where the first WSS also acts to drop channels or sets of channels, and the second WSS also acts to add channels or sets of channels. As a result, the overall crosstalk is dilated, however that increases the costs to customers.

The use of spacers within the liquid crystal layer does act to control the thickness in micro display applications, as is well known, so would reduce the need to characterise and train as separate regions. Also it is cheap to add spacers. However, the use of spacers causes disclinations (typically line defects where the continuity conditions for the liquid crystal director field break down) and scatters incident light: both effects cause further crosstalk which is undesirable in a telecoms switching application. Without the spacers the thickness varies more such that holograms need to be trained locally to meet crosstalk targets, as described previously.

Therefore it is desirable to reduce crosstalk caused by the use of spacers, providing a more uniform liquid crystal layer, reducing process variability as is desirable in maturing product markets. Once the spacers are in the LCOS, the cell gap variation and the consequent need to characterise and train as separate regions is considerably reduced. Further, previous training data may be applied to current LCOS SLMs undergoing hologram training. If necessary the training process may include measuring the LCOS array phase vs. RMS volts (or digital level) calibration and looking for the previous trained LCOS array with the closest matching set of calibration data.

Furthermore, crosstalk is also sensitive to the temperature dependence of the liquid crystal birefringence and elastic constants. Hence methods to remove crosstalk could ease the temperature dependence of the switch performance, and hence relax the need for fine temperature control.

Experimentally it is found that even when the crosstalk has been well controlled inside the area occupied by a particular routing hologram, this breaks down at the boundary between areas occupied by different routing holograms as will be described later (see FIG. 42). This appears to be an inevitable result of using a liquid crystal to provide phase modulation. The liquid crystal is subject to continuity equations, so that abrupt boundaries between phase contour distributions are not possible, except where there is a disclination. In practice the phase contours interfere, and disclinations may also appear, as may be seen by examining the LCOS SLMs under a polarising microscope. The effect on the wavelength spectrum at the switch outputs seems to be to cause spikes in the crosstalk distribution: caused by the local diffraction spectrum from these boundary regions. A method to reduce crosstalk from unwanted parts of the diffraction spectrum addresses this problem and is therefore desirable.

Another important consideration when selecting routing holograms is to avoid, or at least control, notches in the spectrum between channels routed between the same input and the same output fibre. As will be described, the presence of notches is partly caused by the need to control crosstalk, and hence a method to reduce crosstalk targets from the routing holograms can ease the manufacturing costs of controlling spectral notches, as well as the performance implications of residual spectral notches.

These spectral notches occur because the light at wavelengths at and around the channel boundary is incident on the LCOS array across two holograms. This situation is illustrated in FIG. 1: the beam 100 is incident on the LCOS array 101 such that its centre line 102 is located at the boundary between two adjacent holograms, 103 and 104. The first half of the beam, 105, to the left of the centre line 102, is processed by the LCOS array, for example in a reflective SLM it is reflected and phase modulated by the hologram, 103 on which it lands, to create a set of diffraction orders. The hologram 103 is designed so that a strong diffraction order routes an image of the beam that is incident on said hologram, to the end of the fibre. Because of the double pass through the grating and routing lens, in a well aligned system, the centre line of the original beam is imaged onto a line through the centre of the output fibre or waveguide. This is shown in FIG. 2: the output fibre 200 has a centre line 202 and an incident beam 201. Each half of the output beam, 205 and 206, either side of the centre line, 202, has a phase determined by the routing hologram by which it was steered to the same output fibre or waveguide. For example the half of the output beam 206 is a (reversed) image of the half of the beam incident on the LCOS SLM, 106. The centre line 202 in FIG. 2 is an image of the centre line 102 in FIG. 1.

Hence a phase difference between the diffraction orders created by the two adjacent holograms creates a phase step across the image that arrives at the output fibre. The effect on the spectrum is shown in FIG. 10. This effect assumes the output fibre is a single-mode telecommunications fibre, as typically used in high capacity WDM networks. Hence the coupling efficiency of light incident on the end of the fibre may be predicted by calculating the modulus squared of the normalised overlap integral of the incident beam and the fibre fundamental mode. Therefore a phase step of pi causes complete extinction at a wavelength where the incident beam is centred on the hologram boundary, because the image formed at the end of the output fibre or waveguide, is completely orthogonal to the fibre fundamental mode when it couples into the fibre, this causes the null 1013 shown in FIG. 10. A phase step of zero means that the two parts of the beam couple in phase into the fundamental mode of the output fibre, causing the flat spectrum 1010. The closer the phase step to zero, the greater the coupling efficiency, and the weaker the spectral distortion: spectral curves 1011 and 1012 correspond to phase differences of pi/4 and pi/2 respectively. Spectral curve 1020 shows the spectrum of an isolated channel, hence the null 1012 results in significant passband narrowing. Any notch reduces the overall passband for a channel routed through the network. Hence the stitching error between adjacent holograms should be adjusted to minimise the phase step of wavelengths where the incident beam lands at or close to the hologram boundary: empirically this has the effect of suppressing the notch. With a pure routing hologram this is straightforward; a first method is simple to implement, the relative phase may be adjusted by scrolling at least one of the two holograms in a direction orthogonal to the dispersion plane: for a phase ramp with a period of N pixels, scrolling the hologram by 1 pixel changes the relative phase by 2.pi/N. Hence the phase ramp period sets the resolution in this adjustment: the longer the period, the finer the adjustment achieved by this method, and the smaller the residual notch in the spectrum. The worst case relative phase difference is half the resolution, that is pi/N, so the residual spectral notch tends to be worse for the outer ports (where the phase ramp period is shorter), than for the inner ports. Another method to suppress the notch is to adjust all the phase levels across the phase ramp by an approximately uniform phase shift applied to all pixels in one or both holograms. In practice this is difficult, firstly because the phase-volts relationship is nonlinear, so that the phase shift applied to the phase ramp is non-uniform across the phase ramp, secondly because this nonuniformity can spoil the optimised holograms, such that the unwanted orders increase in strength.

An ideal WSS has no discernible notches in the spectrum: it uses the same unit cell, which is the same periodic phase distribution, to route light between a particular input and output, whatever the wavelength so that, whenever two adjacent holograms are routing between the same input and output, the holograms may be perfectly stitched. It can be shown that if the output fibre is single-mode, spectral notches will also occur when the field at the output fibre is not an image of the field reflected from the LCOS: mathematically this is because we may calculate the coupling efficiency at any convenient plane in the system. Hence the problem does not disappear by changing the output optics.

Some reasons for varying the phase distribution inside the unit cell, leading to susceptibility to spectral notches, are as follows. A first reason is because the hologram required to produce acceptable crosstalk performance varies with the cell gap, that is the thickness of the liquid crystal layer, hence to achieve these crosstalk limits, an LCOS device with variation in the cell gap needs to be treated as a set of separate regions, with the routing holograms trained according to an average cell gap in each region.

A second reason is because the position of the diffraction orders causing crosstalk is wavelength-dependent, so if the crosstalk suppression method relies on judicious positioning of the unwanted orders, it has a finite wavelength range. The strength of the unwanted diffraction orders is also wavelength-dependent. To control such crosstalk, partway across the wavelength range, the routing hologram changes to a different unit cell: this transition means the two holograms either side cannot be stitched perfectly, so a residual notch remains. Hence it is sensible to choose the transition points to align with the boundary between two channels, to avoid spectral distortion of the information carried inside the channel. However, if using the full flexibility of the LCOS WSS to vary the position and bandwidth of the channels, the channel boundaries are not invariant. On reconfiguring the channels, the notch position must be moved along to stay aligned with the channel boundary. This means additional sets of control data must be stored, to allow the notch position to vary according to the channel plan. Reducing the need to control crosstalk to suppress its wavelength dependence, reduces the requirement to vary the unit cell, and hence reduces the number of notches to be managed. However for ports that are significantly off-axis, it is also necessary to vary the period of the unit cell to avoid crosstalk from light coupling into the adjacent port: this happens because the output position is proportional to wavelength, hence below and above the central design wavelength, the intended output beam is closer to one or other of the two adjacent ports.

FIG. 3 shows two output ports 300 and 301: these ports could each comprise an output fibre, or a microlens aligned with an output fibre. Incident on the first output port 300 there are shown three beams 302 to 304. The centre beam 303 is aligned perfectly with the centre of the output port 300. The uppermost beam 302 is at a longer wavelength, and the lower beam 304 is at a shorter wavelength. Hence these beams are incident further away, or closer to the optical axis, which is in the direction shown by the arrow 305, with respect to the output ports 300 and 301. The lowest beam 304 is incident closer to the adjacent output port 301; hence the peak in the overlap integrand increases in strength and moves closer to the middle of the adjacent output port. Hence the crosstalk increases.

Reducing coupling into adjacent ports also reduces the requirement to vary the unit cell hologram pattern, and thereby reduces the number of notches to be managed. Hence reducing both types of crosstalk makes it easier to control the quality of the spectrum of the channels, and eases the complexity of the control system that allocates holograms to groups of pixels. Although the coupling efficiency into the target output port varies with wavelength, this may be compensated by varying the attenuation.

Crosstalk may also be caused when attenuating light passing through the WSS. The attenuation is created by routing unwanted light so that it does not couple from the input fibre into the intended output fibre. Crosstalk is caused when this unwanted light couples into a different output fibre, or when light entering a different input fibre is coupled by the diffraction orders of the combined routing and attenuation hologram, into the or any output fibre.

One method to achieve attenuation includes redistributing the unwanted light (to be removed to achieve attenuation) amongst the unwanted diffraction orders of the hologram. As is well known, transverse offset of an unwanted diffraction order reduces the coupling efficiency into an output, and hence acts partially to suppress crosstalk. Hence these orders created by redistributing the unwanted light must land far enough away from the output ports not to increase the crosstalk to unacceptable levels, and far enough away from the input ports not to cause back reflection. Hence this method is suitable when the routing hologram itself already has a short period. A second method is combining the routing hologram to create the channel with another routing hologram to distribute the unwanted light mainly to a dump location. The first and second methods both require an individual hologram to be trained and stored for every attenuation level, also they can affect the average phase of the desired routing component of the holograms, so the hologram scroll position or average phase may need to be adapted to suppress spectral notches at the output. Training and storing many holograms and adapting to suppress notches adds cost and complexity to manufacturing. It is therefore desirable to find a new method for attenuation that reduces the need for training separate holograms for each attenuation level, and requires little, or no, adaptation to avoid spectral notches.

A further manufacturing issue that results from crosstalk control methods is the interplay between assembly tolerances and tolerances in the phase ramp periods. For example, a simple method to control crosstalk is to restrict the phase ramp periods to integer multiples of the pixel pitch, using mainly first orders but some second orders, because this reduces the spatial density of unwanted diffraction orders, and therefore reduces the number of unwanted diffraction orders likely to couple into the switch output ports and cause crosstalk. However, as a result, the phase ramp periods are fixed and inflexible, therefore the output ports must be positioned accurately with respect to the optical axis of the lens used to route the beams incident on the LCOS to and from the ports. Equivalently, the LCOS tilt must be carefully adjusted. Further the focal length tolerance on the routing lens becomes tight. In other words, the assembly process must fit the selected phase ramp periods. It is therefore desirable to find a new method to suppress crosstalk from phase ramps, so the phase ramp periods may be adapted to assembly and focal length tolerances, reducing assembly costs and BoM (bill of materials) costs. In practice the positions of the input and output ports may be deduced by applying a wavefront sensing method at the LCOS device, as described in PCT/GB2004/057149, to measure angles of incidence at the area of the LCOS used to route the beams. Given the angle of incidence, a suitable set of routing holograms may be looked up from a database.

LCOS defects can also cause crosstalk. For example a failed pixel drive circuit will cause the applied field to take up the average of the value applied by the neighbouring pixels. If the faulty pixel is positioned well away from the flyback region, this may not be a problem, but if the faulty pixel is in the middle of the flyback region the unwanted orders created by that region of the LCOS may increase. Similarly a fault in the circuits used to update the pixel voltages in a particular row or column could increase crosstalk. A faulty row will affect every channel, while a faulty column will affect every phase ramp applied to the same channel. The effect of intolerance to such defects is to reduce LCOS yields, and therefore increase the yielded cost of the LCOS inside each WSS. A method to suppress the crosstalk caused by unwanted orders therefore has the potential to reduce the contribution of LCOS costs to the overall bill of materials.

The switching time for an LCOS WSS is extended by the need to control transient crosstalk. For example, a sequence of intermediate holograms may be applied. This of course further increases the number and cost of training and storing the routing and attenuation holograms. A method to suppress the crosstalk caused by transient unwanted orders therefore has the potential to improve the switching time, as well as reduce costs of managing transients.

This disclosure is aimed at providing improved devices and methods.

3 BRIEF DESCRIPTION

In one aspect, there is disclosed a switch device having means for spatially modulating light, a dispersion device for spatially dispersing light onto the means for spatially modulating light the switch device having a switch plane and a dispersion plane, and anamorphic optics providing an imaging function in the dispersion plane, and a Fourier transform function in the switch plane.

The anamorphic optics may be provided by anamorphic optical components with their axes crossed at 90 degrees.

The means for spatially modulating light may comprise an LCOS SLM.

The means for spatially modulating light may be an amplitude modulating SLM.

In a second aspect, there is disclosed a method of controlling light using a spatial filter means and a routing means in a switch having a dispersion plane and a switching plane, the method comprising using anamorphic optics to perform an imaging function in the dispersion plane and to perform a Fourier Transform function in the switching plane In a third aspect, a method of controlling a beam of light containing a plurality of wavelength channels, comprises applying the beam to anamorphic optics whereby each channel is made incident upon a respective group of modulating elements wherein each group is composed of plural subgroups, applying a first hologram to one of the subgroups and a second different hologram to another of the subgroups wherein the first hologram is selected to route the light incident upon it to an output and the second causes light incident upon it to be directed in a direction other than to the output.

The groups of modulating elements, in one family of embodiments, are two dimensional The second hologram may be a blocking hologram The second hologram may provide uniform phase.

The spatial filter means may be a nematic LC SLM

For nematic LC devices, the spatial filter may use amplitude modulation to get good extinction.

The spatial filter means may be a ferroelectric LC SLM.

The routing means may use amplitude modulation, but this may be less efficient than using phase modulation The routing means may be a phase-modulating SLM.

The phase-modulating SLM may be binary in operation.

The routing means may be a FLC LCOS SLM.

In a fourth aspect, there is provided an optical switch having an input, a switching stage, and an output, wherein the switch is adapted to receive at its input plural optical signals of different wavelengths, the switching stage comprising a first electrically controllable portion for selectively blocking at least one of the wavelengths, and a second electrically controllable portion for routing output wavelengths of the first stage to the switch output.

In a fifth aspect there is provided an optical switch having an input, a switching stage, and an output, wherein the switch is adapted to receive at its input plural optical signals of different wavelengths, the switching stage comprising a first electrically controllable portion for routing selected wavelengths to a second electrically controllable portion for selectively blocking at least one of the wavelengths to the switch output The electrically controllable first portion may be adapted to spatially filter the input wavelengths.

A switch input may comprise an ensemble of optical wavelengths.

In some embodiments the optical switch has a single input port as said input and plural output ports.

In some embodiments, the optical switch has plural input ports and a single output port.

The switch may have a dispersion element, wherein the first electrically controllable portion is a first LCOS array configured to receive dispersed light from the dispersion element and to selectively pass light onto a second LCOS array as the second electrically controllable portion.

The switch may have a dispersion element disposed to receive incident optical radiation along the optical axis of the switch and arranged to angularly disperse said optical radiation by wavelength in a dispersion plane.

There may be a birefringent element, for example a birefringent wedge, for separating the polarisation components of input radiation wherein the or each input port may have an associated microlens for directing input radiation onto the birefringent element.

The switch may have a collimating device disposed to receive separated polarisation components and to provide light collimated in the dispersion plane.

There may be optics for focussing the separated polarisation components to two separate areas, wherein at one of these areas, there is a half wave plate.

The switch may have a pair of confocal cylindrical relay lenses, the first providing light to the dispersion element and the second receiving angularly dispersed light from the dispersion element, wherein the cylinder axes of the confocal cylindrical relay lenses are in the dispersion plane.

The switch may have a cylindrical dispersion lens arranged to receive angularly dispersed light from the second confocal relay lens, and to spatially distribute the light by wavelength in wavelength groups onto a first LCOS array, wherein the first LCOS array is disposed perpendicular to the dispersion plane, a switch plane being defined as orthogonal to both the plane of the LCOS array and the dispersion plane, the LCOS array being in the focal plane of the cylindrical dispersion lens and the cylinder axis of the cylindrical dispersion lens is perpendicular to the dispersion plane.

The switch may be configured so that reflected light from at least one of the wavelength groups passes through the cylindrical dispersion lens to an optical device that acts as a retroreflector in the dispersion plane, but a mirror in the switch plane.

The switch may have a second LCOS array disposed to receive light from the optical device via the cylindrical dispersion lens, the second LCOS array lying in the plane of the first LCOS array.

In another aspect, there is provided an optical switch adapted to receive at one or more inputs plural optical signals of different wavelengths, the switch having optics arranged to receive the optical signals and to spatially distribute the beam onto a first LCOS array operable to spatially filter light of the beam, the first LCOS array being arranged to provide output light towards a second LCOS array, the second LCOS array being configured to route selected wavelengths to one or more outputs of the optical switch.

In yet another aspect, there is provided an optical switch adapted to receive at an input plural optical signals of different wavelengths, the switch having optics arranged to receive the optical signals and to spatially distribute the beam onto a first LCOS array that is operable to process the beam by selectively routing in a controllable direction, the first LCOS array being arranged to provide output to a second LCOS array, operable to spatially filter light from the first array.

In a further aspect, there is provided an improved method for reducing crosstalk in an optical switching device, the method comprising selectively blocking at least one wavelength from an input port, passing other wavelengths on to a routing device and routing the other wavelengths.

In another aspect a method of controlling light using a spatial filter means and a routing means in a switch having a dispersion plane and a switching plane, comprises performing an imaging function on the light in the dispersion plane and performing a Fourier transform function on the light in the switching plane.

In a still further aspect, there is provided a method of reducing crosstalk in an optical switching device, illuminating a group of light modulating elements to provide plural diffraction orders, spatially distributing at least some of the diffraction orders onto a spatial light modulator and blocking unwanted orders.

In a yet further aspect, there is provided an optical switch comprising a dispersion device configured to disperse incoming light by wavelength onto a first LCOS array, the first LCOS array being controllable to spatially filter light incident upon it, means defining an optical path to cause light passed by the first LCOS array to become incident upon a second LCOS array, the second LCOS array being controllable to route light incident upon it in desired directions, the dispersion device being arranged to collect light for outputs of the switch.

In a related aspect, there is provided an optical switch comprising a dispersion device configured to disperse incoming light by wavelength onto a first LCOS array, the first LCOS array being controllable to route light incident upon it in desired directions, means defining an optical path to cause light passed by the first LCOS array to become incident upon a second LCOS array, the second LCOS array being controllable to spatially filter light incident upon it, the dispersion device being arranged to collect light from the second LCOS array for the output of the switch.

The dispersion device may comprise a grating or a grism.

In yet another aspect, there is disclosed a method of attenuating an optical signal by segmenting a group of pixels onto which the signal is incident.

In a still other aspect a method of reducing crosstalk uses more than one LCOS SLM array to successively control light transmission.

For a 1×N switch, input optics inside an LCOS WSS delivers spatially separated wavelength components to a routing array, which applies routing holograms that route the beam to be coupled into the selected output, independently for each separated wavelength component. However, these routing holograms also create unwanted diffraction orders that add significant cost and complexity to manufacturing, in order to control crosstalk within acceptable limits.

In embodiments, the routed light is passed via intermediate optics to a spatial filter array. The intermediate optics provides imaging in the dispersion plane and a Fourier transform operation in the switch plane. Hence wavelength components remain separated in the dispersion plane, while in the switch plane, the required diffraction orders to carry light to selected outputs are separated spatially from the unwanted diffraction orders that cause crosstalk. The spatial filter array passes the required diffraction orders and blocks the unwanted diffraction orders. This creates significant suppression of the unwanted diffraction orders, thereby easing manufacturing, or facilitating 1×N switches with improved crosstalk performance.

The output optics combines by wavelength, selected diffraction orders for each output port and couples them into the required output fibre or waveguide.

The input optics and output optics are separated and different. However, both use anamorphic transformations to be able to fit the system within a reasonable height.

In the case of an N×1 switch, input optics delivers spatially separated wavelength components to a spatial filter array, in which each input port has associated with it a unique row of spatial filters, one for each wavelength component. These spatial filters provide independent wavelength selective blocking for each input port, such that wavelengths that are not selected to be coupled into the output, may be blocked, at least partially, before these unwanted signals reach the routing array.

In embodiments, the spatially filtered light is passed via intermediate optics to the routing array. The intermediate optics provides imaging in the dispersion plane and a Fourier transform operation in the switch plane. Hence wavelength components remain separated in the dispersion plane, while in the switch plane, spatially filtered light from all input ports, emerging from the spatial filter array as parallel beams, is combined by angle onto a common position at the routing array.

At the routing array, the main diffraction order of the routing hologram routes the selected wavelength components landing at this common position to be coupled into the output. The effect of the unwanted diffraction orders, which usually couple non-selected wavelengths into the output, is reduced because the non-selected wavelengths have already been partially blocked. In this way, the effect of unwanted diffraction orders created by the routing holograms is suppressed, easing manufacturing or facilitating N×1 switches with improved crosstalk performance.

Routing holograms may be combined with other holograms to create an attenuation function. This also creates unwanted diffraction orders, and results in a large number of holograms to be trained to achieve crosstalk targets. For example there might be 150 combined routing and attenuation holograms to be trained for each route, for each separately trained region of the LCOS array. The invention provides a compound attenuation mechanism that does not required routing holograms to be combined with an attenuation hologram, hence the number of routing holograms to be trained is reduced to one per route, for each separately trained region of the LCOS array. The attenuation mechanism uses a geometric method at the routing array, to provide fine adjustment in attenuation levels. Coarse adjustment in attenuation level is provided by the spatial filter array. This compound mechanism results in reduced control complexity and reduced manufacturing costs. The mathematical properties of the attenuation mechanism ease the complexity of two further manufacturing issues in LCOS WSS, that is firstly controlling holograms to suppress spectral notches between adjacent channels carrying light routed between the same input and output, and secondly selecting groups of pixels to route the light in each channel, in such a way as to provide fine control of the centre wavelength and passband edges of channels transmitted through the switch. In a conventional LCOS WSS, the fine attenuation mechanism and the fine control of the centre wavelength and passband edges would cause crosstalk, however, the spatial filter array suppresses these crosstalk mechanisms.

LCOS may be used to implement the spatial filter array and the routing array. This requires careful control of polarisation states inside the switch. The optical systems described allow the spatial filter array and routing array to be implemented with the same physical LCOS device. The optics uses crossed cylindrical components, which may be acylindrical, or freeform, and thus take advantage of recent improvements in lens technology. Wavefront sensing (as described in PCT/GB2004/057149) may be implemented using the LCOS device, on both the routing array and the spatial filter array, firstly to reduce assembly costs and secondly to measure the dispersion equation for the assembled switch, to reduce filter or channel calibration costs.

Embodiments embodying certain aspects of the invention will now be described.

4 BRIEF DESCRIPTION OF THE DRAWINGS

In the drawings:

FIG. 3 is a schematic diagram showing three beams incident on two output ports of an optical switch;

FIG. 11 shows a block diagram an optical switch;

FIG. 12A-12D show variants of the input optics of FIG. 11, in the switch plane

FIG. 15A-15C show variants of the intermediate optics of FIG. 11, shown in the dispersion plane;

Figure 17:
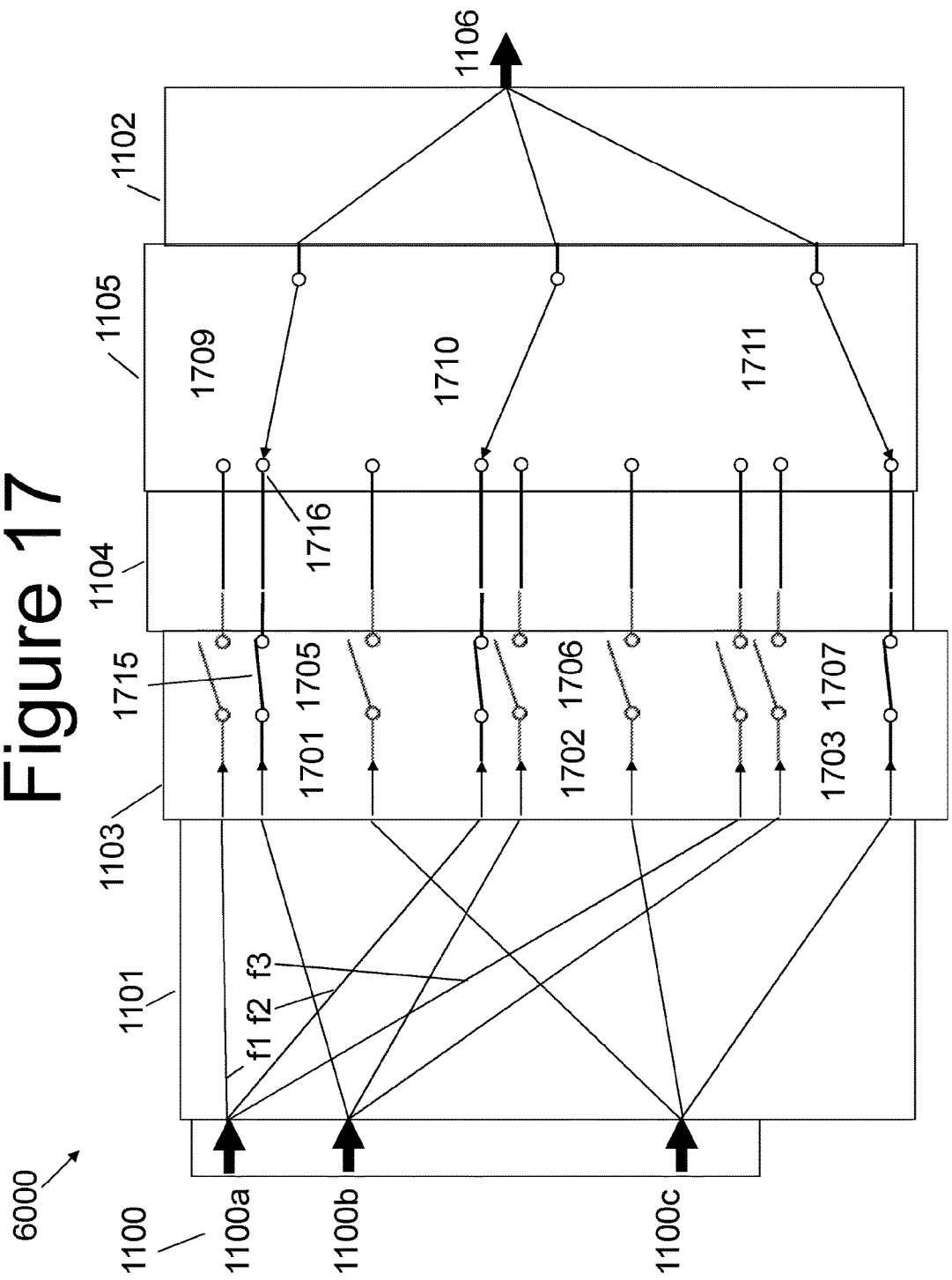
Figure 18:
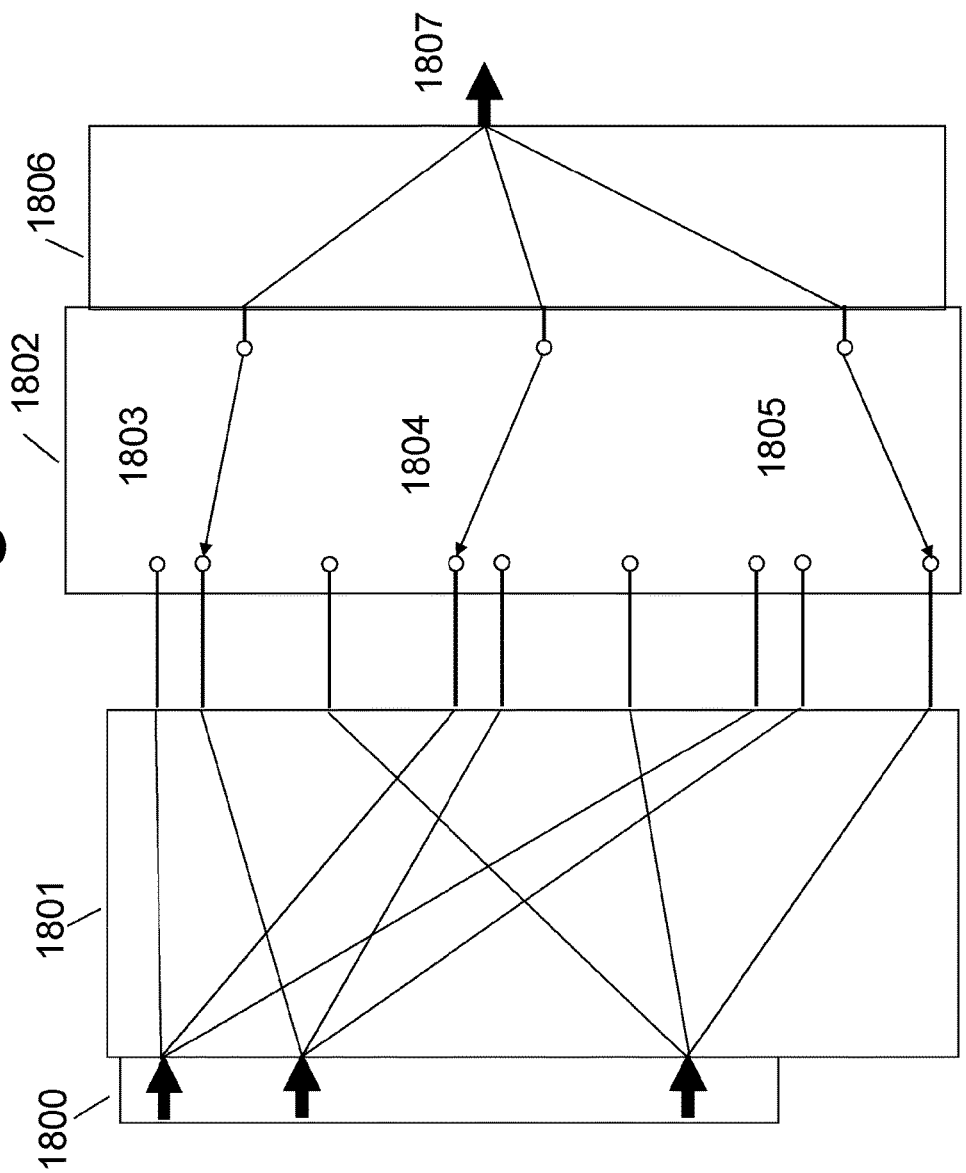
Figure 19:
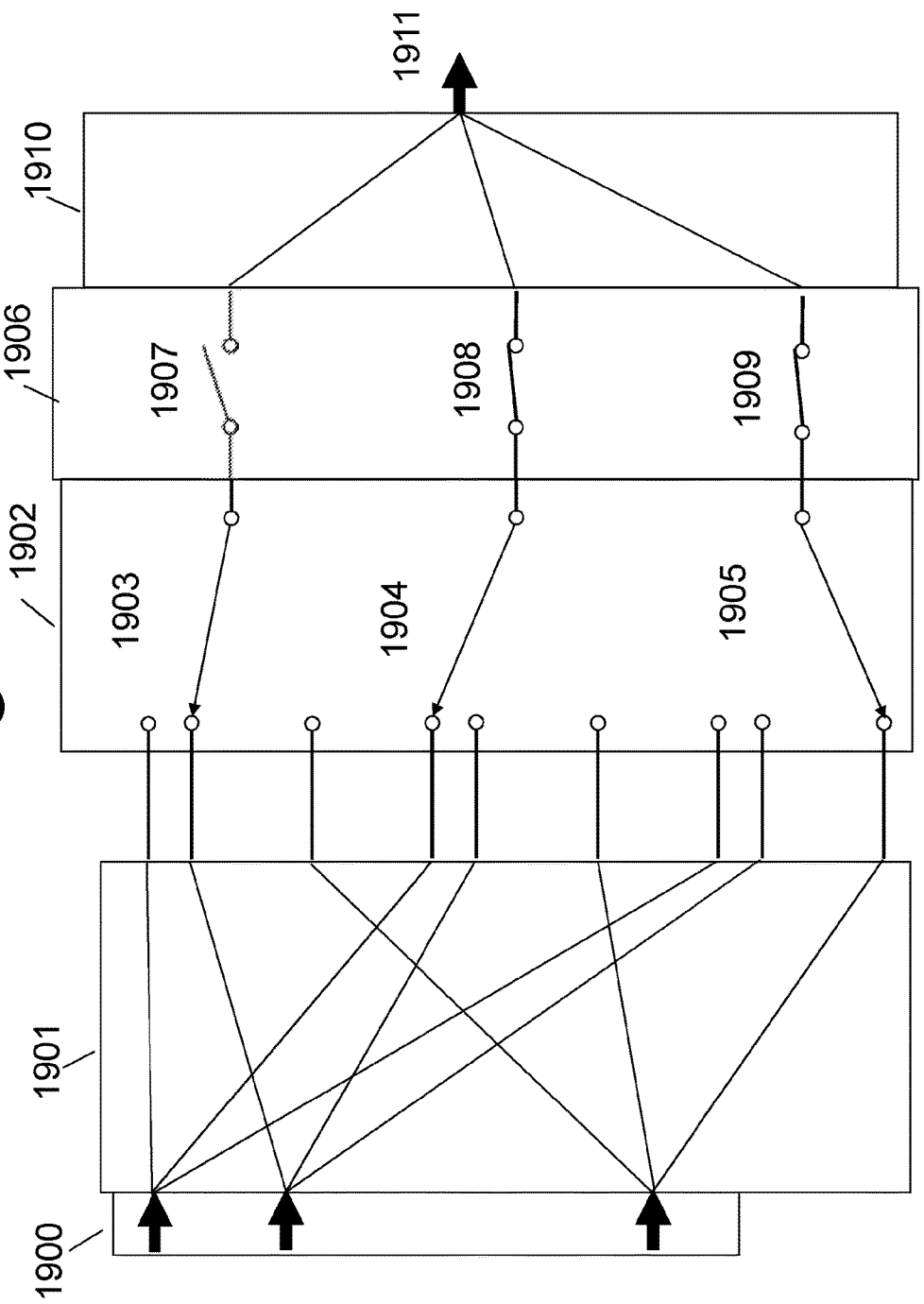
Figure 20:
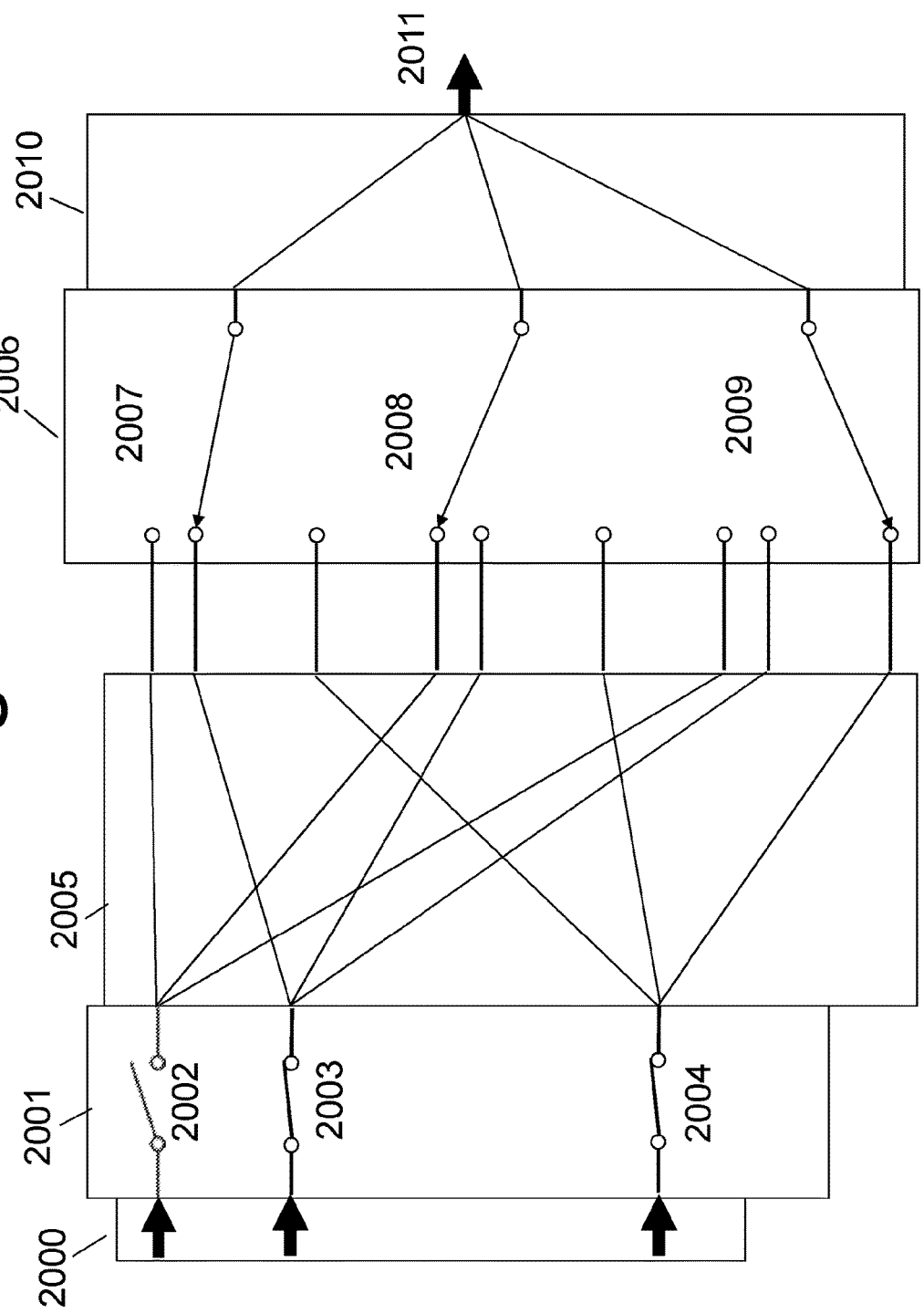
Figure 21:
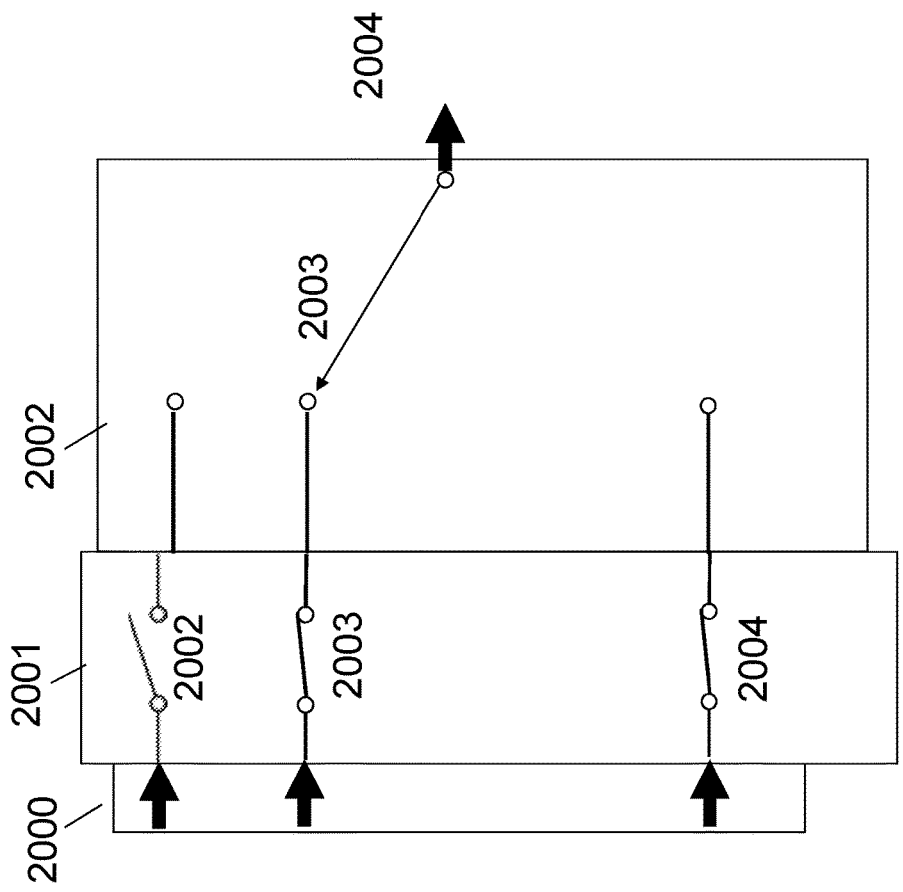
Figure 22:
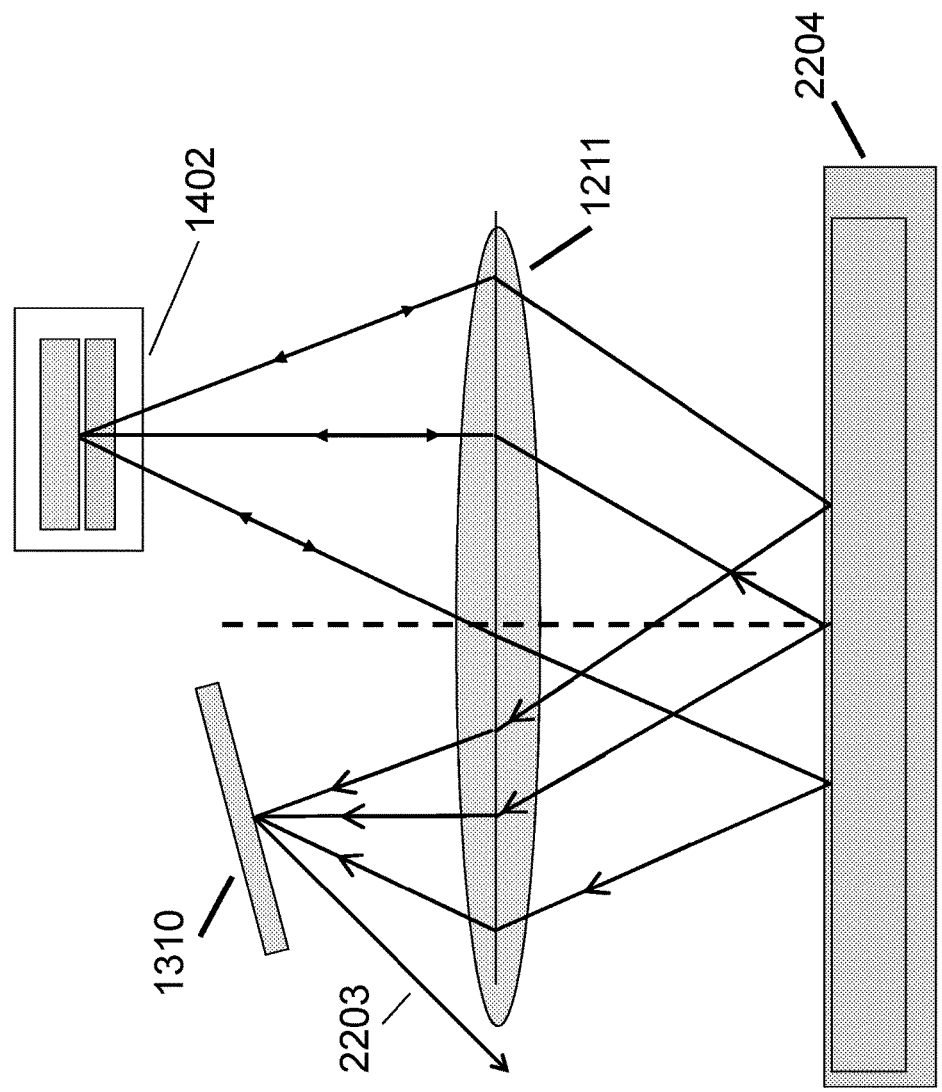
Figure 23:
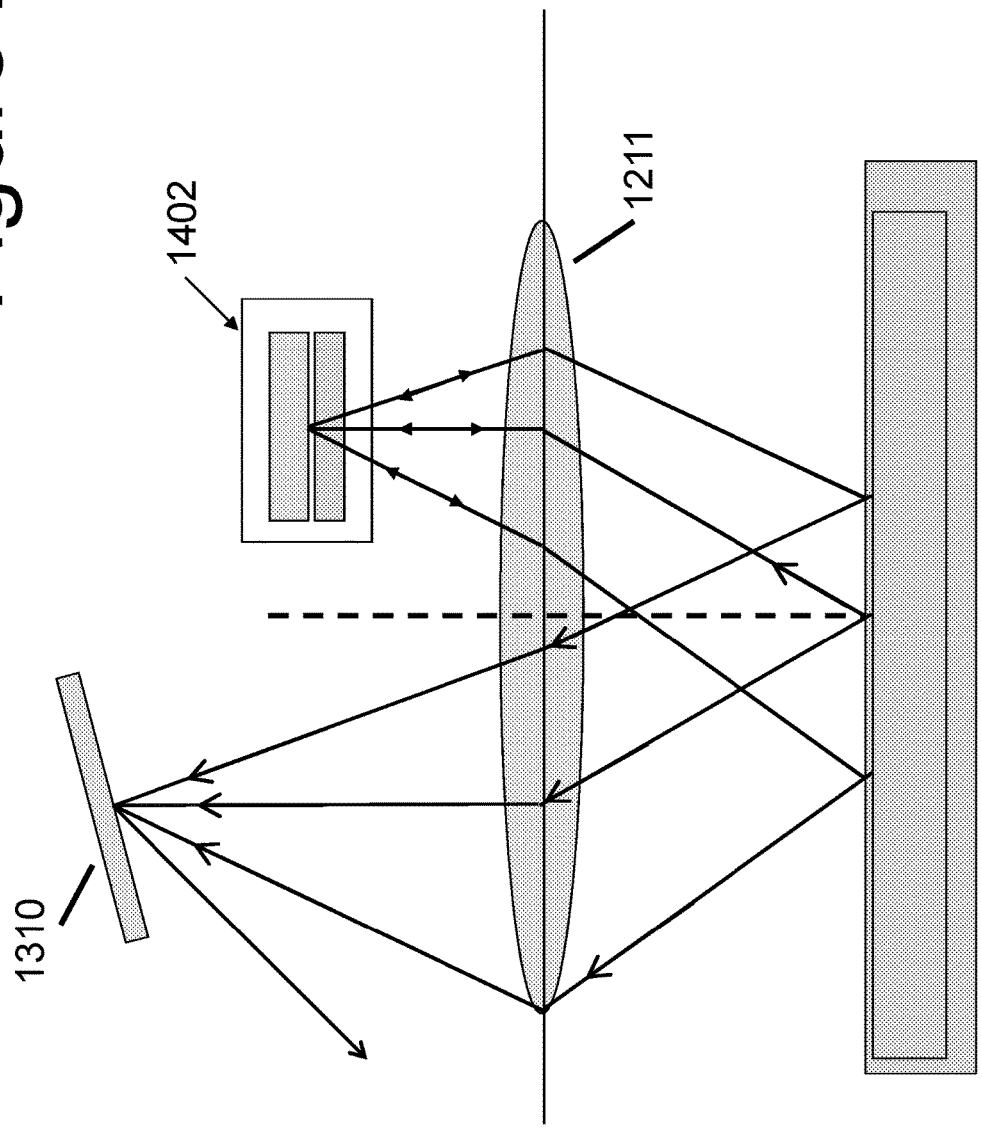
Figure 24:
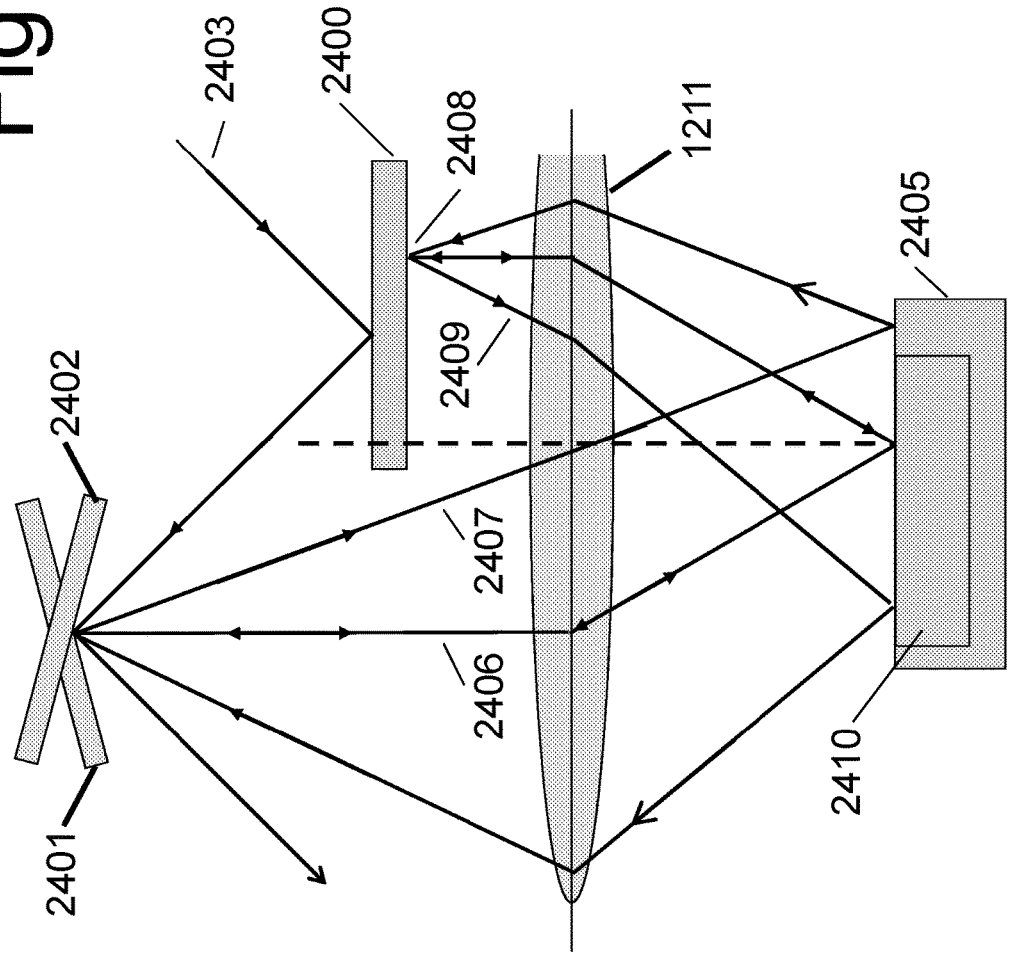
Figure 25:
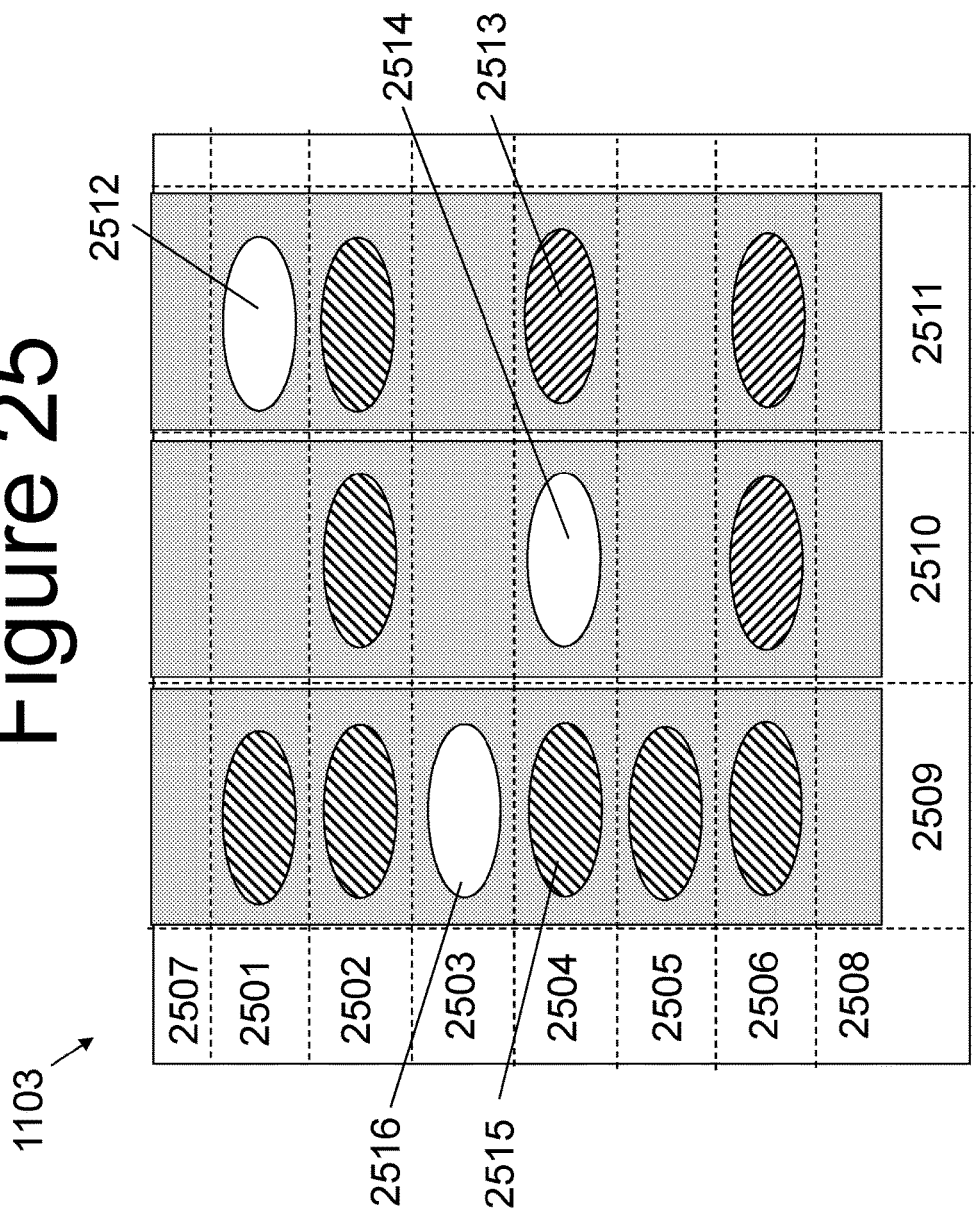
Figure 26:
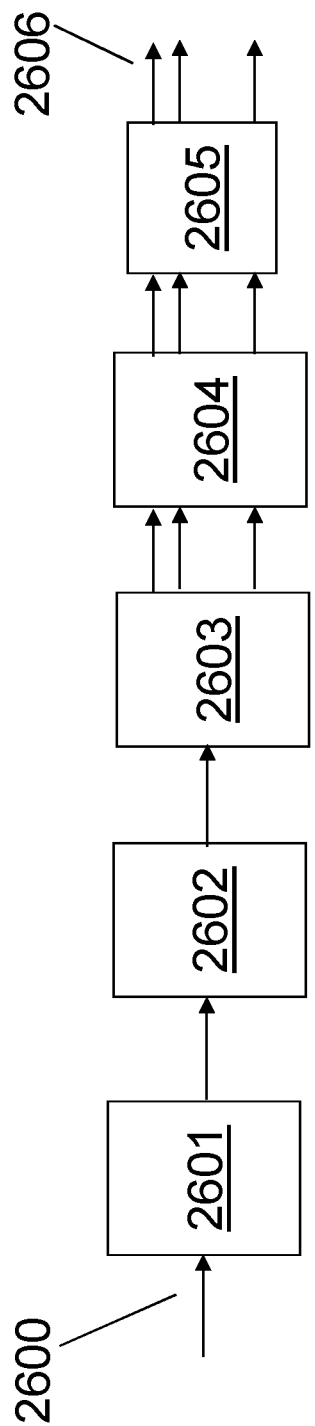
Figure 27:
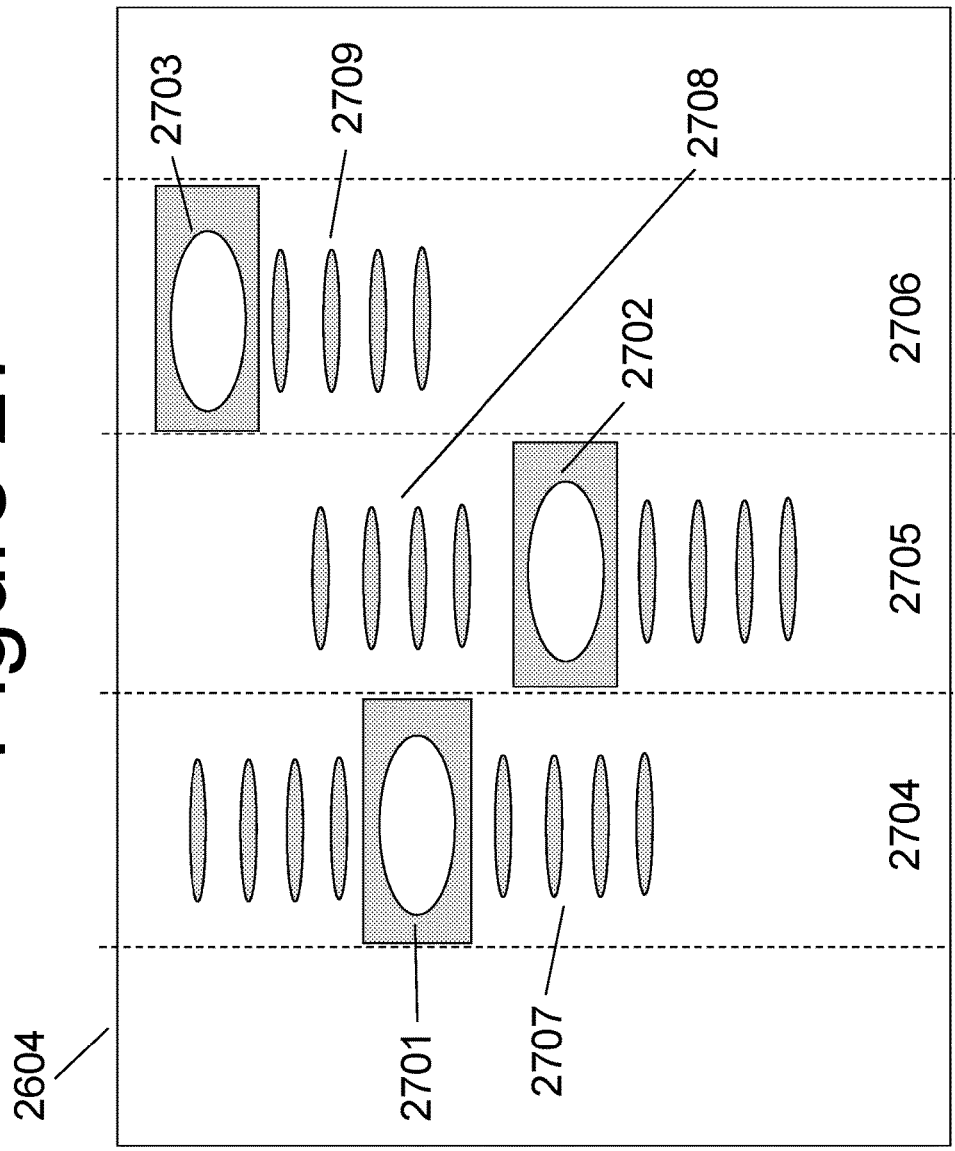

FIG. 16A-F shows a view of variants of the output optics of FIG. 11;

FIG. 17 shows a highly-schematic equivalent optical circuit of the optical switch of FIG. 11;

FIG. 18 shows the equivalent optical circuit of a conventional N×1 WSS;

FIG. 19 shows an optical circuit of an arrangement with an LC blocker array, positioned in front of, and aligned with MEMS mirrors;

FIG. 20 shows an optical circuit of the combination of a conventional N×1 WSS with a spatial filter;

FIG. 21 shows an optical circuit diagram for a spatial filter switch;

FIG. 22 shows a first further variant of the intermediate optics of FIG. 11, shown in the dispersion plane;

FIG. 23 shows a second further variant of the intermediate optics of FIG. 11, shown in the dispersion plane;

FIG. 24 shows a third variant of the intermediate optics of FIG. 11, shown in the dispersion plane using a different type of Fourier element;

FIG. 25 shows a view of wavelength selective spatial filtering, taking place at the first LCOS array of FIG. 11;

FIG. 26 shows a block diagram of a 1×N optical switch;

FIG. 27 shows a view of the second LCOS array in the switch of FIG. 26

Figure 10:
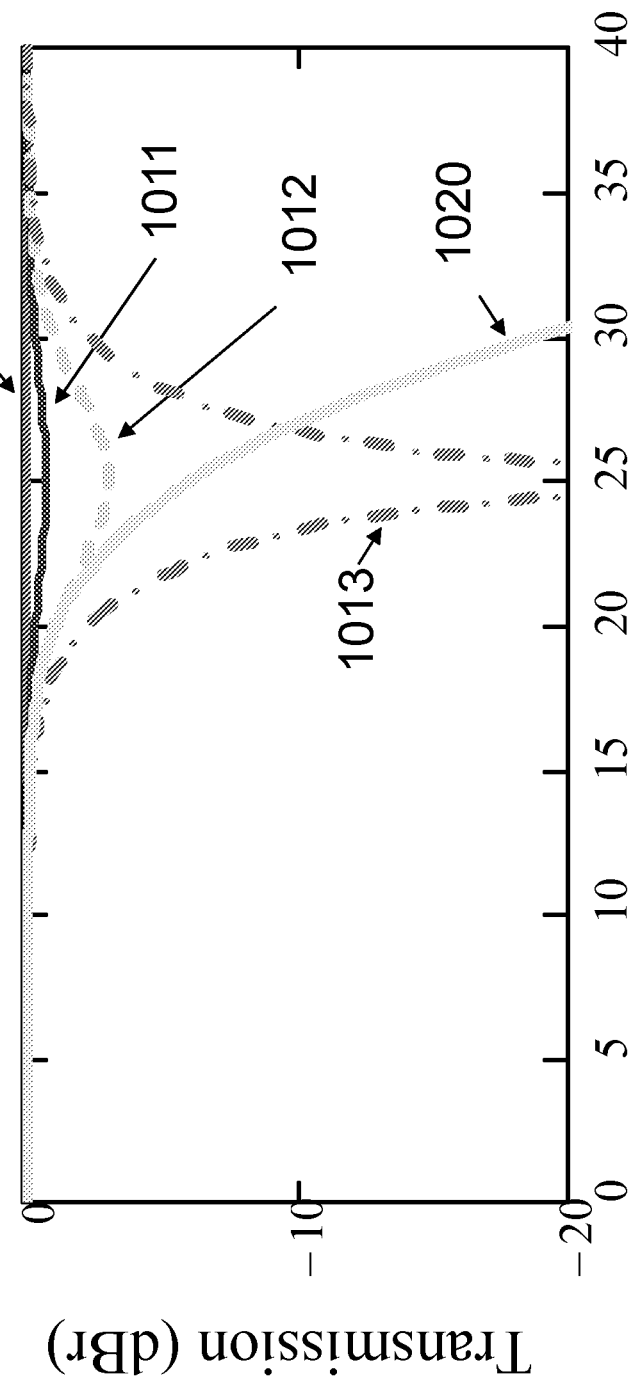
FIG. 10 shows a graph of notches with transmission plotted against frequency offset with respect to centre of channel
Figure 28:
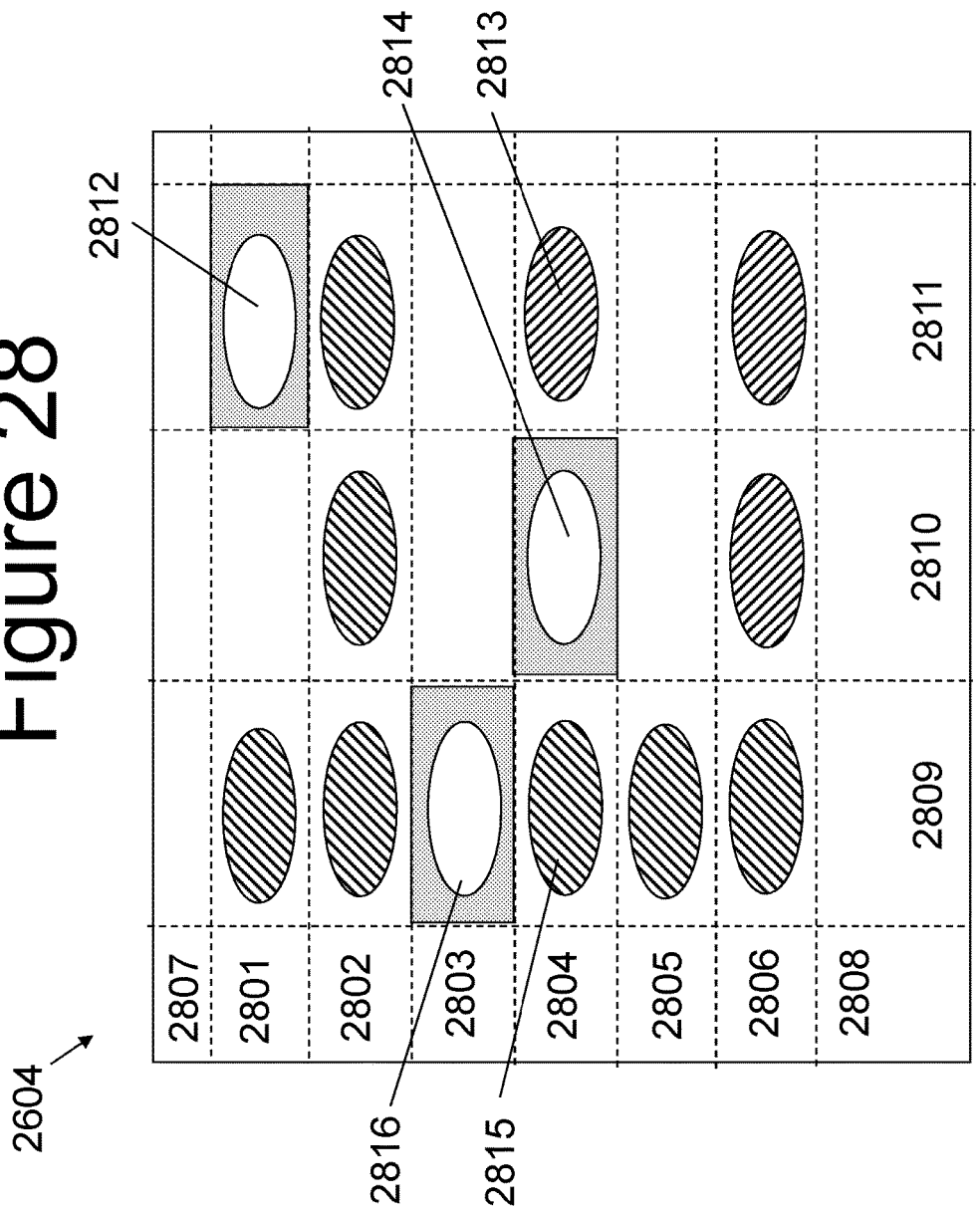
Figure 29:
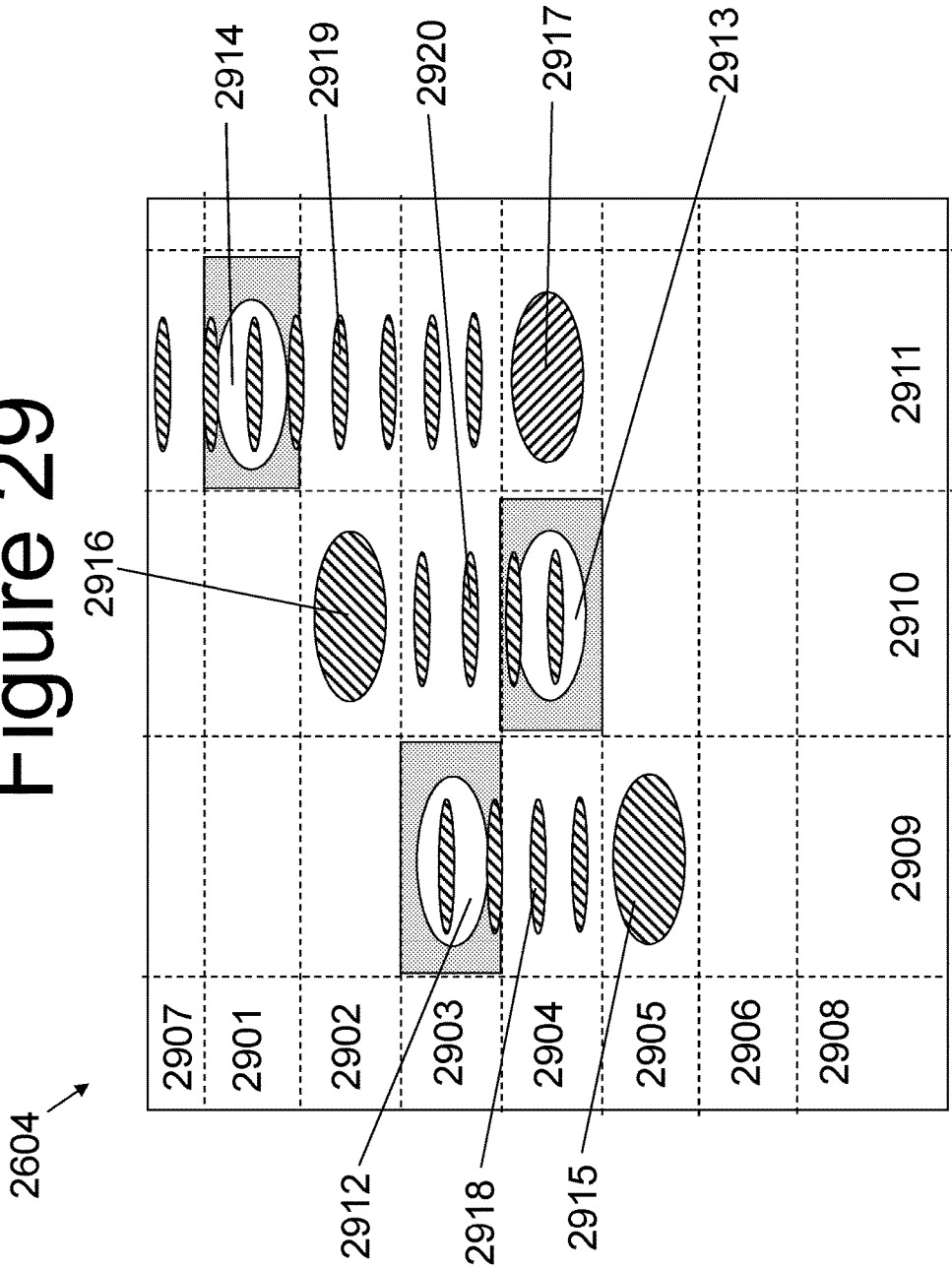
Figure 30:
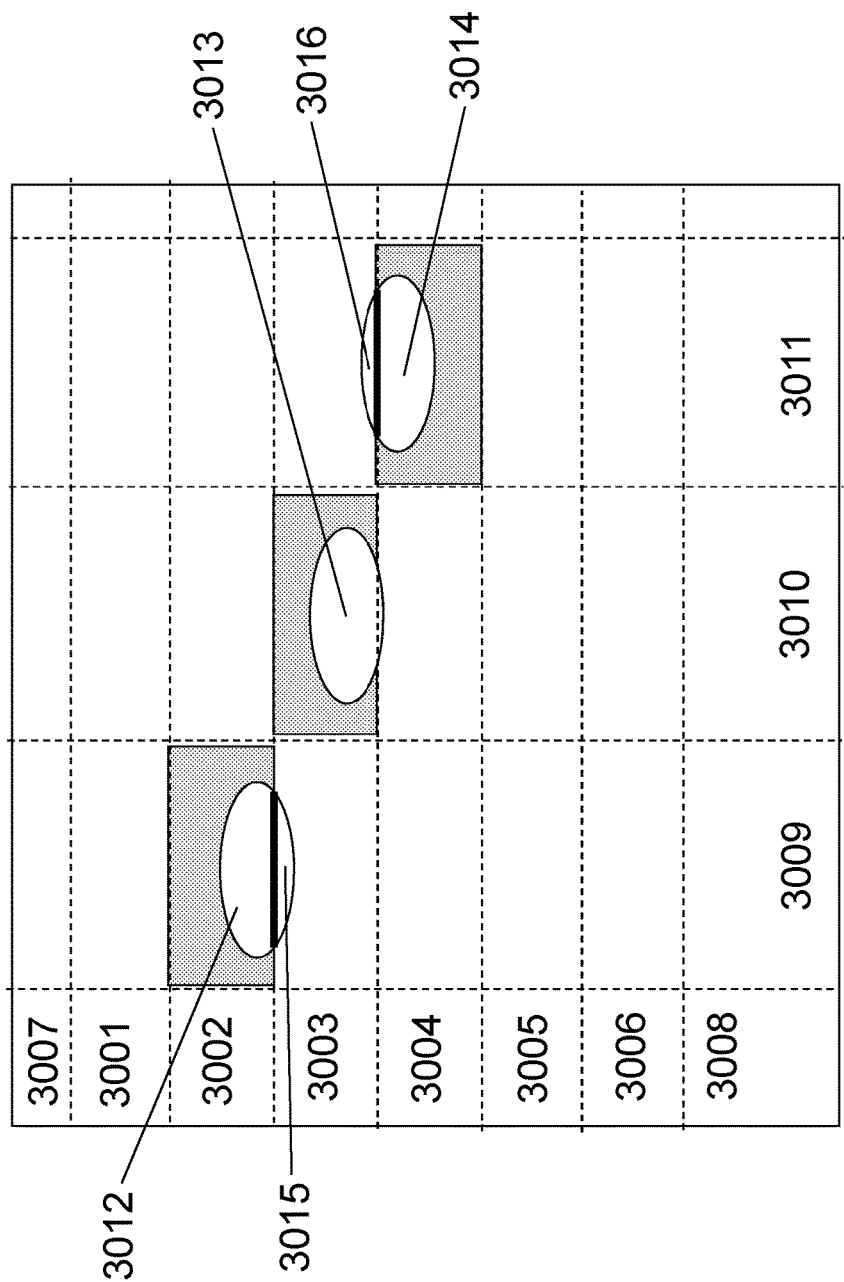
Figure 31:
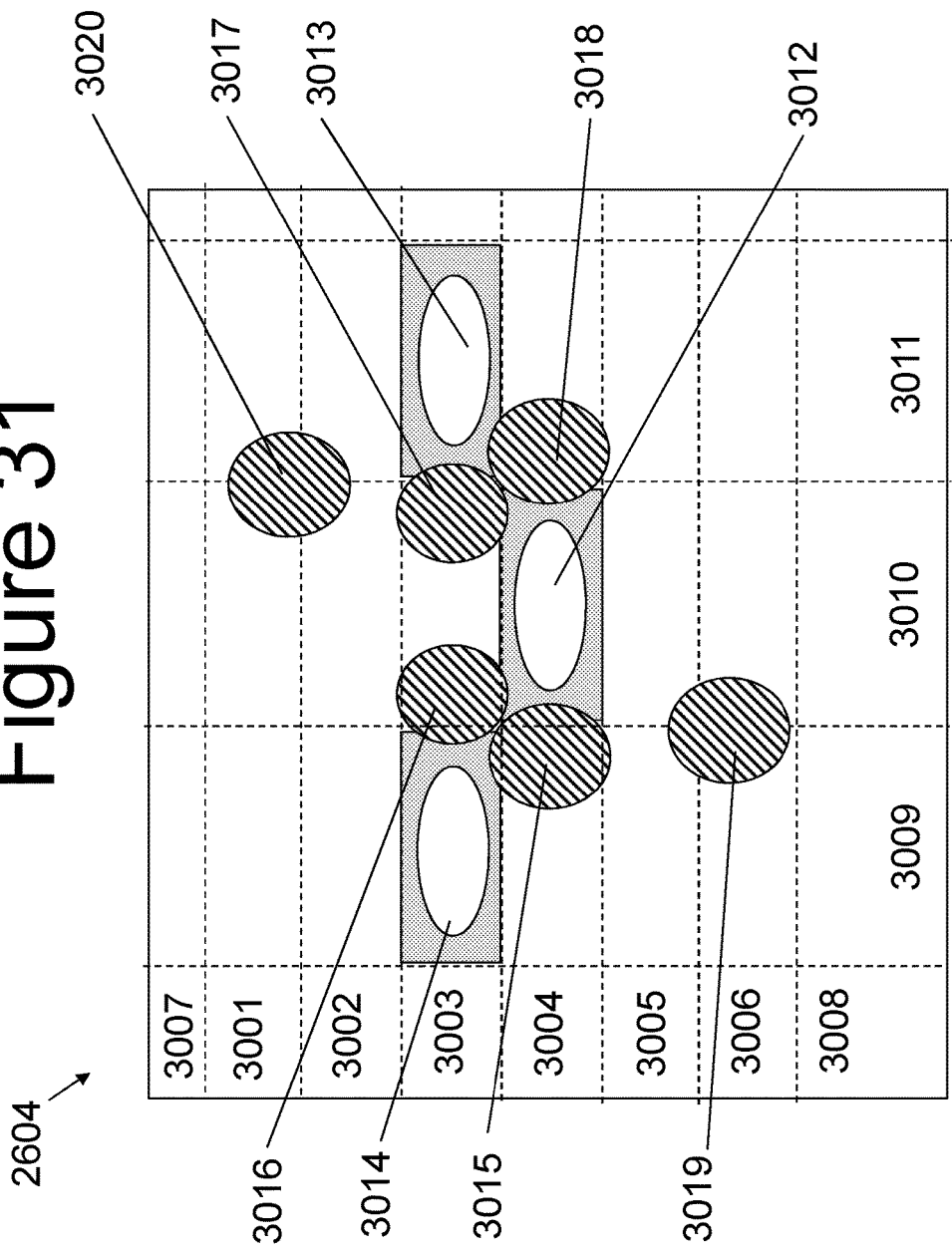
Figure 32:
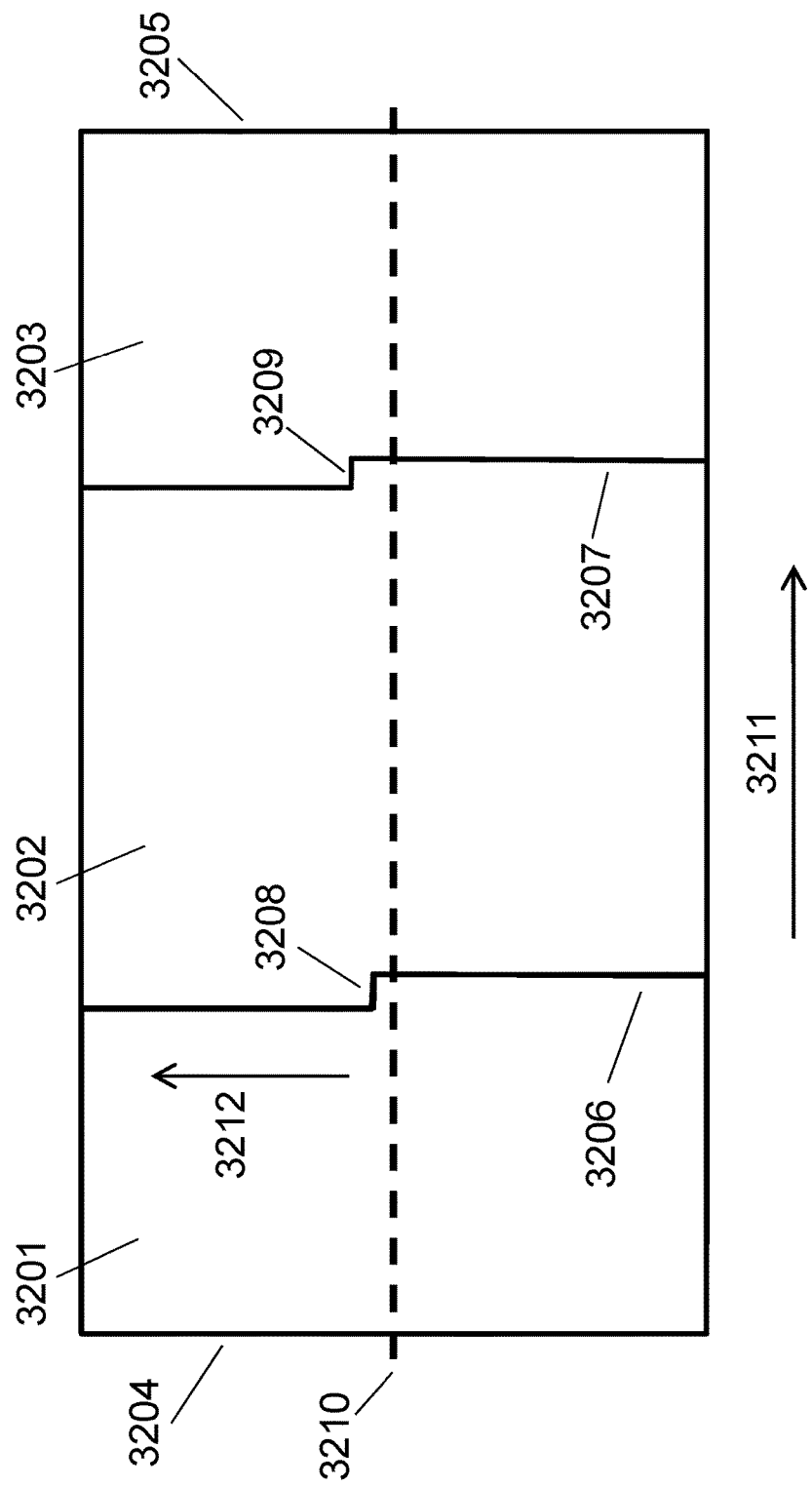
Figure 33:
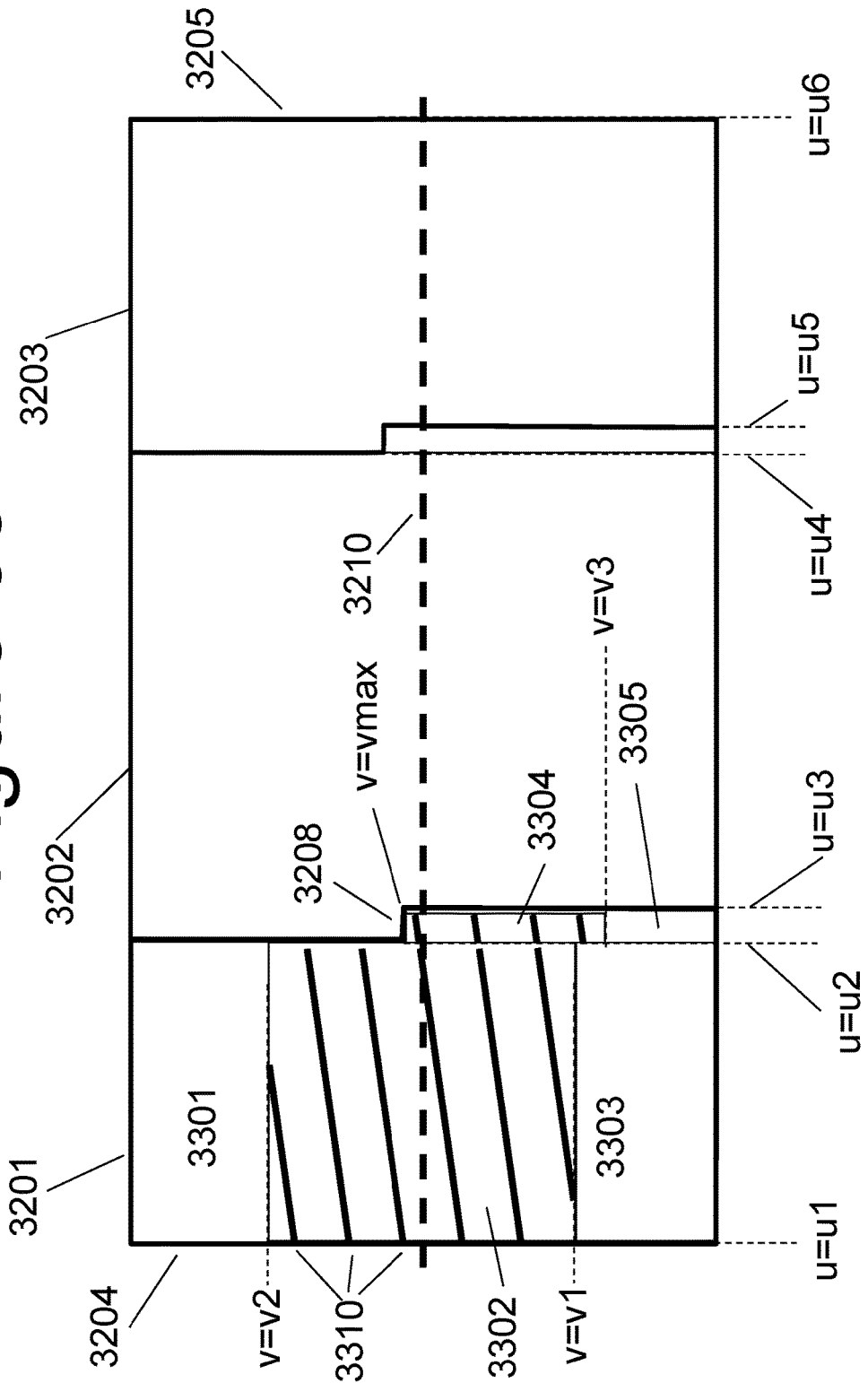
Figure 34:
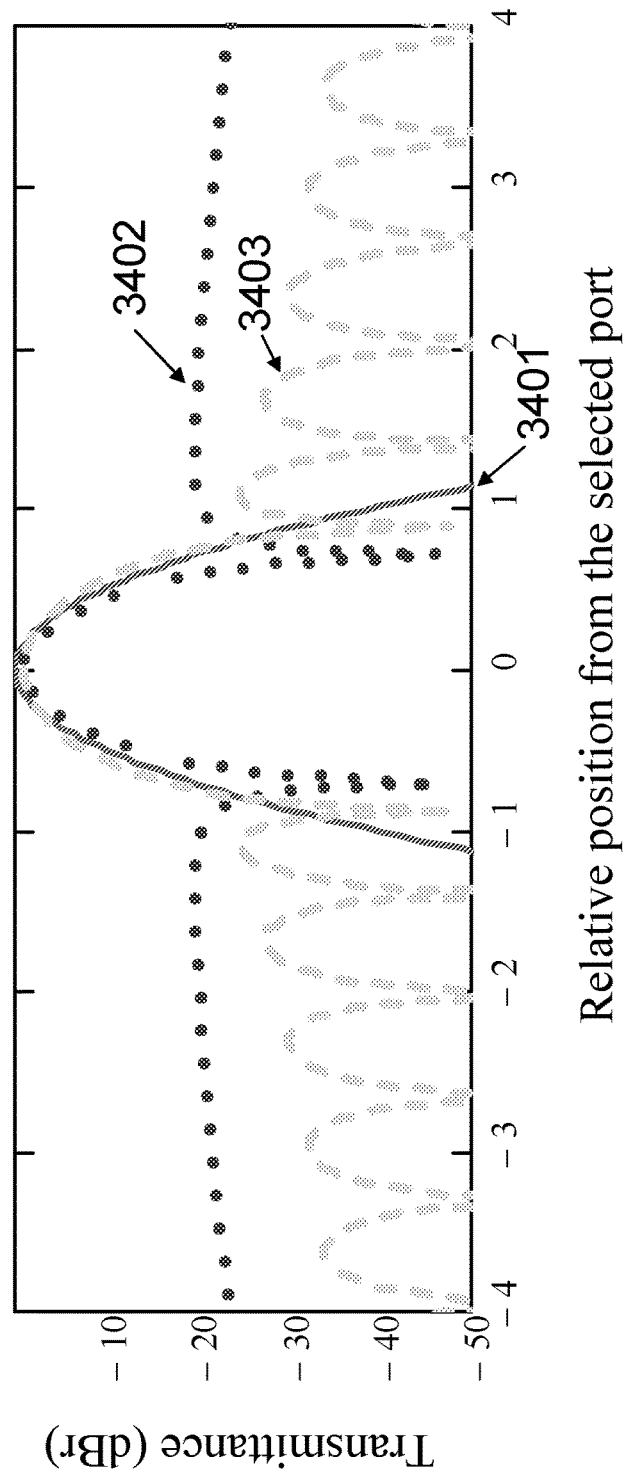
Figure 35:
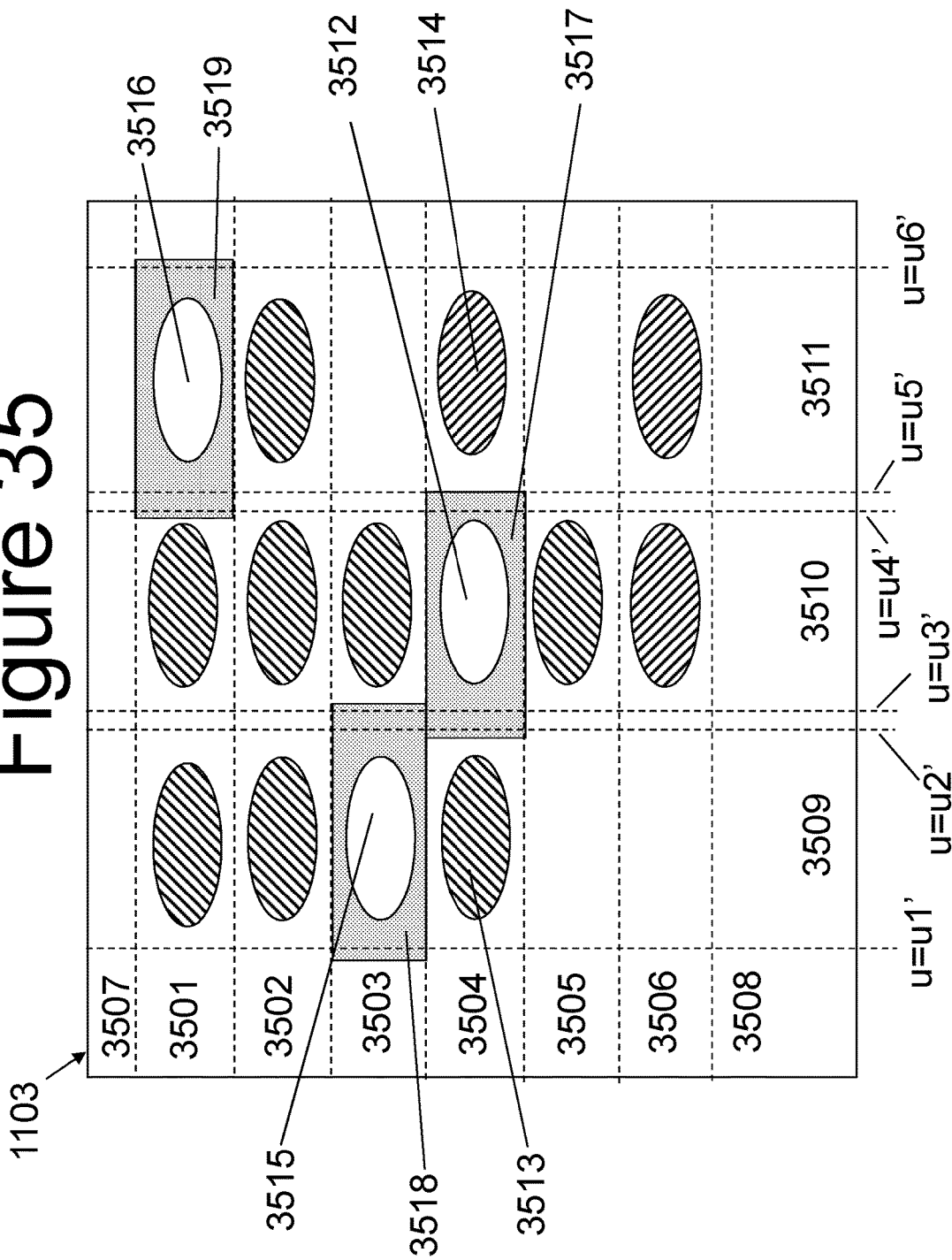
Figure 36:
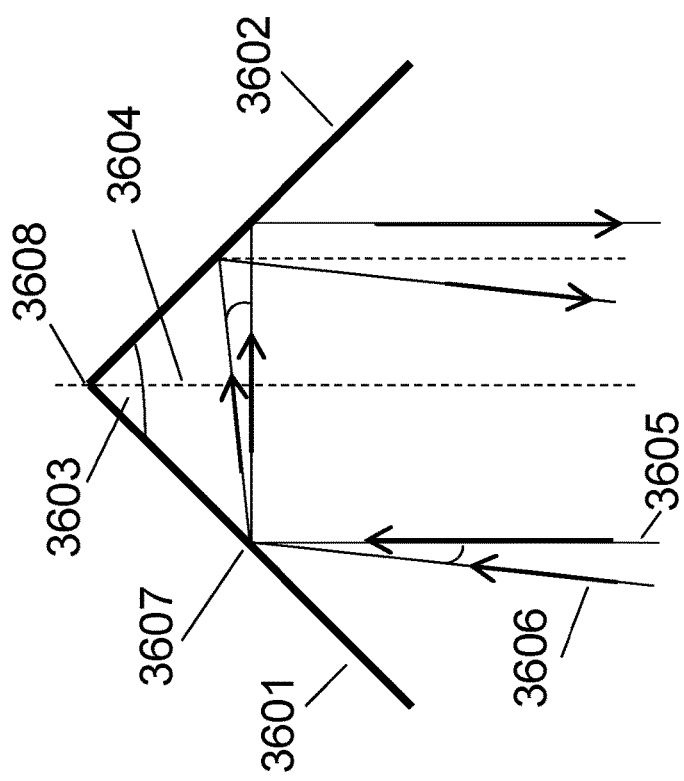
Figure 37:
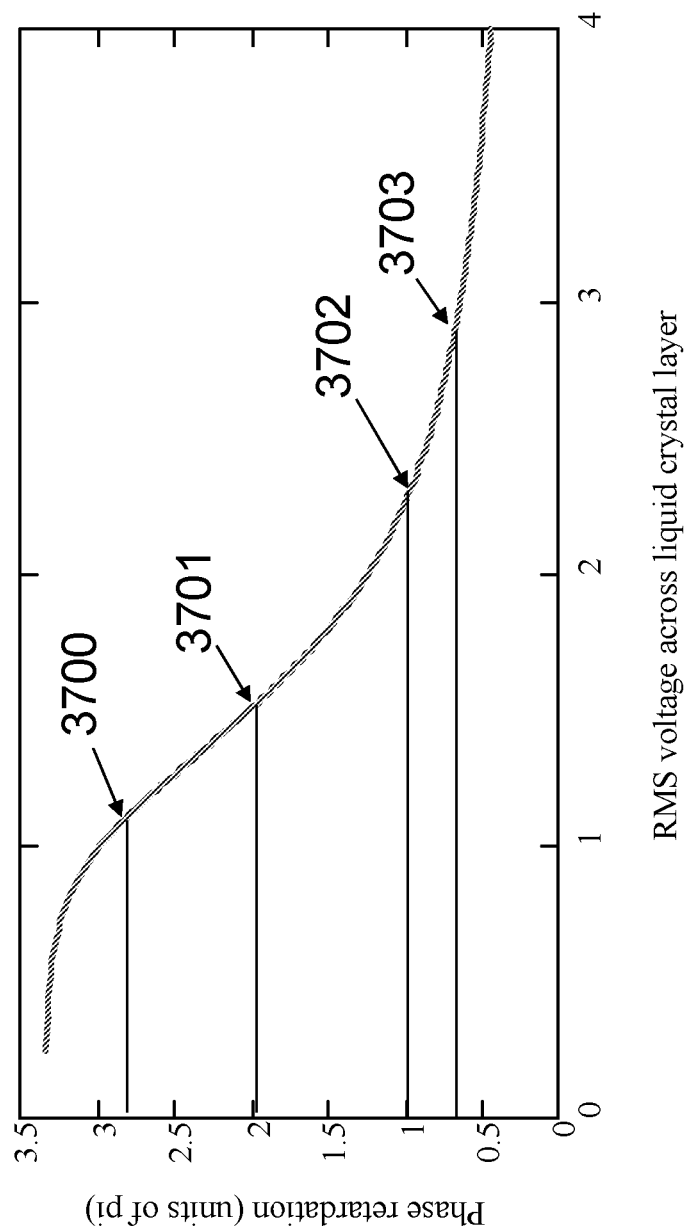
Figure 38:
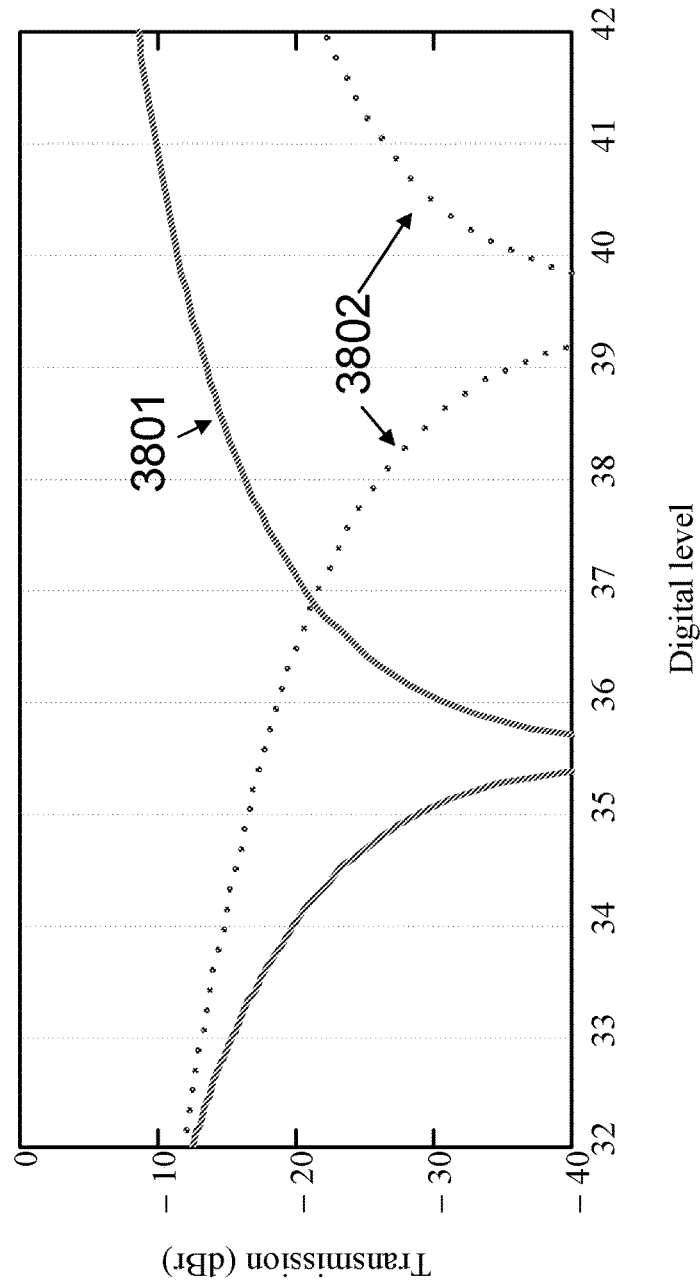
Figure 39:
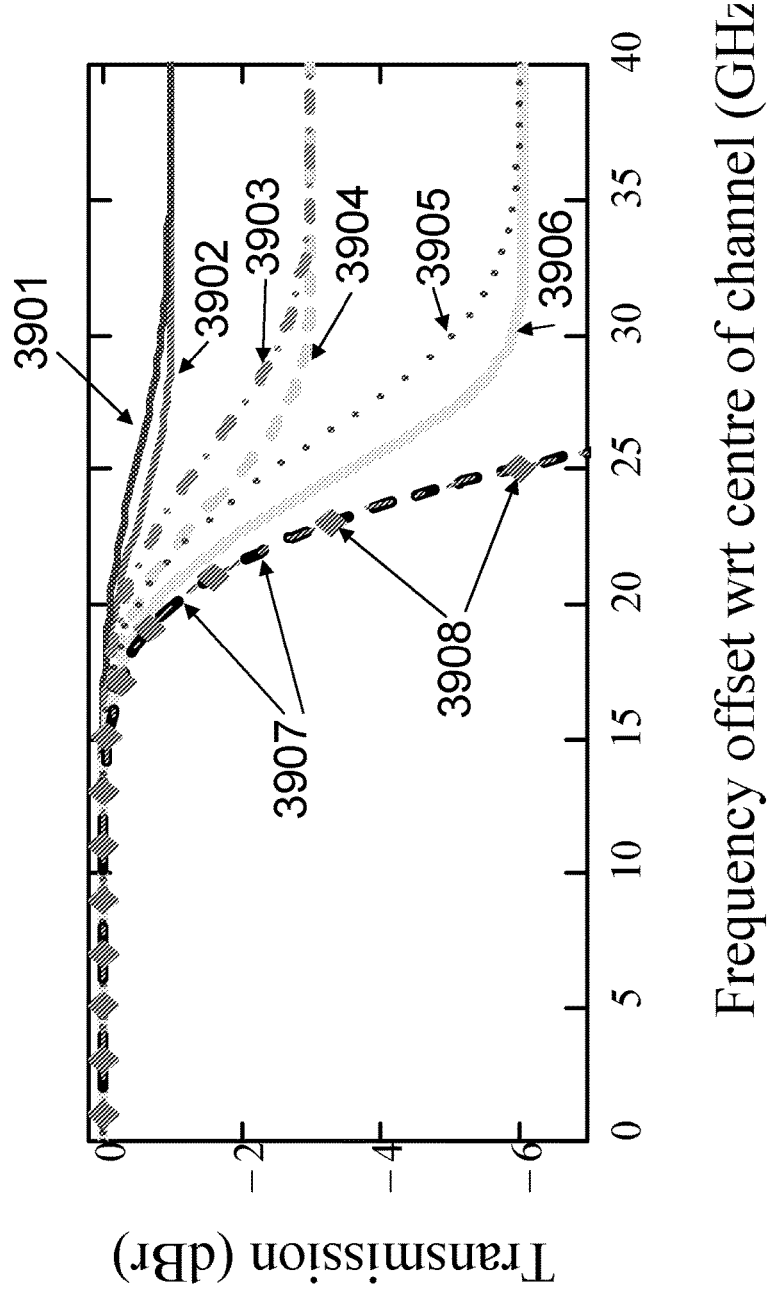
Figure 40:
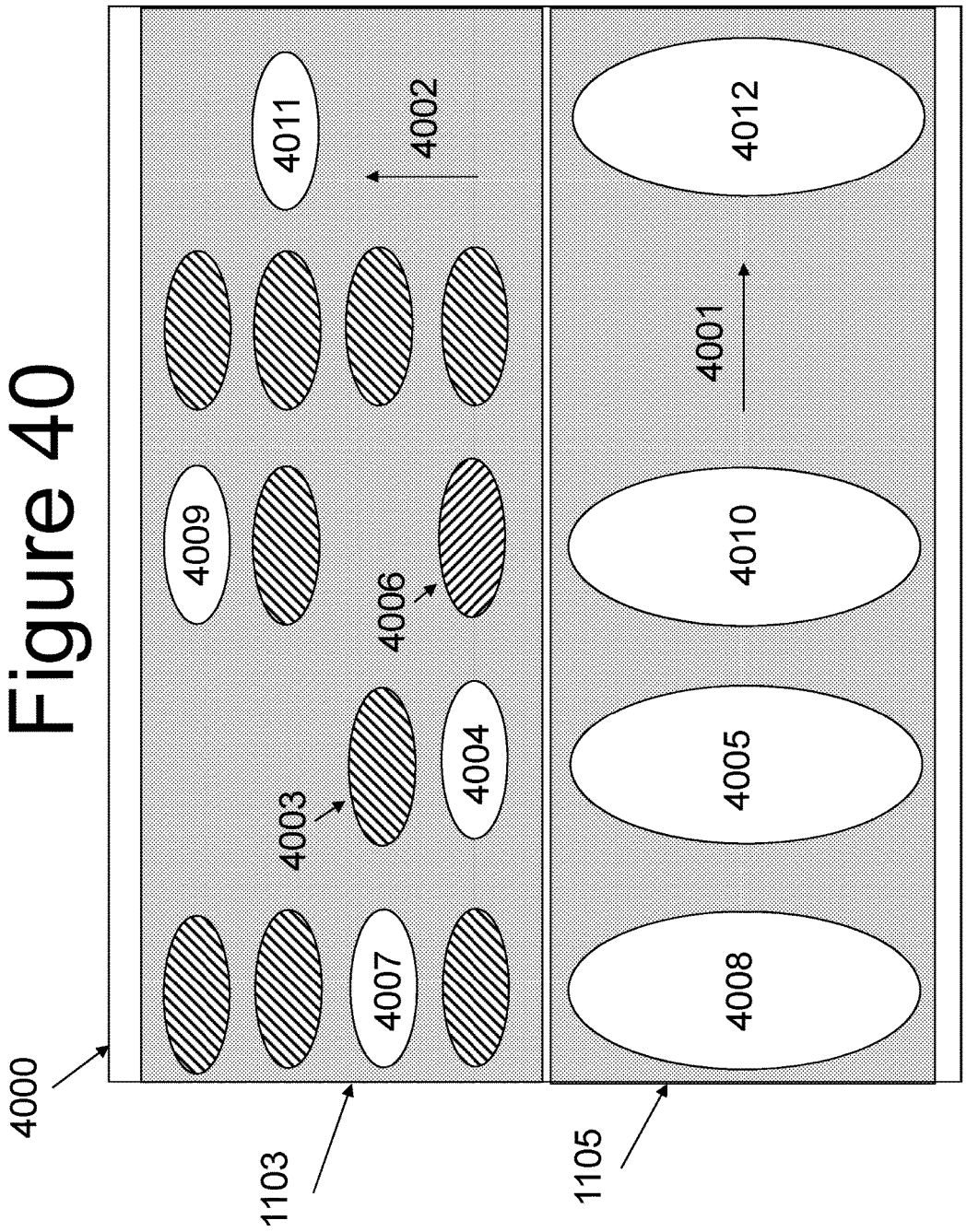
Figure 41:
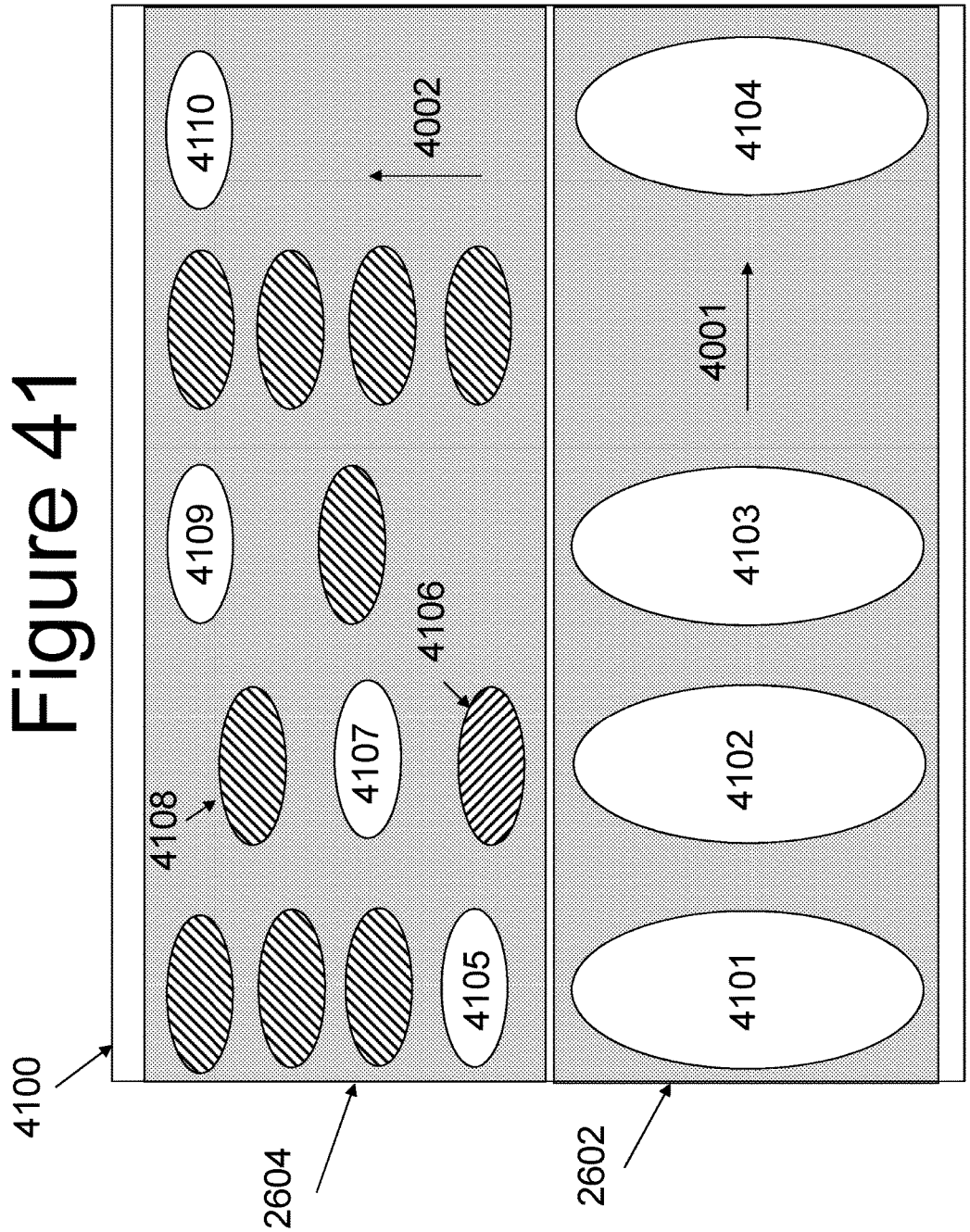
Figure 42:
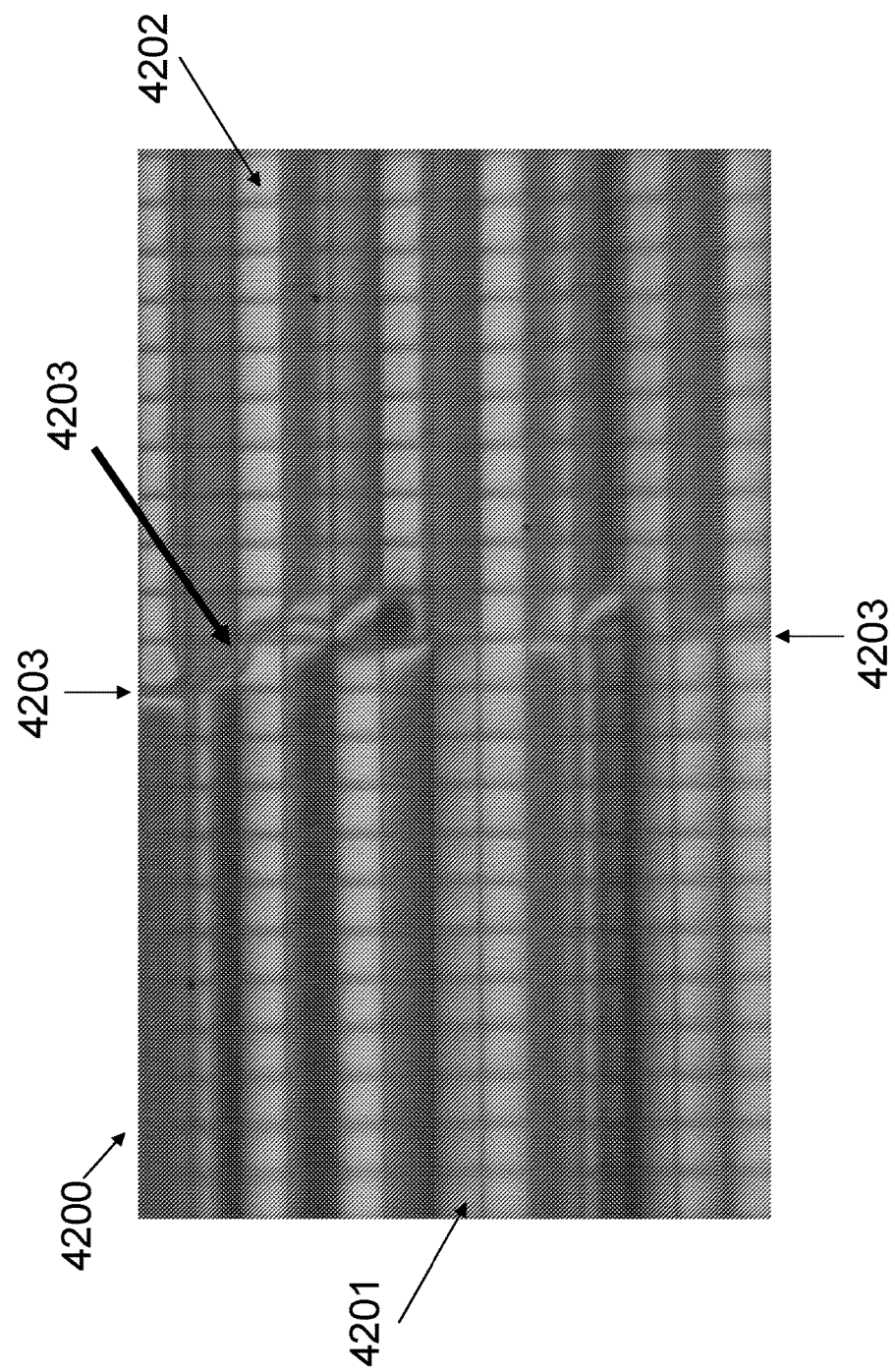

FIG. 28 is another view of the second LCOS SLM;

FIG. 29 is a further view of the second LCOS array showing the effect of ripply tails FIG. 30 shows another view of the second LCOS array, showing only wanted diffraction orders;

FIG. 31 shows a view of the second LCOS array with a worst case example effect of spectral peaks on diffraction orders likely to cause crosstalk;

FIG. 32 shows staggered pixel groups;

FIG. 33 is a more detailed view of FIG. 32;

FIG. 34 shows a calculation of the light that is coupled from the rejected input ports, as a function of their relative distance from the selected input port;

FIG. 35 shows a spatial filter array, adapted for the pixel group assignment shown in FIG. 33;

FIG. 36 shows a schematic diagram of a retroreflector;

FIG. 37 shows a graph of applied phase retardation across the liquid crystal layer as a function of RMS voltage, for a typical liquid crystal material;

FIG. 38 uses the phase retardation graph in FIG. 37 to calculate extinction as a function of voltage;

FIG. 39 recalculates the effect of FIG. 10 taking into account both the amplitude modulation from the spatial filters and the phase side-effect of the amplitude modulation;

FIG. 40 shows a schematic of a section of the two LCOS arrays of FIG. 11 when they are provided by a common physical device;

FIG. 41 shows a schematic of a section of the two LCOS arrays of FIG. 26 when they are provided by a common physical device; and FIG. 42 shows a photographic image of an LCOS device displaying two different routing holograms side by side, showing phase contours at the hologram boundary.

5 DESCRIPTION OF EMBODIMENTS

5.1 Overview of Embodiments

Embodiments are described in the context of communication systems, for example those using near infrared optical radiation. The invention is not so restricted, of course, and it is envisaged to apply the techniques described in the following to other wavelength ranges, and to other applications, such as test and measurement of networks and devices, spectroscopy and pulse shaping.

A 1×N optical switch embodying aspects of the invention has the overall functionality of a conventional 1×N WSS, providing routing, channel equalisation and wavelength selective blocking (a wavelength selective blocker operates to block light of a specific and selected wavelength or nominal wavelength). In structure, however, the 1×N optical switch is different, having two-stage switching via a first switching portion and a second switching portion functionally and optically in mutual series. The second switching portion provides the functionality of a set of independent Wavelength Selective Blockers, one in series with every one of the N outputs of the first switching portion.

Similarly an N×1 optical switch embodying aspects of the invention has the overall functionality of a conventional N×1 WSS, but with a first switching portion that provides the functionality of a set of independent Wavelength Selective Blockers, one in series with every one of the N inputs to the second switching portion.

Rather than physically connecting N+1 separate modules to build the switch, the device can be integrated into a single entity using shared components, for example a dispersion element or elements shared between the wavelength selective blocking and the WSS, and it is also possible to provide two LCOS arrays by dividing up a single substrate into two sub arrays. Combining functionality in this way into a common integrated platform saves significantly on materials costs, for example two LCOS arrays (which can be provided by a common SLM), rather than N+1 LCOS arrays. Moreover many of the beam train components are shared. Net optical losses can be low because light needs only be dispersed once and recombined once, rather than twice. It will also be shown that by combining these functions into a common platform, further functionality is enabled, that would not be possible by connecting the devices as separate modules.

The embodiments to be described include methods and devices to suppress the crosstalk created by unwanted diffraction orders, spacers to control cell gap and the other crosstalk mechanisms described earlier. Also the embodiments include methods to reduce the training and storage cost and complexity of providing a set of attenuation levels with the required fine spacing. On their own, these new attenuation methods increase crosstalk, but the crosstalk suppression method makes the attenuation methods useable in a practical device that meets target specifications.

5.2 Review; Contrast to Relevant Prior Art

Partly because crosstalk from unwanted diffraction orders is such a limitation of LCOS, and partly because of its inherent interest, controlling this crosstalk has been a significant area for research.

Early LCOS switching research to be reviewed was before a wavelength selective architecture was invented: in such research no dispersive device, e.g. grating or grism, was used to disperse incoming light by wavelength onto separate holograms. Work in this area applied FFT theory to simulate the holograms, with each pixel providing a single sample into the FFT. Hence, typically, such holograms were constrained to have an integer number of hologram periods in the FFT sampling region. The use of the FFT means that complex patterns may be rapidly analysed and optimised on a computer to achieve low crosstalk levels, although in practice this reduces the diffraction efficiency to levels which may be too weak to achieve the required beam path efficiency through the switch. The problem with this approach is that the long hologram periods (typically the optimised hologram ended up with a single hologram period in the FFT sampling region) created a high spatial density of diffraction orders likely to cause crosstalk.

A useful step forward was to recognise that shorter hologram periods would reduce this density, and that particular combinations of periods (for each direction) would result in a system with naturally low crosstalk. While this was for 1×N switches, later work extended it to N×N switches. It can also be combined with optimising the phase distribution inside the unit cell to improve crosstalk control. However, with this improvement in crosstalk, some of the flexibility in LCOS switching was lost: it was no longer possible to adapt the routing period to the positions of the ports in the switch, and the switch was required to be assembled to fit the required hologram periods. The routing period could not be adapted to the curvature of the substrate; otherwise the natural crosstalk suppression from choosing particular periods was lost.

Another method is to position the unwanted diffraction orders sufficiently far away from the output ports that the crosstalk is suppressed by the transverse offset. Typically if the output ports are in a linear array, diagonal routing holograms may be selected so that the unwanted orders are sufficiently offset sideways in the dispersion plane and positioned in the transverse direction, so as to achieve crosstalk targets. This method limits the scalability of the WSS switch, however, because the aspect ratio of the beams inside the output optics mean that much of the "routing capacity" of the holograms is used up achieving enough transverse offset to get adequate suppression. It is also found experimentally that the phase contours of the holograms do not behave as required: they are distorted by fringing fields and by the pixel edges. As a result, additional diffraction orders appear and cause crosstalk.

A significant source of crosstalk in any 1×N optical switch is the beam tails from light routed to an adjacent port. When crosstalk from unwanted diffraction orders has been controlled, the coupling of these beam tails into the wrong output fibre limits the packing density that may be obtained for a given crosstalk target.

This crosstalk mechanism may be reduced by spatial filtering of the Fourier output from the LCOS device, by an individual microlens associated with each fibre or waveguide in the input/output array. This can be a spherical microlens per waveguide, or a combination of a cylindrical microlens per waveguide in an array along the plane of the waveguide array, with an orthogonal common lens for all waveguides.

In the absence of a microlens, the crosstalk from an adjacent port is the modulus squared of the normalised overlap integral of the complete beam incident on the adjacent port, with the fundamental mode of the fibre receiving the crosstalk.

Figure 8:
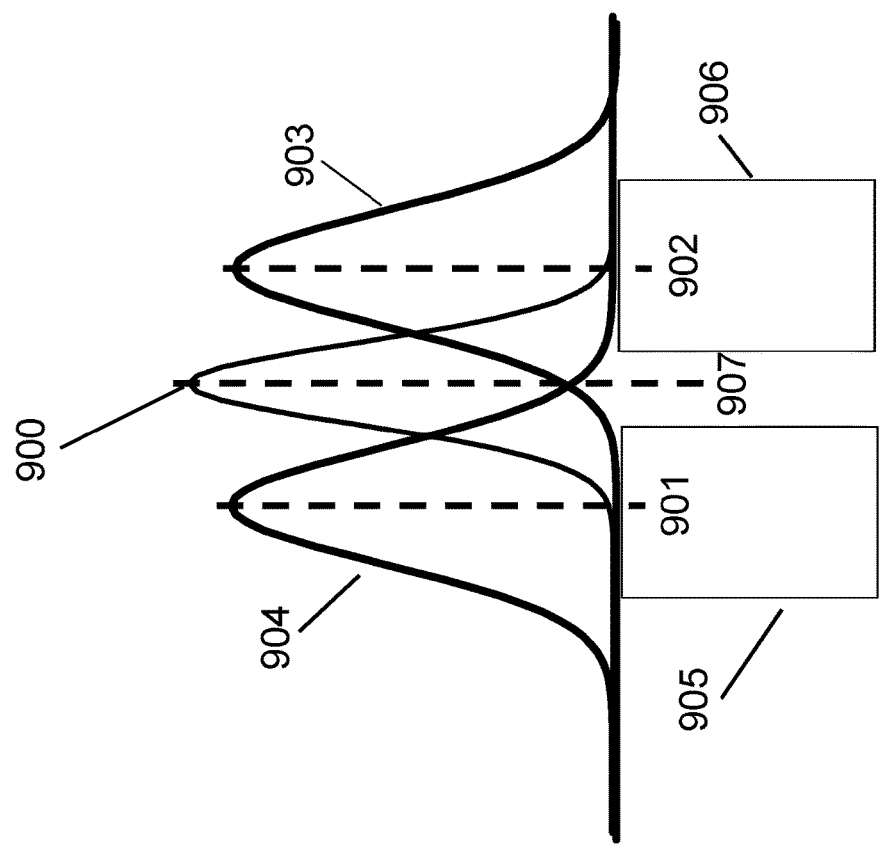
FIG. 8 shows an overlap integrand as a function of position.

FIG. 8 shows the overlap integrand 900 as a function of position: 901 shows the position of the centre of the target output fibre, and 902 shows the position of the centre of the adjacent output fibre. The integrand 900 is the product of the adjacent beam 903 with the fundamental mode 904 of the target output fibre, 905. The integrand is most significant halfway in between the two fibres 905 and 906, at the midpoint 907. Half of the overlap integral arises from the region between the centre of the target output fibre 901 and the midpoint 907, and the other half arises from the region between the midpoint 907 and the centre of the adjacent output fibre 902.

Where a microlens is provided per fibre, it acts as a spatial filter to provide filtering. This has two important consequences. The first consequence is that this filtering may act in combination with a new method, to be described, to substantially remove the crosstalk from the adjacent port. The second consequence is that the coupling efficiency of the crosstalk into the output is at least 6 dB less than the standard formula for transverse offset coupling of a Gaussian-like beam into an output waveguide. This may be understood with reference back to FIG. 8: the microlens used to focus light into the target output fibre, focuses the tail of the adjacent beam into the output fibre. The maximum amount of light coupled from this tail would occur if the entrance pupil of the microlens is square, and has a boundary at the exact midpoint 907 between the centres 901 and 902 of the two fibres. Mathematically this region contributes around half of the overlap integral from the complete offset adjacent beam. The rest of the adjacent beam falls outside the entrance pupil of the microlens, therefore it is not focused into the fundamental mode of the fibre. Hence this half of the overlap integral from the adjacent beam is filtered out. The coupling efficiency is given by the modulus squared of the total overlap integral. Hence the coupling efficiency is ~¼ of the value in an architecture that does not use microlenses in this way, resulting in 6 dB suppression.

Figure 9:
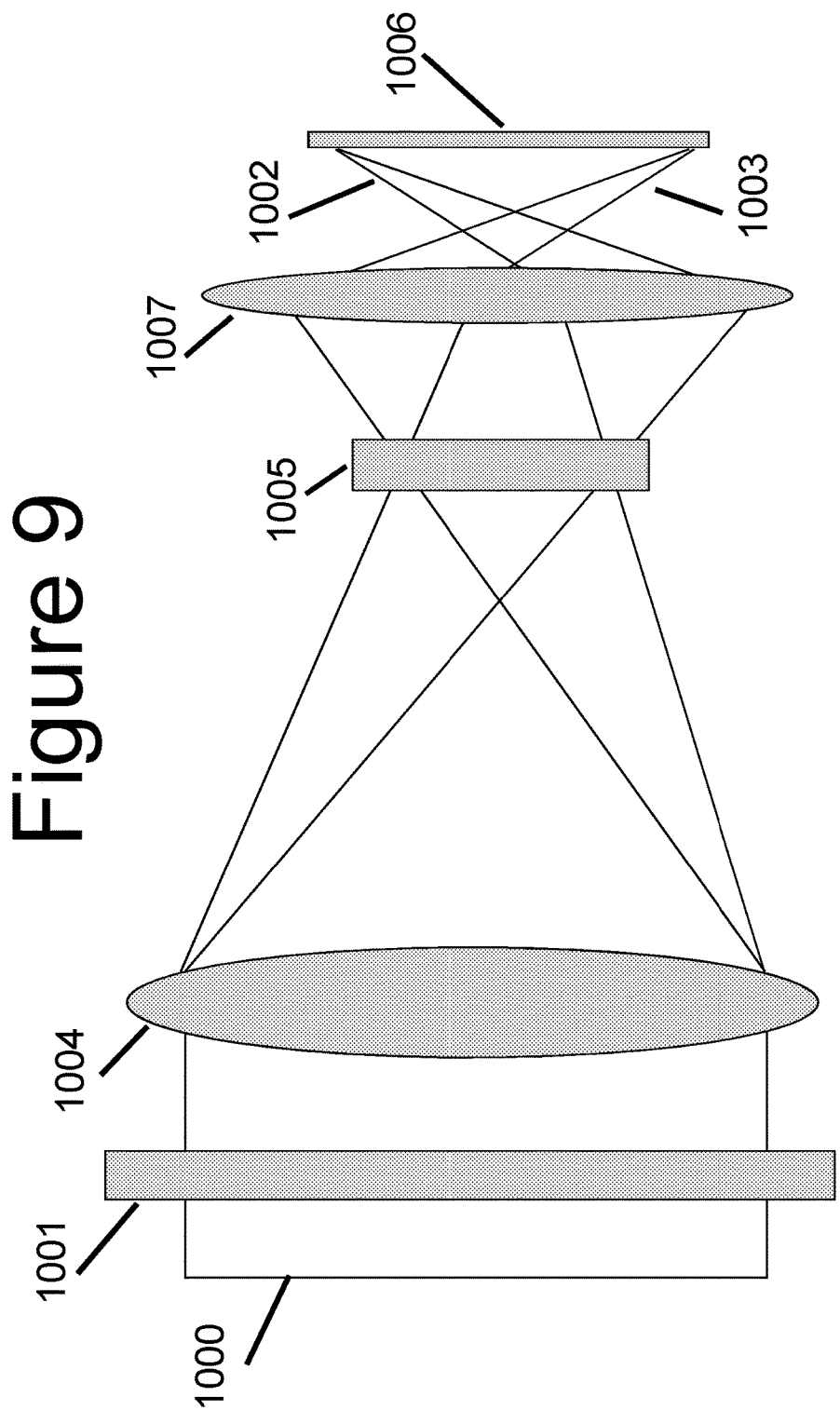
FIG. 9 shows a device for control of crosstalk using two ferroelectric LC SLMs in series.

Referring to FIG. 9, an alternative method to control crosstalk, implemented in a 1×N (not wavelength-selective) switch was to use two transmissive ferroelectric LC SLMs 1001,1005 in series. The design and experiments in the original reference where this method was disclosed were for a scanner 1006, rather than a beam steering switch between optical fibres: hence the required coupling conditions for beam steering between optical fibres were not taken into account. FIG. 9, copied from the original paper, shows the incident beam 1000 arriving at a transmissive beam steering SLM 1001. Two different output beams are shown, 1002 and 1003, each Fourier transformed by the lens 1004 to arrive at a transmissive amplitude modulating SLM 1005. At the second SLM 1005, each of the unwanted diffraction orders likely to land on the scanner 1006 is spatially blocked by a single pixel whose position and dimensions are selected to block that particular order. A second lens 1007 is selected and positioned to image the spatially filtered light onto the scanner.

To adapt to a switching application the scanner 1006 is replaced by an array of optical waveguides, and the positions and focal lengths of the lenses 1004 and 1007 selected so that the output beam waist forms at the end face of the output waveguides. Furthermore, to couple efficiently into a single mode waveguide, the output beams need to arrive parallel to the optical axis of the target output fibre. This could be achieved, for example, by replacing the lens 1007 by a telecentric imaging system. Another required replacement is to use nematic liquid crystal, rather than ferroelectric liquid crystal, in both SLMs 1001 and 1005. This is because of the effect of the DC-balancing scheme, required to maintain electrochemical stability, on the modulation applied by these different types of liquid crystal. For a nematic liquid crystal, as long as the pixels are refreshed at a high enough frequency, the applied modulation is stable and not altered in sympathy with the DC balancing scheme. However, for a ferroelectric liquid crystal, even when refreshed regularly, the modulation changes when the field is inverted. During this change there are amplitude fluctuations which could cause unacceptable burst errors in a communications system.

An equivalent optical circuit diagram for an N×1 switch using this principle is shown in FIG. 21. This has inputs 2000 in series with a bank of on-off switches 2001 implemented as an LC blocker array. Independent on-off switches 2002, 2003 and 2004 are applied to the signals entering on different ports selected from the group 2000. A routing LCOS array 2002 acts as an equivalent uniselector 2003 to form an output 2004. This switch seems designed for monochromatic light, because all signals entering the inputs 2000 share the same routing hologram. Hence the output position of the light at the output 2004 would be wavelength dependent, leading to a wavelength-dependent offset compared to an optical waveguide positioned to collect the output 2004. This offset would cause a wavelength-dependent loss, limiting the wavelength range of the switch, particularly as the port count is increased. If used in reverse as a 1×N switch, the wavelength-dependence of the beam steering would cause wavelength-dependent error in the positions of the beams compared to the LC blocking elements, and hence wavelength-dependent crosstalk into output waveguides positioned to collect the output beams. The blocking applied in the switch of FIG. 21 is port specific, but wavelength agnostic. That is, all the wavelengths entering a specific switch port may be blocked, or none of the wavelengths entering a specific switch port may be blocked.

There are two reasons why this method cannot be used directly in the WSS application. The first reason is because an N×1 WSS is typically desired to be configurable so that signals at different wavelengths may be selected from many ports simultaneously. For example, a first wavelength may be selected from port 1 (by closing on-off switch 2002), but blocked from all other ports, including port 2 (by opening the other on-off switches, e.g. 2003, 2004). Further in an N×1 WSS a second wavelength may be selected from port 2, etc. However if port 2 has been blocked to stop the first wavelength, it will also be blocked for all other wavelengths, including the second wavelength. Therefore we cannot use an LC blocker as shown in FIG. 21 to control crosstalk (port isolation) in an N×1 WSS.

The second reason is that the WSS application requires signals, centred on different nominal system wavelengths, to be routed independently. If an LC blocker was used at the exit of a 1×N WSS, the wavelengths would be travelling as common beams, and hence the spatial filtering at each output port would be the same for all wavelengths. Therefore signals centred on different nominal system wavelengths could not be processed independently to suppress crosstalk.

MEMS mirrors may have crosstalk effects, for example transient effects such as a reflection into a particular port, as the mirror is steered between ports either side, while the switch is being reconfigured. One approach to address this problem is to use an LC wavelength blocker array, positioned in front of, and aligned with the MEMS mirrors. The LC may be set to block while the associated channel is being configured. This acts to switch off all of the signals at wavelengths inside the associated channel.

The equivalent optical circuit for an N×1 WSS with an LC wavelength blocker array is shown in FIG. 19, and has an on-off switch for each channel, between the equivalent bank of uniselectors and the common output port. Inputs 1900 are separated by wavelength inside input optics 1901 to be incident on an LCOS array or MEMS array 1902 that acts like a bank of uniselectors, 1903, 1904 1905, one uniselector for each configured channel. The selected signals also pass through LC blocker array 1906 which has individual LC pixels aligned with each channel that act physically as on-off switches 1907, 1908 and 1909. After the LC blocker array 1906, output optics 1910 combines the selected signals by wavelength to form a common output 1911. In the figure, on-off switch 1907 is open, showing that all signals incident on equivalent uniselector 1903 are blocked while the switch reconfigures. Hence any transient effects for the associated channel are blocked from the output 1911. This wavelength selective blocking is port agnostic, that is, it blocks light at the specific wavelength from all ports, or from none of the ports. While the wavelength selective blocking is applied, no signals at the specific wavelength may emerge from the switch. Therefore this blocking is not useful to manage crosstalk, except while it is not required to route any signal at the blocked wavelength, e.g. during transient control conditions.

However, in embodiments as disclosed here, blocking may be applied independently to all signals from inputs 1900 incident on the equivalent uniselectors 1903, 1904, and 1905. Therefore this blocking may be applied while the switch is in a steady state, during which time signals at the blocked wavelength, from the selected input port or ports, may be routed through to the switch output.

A direct combination of the conventional N×1 WSS with the prior art spatial filter concept used in FIG. 9 has the equivalent optical circuit shown in FIG. 20, and has an on-off switch applied to each of the input ports, before separation by wavelength. In this prior art combination, inputs 2000 are applied to an LC blocker array 2001, with individual on-off switches 2002, 2003 and 2004 applied independently to the signals entering each respective port. Input optics 2005 separates the selected signals by wavelength and delivers them to an equivalent uniselector bank 2006, with uniselectors 2007, 2008 and 2009, one uniselector for each configured channel. Output optics 2010 combines the selected signals by wavelength to common output 2011. The blocking applied in the switch of FIG. 20 is port specific, but wavelength agnostic. That is, all the wavelengths entering a specific switch port may be blocked, or none of the wavelengths entering a specific switch port may be blocked. Therefore this blocking is not useful to manage crosstalk, except while it is not required to route any signal from the blocked port.

The embodiments later described herein, for example with regard to FIG. 11 are advantageous over the device shown in FIG. 20.

A first advantage is that signals may be selected from "all" or "many but not all" of the ports, as required for the typical WSS application. This is because the spatial filtering is carried out independently, per channel-port combination. By contrast, in the direct combination (FIG. 20), if any signal entering a particular port is blocked by the LC blocker array, so are all the other signals entering the same port.

A second advantage is that the spatial filtering in the embodiment is applied independently to spatially separated wavelength channels, and by a 2D array of pixels. Hence the position, size and shape of the 2D group of pixels that is used to pass and block required components may be adapted to support the required channel configuration and assembly tolerances.

A third advantage, also resulting from the use of a 2D array of pixels for spatial filtering, is that subchannel processing may be carried out, to suppress crosstalk spikes created at hologram boundaries.

A fourth advantage is that the spatial filters may be used to apply coarse attenuation levels, independently to spatially separated wavelength channels. A fifth advantage is that the routing means may be used in a simple geometric method to apply fine attenuation levels. In a conventional LCOS WSS this method could cause unacceptable crosstalk, however the spatial filtering suppresses this crosstalk mechanism.

A fifth advantage is that the 2D array of pixels used to apply spatial filtering, may act as a wavefront sensor, to ease assembly costs.

Further advantages, include easier management of spectral notches, suppression of the unwanted diffraction orders created by the transparent front electrode, and will be described later.

These advantages ease the cost of hologram training processes to meet crosstalk targets. As industries mature, process efficiency becomes very important as a source of competitive advantage. The main economic benefit of the embodiments is in the improved process efficiencies they enable, and the potential to meet strict crosstalk targets for coherent systems without the route and select node architecture.

5.3 Equivalent Optical Circuit and Black Box Diagrams

To illustrate the principles, a first embodiment of an optical switch is shown in FIGS. 11-17.

FIG. 17 shows a highly-schematic equivalent optical circuit for the optical switch 6000, in order to clarify the differences with respect to the prior art. Referring to FIG. 17, an N×1 optical switch 6000 has N spatially separate input beams 1100 connected to input optics 1, and a single output beam 1106 delivered by output optics 1102. In one embodiment, each input beam 1100 is delivered from a respective individual optical fibre forming an input port, and the output 1106 is delivered into a single optical fibre forming an output port. One or more of the input beams may include an ensemble of different wavelengths.

Light passes from the input optics to a first array 1103, referred to herein as a spatial filter array, then via intermediate optics 1104 to a second array 1105, referred to herein as a routing array. From the routing array light passes to the output optics 1102.

From each of three inputs 1100a-c, information-carrying signals are spatially separated by wavelength by input optics 1101 to form, in this figurative embodiment, three sets 1701, 1702, and 1703 of signals shown grouped into bands with common centre wavelengths f1, f2, and f3.

The first array 1103 is in this embodiment an LCOS array. It can be considered equivalent to applying on-off switches to each separated signal band. In the off state the signal band is blocked, in the on state the signal band is "selected", that is, allowed to pass through to the intermediate optics 1104. These on-off switches are shown in FIG. 17 as switch groups 1705, 1706, 1707. After the on-off switching, the selected signals are passed to the second array 1105, also in this embodiment formed as an LCOS array. It acts like a set of uniselectors, 1709, 1710, and 1711 to select a particular signal for output in the associated wavelength channel. After the second selection stage, the selected signals are recombined by wavelength inside output optics 1102 to form a common output 1106.

Hence all of the information-carrying input signals that are passed through to the output 1106 are selected twice in series, once by an equivalent on-off switch, and once by an equivalent uniselector. For example, from the set of three information-carrying signals 1701, only the second equivalent on-off switch 1715 is closed, and the other on-off switches in the group 1705 are all open. At the associated equivalent uniselector 1709, the second input port 1716 is selected. Hence from the set of signals 1701, the signal that appears at the output 1106, is that from the second input, 1100b. Similarly, and as shown in the figure, non-selected signals are rejected twice, to increase the depth of blocking.

The equivalent optical circuit for a conventional WSS is shown in FIG. 18. Inputs 1800 are separated by wavelength inside input optics 1801 to be incident on an LCOS array or MEMS array 1802 that acts like a bank of uniselectors, 1803, 1804, 1805, one uniselector for each configured channel. The selected signals are combined by wavelength inside output optics 1806 to form a common output 1807. In a conventional WSS, selected signals are selected once only, by the equivalent uniselector.

Unwanted diffraction orders from LCOS beam steering arrays cause crosstalk that can be difficult and expensive to control, as described earlier.

A first advantage of embodiments, compared to the conventional WSS of FIG. 18, is that by rejecting, at least partially, the unwanted signals before they reach the LCOS beam steering array, the overall crosstalk may be improved, and the manufacturing costs reduced because the holograms do not have to be trained so intensively. Ideally the actual holograms stored are based on an approximate measurement of the local cell thickness, for example looked up from previous manufacturing data.

A second advantage of embodiments, compared to the conventional WSS, is that the input optics 1101, and output optics 1102, are physically separate and therefore may be optimised independently, providing design flexibility.

The optical switch combines the functionality shown in FIG. 17, into a common optical platform, which processes light twice with an LCOS array.

Referring to FIG. 11, the N×1 optical switch 6000 has N spatially separate input beams 1100 connected to the input optics 1101, and a single output beam 1106 delivered by the output optics 1102. In one embodiment, each input beam 1100 is delivered from a respective individual optical fibre forming an input port, and the output 1106 is delivered into a single optical fibre forming an output port. One or more of the input beams may include an ensemble of different wavelengths, each ensemble forming a common multiwavelength beam. The different wavelengths inside each input beam may be carried into the switch as a set of wavelength channels. These are input channels.

The switch 6000 includes the first LCOS array 1103, which acts as a spatial filter array, and the second LCOS array 1105, which acts as a routing array. FIG. 40 shows a schematic of a section of the two LCOS arrays 1103 and 1105 when they are provided by a common physical device, 4000. Incident light is shown as elliptical beam cross-sections, for example, 4003, 4004 and 4005. The action takes place in two planes: a dispersion plane, and a switch plane, which is perpendicular to the dispersion plane. The LCOS arrays are orthogonal to the dispersion plane and to the switch plane. Light incident on both LCOS arrays is distributed by wavelength across the dispersion plane, in the direction of arrow 4001. Light on the first LCOS array 1103 is distributed in the switch plane, that is, in the direction of arrow 4002, according to the input port. The figure shows light incident on both LCOS arrays in a set of 5 adjacent wavelength channels, hence there are 5 columns of beams on the figure, one for each channel. The aspect ratio of the beams incident on the first LCOS array 1103, could be as shown, with the major axis in the dispersion plane (parallel to arrow 4001). This orientation was chosen to fit the beams onto the diagram. In practice, the major axis is more likely to be in the switch plane (parallel to arrow 4002).

The first function of the input optics 1101 is to separate each input beam by wavelength to form a set of spatially separate beams at the first array 1103, so that for each of the N input beams 1100, the light in different incoming wavelength channels or signal bands may be processed independently by the first LCOS array 1103. The second function of the input optics is to maintain the spatial separation of beams from the input ports as these beams land on the spatial filter array 1103. These two functions are illustrated in FIG. 40: beams 4003 and 4004 have come from adjacent input ports but are separated in the switch plane, that is parallel to direction 4002, as they are incident on first array 1103; further beams 4004 and 4006 have come from adjacent wavelength channels from the same input port, and are separated by wavelength, that is parallel to direction 4001, as they are incident on first array 1103.

The purpose of the first LCOS array 1103 is to act as a spatial filter array to independently pass or block the light in different incoming wavelength channels or signal bands. In embodiments, the spatial filters may also apply selective and independent attenuation to the incident light. Hence the combination of input optics 1101 with the first LCOS array 1103 provides wavelength-selective spatial filtering and attenuation, independently for each of the input beams 1100. As shown in FIG. 40, the beams 4003, 4004 at the first LCOS array 1103 may have an elliptical cross-section. Hence the third function of the input optics 1101 is to provide the required anamorphic transformation between the mode of the input fibre and the incident beams at the first LCOS array 1103.

Inside the first LCOS array 1103 the beams shown as shaded ellipses, e.g. 4003, are blocked by the spatial filtering, hence, to first order, they do not propagate to the second LCOS array, 1105. However the beams shown as unshaded ellipses, e.g. 4004, do propagate to the second LCOS array, 1105. For example beam 4004 at the first LCOS array 1103 is incident as beam 4005 at the second LCOS array 1105.

Output light from the first array 1103 is passed to intermediate optics 1104 which deliver output beams to the second array 1105. The desired effect is shown in FIG. 40.

The first function of the intermediate optics is to maintain the separation of each input beam by wavelength. The second function, is for all wavelength channels or signal bands, to combine the selected light from all input ports, emerging as parallel beams from the first array 1103 by angle onto a common group of pixels at the second array 1105. For example selected light beams 4007, 4009 and 4011, arriving from different ports, and hence different positions in the switch plane on the first array 1103, emerge as parallel beams from the first array 1103, and are delivered to the same position (but at different angles of incidence) in the switch plane on the second array 1105 as light beams 4008, 4010 and 4012, respectively.

In some embodiments there are two common groups at the second LCOS array, one for each of two orthogonal polarisation components at the inputs 1100. As shown in FIG. 40, the beams e.g. 4005, incident at the second array 1105 are likely to be stretched in the switch plane, that is, in the direction given by arrow 4002. Hence the third function of the intermediate optics is to transform the beam aspect ratio from its value at the first LCOS array 1103 to be stretched as required at the second array 1105. In embodiments, to be described, the intermediate optics operates as an imaging device in the dispersion plane, and a Fourier transform device in the switch plane.

Second array 1105 operates as a routing array. The second array, also referred to herein as a second SLM, may be part of the same or a different backplane device to the first array 1103. The second array receives beams that are still spatially separated by wavelength, but combined by input port, such that routing holograms or phase ramps may be applied to selectively direct light from a particular input port to the output optics at the desired angle to couple into the output port/fibre 1106. The spatial separation by wavelength allows this selective routing to be carried out independently for each wavelength channel or signal band. In embodiments, the routing array may also apply selective and independent attenuation to each wavelength channel or signal band. Referring back to FIG. 11, output optics 1102 delivers the selected light to the output 1106. A further function of the output optics is to provide the required anamorphic transformation to transform the beams from their stretched condition at the second LCOS array, to be suitably circular for coupling into an output fibre or waveguide.

While the above describes steady-state control conditions while signals are being passed through configured switches, there may also be transient control conditions while the spatial filter array does not pass (i.e. blocks) wavelengths that the routing array is set up to route. This may occur while the routing holograms are being set up or reconfigured, for example. In other words it is not inevitable that the spatial filter array and the routing array are controlled in the same way at the same time.

In normal use, the output 1106 is an ensemble of signals multiplexed into a common beam, and carried in different wavelength channels, forming output channels, and one or more of the inputs 1100 will input an ensemble of signals multiplexed into a common beam, and carried in different wavelength channels, forming input channels. These wavelength channels may be conventional 50 GHz or 100 GHz ITU channels, or they may have different channel spacings in a so-called flex spectrum system.

The output channels from the switch are formed by the concatenation of the input channels with desired switch channels through the switch. These switch channels are created and changed as required by the hologram control system, which assigns groups of LCOS pixels by wavelength to process the signals incident on the two LCOS arrays 1103 and 1105. The groups of LCOS pixels on the first LCOS array 1103 are also assigned by input port.

Similar to known WSS, the switch channels are created by forming optical pathways through the optics and distributing incident light by wavelength into those pathways. Incoming light is angularly dispersed by wavelength onto the LCOS array, and the light modulating elements of the LCOS SLM are grouped together, and each group is assigned to a respective wavelength channel. The switch channel spacing is programmed by the size and shape of a group of modulating elements assigned to process the channel, as will be described later.

The elements 1101 and 1103 carry out wavelength-selective spatial filtering to block some or all of the non-selected wavelengths entering the switch 6000 from each input 1100. This wavelength-selective spatial filtering is carried out independently for each input beam. The LCOS arrays 1103 and 1105 may also apply attenuation methods to create the desired attenuation spectrum. As in a conventional WSS, the processing at the second LCOS array is wavelength-dependent. The wavelength spectrum of the switch channels is also determined by the size, shape and position of the groups of pixels to which holograms are applied by the second LCOS array 1105 and the distribution of the spatial filtering applied by the first LCOS array 1103, as will be described later While the above description applies to an N×1 WSS, the same optical processing concepts may be used to implement an improved 1×N WSS.

Referring to FIG. 26, a block diagram of a 1×N optical switch, is like the block diagram for the N×1 device, FIG. 11, but in reverse. The device has a single multiwavelength input, 2600, in this embodiment as a common multiwavelength beam from an optical fibre or waveguide. The first function of the input optics 2601 is to separate the input beam by wavelength to form a set of spatially separate beams at a first LCOS array 2602, so that the input light in different incoming wavelength channels or signal bands may be processed independently by the first LCOS array 2602. The second function of the input optics is to provide anamorphic transformation between the mode of the input fibre and the required beam aspect ratio at the first LCOS array, 2602. First LCOS array 2602 is also referred to herein as a routing array. It carries out routing by applying phase ramps or routing holograms and configures the switch channel spectrum by selecting groups of pixels to which the routing holograms are applied, and is thus equivalent to the second LCOS array 1105 in FIG. 11. This first LCOS array 2602 may also attenuate the light.

In embodiments, there are two rows of beams at first LCOS array 2602, one for each orthogonal polarisation component at the input.

Intermediate optics 2603 is used to direct the routed light to a second LCOS array, 2604.

The first function of the intermediate optics 2603 is to maintain the separation of input light by wavelength. The second function of the intermediate optics is, for each wavelength channel or signal band, to separate the light processed by the routing hologram into the constituent diffraction orders of the routing hologram, and deliver as separated diffraction orders to second LCOS array 2604. The third function of the intermediate optics 2603 is to transform the aspect ratio of the beams reflected from the first LCOS array 2602 to be that required at second LCOS array 2604. In embodiments, to be described, the intermediate optics operates as an imaging device in the dispersion plane, and a Fourier transform device in the switch plane.

FIG. 41 shows a schematic of a section of the two LCOS arrays 2602 and 2604, when they are provided by a common physical device, 4100. Incident light is shown as elliptical beam cross-sections, for example 4101 to 4110. The action takes place in two planes: a dispersion plane, and a switch plane, which is perpendicular to the dispersion plane. The LCOS arrays are orthogonal to the dispersion plane and to the switch plane. Light incident on both LCOS arrays is distributed by wavelength across the dispersion plane, in the direction of arrow 4001. For example, beams 4101 and 4102 incident on first LCOS array 2602 and beams 4105 and 4107 incident on second LCOS array 2604, carry light in a pair of adjacent channels. The figure shows light incident on both LCOS arrays in a set of 5 adjacent wavelength channels, hence there are 5 columns of beams on the figure, one for each channel Light on the second LCOS array 2604 is distributed in the switch plane, that is, in the direction of arrow 4002, according to the diffraction order spectrum of the routing holograms applied by first LCOS array 2602 to light in the corresponding wavelength channel. For example, the routing hologram applied to beam 4102 at first LCOS array 2602 has been diffracted and separated via the intermediate optics to form separated diffraction orders 4106, 4107 and 4108 on second LCOS array 2604.

Second LCOS array 2604 is also referred to herein as a spatial filter array. It implements a set of wavelength selective spatial filters, to block independently for each wavelength channel or signal band, separated diffraction orders from the routing hologram that are not required to propagate to one or more of the switch outputs, 2606. However, the spatial filter array allows desired diffraction orders to propagate through to the output ports. For example, unshaded beams 4105, 4107, 4109 and 4110 incident on second LCOS array 2604 are "passed" or "selected" by the spatial filters to allow these beams to propagate to one of the output ports. Each beam represents a desired diffraction order created by the corresponding routing hologram on first LCOS array 2602. Referring to FIG. 41, shaded beams, e.g. 4106, 4108, represent unwanted diffraction orders, and are blocked or at least considerably reduced by the spatial filters, to suppress the resultant crosstalk at the output ports.

The net effect on port isolation levels is similar to the N×1 switch previously described, as follows. For the N×1 switch of FIG. 11, spatial filtering is used to block unwanted signals arriving on different inputs, so that the net port isolation provided by the N×1 switch is a series combination of the blocking depth from the spatial filters applied by the first LCOS array with the port isolation levels from the routing hologram applied by the second LCOS array. For the 1×N switch of FIG. 26, the net port isolation provided by the switch is a series combination of the port isolation levels from the routing hologram applied by first LCOS array 2602, with the blocking depth from the spatial filters applied by second LCOS array 2604.

The first function of the output optics is to provide the required anamorphic transformation to transform an elliptical beam at second LCOS array to be the required shape to couple into the output fibre or waveguide. The second function of the output optics is to propagate beams from the spatial filter array to an output array, so that the intended diffraction order created by a routing hologram, is mapped to and coupled into the intended output port. For example, with reference to FIG. 41, first and second selected diffraction orders 4105 and 4107, each landing at different positions in the switch plane, are mapped and coupled via the output optics into first and second output ports respectively, while selected diffraction orders 4109 and 4110, landing at the same position in the switch plane, are both mapped and coupled via the output optics into a third output port. The third function of the output optics is, for each output port, to combine selected signals intended to couple into the output port, into a common multiwavelength beam. For example selected beams 4109 and 4110 are each intended to couple into the third output port. The output optics combines by wavelength, both beams 4109 and 4110 into a common multiwavelength beam that is coupled into the third output. Similarly selected beam 4107 and all other selected beams landing on second LCOS array 2604 at the same position in the switch plane, but at different positions in the dispersion plane, are combined by wavelength by the output optics into a common multiwavelength beam and coupled into the second output port.

Sub channel filtering may also be applied, if desirable, by applying the spatial filtering to a subset of the columns used to filter the whole channel. The spatial filters may also apply attenuation to the selected beams.

5.4 Embodiments for the LCOS Array and Attenuation Mechanisms

Spatial filtering to block the unwanted signals may be implemented using the liquid crystal in amplitude modulating mode, or in phase modulating mode.

A well known method to achieve amplitude modulation is to align the incident polarisation at 45 degrees to the rubbing direction used to align the liquid crystal, and use the liquid crystal as a voltage-controlled reflective waveplate. In this mode, a retardation of pi (or an odd multiple of pi) causes the reflected light to be rotated by 90 degrees, while a retardation of 2 pi (or an even multiple of pi) causes the reflected light to remain in its original polarisation state. This forms a basic method to manipulate the reflected light into one of two desired output states. Polarisation-dependent optics may be used later in the system to reject light in one of these states, and pass light in the other state. For example, the "crossed polarisers" method uses a polariser to create incident light linearly polarised at 45 degrees to the rubbing direction. After modulation by the liquid crystal layer, the light is passed through an analyser that is crossed to the polariser. In this first method, light subject to a retardation that is an even integer multiple of pi is rejected (that is blocked), while light subject to a retardation that is an odd multiple of pi is passed (that is selected). In contrast the "parallel polarisers" method uses a polariser in the same way, but the analyser is parallel to the polariser. In this second method, light subject to a retardation that is an odd integer multiple of pi is rejected (that is blocked), while light that is subject to a retardation that is an even integer multiple of pi is passed (that is selected).

Which state is rejected can be selected to optimise the system performance. For example, the liquid crystal retardation tends to vary nonlinearly with voltage. In homogeneous alignment, and for uniformly spaced voltage levels, the resolution in the retardation tends to finer spacing at lower values of retardation. Hence a retardation of pi may be achieved more accurately than a retardation of 2 pi. Therefore to achieve deep blocking, it may be preferable to block the non-selected wavelengths by applying a retardation of pi. Methods to improve the depth of blocking will be described, embodiments use the ability to apply a pixellated retardation distribution to each light beam to be spatially filtered.

In other circumstances, the depth of blocking is limited by the residual reflection from the cover glass and front electrode. If the blocking is limited by residual reflection, rather than the resolution in the retardation, and the reflection limit is such that the desired blocking may not be achieved, then it is preferable to block the non-selected wavelengths by applying a retardation of 2 pi. As a result the blocked light will have the same polarisation state as the residual reflection, and both these unwanted components may be rejected by the same polarising device.

The blocking achieved in practice by the wavelength selective spatial filter depends on the accuracy with which the amplitude modulation may be controlled, as will be described. It also depends on the extent and strength of sidelobes from the incident beams, and the relative amplitude at which the undesired beams are truncated. The amplitude modulation depth depends on the resolution of the digital device used to control the applied voltage to achieve the desired phase retardation, and also the quality and alignment tolerances of the polarisation manipulation elements in the system. Any sidelobes can extend in the switch plane (up the columns) as well as in the dispersion plane (along the rows). Hence even with a perfect blocking layer, there may be residual light that passes through to the second (beam steering) LCOS array. The crosstalk extinction at the beam steering LCOS array needs to be sufficient to block the residual light that would otherwise couple into the output. Conversely, the optical system needs to be designed to control the residual light sufficient to achieve the desired crosstalk extinction.

In a first method, phase modulation may also be used to implement spatial filtering, by beam steering the selected wavelengths and non-selected wavelengths in different directions. The beam steering of the selected wavelengths can take place in the dispersion plane, or in the switch plane. An effective way to block the non-selected wavelengths is to reflect them specularly, because this does not create a set of strong diffraction orders likely to reduce the blocking efficiency. In a second method, phase modulation may be used to render the spatial distribution of the light at the output fibre or waveguide, orthogonal to the fundamental mode of the waveguide, as described in our patent application WO03021341. In a third method, the distribution at the output waveguide, includes a weak component that couples into the fundamental mode, where the amplitude and phase of this weak component, is adapted to interfere destructively with the residual reflection from the cover glass and front electrode.

Using phase modulation at both LCOS devices has the first advantage that they may be used in tandem, to correct focus errors without adjusting the spot radius as described in our patent application WO003021341. A second advantage is that by using two beam steering elements in series, the strict need for parallelism is removed from the input beams, easing the manufacturing tolerances.

Whether spatial filtering uses amplitude modulation or phase modulation, the discrete set of voltage levels, from which voltages are selected to apply spatial filtering can be optimised separately to the discrete set of voltages used to apply phase levels in the routing LCOS array. As will be described, this is also possible if the same physical LCOS device is used for the spatial filter array and the routing array.

The routing device of FIG. 11 processes input light twice with an LCOS array. Hence it is important to reduce the intrinsic optical loss overhead each time the light is reflected from an LCOS array. The two most significant contributions to the intrinsic optical loss are the loss due to reflections from the transparent front electrode (typically ITO), which may be overcome by index-matching, and also the loss due to the isolating "dead space" gaps between the pixel electrodes, which may be reduced by depositing a dielectric reflector stack over the pixel electrodes, so that almost all of the incident light is reflected before reaching the dead space. The dielectric stack can have two unwelcome side effects. The first is to reduce the available voltage across the liquid crystal, the second is to smear out the phase distributions. Both problems are worse at telecoms wavelengths, than at visible wavelengths. However, using a partial dielectric layer, that is a reduced number of layers, so that most, but not all, of the light is reflected before reaching the dead space, is a good compromise between intrinsic loss and these other effects. The number of layers may be optimised separately for the spatial filter array 1103, and the second array 1105.

In particular, as described previously, the spatial filter array may be implemented by using the LCOS with crossed or parallel polarisers in amplitude modulating mode. FIG. 37 shows a graph of applied phase retardation across the liquid crystal layer as a function of RMS voltage, for a typical liquid crystal material, with 4 operating points, 3700 to 3703. At point 3701 the phase retardation is 2.pi, whereas at point 3702, the phase retardation is pi. A spatial filter used in amplitude modulating mode would operate substantially along the line between these two points. In a first embodiment, the liquid crystal layer is used in ECB mode (Fréedericksz transition) and the spatial filtering is implemented using crossed polarisers at ~45 degrees to the rubbing direction that aligns the liquid crystal layer. In this embodiment, at operating point 3701 the light is blocked, while at operating point 3702 the light is maximally transmitted. At intermediate RMS voltages between 3701 and 3702, the incident light is attenuated: the closer the RMS voltage to 3701, the greater the attenuation. In a second embodiment, the spatial filtering is implemented using parallel polarisers at ~45 degrees to the rubbing direction. In this embodiment, at operating point 3702 the light is blocked, while at operating point 3701 the light is maximally transmitted. At intermediate RMS voltages between 3701 and 3702, the incident light is attenuated: the closer the RMS voltage to 3702, the greater the attenuation.

While the phase range for spatial filtering is ~pi, phase ramps require a nominal phase range at least 2 pi, for example between operating points 3700 and 3703. Hence the routing array requires a broader range of RMS voltages than the spatial filter array. Therefore given the same supply range of RMS voltages between the pixel electrodes and the front electrode, the spatial filter array can tolerate a larger voltage drop across the dielectric reflector, and hence a thicker (and more reflecting) dielectric stack. Further, while the routing array applies a phase distribution that is varying over ~2.pi to each separated beam, the spatial filter array is intended to apply substantially uniform amplitude modulation to each beam, with the differences in applied attenuation occurring between beams. Therefore the spatial filter array is more tolerant to smearing effects from the dielectric layer on top of the pixel electrodes.

If the LCOS arrays are physically separate devices, i.e. two separate SLMs, the alignment direction of the liquid crystal can be optimised independently for the two devices. However, if a common device is used, as is desirable to reduce manufacturing costs, it is likely that the liquid crystal alignment layer would be rubbed in the same direction for both LCOS arrays. Referring back to FIG. 11, to be able to achieve amplitude modulation at the first LCOS array 1103, with phase modulation at the second LCOS array 1105, for such a common device, the incident light needs to be polarised linearly, but in different orientations at each LCOS array, compared to the plane of tilt of the liquid crystal. Hence the optics stages 1101, 1104 and 1102 need to manipulate the polarisation as required, as will be described later.

In practice an LCOS device provides a discrete number of digital levels to control the liquid crystal layer, each providing a discrete level of RMS voltage between the pixel electrodes and a common front electrode.

The actual digital levels applied by the spatial filters to block incident light may be adapted to the local cell gap and incident wavelength. Design tricks used to improve the temperature stability and other performance aspects of transmissive glass LC SLMs used as wavelength selective blockers, known to those skilled in this art, may be applied to the area of the LCOS array used to provide the spatial filters.

Another important design detail is the depth of extinction applied by the spatial filters in blocking mode. Compared to a conventional wavelength selective blocker using transmissive glass LC SLMs with a single pixel per channel, the spatial filters using LCOS have the disadvantage of a reduced number of digital levels inside the operating range, hence a coarser resolution in RMS voltage. FIG. 38 uses the phase retardation graph in FIG. 37 to calculate extinction as a function of voltage, but the RMS voltage is shown as a set of equally spaced digital levels. The extinction is calculated assuming crossed polarisers, and a liquid crystal layer with no intrinsic twist between the rubbing directions at the front and back of the liquid crystal layer.

The data used to calculate FIG. 38 is adjusted slightly to show the worst-case scenario, in which perfect extinction is achieved halfway between available digital levels. Transmission curve 3801 shows the attenuation as a function of digital level, where the digital levels provide RMS voltages in the range 0V to 4V. At digital levels 35 and 36 the theoretical extinction is ~30 dB, however halfway in between levels 35 and 36, the theoretical extinction should be better than 40 dB.

A first method to reduce the impact of the worst case scenario is to spatially dither the applied digital level, so that the average RMS voltage applied by the spatial filter is closer to that producing the best extinction. In this context a partial dielectric layer on the pixel electrodes has the advantage that it smears out phase retardation differences between adjacent liquid crystal pixels. At the cell gaps used for telecoms wavelengths, the director field will also have significant edge effects between pixels, further helping the averaging process. The reflected light beam from the spatial filter will have an average component that is uniformly modulated to a phase retardation to achieve good extinction on passing through the crossed polariser, added to a residual oscillatory component that will receive less extinction. The spatial filter dither distribution may be selected so that the shape of the oscillatory component, is at least partially orthogonal to a back-launched beam routed from the output. Hence the oscillatory component will be further extinguished when it couples into the output fibre or waveguide.

Whether the LCOS device is digital or analogue, the available RMS voltages depend on the potential difference waveform between the common front electrode and ground, and also a set of available potential difference waveforms between the pixel electrode and ground. If the two arrays use the same LCOS device, control flexibility may be achieved by splitting the front electrode, which are usually common, so that a first common front electrode controls the spatial filter array, and a second common front electrode controls the routing array. Hence the set of RMS voltages between the pixel electrodes and the front electrode, may be optimised independently for the spatial filter array and the routing array. For reliable long-term operation, it is also important for the drive waveforms across the LC layer to be DC balanced, that is the net DC component should be as close as possible to zero.

A second method to reduce the impact of the worst-case scenario shown in transmission curve 3801 is to adjust the front electrode waveform for the common electrode applied to the spatial filter array, to decrease the spacing in RMS voltage between digital levels inside the spatial filter array, compared to the routing array. This is shown in transmission curve 3802, in which the front electrode waveform has been adjusted so that in the first half of the DC balance cycle, the lowest voltage across the LC layer is −1 V and the highest voltage is 3V, whereas in the second half of the DC balance cycle, the lowest voltage across the LC layer is −3 V and the highest voltage is 1V. This provides a DC balanced system, as required for long-term stability of the liquid, with a minimum RMS voltage of 1V and a maximum RMS voltage of 3V. The result is that the worst-case attenuation is now better than 35 dB.

A typical WSS specification requires a range of attenuation between 15 dB and 20 dB, with spacing between attenuation levels of 0.1 dB or 0.2 dB. This requires between 75 and 200 separate attenuation levels. Even with the improvements discussed, this is difficult to achieve with the spatial filter array acting on its own and an 8 bit LCOS device, especially because the attenuation response is non-linear and varies quickly with digital level near the null, as shown in FIG. 38. However, referring back to FIG. 11, the spatial filter array, 1103, may apply coarse attenuation levels by applying selected phase retardation uniformly across each incident beam, with fine level adjustment of net attenuation provided by an attenuation method implemented by the routing array 1105, as will be described.

Therefore in one embodiment the spatial filter control data to be stored for each wavelength channel from each input port, is a blocking hologram, tailored for the local cell gap and wavelength, possibly with spatial dither to improve depth of extinction, and also a digital level for each coarse attenuation level. Three methods may be used to improve the resolution in the coarse attenuation level. The first method is to vary the amplitude modulation applied to each selected beam, across the switch plane, so that the resulting reflected beam is shaped to become partially orthogonal to the fundamental mode of the output fibre, so reducing coupling efficiency at the output. Preferably this shaping acts to increase the effective spot radius for the beam, as measured in the switch plane. A second method is to vary the amplitude modulation applied to the selected beam, across the switch plane, but usually the beams will be very narrow in this plane, and not cover many pixels. A third method is to apply spatial dithering of the phase retardation, as described earlier to improve the blocking depth of extinction. All 3 methods are starting to scale up the training and hologram storage requirements for the device, so may be undesirable when we want to reduce manufacturing costs.

Figure 1:
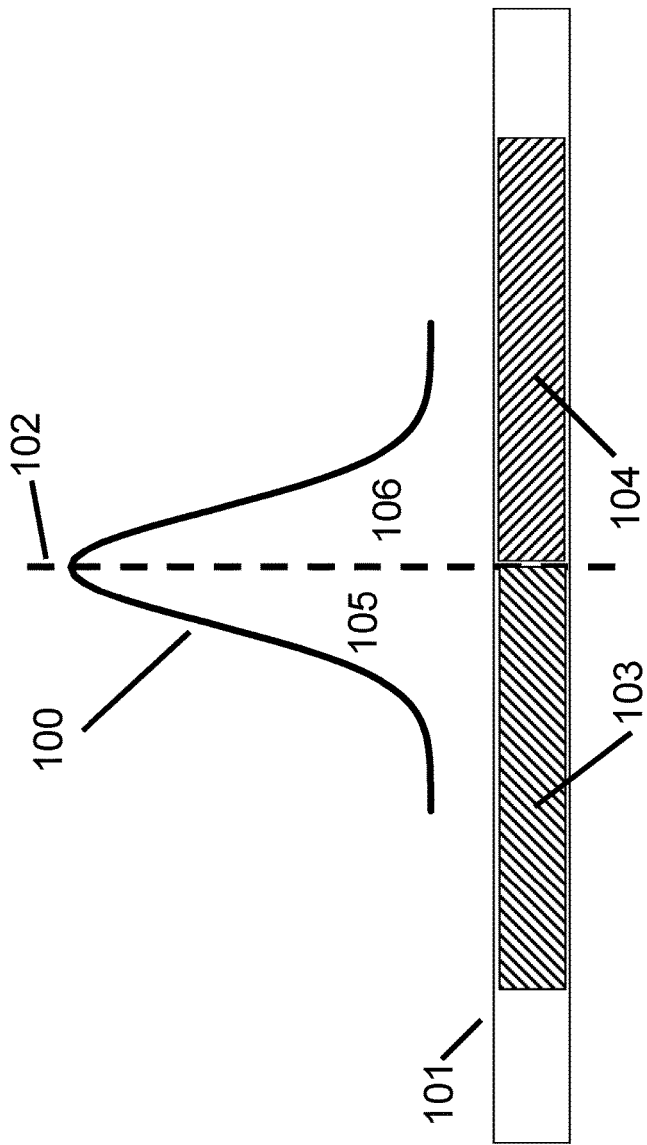
FIG. 1 is a schematic diagram showing an optical beam incident on two adjacent holograms of an SLM.
Figure 2:
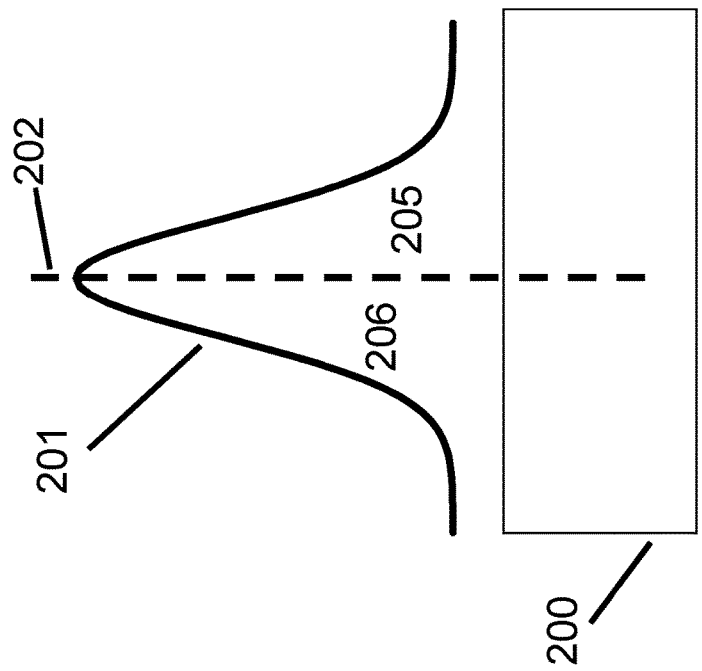
FIG. 2 is a schematic diagram showing the beam of FIG. 1 incident at an output port of an optical switch.
Figure 4:
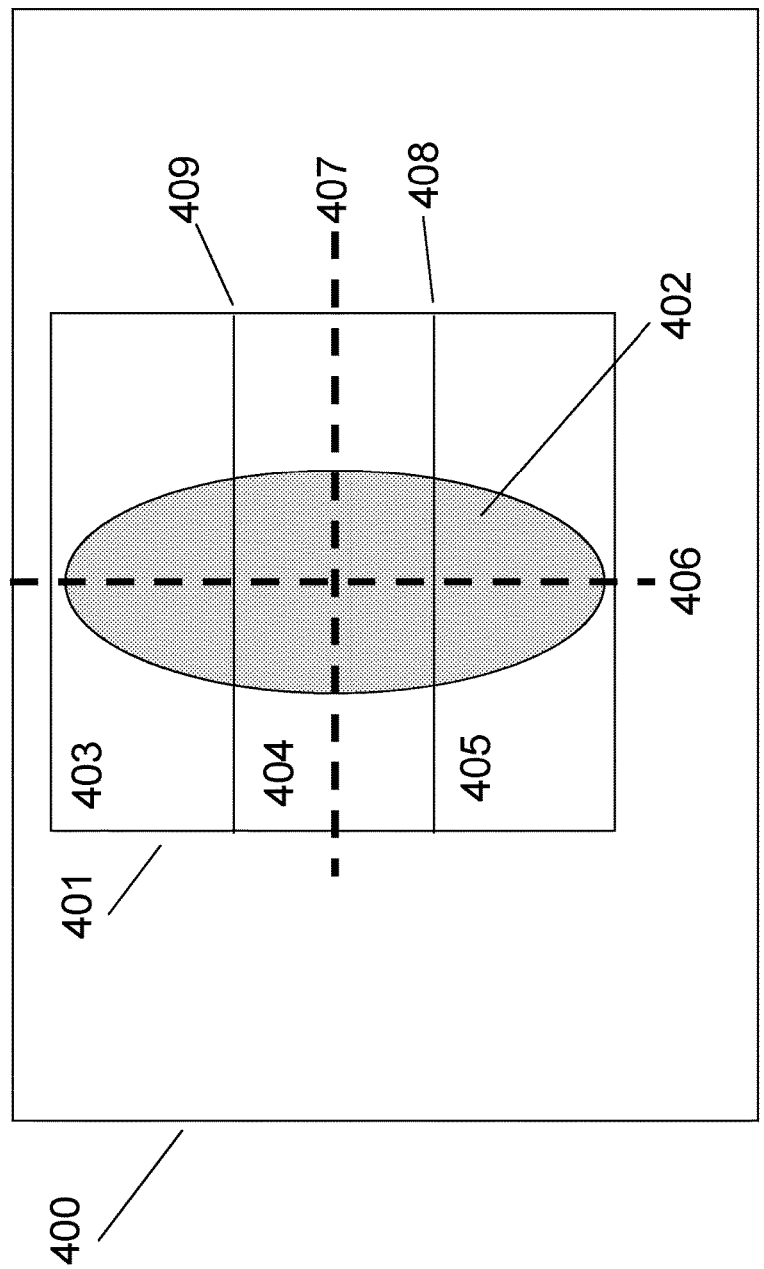
FIG. 4 is a schematic diagram of a part of an LCOS SLM showing of a group of pixels of the SLM subdivided to be able to attenuate an incident beam.

A suitable method to create fine attenuation at the routing array, 1105, is to distort the amplitude distribution of the beam reflected from the SLM, so that the coupling into the fundamental mode is reduced. An easy way to do this is to apply uniform phase, instead of a routing hologram, to one or more sections of the beam. These sections are formed by selecting groups of rows inside the selected group of pixels used to process the beam, as shown in FIG. 4. This technique involves subdividing a group of pixels onto which the relevant beam is incident.

Referring to FIG. 4, LCOS array 400 of an SLM, used to apply attenuation, has a group of pixels 401 assigned to provide a wavelength channel with a desired centre wavelength and passband. In the figure, the group 401 is shown as rectangular for convenience. However, it may be any arbitrary shape, for example selected to provide flexibility to select the centre wavelength and passband, as will be described later. In some embodiments, one or more input light beams having an ensemble of wavelength channels are spatially separated by wavelength. Each wavelength channel is made incident on a different region of the SLM.

The signals carrying information through the channel shown in FIG. 4 typically land as an elliptical beam shown in cross section as 402, with lines of symmetry 406 and 407. In embodiments, this elliptical shape is created by anamorphic optics. The group of pixels is shown as divided into three subgroups 403, 404 and 405: but could be divided into two, or more than three. In this embodiment the subgroups are associated with distinct sets of rows inside the group 401 to achieve uniform attenuation across the channel, and the subdivision has even symmetry about the centre of the beam. One or more subgroups has uniform phase applied: hence the light reflected from the uniform phase region is reflected into the zero order of the hologram. The device can be configured so that the zero order of the hologram can be kept well away from output ports. In a first embodiment, subgroup 404 has uniform phase applied. One or more subgroups has a routing hologram applied and selected to route the incident light into one or more desired output fibres or waveguides of the device. In a first embodiment, subgroups 403 and 405 shown in FIG. 4 have a routing hologram applied.

The attenuation created by this method may be calculated by analysing the propagation through to the output and calculating the coupling efficiency at the output fibre or waveguide. However, the coupling efficiency may be calculated at any convenient plane in the system between the routing array, 1105, and the output, 1106. Therefore we may calculate the attenuation by calculating the coupling efficiency at the routing array, between the product of the incident beam at this position and the routing component of the hologram, with the fundamental mode of the output fibre or waveguide, propagated backwards from the output.

The attenuation may be varied by assigning a different number of rows to each subgroup: at minimum attenuation for the first embodiment, the subgroups 403 and 405 meet and subgroup 404 has been progressively reduced until it does not include any pixels, so that all of the beam is routed, whereas at maximum attenuation, subgroup 404 has been progressively expanded until subgroups 403 and 405 do not include any pixels, so none of the beam is routed.

Figure 5:
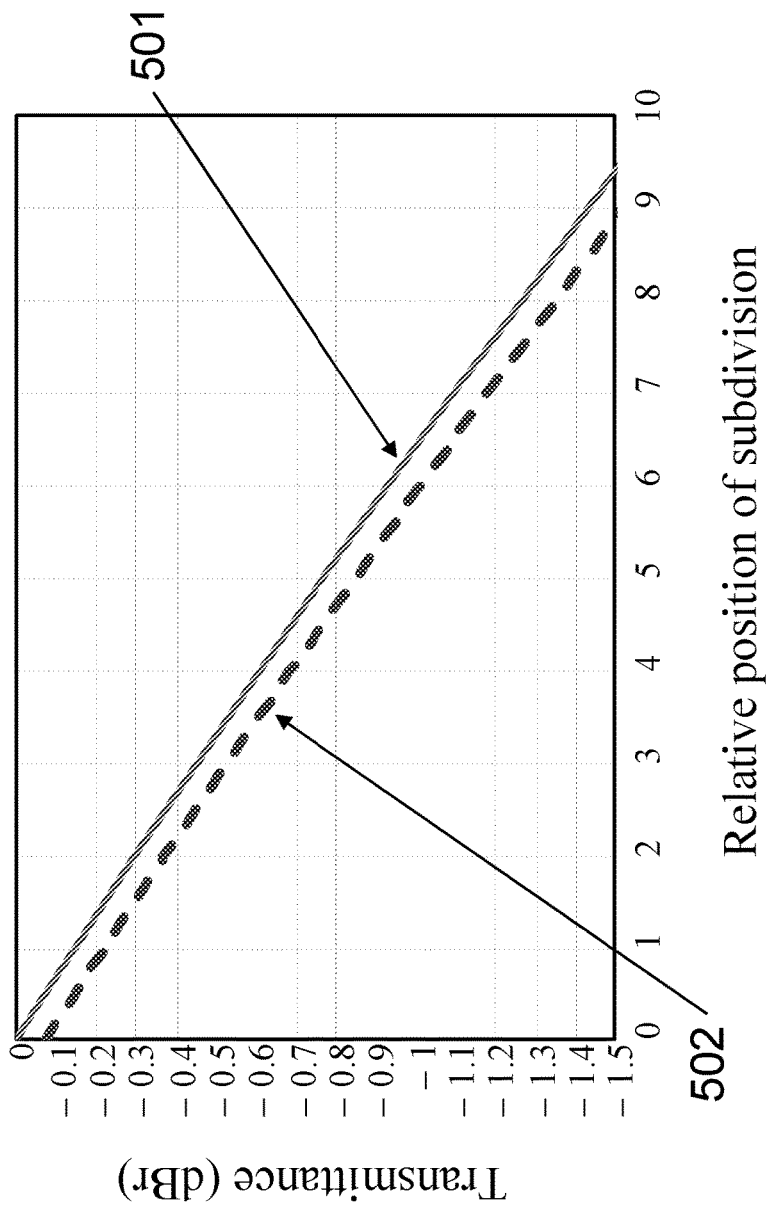
FIGS. 5 and 6 show graphs of attenuation plotting transmittance against relative position of subdivision

FIG. 5 shows a graph of attenuation for this first embodiment, to investigate the resolution in fine levels between 0 and 1.5 dB, using a value for the spot radius measured in the v direction, of 750 μm. The graph in FIG. 5 shows the calculated transmittance, plotted vs. the position of the subdivision 409, shown in FIG. 4, where this position is measured from the symmetry axis 407, and divided by an example pixel pitch of 8 μm. Hence the available attenuation levels are when the relative position has an integer value. The line 501 is for the case where subdivisions 408 and 409 are equidistant from the symmetry axis 407, while the line 502 is for the case where subdivision 408 is one pixel pitch further away from the symmetry axis 407. As shown on the figure, by choosing subdivision positions from one of these two lines, this simple method gives a resolution of 0.1 dB and monotonic behaviour, which makes it easy to control.

We may also route the centre portion to the intended output, and reject the outer portions.

Referring to FIG. 4, in this second embodiment, the centre group of pixels 404 has a routing hologram applied, while the outer groups, 403 and 405, have uniform phase applied.

Whether we reject, or route, the centre portions, it is advantageous to divide the group into 3 (or more) subgroups, because it gives a finer resolution in the attenuation levels than a single group, as shown in FIG. 5. Also then the output beam can have, at least approximately, even symmetry, for example where an odd number of subgroups is provided. This even symmetry makes it reasonably resilient to positional tolerances in the output.

Figure 6:
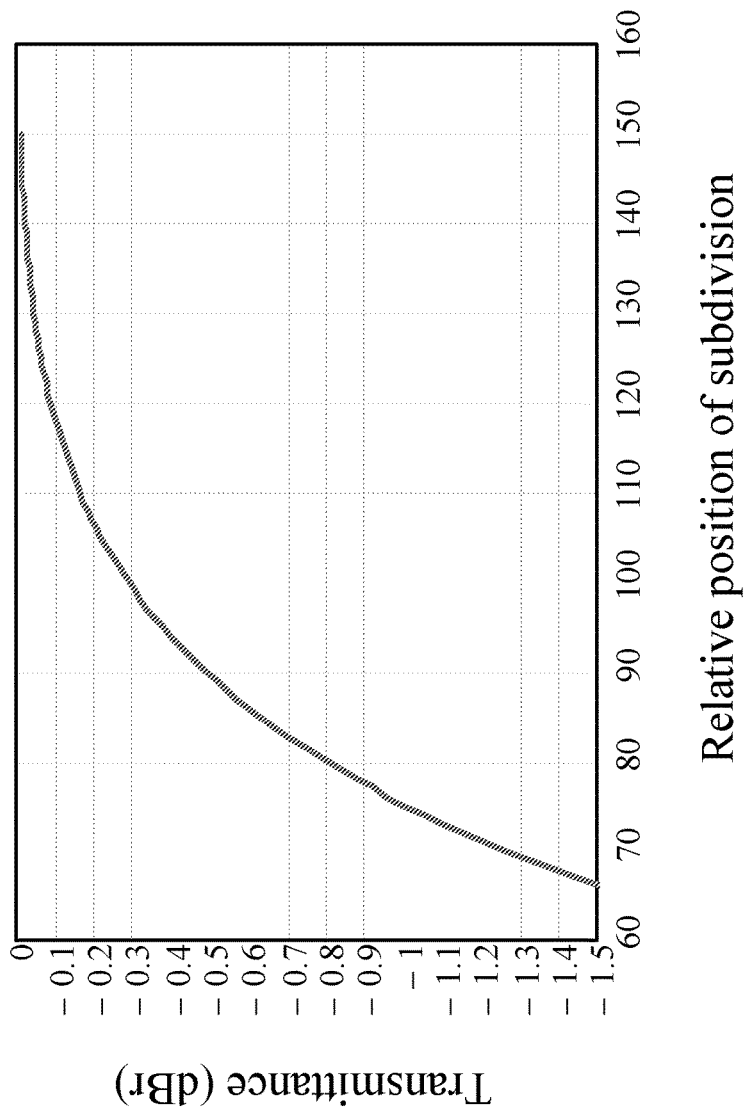

FIG. 6 shows a graph of attenuation for this second embodiment, to investigate the resolution in fine levels between 0 and 1.5 dB, again using a value for the spot radius measured in the switch plane direction (parallel to arrow 4002 in FIG. 40), of 750 μm. The graph in FIG. 6 shows the calculated transmittance, plotted vs. the position of the subdivision 409, shown in FIG. 4, where this position is measured from the symmetry axis 407, and divided by an example pixel pitch of 8 μm. Hence the available attenuation levels are when the relative position has an integer value. The results show that very fine tuning of the attenuation levels is possible with this second embodiment, which also has monotonic behaviour. With this second embodiment, we may use a smaller spot radius in the switch plane and still achieve 0.1 dB resolution in attenuation.

A first advantage of this method of attenuation is that is it is typically based on the same routing hologram used at zero attenuation. This avoids a requirement to train a separate hologram for every attenuation level. For example, if the switch is a 1×20 or a 20×1, the method shown in FIG. 4 only requires 21 holograms to be trained and stored, one of which is uniform phase, for each separately trained region of the LCOS. Further data to be stored is the positions of the subdivisions for each attenuation level.

A second advantage is that the attenuation realised by this method does not depend on the local thickness of the liquid crystal layer (cell gap) or temperature, it depends on geometry and any wavelength dependence in the positions and spot radii of the incident beams (both position and spot radii as measured in the switch plane). Hence a calibration of the method at one local cell gap or temperature may be applied to predict the attenuation at another different cell gap or temperature. The row address corresponding to the centre line 406 of the incident beam, and also the amplitude distribution of the incident beam are required for an accurate a priori prediction of the attenuation: conveniently these properties may be measured using, for example, wavefront sensing, as described in PCT/GB2004/057149. Hence this method forms the basis for a robust control system. It is also very flexible: additional subgroups may be provided, for example to reduce crosstalk created by this method. Also the subgroups may be wedge-shaped, to provide channel contouring.

Further advantages as described later, include the absence of a requirement to adjust the combined holograms to suppress notches, and compatibility with a simple method to achieve very good control of the channel centre wavelength.

Unfortunately, however, the attenuation method described (using subgroups to either route or block the beam) has one significant drawback, in that the amplitude discontinuities cause ripples in the far field. In the N:1 switch of FIG. 11, the effect of these ripples is to couple the residual light from the spatially filtered (rejected) input ports, into the output. For the first embodiment of FIG. 4 these ripples are created independently by the truncated light beam routed by subgroup 404, and also by the pair of light beam edges that are routed by subgroups 403 and 405 to the output fibre. These ripples create a crosstalk floor. FIG. 34 shows a calculation of the light that is coupled from the non-selected (rejected) input ports, as a function of their relative distance from the selected input port, for a fine attenuation of 1 dB. The ports adjacent to the selected input port are at relative positions +1 and −1. Solid line 3401 shows the case where no attenuation is applied by the routing array: the coupling efficiency from the adjacent port caused by offset is minus 40 dB. The calculations in FIG. 34 do not assume spatial filtering at the output using a microlens aligned with the output fibre, or an equivalent aperture. With such filtering the crosstalk curves in FIG. 34 would be suppressed, for example the coupling efficiency from the adjacent port, with no attenuation from the routing array could be reduced to minus 46 dB. Dotted line 3402 shows the fine attenuation first embodiment, where the centre portion of the beam at the routing array is set to uniform phase, while the two outer portions receive the routing hologram. There is a crosstalk floor at 20 dB down, which is slow to drop off. Dashed line 3403 shows the second (inverse) embodiment, where the beam tails are set to uniform phase, and the centre portion routes as normal. The crosstalk floor drops more quickly and the adjacent port crosstalk is at minus 25 dB. These results suggest the second embodiment is better. However, the first embodiment may be improved using more subgroups to suppress the crosstalk floor, albeit at the expense of a more complex control system, and the use of a spatial filter at the output would also improve performance without adding control complexity. Further improvements would be to use subgroups with a scrolled version of the basic routing hologram, to add a phase effect to help suppress the floor, or to have a set of routing holograms with different amplitudes. In general, the problem of reducing the sidelobes created by this fine attenuation method is isomorphic to the problem of controlling intersymbol interference in digital transmission systems, so methods from this field may be adapted to make the method suitable for a broader range of attenuation levels. On the other hand this adds complexity to manufacturing.

Returning to the second embodiment, the specularly reflected beam tails also cause a crosstalk floor, this is not shown in the figure, but drops off for the adjacent ports with very similar behaviour to the crosstalk from the routed parts of the beam (that is the behaviour for the adjacent ports is similar to curve 3403). Therefore as long as the specular reflection lands far enough away from the output, the light that couples via this pathway as crosstalk into the output should be suppressed by at least 25 dB. So if the spatial filters apply 30 dB attenuation to the adjacent input ports, and these two crosstalk pathways add incoherently, the overall blocking from each adjacent port would be of the order of 50 dB. It may be possible to select the uniform phase level and the position of the specular reflection so the crosstalk from each source (centre routing portion of the beam and the specularly reflected beam tails) is in antiphase, or nearly in anti-phase, so as to further improve the crosstalk performance. For some input ports, it may be better to apply a short period routing hologram to the beam tails, instead of uniform phase.

A further improvement would be to apodise the edges of the routing holograms applied to the pixel subgroups, for example using beam shaping methods published in WO03021341 but this adds control complexity.

In a 1:N switch which acts like FIG. 11 in reverse, the effect of these ripples cause by the fine attenuation method is to couple residual light after spatial filtering (at non-selected outputs) into the wrong output port. The overall crosstalk performance is equivalent, that is given 30 dB spatial filtering, and 25 dB crosstalk tail from an attenuation method, the crosstalk tail will be suppressed to minus 55 dBr by spatial filtering.

Where a hologram performs both routing and attenuation it is important to consider the effect of the attenuation method on the phase of the diffraction order as it arrives at the output. This is because, for wavelengths at or close to the channel boundary, any phase modulation of the diffraction order that varies with the attenuation level, could modify or create a phase step in the image of the light reflected from the SLM as it arrives at the output fibre (or output microlens). When two adjacent channels are configured to route signals from the same input fibre to the same output fibre, such a phase step will cause a notch in the spectrum, as described previously. Again the relative phase can be adjusted by scrolling one or both holograms, or a uniform phase adjustment applied to one or both holograms. However this adds additional work to the manufacturing process. For control purposes it is desirable to have a standard scroll position, for the holograms, whatever the attenuation setting of the adjacent hologram. This means the hologram for each channel may be looked up without the requirement to adapt to the configuration for adjacent channels. The attenuation method illustrated in FIG. 4 has the further advantage that it does not create a phase step, thereby easing control complexity.

Figure 7:
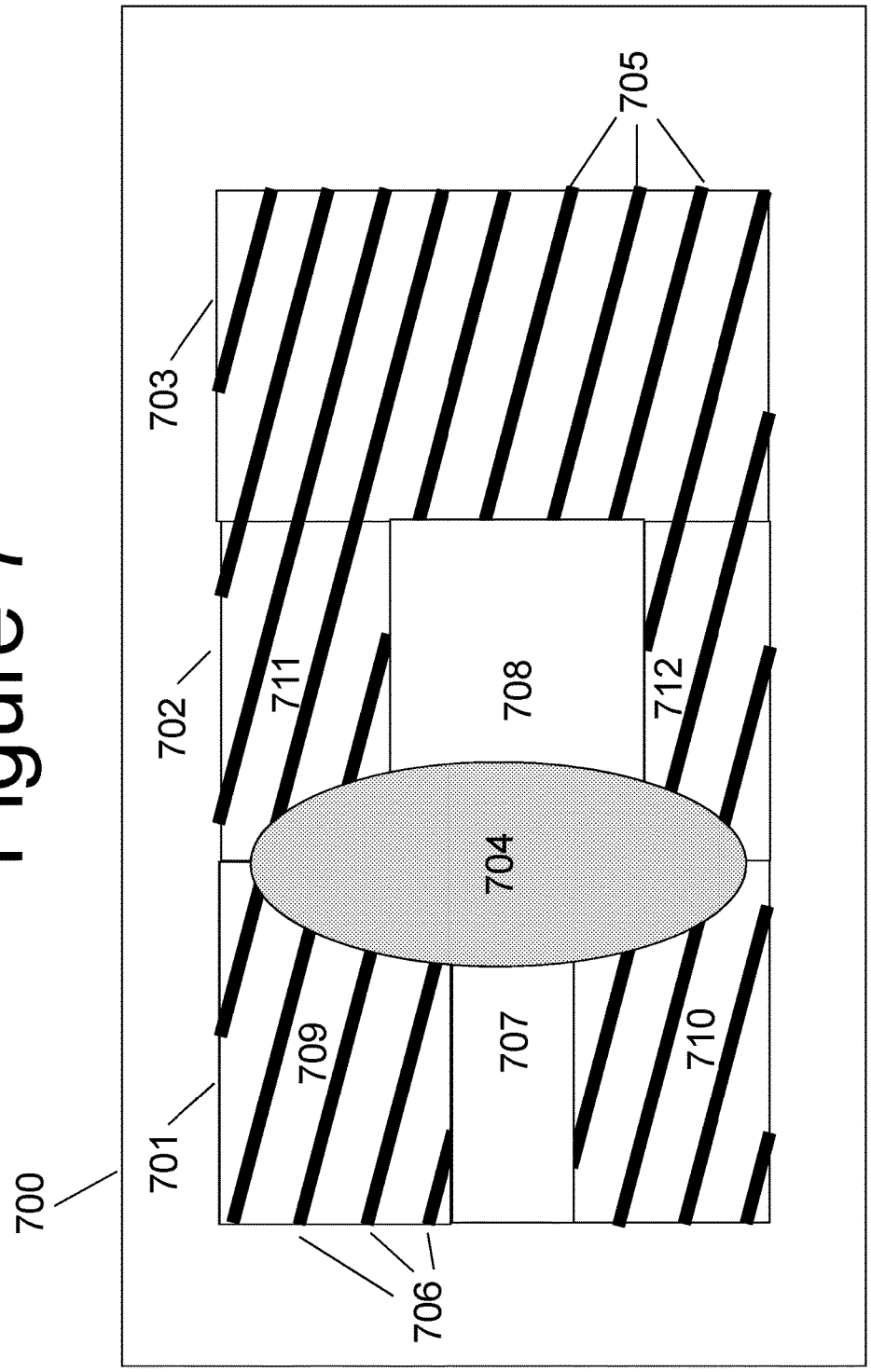
FIG. 7 is a schematic diagram showing a beam landing on an SLM at a boundary between two groups of pixels.

This is illustrated by FIG. 7, in which, a beam 704 is incident on a LCOS array 700 such that the centre line of the beam lands at the boundary between two groups of pixels 701 and 702, where the size, shape and position of each group of pixels is chosen, according to the dispersion equation for the wavelengths distributed across LCOS array 700, to provide the required centre wavelengths and passbands for two adjacent channels. Each of the two groups of pixels 701 and 702 is divided into three subgroups. The size (and centre row) of the centre subgroups 707 and 708 are selected to achieve the desired attenuation in the channel associated with each group of pixels. The remaining subgroups 709, 710, 711 and 712 have routing holograms in the form of phase ramps applied, shown as phase contours 706 in subgroup 709. Also shown in FIG. 7 is a third group of pixels 703. This third group is not subdivided because the desired attenuation for its associated channel is zero. Inside the third group there are shown phase contours, 705, for the routing hologram.

We may calculate the switch spectrum, that is the spectrum of wavelengths selected by the switch from the input channels, by calculating the coupling efficiency at the routing array, between the 3 way product of the incident beam at this position, as propagated forwards from the input fibre or waveguide, with the routing hologram used to route light between the input and the output, and with the fundamental mode of the output fibre or waveguide, propagated backwards to the routing array The routing hologram may be decomposed by Fourier analysis into a set of diffraction orders at different angles, with one diffraction order coupling light between the input and output. When a beam is incident across two routing holograms, H1 and H2, it may be shown that the switch spectrum, S(L), where L is wavelength, is dominated by the modulus squared of the sum of two normalised integrals, a first integral over the region R1, occupied by the first routing hologram, H1, and the second integral over the region R2 occupied by the second routing hologram, H2:

$$S(L) = \left| \iint_{R1} F(u, v, L) B*(u, v, L) a_1 \exp iQ_1 \, du \, dv + \iint_{R2} F(u, v, L) B*(u, v, L) a_2 \exp iQ_2 \, du \, dv \right|^2 \quad (1)$$

Referring to FIG. 7 and considering incident beam 704, routing hologram H1 is applied to region R1 comprising pixel groups 709 and 710, while routing hologram H2 is applied to region R2 comprising pixel groups 711 and 712.

Inside the integrals in equation (1), $a_1 \exp i Q_1$ and $a_2 \exp i Q_2$ are the complex amplitudes of the diffraction orders in holograms H1 and H2, that route light between the input and the output. Further, F(u,v,L) is the forward propagating field from the input, where u is the position on the LCOS array measured parallel to the pixel rows, that is in the dispersion plane, and v is the position on the LCOS array measured parallel to the pixel columns, that is in the switch plane, and B*(u,v,L) is the complex conjugate of the backwards propagating field from the fundamental mode of the output fibre or waveguide. Both field distributions, F(u,v,L) and B*(u,v,L), are assumed normalised to unity power integral. Terms $a_1$ and $a_2$ are real and describe the amplitudes of the diffraction orders, whereas $Q_1$ and $Q_2$ describe the relative phase of the diffraction orders, and may be varied by altering the scroll position of the periodic routing hologram, or the unit cell of the phase distribution inside the routing hologram. When $Q_1$ and $Q_2$ are in phase, the two integrals interfere constructively, whereas if $Q_1$ and $Q_2$ are in antiphase, the two integrals interfere destructively. This leads to spectral notches where the depth and width of the notch depends on the difference between $Q_1$ and $Q_2$. Example spectral notches have been shown in FIG. 10, and described previously. The effect of the attenuation method in FIGS. 4 and 6 is that increasing the attenuation reduces the area over which each of the two integrals are calculated, it does not change the phase terms, $Q_1$ and $Q_2$ inside the integral. Therefore whether the interference between the two integrals is constructive or destructive depends on the difference between $Q_1$ and $Q_2$, but not the attenuation level applied by this method.

Therefore if notches are suppressed for a common attenuation level applied to adjacent channels, as long as the same routing holograms H1 and H2 are used for all attenuation levels applied to each respective channel, we may alter the attenuation level without creating a spectral notch.

Hence the manufacturing problem of selecting control data to control notches for arbitrary and different attenuation levels in adjacent channels connected between the same input and output is simplified.

In a first method, the same attenuation is applied to a set of one or more adjacent channels, and routing holograms are applied to route the set of channels between the same input and output. As described previously, the routing hologram may vary with wavelength due to manufacturing tolerances in the liquid crystal layer, possibly also due to drive effects from the silicon backplane, further it may be necessary to adapt the hologram period to suppress the wavelength dependence in the beam deflection created by the routing hologram. At a boundary between two different routing holograms, trained to route between the same input and output, one of the holograms may be scrolled, or shifted up and down in phase, to suppress a notch in the output spectrum, for light at wavelengths where the beam lands across the boundary between the two different holograms. Referring to equation (1), this means we have made $Q_1$ and $Q_2$ sufficiently equal to suppress the notch, so the two integrals interfere constructively. By selecting the same attenuation level for each channel, each integral in equation (1) has equal weight. Now when we change an attenuation level applied to one of the channels, the interference between the integrals remains constructive, and notches stay suppressed.

In a second method it may be convenient to apply different attenuation levels to adjacent channels when adjusting to suppress notches. The same principle holds. Once the notch has been suppressed for one pair of attenuation levels in adjacent channels, the notch will remain suppressed as the attenuation is changed by altering the area occupied by the routing holograms applied to the adjacent channels.

The method is further illustrated in FIG. 7. All three pixel groups 701, 702 and 703, are connecting their associated channels between the same input and the same output, using a periodic routing hologram with the same phase distribution inside its unit cell. As shown, the phase contours have the same period for all three channels, and the phase contours are stitched together for all three channels, i.e. the phase contours are continuous across all three channels without discontinuities. Hence, for any wavelength where the beam lands across the boundary between two of these pixel groups, such as beam 704 in FIG. 7, the phase terms $Q_1$ and $Q_2$ inside the integral for the transmission spectrum, are identical, and spectral notches will be suppressed.

The phase ramps shown in FIG. 7 have contours that are not parallel to the dispersion plane, because this makes the diagram easier to understand. However the contours could be parallel to the dispersion plane that is parallel to the columns, because in current practice, this makes the holograms easier to control, especially the behaviour of disclinations in flyback regions.

The example in FIG. 7 uses the same periodic routing hologram to route light in adjacent channels between the same input and output. If it is necessary to use a different hologram to route light in adjacent channels between the same input and output, for example to compensate for the wavelength dependence of the output position, or to adapt to cell gap variation, the same principle may still be applied. That is, adjusting the difference between phase terms $Q_1$ and $Q_2$ to suppress spectral notches for a particular pair of attenuation levels applied to adjacent channels should be sufficient to suppress spectral notches for other attenuation levels applied to adjacent channels.

An important issue in designing WSS is the accuracy in the centre wavelength of the channels. Where the channels are spatially dispersed across the pixels of an SLM, the dispersion in the position where a monochromatic wavelength lands is approximately linear across the group of pixels assigned to a single channel. If a rectangular group of pixels is assigned to a channel, the smallest increment in the whole group width is a whole column, which means the smallest increment in the position of the centre of the rectangle is half a column Hence it may be shown that with a rectangular group of pixels, the smallest increment in the position of the centre of the group, leads to a tolerance in the channel centre wavelength of plus or minus S/(2N), where S is the nominal channel separation, and N is the number of columns.

An irregular group of pixels may be assigned to each channel so that, for example, the channel centre may be controlled in smaller increments. The principle is shown in FIG. 32. FIG. 32 shows the pixel groups assigned to 3 adjacent channels. Unlike FIG. 7, in this case the 3 pixel groups assigned to the channels are non-rectangular. For simplicity, the outer two channels have pixel groups 3201 and 3203, each with one straight edge 3204 and 3205, and one staggered edge 3206 and 3207. Each staggered edge has a step in the group boundary, 3208 and 3209. Hence the 3 channel groups each consist of a rectangular group, including all or most of the pixel column where the beam at wavelengths inside the channel is incident, and also at least one part-column upon which part of the beam at wavelengths close to the channel boundary is incident. Also shown on the figure is an axis of symmetry, 3210, through the position where the centre of the beams land on the pixel array, and in the dispersion plane. In FIG. 32 the pixel array is assumed aligned with the rows perfectly parallel to the dispersion plane. Assume the system including its dispersion element is arranged such that as the optical wavelength is increased, the position where a monochromatic beam lands on the array, moves in the direction shown by the arrow 3211. Now consider the pixel group 3201 for the first channel. As the step 3208 in the staggered edge 3206 moves further away from the axis of symmetry 3210, in the direction shown by arrow 3212, the centre wavelength of the first channel increases, whereas if the step 3208 moves in the opposite direction, the centre wavelength of the first channel decreases. Now consider the centre channel, with pixel group 3202. For typical ratios of the pixel group width (in the dispersion plane) to the spot radius, the lower and upper edges of the passbands of this channel may be controlled independently, by independent adjustment of the positions of steps 3208 and 3209. While the example shown is for 3 channels only, it is extendable to the whole set of channels. This technique reduces the number of pixel columns required to achieve a given centre accuracy in the channel, allowing a smaller LCOS device with therefore higher yield of working die per wafer. For a given width of VLSI per channel, this technique also allows a larger spot radius (in the dispersion plane) for the incident beam, because the passband can be more narrow, to provide the required user bandwidth, if the channel centre is more accurate. Using a larger spot radius eases assembly tolerances and reduces the need for aberration correction, so brings worthwhile cost-saving benefits.

In practice the routing holograms do not form abrupt boundaries. This may be confirmed by examining under a polarising microscope, an LCOS device with two different routing holograms applied to adjacent pixel groups, and using the "crossed polarisers" method described earlier, to cause the LCOS device to provide amplitude modulation to the incident light. The amplitude modulation is directly related to the phase retardation applied locally to the incident light by the LCOS device. Hence this viewing method creates an intensity map that shows phase contours inside the routing hologram. The result of such an experiment is shown in FIG. 42. The figure shows a subsection of an LCOS array 4200. The left-hand side, 4201, of this subarray has a first periodic routing hologram applied, while the right-hand side, 4202, has a second periodic routing hologram applied. The boundary, 4203, includes a deliberate step, 4204, similar to 3208 shown in FIG. 32, created by assignment of irregular pixel groups to each routing hologram. The wiggly black lines around the step appear to be disclinations. FIG. 42 shows that the phase contours of each routing hologram extend partially into the adjacent hologram, in an irregular fashion that is different to the control boundary. In other words the effective physical boundary does not correspond exactly to the pixel groups assigned to each routing hologram. Whatever the shape of the assigned pixel group, one effect of the difference between the physical boundary and the assigned edges of each pixel group, is to create a small shift in the passband edges. This shift could be compensated with a deliberate stepped boundary as shown by 3208 in FIG. 32 and also by 4204 in FIG. 42. By adjusting the position of this step in the switch plane, the passband edges may be tuned to the required position in the wavelength spectrum.

The attenuation method of FIGS. 4 and 6 is straightforward to combine with such an irregular, non rectangular shape for the group of pixels assigned to the channel, and thereby to maintain the advantages described. The principle is shown in FIG. 33.

The rectangular groups are shown divided into 3 sub groups, similar to FIG. 7. The part-columns are shown divided into 2 sub-groups. For example pixel group 3201 has a rectangular region with 3 sub groups 3301, 3302 and 3303, and a part-column with 2 sub groups 3304 and 3305. In a first embodiment we reflect specularly the portions of the beam furthest from its line of symmetry 3210. Hence to sub groups 3301, 3303 and 3305 we apply uniform phase modulation, while to subgroups 3302 and 3304 we apply a routing hologram to route between the desired input and output ports.

We may adapt equation (1) to model the switch spectrum. The first routing hologram H1 is applied to region R1 comprising pixel subgroup 3302, as shown in FIG. 33, while the second routing hologram H2 is applied to region R2 comprising pixel subgroup 3304, also as shown in FIG. 33. The phase contours 3310 applied to pixel subgroups are shown as continuous. It is assumed that the adjacent routing holograms use the same phase distribution, such that the complex amplitudes of the diffraction orders are the same inside both integrals. Hence for the case illustrated in FIG. 33, $a_1=a_2$, $Q_1=Q_2$ and the switch spectrum becomes:

$$S(L) = a_1^2 \left| \iint_{3302} F(u,v,L)B*(u,v,L)dudv + \iint_{3304} F(u,v,L)B*(u,v,L)dudv \right|^2 \quad (2)$$

The forwards and back propagated beams are usually Gaussian-like, so we can treat their distribution as separable, that is as a product of two distributions, a first distribution that describes the beam distribution as a function of v, the position in the switch plane measured from symmetry axis 3210, through the centre of the beam, and a second distribution that describes the beam distribution as a function of u, the position in the dispersion plane. This second distribution depends on wavelength, because the beam position translates across the dispersion plane as the wavelength is changed. We may also assume the system is designed such that the forwards and backwards propagated beams are well-matched when no attenuation is applied, hence we may approximate $F(u,v,L)=B(u,v,L)=F1(v)\ F2(u,L)$. Therefore we may separate the integrals in equation (2) as follows:

$$S(L) = a_1^2 \left| \int_{u1}^{u2}|F2(u,L)|^2 du \int_{v1}^{v2}|F1(v)|^2 dv + \int_{u2}^{u3}|F2(u,L)|^2 du \int_{v3}^{vMAX}|F1(v)|^2 dv \right|^2 \quad (3)$$

where the limits of the integrals u=u1, u2, u3 and v=v1, v2, v3 and vmax define the edges of pixel subgroups 3302 and 3304, as shown on FIG. 33.

Now consider the first integral, which is over the area occupied by pixel subgroup 3302. This area can cover none, part or all of the distance occupied by the beams along the v axis, hence (given the fields are normalised to unity power integral, as described previously), the inner integral (over v) may vary between 0 and 1, or a value very close to 1 if the beam tails are truncated by the overall hologram aperture. Hence we may write the first integral as:

$$I1(L) = P1(v1,v2)\int_{u1}^{u2}|F2(u,L)|^2 du \quad (4)$$

where the modulus of P1(v1,v2) is variable between 0 and 1 by selecting pixel boundaries v1 and v2, the lower limit of 0 occurring when v1=v2, and the upper limit of 1 occurring when v1 is at minus infinity, and v2 is at plus infinity.

Now consider the second integral, which is over the area occupied by pixel subgroup 3304. This area can cover at most the distance between minus infinity and the step at v=vmax. Hence we may write the second integral as:

$$I2(L) = P2(v3)\int_{-\infty}^{vMAX}|F1(v)|^2 dv \int_{u1}^{u2}|F2(u,L)|^2 du \quad (5)$$

where the modulus of P2 (v3) is variable between 0 and 1 by selecting pixel boundary v3, the lower limit of 0 occurring when v3=vmax, and the upper limit of 1 occurring when v3 is minus infinity.

Therefore in the general case, the switch spectrum S(L) is given by:

$$S(L) = a_1^2 \left| P1(v1,v2)\int_{u1}^{u2}|F2(u,L)|^2 du + P2(v3)\int_{u2}^{u3}|F2(u,L)|^2 du \int_{-\infty}^{vMAX}|F1(v)|^2 dv \right|^2 \quad (6)$$

Now consider the special case given by equation (7):

$$P1(v1,v2)=P2(v3)=P0 \quad (7)$$

This special case represents the physical condition in which, taking a cross-section of the beam parallel to hologram boundary 3204, the fractional power incident on routing hologram 3302, is the same as the ratio of the power incident on routing hologram 3304, to the total power incident over the combined region consisting of routing hologram 3304 and uniform phase hologram 3305. For this special case, the transmission spectrum becomes $$S(L) = a_1^2 |P_0(v1, v2, v3)|^2 \left| \begin{array}{c} \int_{u1}^{u2} |F2(u, L)|^2 du + \\ \int_{u2}^{u3} |F2(u, L)|^2 du \int_{-\infty}^{vMAX} |F1(v)|^2 dv \end{array} \right|^2 \quad (8)$$

Given that the modulus of P1(v1,v2) and P2(v3) may vary between 0 and 1, the same is true for |P0| squared. This last expression shows that for the subrange of wavelengths landing across (but not outside) pixel groups 3201 and 3202, if we can choose hologram boundaries v1, v2 and v3 to satisfy equation (7), the wavelength spectrum for the subrange acts as the product of a first function P0 that describes the attenuation applied to these wavelengths, by selecting hologram boundaries v1, v2 and v3, and a second function (the modulus squared of the sum of integrals) that is independent of the applied attenuation. Hence this second function describes the filter response applied to the channel when no attenuation is applied. Hence we may write the transmission spectrum as a simple product:

$$S(L) = a_1^2 |P_0(v1,v2,v3)|^2 G(v\,max, u1, u2, u3) \quad (9)$$

By changing $P_0$ (subject to the constraint given by equation (7)), we may alter the attenuation applied to the whole subrange of wavelengths, without altering the shape, G of the filter response, which has been selected by choosing vmax. If the pixel array acts as a perfect phase modulating array, this approach means that the spectral edges of the passband will not be distorted with changes in attenuation level, despite the assignment of part columns, by selecting the relative area occupied by the routing holograms to achieve the special case condition described by equation (7).

In the absence of any adjustments for edge effects at hologram boundaries, this means the relative power landing on subgroup 3302, compared to the total power landing on subgroups 3301, 3302 and 3303, is equal to the relative power landing on subgroup 3304, compared to the total power landing on subgroups 3304 and 3305. In practice some adjustment in the size of subgroup 3304 may be required to compensate for edge effects around the step 3208, including a dependence on the routing hologram applied to the adjacent group 3202 (See FIG. 42 and the previous description of the figure, for relevant examples). This adjustment may be adapted, optimised and stored as part of the training process for each switch. The required training time and data storage is still much less than would be required for ~150 different attenuation holograms applied to the whole group for the channel.

While the above description assumes there are no guard bands between channels, the same principle applies when the centre group of pixels 3202, is a guard band applied to narrow the passband of adjacent channels. In practice the width of group 3202 would then be considerably reduced compared to the figure. Guard bands are useful when for example express channels are routed through two WSS. This means that express channels gain twice the adjacent channel extinction of added or dropped channels. Guard bands are not necessary between express channels: doing without guardbands for express channels improves concatenated passband when a signal passes through many nodes. In this case the passband for added and dropped channels may have little effect on the concatenated passband, so it may be traded for improved adjacent channel extinction, by using guardbands, that is routing light landing between the groups in a third direction, compared to the adjacent channels, and thereby improving the isolation of such channels from the tails of the light inside the adjacent channel.

Hence the combination of coarse attenuation at the spatial filters and fine attenuation at the routing array provides many advantages. This combined attenuation method eases manufacturing costs in two ways. The first way is because it is only necessary to train one routing hologram per port per channel, rather than one routing hologram per port per channel per attenuation level. The second way is because it is not required to train control data to control notches separately for every attenuation level. Considering a typical attenuation requirement is 150 levels, this is a very significant saving. This method reduces the storage requirement for the holograms used to route and attenuate, reducing the cost of the control electronics. This is true whether the holograms are stored as digital replicas, or recreated from polynomial coefficients, or by using some other method designed to recreate the required holograms.

As long as the light from non-selected wavelengths is sufficiently blocked by the spatial filter array, unwanted diffraction orders created by a fine attenuation method implemented at the routing array will not degrade the crosstalk (or port isolation) beyond acceptable limits. Hence the greater the depth of extinction created by the spatial filter array, the greater the allowed strength of unwanted diffraction orders created by the routing array.

Another method to implement spatial filtering, which promises high extinction, is to use so-called polarisation gratings. When enabled by applying the required voltage, the incident light is deflected by a much larger angle than achievable with LCOS phase ramps. This deflection may be applied to select the light, with the undeflected light left to reflect specularly to a beam dump. This method does not, on its own, provide a set of intermediate attenuation levels. These would be provided by the routing array, which would therefore be allowed to provide worse crosstalk performance than in the switch based on spatial filtering by amplitude modulation via crossed or parallel polarisers. The methods proposed earlier to extend the range of the fine attenuation method at the routing array could be applied to achieve overall crosstalk targets in a switch using polarisation gratings to implement the spatial filtering.

If the spatial filtering is implemented by using the LCOS with crossed or parallel polarisers in amplitude modulating mode as described earlier, the spatial filters have a phase effect as well as an amplitude effect. Assuming no twist, when parallel polarisers are used, the actual local field reflected from and modulated by the spatial filter, Eout, depends on the local incident field, Ein, and local phase retardation, phi, as Ein.cos(phi/2).exp i phi/2. Assuming no twist, when crossed polarisers are used, Eout is given by Ein.sin(phi/2).exp i(phi/2−pi/2).

This phase side effect may be used to advantage when assembling the switch: as described in PCT/GB2004/057149, phase modulation at an LCOS array may be used to sense wavefronts of beams incident on the device, and this information used as feedback to inform the assembly process. Therefore the wavefront sensing method described in this prior art may be used with an amplitude modulating device which also has a side effect of modulating phase, as long as the relevant equations, described in the prior art, are adapted accordingly, to include the local amplitude modulation. The front electrode waveform applied to the spatial filter array could be altered for the assembly process, to allow a broader range of RMS voltages, and hence a broader range of phi/2. This is because the ideal wavefront sensing hologram uses 3 sensing levels separated by pi/2, which does not fit in the spatial filter range (between operating points 3701 and 3701 in FIG. 37, phi/2 varies by only pi/2), and furthermore one end of this range also acts to extinguish the beam. By increasing the range of RMS voltages we can avoid this extinction, and still select reasonably spaced phase levels phi/2.

The phase side-effect also causes a potential problem, in that if the spatial filters are used to apply different coarse attenuation levels to adjacent channels selected from the same port, there will be a consequent phase step across the incident beam at the routing array, for light at wavelengths at or around the channel boundary. If the adjacent routing holograms are perfectly stitched, this phase step will be imaged to the output fibre or waveguide or microlens, potentially causing a spectral notch between channels. If necessary, one or both adjacent routing holograms could be scrolled to suppress the notch by creating an opposing, cancelling, phase effect at the output. However this adds control complexity which is undesirable.

The graphs showing spectral notches in FIG. 10 are for the case where both channels have equal attenuation applied, and the phase step is caused by a routing hologram. FIG. 39 recalculates this effect taking into account both the amplitude modulation from the spatial filters and the phase side-effect of the amplitude modulation, for the case where adjacent routing holograms do not cause a phase step, the first channel is not attenuated, while the second channel, adjacent to the first, has attenuation applied. Simulations show the result is the same, whether we apply crossed or parallel polarisers to achieve the attenuation. Spectral curves 3901, 3903, 3905 and 3907 are for a prior art (conventional) LCOS WSS that uses routing holograms to select, attenuate and block channels, whereas spectral curves 3902, 3904, 3906 and 3908 are for the embodiment in which a spatial filter array based on crossed or parallel polarisers in amplitude modulating mode, as described earlier, is used to attenuate and block channels. For complete blocking of the second channel (curves 3907 and 3908) the response looks identical. For 6 dB attenuation of the second channel (curves 3905 and 3906) the spatial filter method (3906) favours the attenuated channel, by giving it more passband, which may be desirable in some circumstances. Similarly for 3 dB attenuation (curves 3903 and 3904) and 1 dB attenuation (curves 3901 and 3902) more passband is provided to the attenuated channel (curves 3902 and 3904). If this effect is undesirable, the routing holograms may be scrolled to give more passband back to the channel with no attenuation (or less attenuation).

5.5 Optical Layouts Overview

Returning to FIG. 11, having considered the options for spatial filtering at the first LCOS array 1103, coarse attenuation at the first LCOS array 1103 and fine attenuation at the second LCOS array 1105, we now consider the options for input optics 1101, intermediate optics 1104, and output optics 1102.

The device includes at least one LCOS backplane. The action takes place in two planes: a dispersion plane, and a switch plane, which is perpendicular to the dispersion plane. The LCOS array is orthogonal to the dispersion plane and to the switch plane. Much of the optics is cylindrical; therefore it has an effect in one only of the dispersion and switch planes, but not the other. Such an effect is sometimes termed anamorphic. As described previously, FIG. 40 shows the beams and their aspect ratios at each of the two LCOS arrays 1103 and 1105.

Returning to FIG. 11, the purpose of the first LCOS array 1103, is, for each of the input beams, to act as a spatial filter array to independently pass or block the light in different incoming wavelength channels or signal bands. In embodiments, as described previously, the spatial filters may also apply selective and independent attenuation to the incident light. Hence the combination of input optics 1101 with the first LCOS array 1103, provides wavelength-selective spatial filtering and attenuation, independently for each of the input beams 1100.

While FIG. 40 shows a single beam cross-section for each wavelength channel from each input port, there are three polarisation diversity options at the first LCOS array 1103. Hence the fourth function of the input optics is to provide polarisation diversity.

The first option is to set aside separate areas for each polarisation, this doubles the required height of the first LCOS array 1103, which can be undesirable on cost grounds, as well as yield.

The second option is for the two polarisation components from each port to share the same area on the first LCOS array, by angle in the switch plane. Once this design decision has been made, it is necessary to find a way to spatially separate the polarisation components from each port, so they can be manipulated as required to achieve high throughput from the dispersion element. Relay lenses provide a convenient central point to carry out this manipulation; also they allow a shared birefringent wedge element to be used to separate the polarisations after the microlens array. Another consequence of the separation by angle at the switch plane is a requirement to set aside separate areas for each polarisation on a second LCOS array, used for routing, to be described. As is well known, this is often desirable to manage residual Polarisation Dependent Loss from the device optics.

The use of the relay lenses provides further advantages. Firstly spot radii may be used at the outputs from the cylindrical microlenses which are fairly small, for example as small as 80 μm. Normally the short Rayleigh length of such beams would lead to detrimental beam divergence over the long path lengths in the system. However, the relay manages the beam waists so they are focused as required onto the first LCOS array 1103. A smaller spot radius leads to a lower height for this part of the system, potentially lowering the overall system height.

The third option is for the two polarisation components from each port to share the same area on both LCOS arrays, but be separated by angle in the dispersion plane. The transverse offset between these beams required to manipulate their polarisation state is sufficient to process at least one component with a half-wave plate to align the polarisation with that most suitable for the dispersion element. As will be explained, the polarisation components are imaged in the dispersion plane, between first and second LCOS arrays, so that they are also separated by angle in this plane, at the second LCOS array used for routing, to be described. In this embodiment, a shared area is used for the two polarisation components at the second as well as the first LCOS array, reducing the required height for the second LCOS array. This is the situation shown in FIG. 40, described in detail previously.

In this third embodiment, the beam relay is not required to achieve polarisation diversity. Hence a fourth embodiment uses the third embodiment, but without the beam relay.

When a single SLM is used for both LCOS arrays, the required height is at least the sum of the heights for both arrays.

5.6 System without Relay Lenses, Both Types of Dispersion Element

Figure 12A:
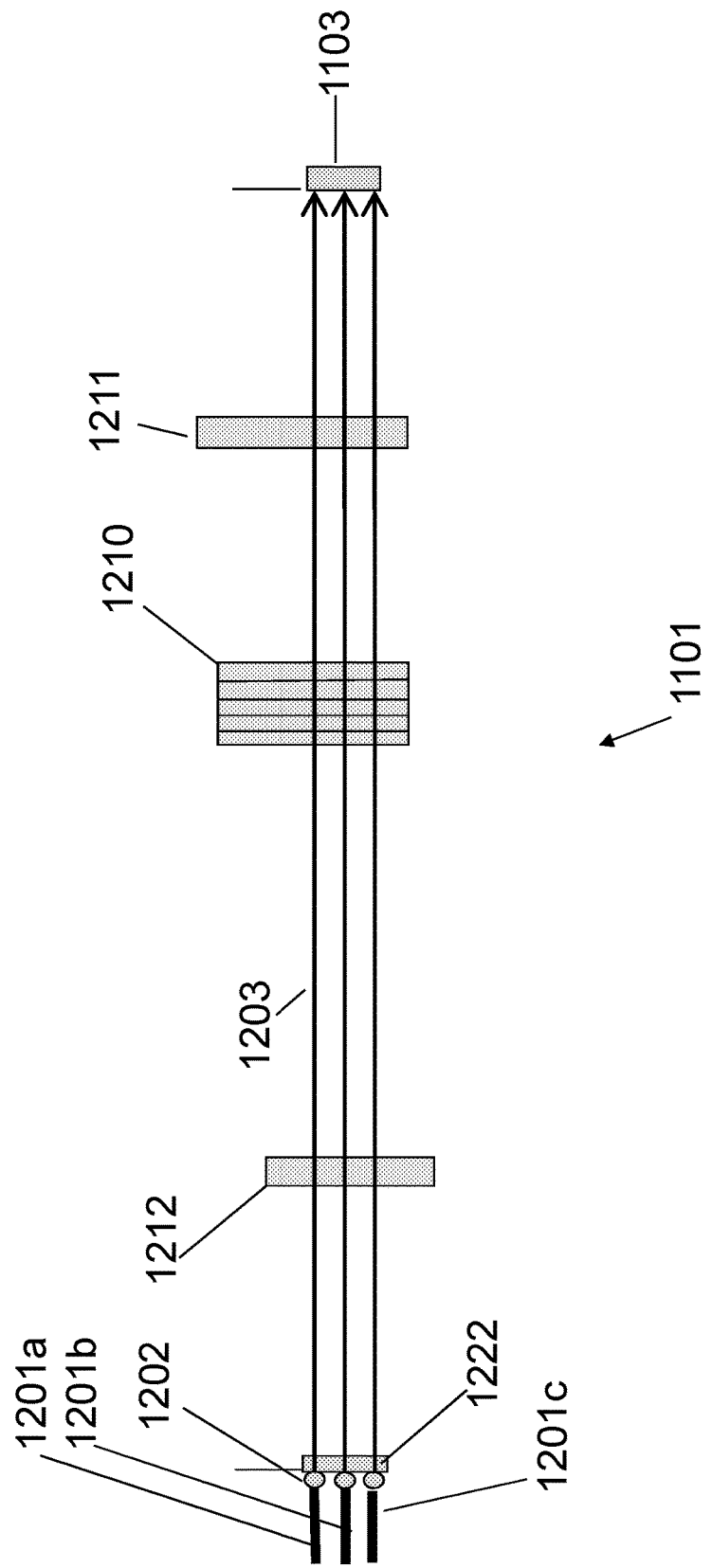
Figure 13A:
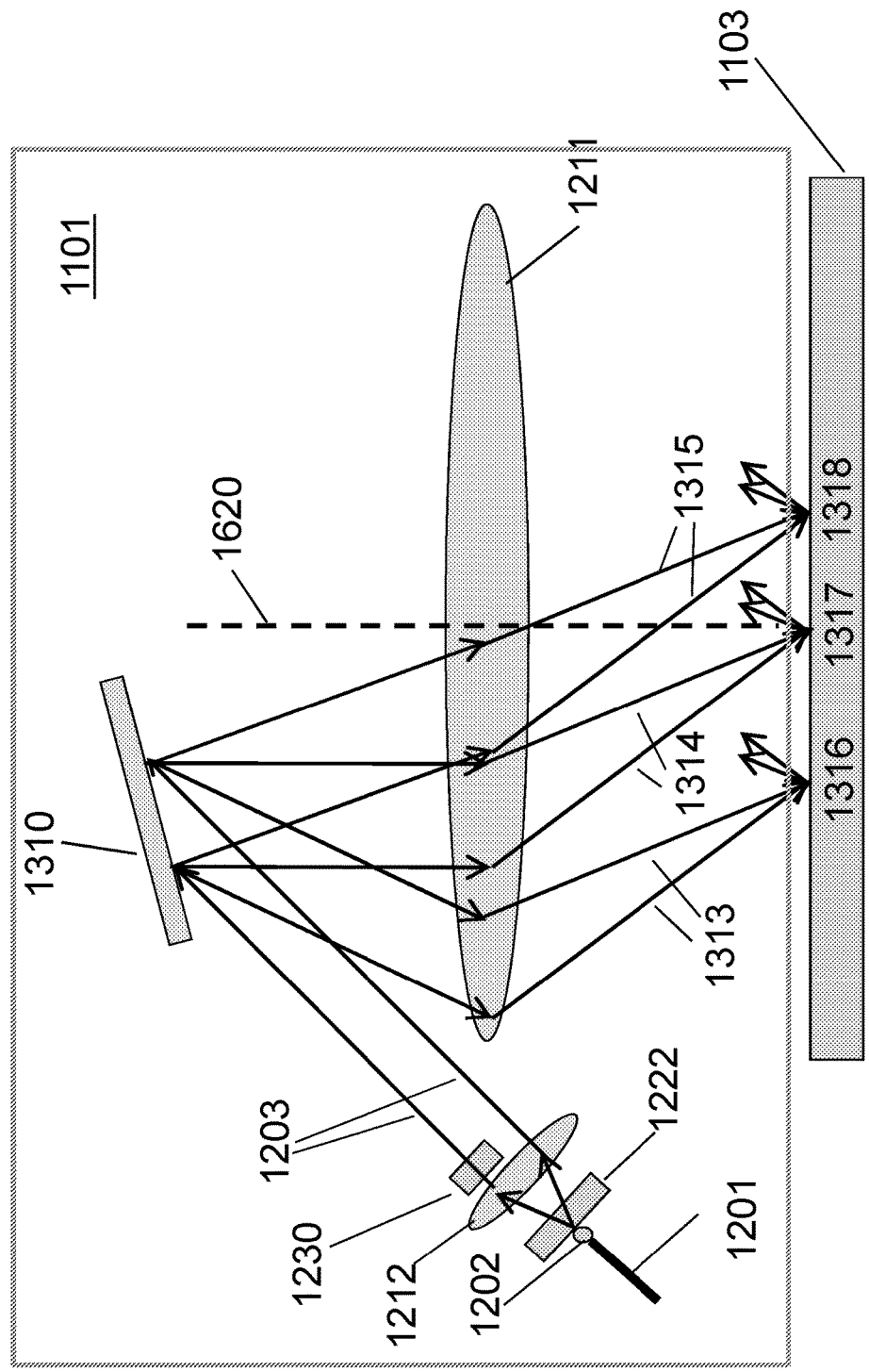
FIG. 13A-13C show variants the input optics of FIG. 11, shown in the dispersion plane.

FIGS. 12A and 13A show two embodiments of the input optics 1101 together with the first LCOS array 1103. FIG. 12A shows a cross-section in the switch plane using a transmissive dispersion element 1210 while FIG. 13A shows a cross-section in the dispersion plane that is identical to the embodiment of FIG. 12A, but using a reflective dispersion element 1310.

Referring to FIGS. 12A and 13A, input optics 1101 shown for three input fibres 1201a-c has an array 1202 of cylindrical microlenses with a respective individual microlens for each fibre. The cylinder axis of the microlenses lies parallel to the dispersion plane. In this embodiment, light from the microlenses 1202 passes to a birefringent wedge 1222 which splits the light by polarisation in the dispersion plane. Alternatively a calcite beam displacer, or a polarising beam splitter and a right angle turning mirror may be used to separate the polarisations in the dispersion plane after collimation. All three approaches are well known in the prior art: the objective is to create two separated parallel beams in the dispersion plane, incident on the dispersion element with a spot radius sufficient to achieve the required filter passbands. In practice, as is well known, design for polarisation diversity must also consider Polarisation Mode Dispersion (PMD) that is the difference in group delay over the path lengths traveled by separated polarisation components. Compensating plates, or symmetry tricks, may be used to control PMD. A half wave plate 1230—see FIG. 13A, is inserted into the path of one polarisation component so as to rotate the polarisation to be parallel to the other component. Which component to rotate depends on the type of dispersion element.

In the embodiment of FIG. 12A, the dispersion element 1210 is transmissive, for example a volume phase hologram of the type made by Kaiser Optical Systems. In this case the diffraction efficiency tends to be much higher for light that is polarised in the switch plane. Therefore the preferred embodiment is to rotate the polarisation component that is polarised in the dispersion plane, to be polarised in the switch plane.

In the embodiment of FIG. 13A, a reflective dispersion element 1310 is used, for example a reflective blazed grating or a grism. This can make the system more compact and optically efficient, since the dispersion element 1310 also helps to optically fold up the system. In this case the preferred embodiment is to rotate the polarisation component that is polarised in the switch plane to be polarised in the dispersion plane.

Angularly-dispersed light from the dispersion element 1210; 1310 passes to a cylindrical dispersion lens 1211 and thence is rendered incident on the first LCOS array 1103. The LCOS array is disposed at the focal plane of the dispersion lens 1211 and orthogonal to both the switch and dispersion planes.

The birefringent wedge 1222 separates the polarisation components of each of the input beams created by the cylindrical microlens array, to form pairs of beams 1203 (see FIG. 13A).

The cylindrical collimating lens 1212 is used to create the required beam spot size in the dispersion plane at the dispersion element 1210,1310, to achieve the desired beam spot size in the dispersion plane at the first LCOS array 1103.

Dispersion takes place in a plane orthogonal to FIG. 12A and in the plane of FIG. 13A.

FIG. 13A shows pairs of chief rays 1313, 1314 and 1315 for three different wavelength components from the inputs, as incident at three separate areas 1316, 1317 and 1318 of the first LCOS array 1103, and reflected back towards the cylindrical dispersing lens 1211. The two parallel beams from each input, 1203, arrive at the dispersion element at the same angle of incidence, therefore the wavelength dependence of the diffraction angle is the same for the pair of beams. Hence identical wavelengths in the pair of beams are refracted by an ideal lens to the same point on the focal plane. Therefore, as shown in the figure, both chief rays in each pair are refracted to a common point on the first LCOS array, 1103.

As described previously with reference to FIGS. 11 and 40, the first function of the input optics, is separating each input beam by wavelength to form a set of spatially separate beams at the first LCOS array 1103, so that for each of the N input beams, the light in different incoming wavelength channels or signal bands may be processed independently by the first LCOS array, 1103. This is achieved by the series combination of the dispersion element, 1210 or 1310, with the focusing element, 1211. This focusing element, 1211, provides a focusing action in the dispersion plane, but has no power in the switch plane, and may be acylindrical. While the embodiments shown in FIGS. 12A and 13A use a lens for this focusing element, 1211, a reflective focusing element may also be used, to provide a more compact system, but with higher angle of incidence at the LCOS (in the dispersion plane). In some embodiments, for example using freeform optics, the focusing element may have some functionality in the switch plane, but this is not required to provide the function of separating input beams by wavelength in the dispersion plane, to allow independent processing.

Grisms are a compound dispersion element formed by combining one or more refractive prisms with a diffractive element such as a reflective blazed grating or a volume holographic grating, which may be used in transmission or in reflection. Grisms are attractive dispersion elements for use in the WSS application because they allow increased dispersion, further by balancing the wavelength dependent dispersion of the holographic or grating device with the wavelength dependent dispersion of the prism, the spatial distribution across the dispersion plane of the light beams at different wavelengths may be optimised. For example, to maximise the use of the available width of LCOS array in the dispersion plane, it is desirable to tailor the grism dispersion so that the ratio of the width of the group of pixels assigned to route light inside each channel, to the spot radius of a monochromatic beam inside the channel, as the beam is incident on the LCOS, is uniform across the wavelength range.

The second function of the input optics is to maintain the spatial separation of beams from the input ports as these beams land on the spatial filter array, 1103. The separation between the ends of the input fibres and the microlens array may be adjusted to "throw" the beam waists a long distance, typically up to a Rayleigh distance, from the microlens output focal plane. Further the microlens focal length and diameters may be chosen so that the beam waists so formed, land at or close to the spatial filter array. Typically this leads to input beams with a Rayleigh length 10 cm or more, and hence requires input beams with a spot radius at the beam waist that is ~220 µm or more. For this 220 µm value, the beam radius at the microlens would be up to 310 µm. Assuming a lens aperture that is 3 times the beam waist measured at the aperture, a suitable array of cylindrical microlenses would have a lens pitch a little under 1 mm Hence a 4×1 switch would require a spatial filter array with a vertical width in the switch plane ~4 mm or more, and a 9×1 switch would require a spatial filter array with a vertical width in the switch plane of ~9 mm or more. Hence this embodiment is suitable for a small number of input ports. Some height compression could be achieved by using a smaller aperture for the microlenses, than is customary, then using the spatial filter array to improve the beam cross-sections by removing sidelobes (in the switch plane) from the selected input beams for the selected wavelength components. Of course the overall performance is then a trade-off with the impact of sidelobes from the non-selected input beams.

Referring to FIG. 12D, further height compression could be achieved with a pair of cylindrical relay lenses, 1205a and 1205b, that in the switch plane, relay the beams formed at the output focal plane of microlens array 1202, to a position closer to first LCOS array, 1103, than in FIG. 12A. The effect of the relay lens pair is to reduce the beam divergence through the system, allowing a closer spacing of the spatial filters for each input port. In FIG. 12D, the collimating lens 1212 is shown at the joint focal plane of the two relay lenses. This is not essential. In other embodiments the collimating lens 1212 is combined with the second (or the first) relay lens, using freeform optics. Further, in FIG. 12D, the relay lenses have ~the same focal length. In some circumstances it may be desirable for the relay to be asymmetric, providing a magnifying or demagnifying effect to the beam separation between the microlens array and the spatial filter array.

Referring back to FIGS. 11 and 40, the third function of input optics, 1101, is to provide the required anamorphic transformation between the mode of the input fibre or waveguide, and the incident beams at first LCOS array, 1103. The dispersion element often has an anamorphic effect on beam shapes, and this needs to be taken into account when designing the input optics, 1101, and the output optics, 1102. Returning to FIG. 12A, in this embodiment, the beam waist in the switch plane at first LCOS array, 1103, is determined by the focal length of the cylindrical lenses in lens array 1202, the longitudinal separation between input fibres 1201a-c and lens array 1202, and the propagation distance between lens array 1202 and first LCOS array, 1103. Now referring to FIG. 13A, the beam waist in the dispersion plane at first LCOS array 1103 is imaged from the beam waist leaving the input fibre to form focused beam waists at first LCOS array 1103, by the series combination of collimating lens 1212 with the dispersion lens 1211, and also the anamorphic effect of the dispersion element. Lenses 1211 and 1212 have focusing power in the dispersion plane but not the switch plane. Hence the beam waists in the switch plane and dispersion plane may be controlled independently to provide the required anamorphic transformation.

The fourth function of input optics 1101 is to provide polarisation diversity. Referring to FIG. 13A, in this embodiment, light from the microlenses 1202 passes to a birefringent wedge 1222 which splits the light by polarisation in the dispersion plane. Light from birefringent wedge 1222 passes to the cylindrical collimating lens 1212, and towards the dispersion element 1310. The cylinder axis of the collimating lens 1212 is parallel to the switch plane. It is the same lens used to image the beams in the dispersion plane from the input fibres 1201 to first LCOS array, 1103.

Referring to FIG. 25, showing a view of the wavelength selective spatial filtering taking place at the first LCOS array 1103, each input beam has its wavelength components dispersed across the first LCOS array 1103. In this case there are six input fibres provided, unlike the three that have been shown elsewhere to simplify description. These will be referred to as port 1, port 2, etc with port 1 corresponding to row 2501 and port 6 corresponding to row 2506.

Thus there are six rows 2501, 2502, 2503, 2504, 2505 and 2506. Each row is a respective group or array of modulating elements of the first LCOS array 1103 and is assigned to a respective input port. Other rows 2507, 2508 may be used to ease alignment tolerances, or to service other ports: typical port counts at the input are 4, 9, 20 and 23.

To each of the configured wavelength channels through the switch there is assigned a column on the first LCOS array 1103. Each column is a respective group or array of modulating elements of the first LCOS array 1103. The figure shows three columns 2509, 2510 and 2511, each corresponding to an adjacent channel of three adjacent channels. In the figure, the three columns have the same width. In a so-called flex spectrum device the width of each column will vary according to the configured channel passband. Typically the width also varies across the array according to the dispersion of the grating or grism or of the equivalent wavelength separation element. There will also be further columns to cater for the rest of the switch wavelength range, and even further columns at the extreme ends of the array, to allow for alignment tolerances.

For the example in FIG. 25, the columns 2509, 2510 and 2511 have straight edges. As will be described later, for fine adjustment of channel centre wavelengths, it is useful to stagger the edges (see for example FIG. 35). Returning to FIG. 25, the intersection of each row, with each of the columns, delineates a group of pixels, incident upon which there may or may not be an incident beam, shown in cross-section as an ellipse.

In the figure there is a first unshaded ellipse 2512 at the intersection of column 2511 and row 2501, a second 2516 at the intersection of column 2509 and row 2503, and a third 2514 at the intersection of column 2510 and row 2504. Each unshaded ellipse represents the cross-section through a beam transporting a selected signal through the optical switch. Shaded ellipses represent the cross-section through a beam transporting a signal that is required to be blocked.

The figure shows ellipses in all six rows 2501-6 of the first column 2509, in only rows 2502, 2504 and 2506 of the second column 2510 and in rows 2501, 2502, 2504 and 2506 of the third column 2511. Hence in the channel associated with the first column 2509, there are signals from all 6 ports, in the channel associated with the second column 2510 there are signals from three ports and in the channel associated with the third column 2511 there are signals from four ports.

For the first column 2509, the desired signal at the output is from the row 2503, corresponding to port 3. Hence the signals from all five other ports are blocked. The effect for this channel is to create an open "porthole" in row 2503 for the desired signal to reach the selected output. The act of blocking the other signals can be considered as closing the "portholes" in rows 2501, 2502 and 2504-2506.

For the second set of columns 2510, the desired signal at the output is from the set of rows 2504, corresponding to port 4. Hence at least the signals from port 2 (row set 2502) and port 6 (row set 2506) are blocked. The others could be blocked too, in which case the second set of columns has an open porthole in row 2504 for the desired signal, with all other portholes closed.

For the third set of columns 2511, the desired signal at the output is from the set of rows 2501, corresponding to port 1. Hence at least the unshaded signals from ports 2, 4 and 6 are blocked.

As shown, every wavelength component entering the optical switch 6000 may be processed independently, even if two or more signals inside the same ITU channel enter on different ports. Hence all wavelength components that are not required at the output may be blocked at the first LCOS array, 1103. As explained in conjunction with FIG. 17, this reduces the impact of crosstalk created by unwanted diffraction orders from the holograms, by the blocking ratio applied by the first LCOS array, 1103. In particular this blocking can suppress transient crosstalk that may arise while switching holograms on or off, which is difficult to control without extending the switch reconfiguration time, for example, by applying a sequence of intermediate holograms, as described in patent application EP1221068. An alternative method to control switch transients is to use a separate LC blocker layer in front of the LCOS, but this adds to the parts cost and manufacturing costs, and is port agnostic, as described earlier.

The purpose of the intermediate optics is to maintain the separation of each input beam by wavelength between the first LCOS array and the second LCOS array, but for each wavelength channel or signal band, combine the light selected from all input ports and emerging as parallel beams from the first LCOS array, onto a common group of pixels at the second LCOS array, 1105. The intermediate optics also transforms beam aspect ratios as required between first LCOS array, 1103 and second LCOS array, 1105.

Figure 14A:
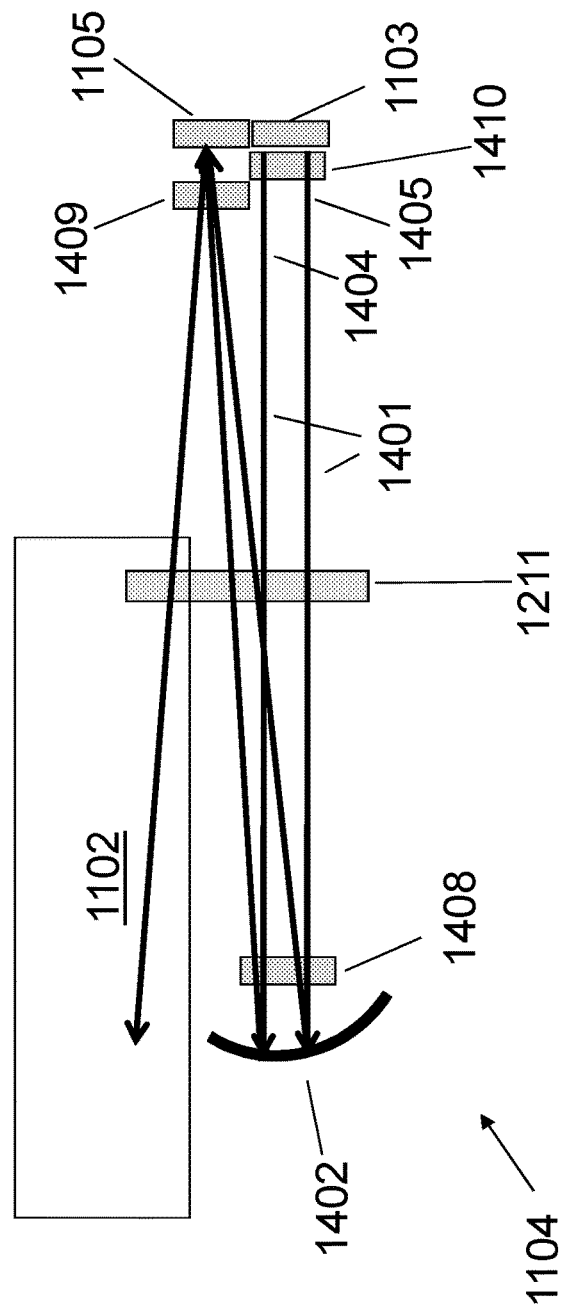
FIG. 14A-14D show variants of the intermediate optics of FIG. 11, shown in the switch plane.
Figure 15A:
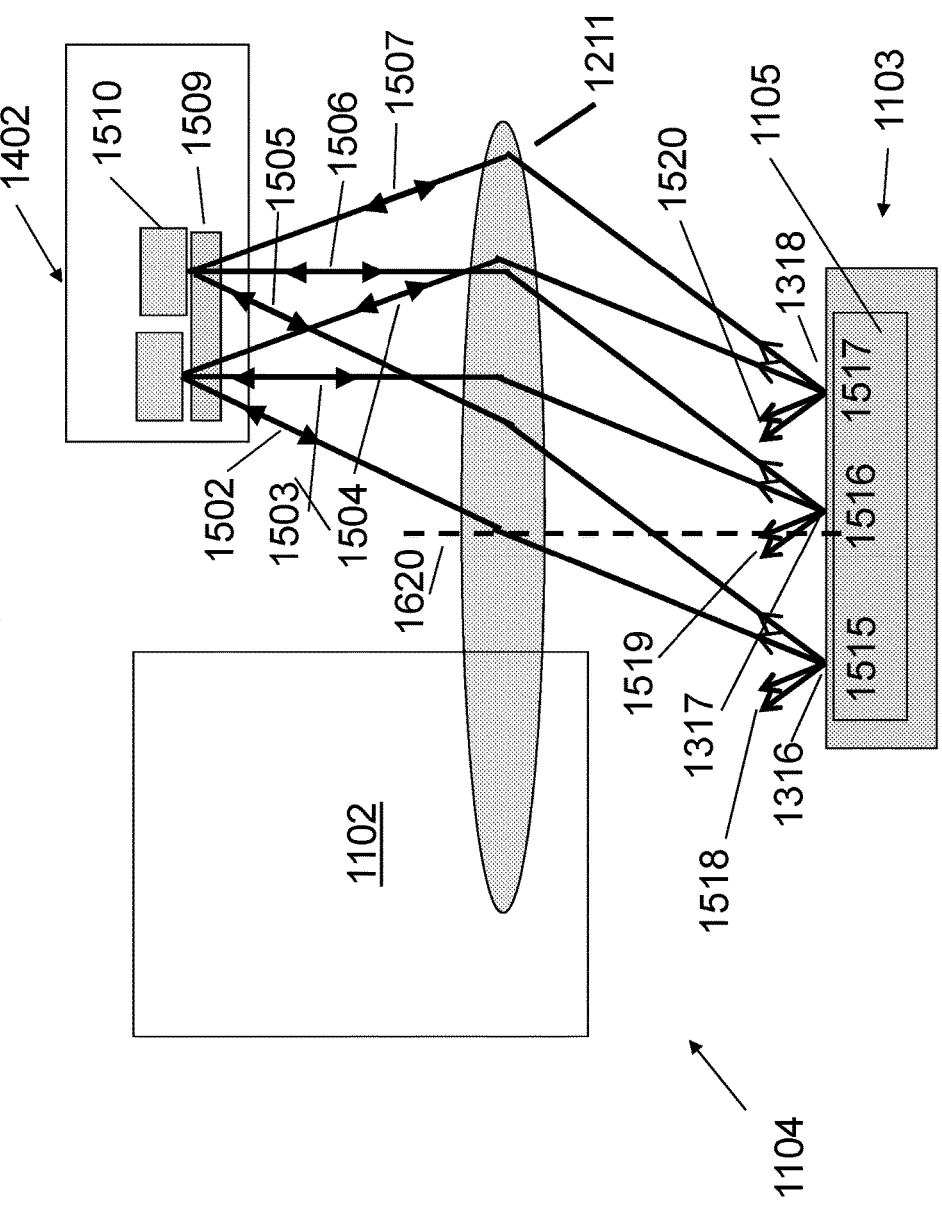

FIGS. 14A and 15A show an embodiment of the intermediate optics 1104 together with the first LCOS array 1103 and the second LCOS array 1105, and part of the output optics 1102. In this embodiment it is assumed that the spatial filters use amplitude modulation, rather than phase modulation or polarisation gratings. Intermediate optics 1104 delivers the processed beams at the selected wavelengths from the first LCOS array 1103 to the second LCOS array 1105, which may be part of the same or a different LCOS backplane device.

In this embodiment, the input optics 1101 is anamorphic and operates on the input beams to provide different properties in two perpendicular directions that are orthogonal to the direction of propagation. The intermediate optics 1104 is orthogonal optics that processes light in each of those directions independently of the other direction. The output optics 1102 is anamorphic, and receives the processed light of the two directions to combine the light together and provide the output beam. The input optics 1101 and output optics 1102 in this embodiment are asymmetrical.

In this embodiment, the input optics 1101 uses crossed anamorphic elements—e.g. crossed cylindrical lenses, as will be later described herein. The axes of the crossed elements, along with the axes other components, define a switching plane and a dispersion plane. The optical elements cause incident light to be dispersed by wavelength in the dispersion plane. However in the switching plane, perpendicular to the dispersion plane, the optical elements perform Fourier transformation of the incident light.

As a consequence, spatial filtering of the Fourier transformation may be used to reduce crosstalk.

In this embodiment, the output optics 1102 uses crossed anamorphic elements—e.g. crossed cylindrical lenses, as will be later described herein FIG. 14A shows a cross-section in the switch plane while FIG. 15A shows a cross section in the dispersion plane.

With reference to FIGS. 14A and 15A, the optics shown consists of first LCOS array 1103 and second LCOS array 1105, together with the cylindrical dispersion lens 1211 that is disposed to receive light from the first LCOS array 1103. Light after passing through this lens strikes an optical device 1402 that acts as a tilted cylindrical mirror in the switch plane but as a pair of retroreflectors in the dispersion plane. The effect and operation of a retroreflector will be discussed later in more detail. This optical device 1402 is configured and arranged so as to reflect light from the first LCOS array 1103 on to the second LCOS array 1105 via the cylindrical dispersion lens 1211. Light, processed by the second LCOS array 1105, is reflected off to output optics 1102.

Referring to FIG. 14A, the light processed by the first LCOS array 1103 is in the form of two polarisation components as sets of pairs of beams 1401, angularly separated in the dispersion plane, one pair for each of the N input ports (the angular separation is shown in FIG. 15A). FIG. 14A shows the chief rays for each pair 1404 and 1405 of polarisation components for the extreme ports. In the switch plane the beams are reflected parallel from first LCOS array 1103 to be incident on cylindrical mirror 1402, which acts as a Fourier element, focusing the beams for each of the N ports, emerging parallel from first LCOS array, onto substantially the same position in the switch plane at the second LCOS array 1105.

The second LCOS array 1105 applies routing holograms to route the processed beams from the first LCOS array 1103 to the output optics 1102 at the desired angle to couple into the output. As shown in the figure, the required deflection applied by the routing holograms, varies according to the position of the spatial filter row that processes light from the selected port.

The second LCOS array 1105 may also apply the fine attenuation methods described earlier, using selected pixel subgroups of controllable width in the switch plane, to either route the incident light beam between the selected input and output, or to specularly reflect or otherwise block the unwanted light to create the desired attenuation spectrum. As described previously, the first function of the intermediate optics is to maintain the separation of each input beam by wavelength. While propagating from the first LCOS array 1103 to the second LCOS array 1105, the beams pass twice through the cylindrical dispersion element 1211 which does not have focusing power in the switch plane, shown in FIG. 14A. Referring to FIG. 15A, this double pass through the cylindrical lens provides an imaging function in the dispersion plane between first LCOS array 1103 and second LCOS array 1105, thereby maintaining the separation of each input beam by wavelength.

As described previously, the second function of intermediate optics is to combine the selected light from all input ports by angle onto a common group of pixels at the second LCOS array 1105. This function is provided by tilted cylindrical mirror 1402 which focuses the beams for each of the N ports, which are parallel in the switch plane, onto substantially the same position in the switch plane at the second LCOS array 1105. Hence cylindrical mirror 1402 also provides the third function of intermediate optics 1104, which is to transform the beam aspect ratio from its value at the first LCOS array 1103 to be stretched as required at the second LCOS array 1105.

If the LCOS arrays are physically separate devices, i.e. two separate SLMs, the alignment direction of the liquid crystal can be optimised independently for the two devices. However, if a common device, as is desirable to reduce manufacturing costs, it is likely that the liquid crystal alignment layer would be rubbed in the same direction for both LCOS arrays. To be able to achieve amplitude modulation at the first LCOS array 1103, with phase modulation at the second LCOS array 1105, for such a common device, the incident light needs to be polarised linearly, but in different orientations at each LCOS array, compared to the plane of tilt of the liquid crystal.

In further situations the two SLMs are different, for example the first could be ferroelectric and the second nematic.

In a further embodiment, both SLMs may use ferroelectric liquid crystal. As is well-known, FLC rotates in-plane, which may be advantageous, for example for test and measurement applications because FLC can switch in under a millisecond. Boulder Nonlinear Systems sell FLC LCOS which provides binary phase levels and, for each phase level, a range of amplitude levels. In this case the spatial filter means may use the amplitude levels, and the routing means may use binary phase modulation. This may be liable to give rise to strong crosstalk, but the spatial filter means can be adapted to reduce this. Again, as is well known, FLC has to maintain DC balance for routing holograms and spatial filter holograms. The routing holograms may be scrolled to achieve this, because they are periodic. Transient crosstalk will be suppressed by the spatial filters. However, spatial filter holograms also need to experience field inversion.

In such test & measurement applications using an N×1 WSS, inputs could be an array of optical sources and may be integrated with modulators. Referring to FIGS. 12A to 12D, this array replaces input fibre array 1201a to c. Wavefront sensing using LCOS, as described in PCT/GB2004/057149, and implemented at one or both of the LCOS arrays inside the switch, could be used to align the array of sources with the rest of the N×1 switch, allowing such arrays to be tested before aligning with output fibres and packaging. Similarly in test & measurement applications using a 1×N WSS, outputs could be receivers, rather than an array of output fibres or waveguides. These receivers would be aligned with the rest of the 1×N switch by backlaunching from the receiver, for example from a sacrificial waveguide, and wavefront sensing at one or both of the LCOS arrays inside the switch.

Three variant embodiments are shown in FIG. 14A, and may be used separately, or in combination. The basic principle is to use a suitably oriented half wave plate to rotate the linear polarisation state between the three orientations required for the dispersion element, and each of the two LCOS SLMs.

The first embodiment is the quarter wave plate 1408, which acts in double pass as shown, as a half wave plate.

The second embodiment has a half wave plate 1409 disposed spaced in front of the second LCOS array 1105.

The third embodiment has a half wave plate 1410 disposed spaced in front of the first LCOS array 1103.

In variants of the second and third embodiments, the half-wave plate instead of being physically separate and spaced from the respective LCOS array, is deposited on the cover material of the LCOS, and windowed, that is limited to the area where it is required to rotate the polarisation of the incident light to and from that required for the liquid crystal layer to perform its required function.

If the spatial filter uses the liquid crystal layer in amplitude modulation mode, polarisation manipulation optics such as a polariser or polarising beam splitter are required at some point in the system, to reject and handle the blocked light, and to deliver light to the liquid crystal layer that is linearly polarised across the range of incident wavelengths.

In an embodiment the cover glass in front of the spatial filter array includes as well as a half wave plate, a polariser, e.g. using a polarising material such as Polarcor™. In this embodiment, the light passes first through the half-wave plate to be polarised at 45 degrees to the rubbing direction, then through the polariser, such that after double-pass phase modulation by the liquid crystal layer, the unwanted light would be rejected by the polariser and the required light would be re-oriented by the half-wave plate to its original polarisation direction, as required by the dispersion element. Hence the amplitude modulation has used the "parallel polarisers" method described earlier. As well as rejecting the unwanted light, the polariser also ensures that despite wavelength-dependent effects in the half-wave plate, the incident light on the first LCOS array is linearly polarised in the required direction. In this configuration, the achievable extinction is then limited by the specular reflection from the AR coating on the cover glass and from the transparent front electrode. Typically the level achievable would be ~30 dB extinction. This value then sets the allowable crosstalk from the routing array, to be, for example, 20 dB to achieve overall crosstalk suppressed to below 45 dB. In this embodiment, if the dispersion element requires light that is polarised in the dispersion plane, the light incident on second LCOS array 1105 is polarised in this same plane, hence the whole LCOS device should be "rubbed" to align the molecules in the dispersion plane. However, if the dispersion element requires light that is polarised in the switch plane, the whole LCOS device should be rubbed to align the molecules in the switch plane.

To achieve greater depth of extinction at the spatial filter array we can use the "crossed polarisers" method, at the expense of greater complexity. The crossed polarisers method requires an input polariser and an output analyser. The input polariser could be combined with the polarisation diversity optics inside the input optics and has the function of ensuring that input light is linearly polarised in the direction required for the dispersion element to have high optical efficiency, across the desired wavelength range. In a first embodiment the whole LCOS device is rubbed at 45 degrees to the dispersion plane, the light incident on the first LCOS array may be polarised in the dispersion plane or the switch plane, depending on the type of dispersion element, and an analyser is oriented to select light polarised in the orthogonal direction, e.g. if the incident light on the first LCOS array is polarised in the dispersion plane, the analyser selects light that is polarised in the switch plane, and vice versa. The output analyser could be disposed spaced in front of the tilted cylindrical mirror, or form part of the tilted cylindrical mirror, or disposed spaced in front of second LCOS array, 1105, or form part of second LCOS array, 1105. The selected light is now polarised at 45 degrees to the required direction to be phase modulated by second LCOS array, 1105. Hence after passing through the analyser, a half-wave plate, 1409 in FIG. 14A, is required to rotate the selected light to be polarised as required. It is advantageous for the analyser to be at or close to half-wave plate 1409, so that the phase-modulated light passes back through this analyser, and thereby the effects of unwanted twist in the liquid crystal layer on the output light from second LCOS array 1105 will be suppressed. In this embodiment, the output light is polarised orthogonal to that required for the dispersion element to have high optical efficiency. Therefore output optics 1102 includes means to re-orient the polarisation as required, in the beam path between second LCOS array 1105 and the dispersion element.

Referring now to FIG. 15A, the function of the intermediate optics 1104 in the dispersion plane is to image the beam waists from the first LCOS array 1103 to the second LCOS array 1105. In this embodiment, the beam waist at any wavelength is ideally imaged to the same set of columns on the second LCOS array 1105, as on the first LCOS array 1103. First LCOS array 1103 is shown in FIG. 15A as directly underneath second LCOS array 1105. Although the figure suggests that the front surface of the two SLMs would be in different planes, this is misleading, it is drawn like this solely to make the explanation clear. If on a common device, the two SLMs would be likely to share the same cover glass. In a real system the imaging may be slightly offset (in the dispersion plane) between the columns on each LCOS array. The size, shape and position of the groups of pixels to route or spatially filter the beams may be adapted as required to maintain or shape the desired switch channel, as will be explained later in section 5.9

From positions 1316, 1317 and 1318 on the first LCOS array 1103 (the pairs of chief rays at 3 different wavelengths), beams propagate with chief rays 1502 to 1507 to the cylindrical dispersion lens 1211, so as to propagate to two common points on the previously-mentioned optical device 1402. This acts as a pair of retroreflectors in the dispersion plane, but a tilted mirror in the switch plane. The optical device 1402 consists of a pair of retroreflectors 1510 and a cylindrical lens 1509. The focal length of the cylindrical lens is selected to provide the required focal length for the equivalent cylindrical mirror, which acts as a Fourier element. The required mirror tilt may be achieved by rotating the retroreflector about an axis in the dispersion plane.

A retroreflector is a device that reflects light back into the direction of incidence regardless of the angle of incidence. A mirror reflects light with an angle of reflection equal to the angle of incidence with respect to a normal. A standard retroreflector acts as a retroreflector in two orthogonal planes, and is often called a corner cube reflector. Therefore it has 3 sides.

FIG. 36 shows a device that acts as a retroreflector in a single plane, this has 2 sides, 3601 and 3602, each acts as a mirror, the angle 3603 between the 2 sides is 90 degrees and there is an axis of symmetry 3604 through the middle. The figure shows the chief rays of two beams 3605 and 3606, which are reflected from a common point 3607 from the mirror 3601, then reflected from the mirror 3602 on the opposite side of the axis, 3604, to emerge antiparallel to their original directions. This mechanism causes an offset between the incident and retroreflected beams. The closer the common point 3607 to the axis 3604 the smaller the offset. If the common point is at the apex 3608, the retroreflected beam is retroreflected back along its original path. When the incident light has a known polarisation state, the surfaces of mirrors 3601 and 3602 may be coated to optimise the reflectance for this known state. Retroreflectors may act to modify the polarisation state of the reflected light. This can be a particular issue for corner cube retroreflectors, but should be less of a problem for the 2 sided retroreflector proposed, particularly because the described embodiments deliver light to this retroreflector that is polarised either in the switch plane or in the dispersion plane.

Returning to FIG. 15A, in a first embodiment, each polarisation component has its own retroreflector as shown, positioned such that the common point to which the wavelength components converge, is at the apex of a retroreflector. Hence in the dispersion plane the optical device 1402 retroreflects the chief rays back to positions 1515, 1516 and 1517 on the second LCOS array 1105, directly above the positions 1316, 1317 and 1318, from where they were reflected from the first LCOS array 1103. The beams are then reflected as pairs of chief rays 1518, 1519 and 1520, towards output optics 1102.

In a second embodiment, not shown, the two polarisation components may share a common retroreflector. Each component may reach the retroreflector on opposite sides of its axis of symmetry, so each returns from the side of the retroreflector where the other polarisation component was incident.

Figure 16A:
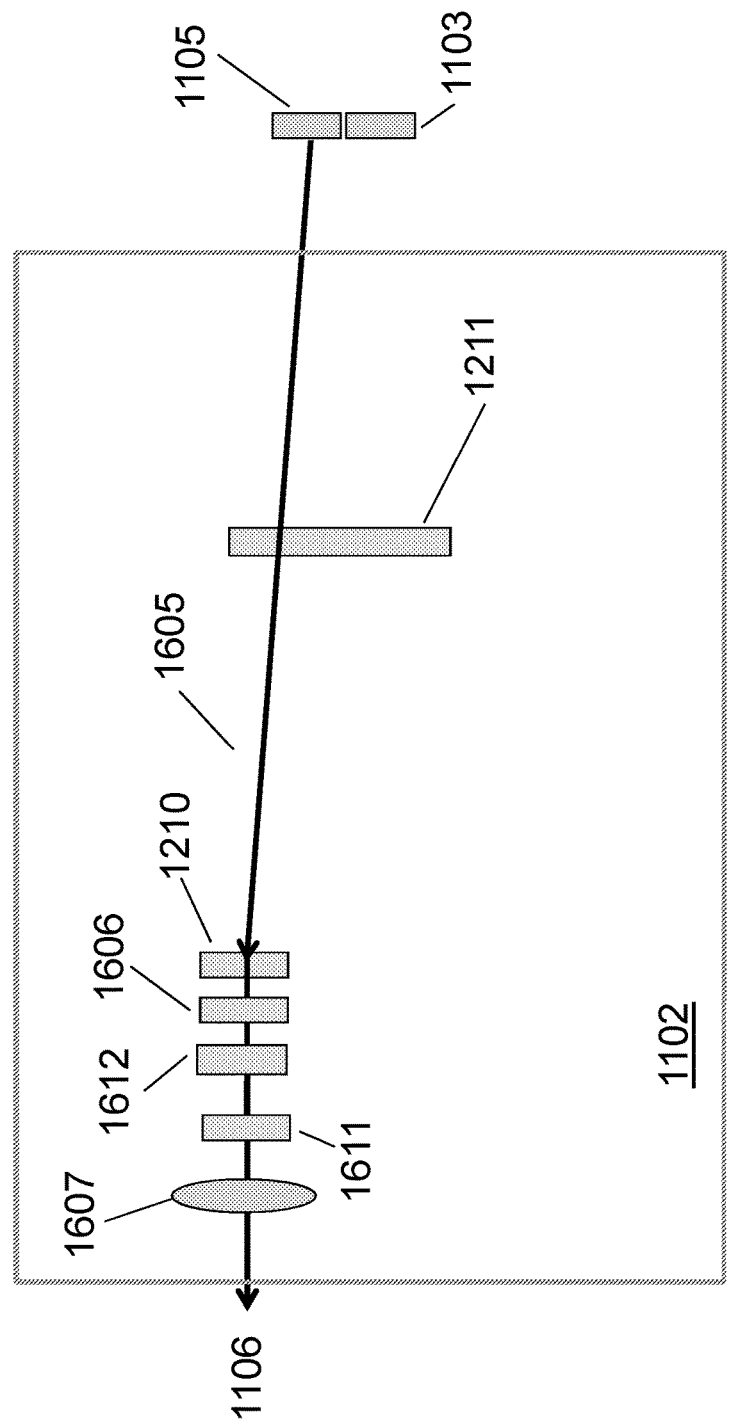

FIG. 16A shows an embodiment of the output optics 1102 in the switch plane. As previously described, second LCOS array 1105 implements beam steering holograms to form two output beams (in the dispersion plane) to propagate the selected signals to be combined into a common pair of beams by the dispersion element 1210, shown as transmissive, although it could also be a reflective dispersion element. This dispersion element could be the same physical device as the dispersion element used inside the input optics, or a separate physical device, but with the same dispersion equation, to allow previously separated wavelength components to be recombined. Each of the two common output beams is created by originally orthogonally polarised components of the selected input beams. The output beams 1605 have a tilt: this is shown as corrected just before the dispersion element, 1310, which is therefore a combined dispersion and tilt correction element. Alternatively the tilt correction could be implemented separately.

The dispersion element outputs light via a windowed half wave plate 1606 that recreates a pair of orthogonal polarisations to a polarising beam splitter assembly, 1612, that acts in reverse like a periscope combining element. As mentioned previously, PMD (polarisation mode dispersion) needs to be considered when laying out the system. The combined beams are coupled in the switch plane from LCOS array 1105 to the output fibre 1106 by the Fourier lens 1607. Between the Fourier lens 1607 and the output fibre 1106 there could also be an aperture (not shown) to act as a spatial filter to further reduce crosstalk.

Also shown is a cylindrical focusing lens 1611 in the dispersion plane, to focus the dispersion plane component of the light into the output fibre, 1106.

Figure 16B:
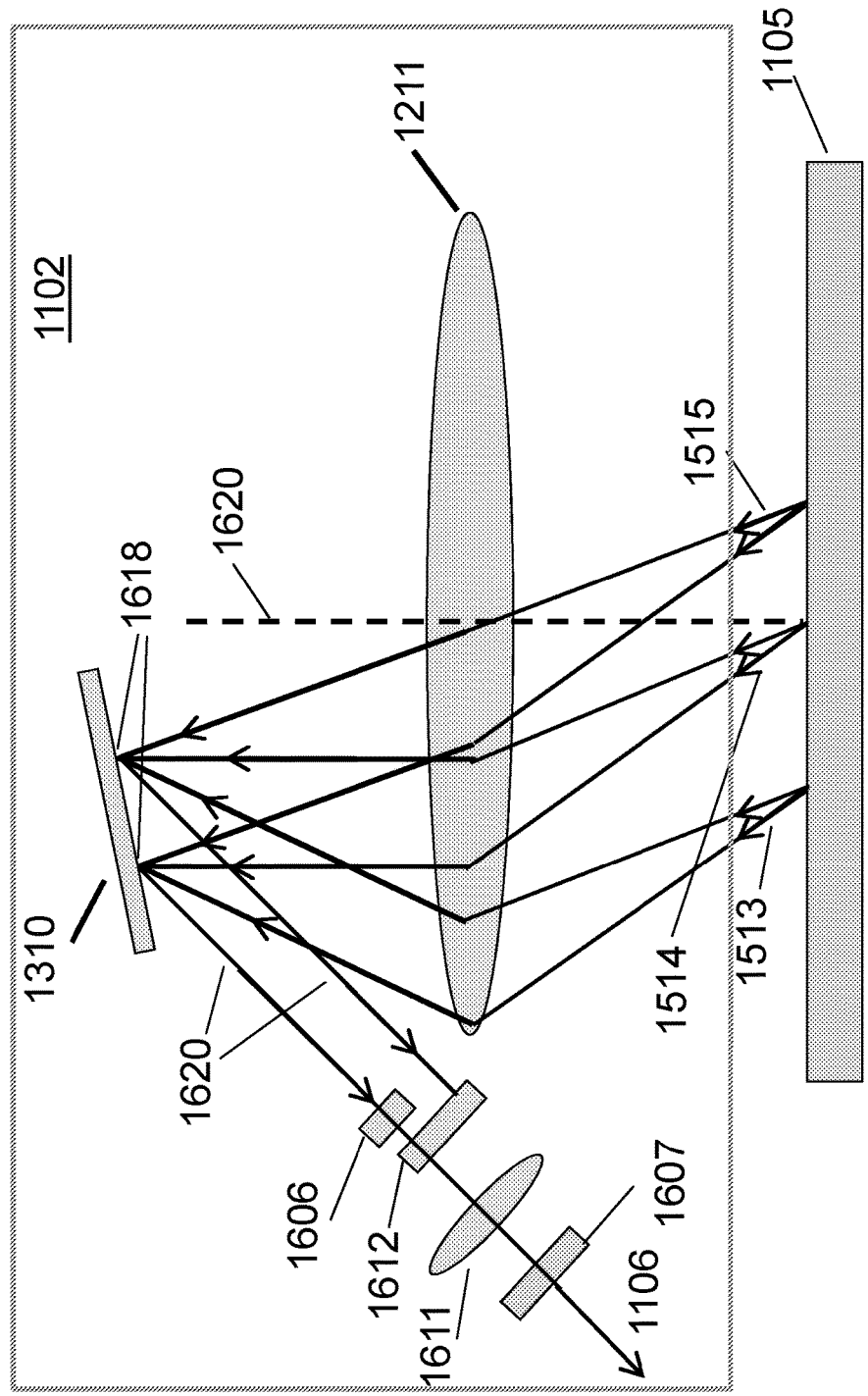
Figure 16C:
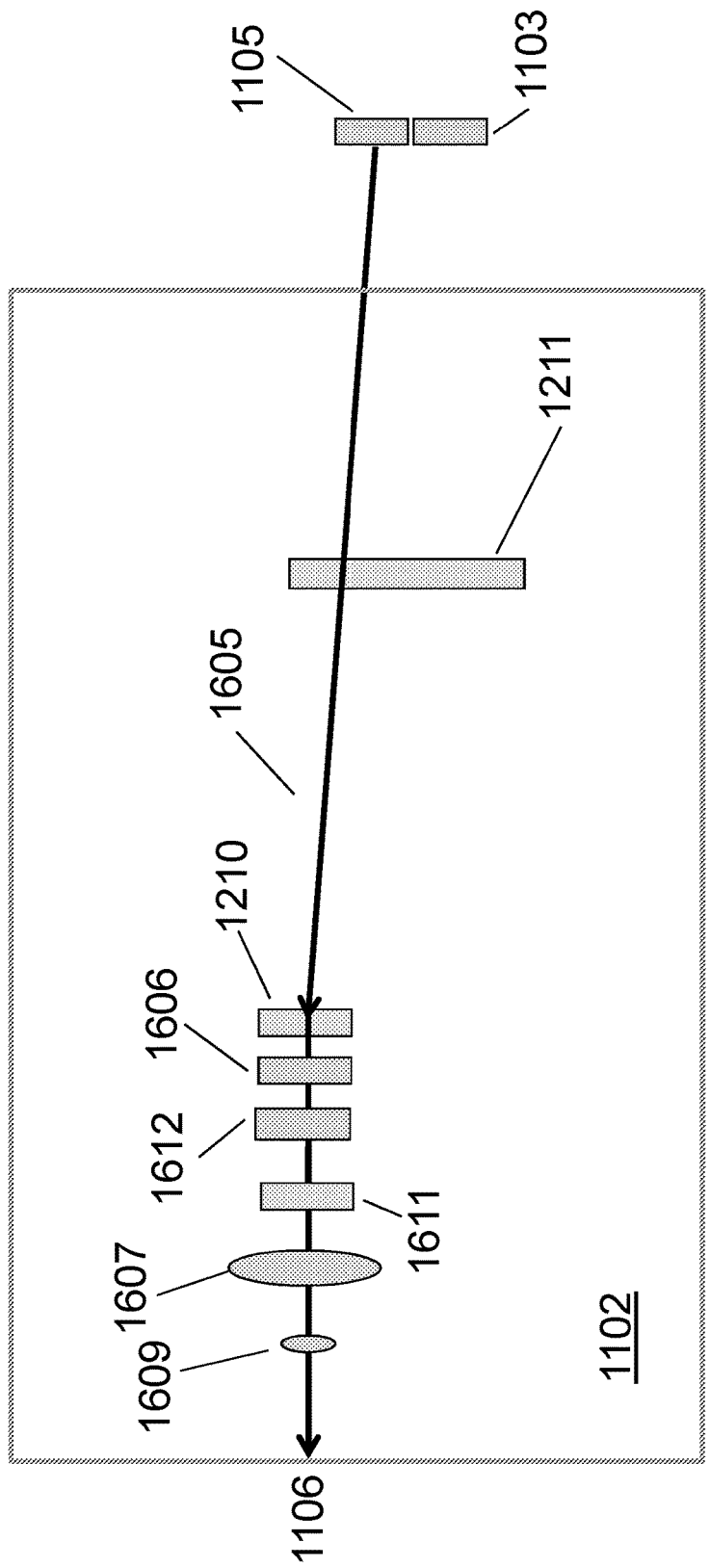

FIG. 16C shows an alternative embodiment in the switch plane, with a microlens 1609 such that the output beam is imaged in the switch plane from LCOS array 1105 to the output fibre 1106 by the series combination of Fourier lens 1607 and microlens 1609. This microlens creates an additional spatial filtering effect on residual unwanted diffraction orders, also on adjacent port crosstalk, as described previously.

FIG. 16B shows a dispersion plane view of the embodiment of FIG. 16A. Separate wavelength components shown as pairs of chief rays 1513, 1514 and 1515 are shown reflected specularly from the second LCOS array 1105, and converged by the dispersing lens 1211 to be incident at a pair of common points 1618 at the grating or equivalent dispersion element 1310, which also may act to correct the tilt in the switch plane, as discussed in association with FIG. 16A. In this embodiment, the dispersion element, 1310, is shown as reflective. The symmetry of the optical system is arranged such that, in the dispersion plane, the light at each wavelength component approaches the dispersion element 1310 at the angle at which it was originally dispersed from the same element. Hence the wavelength components are remultiplexed into a pair of common multiwavelength output beams 1620. The common beams 1620 pass through the half wave plate 1606 to recreate orthogonal polarisation components, then through the polarising beam splitter 1612 (used as a combiner). The combined beams are focused in the dispersion plane into the output fibre by focusing lens 1611. The combined beams are focused in the switch plane from LCOS array 1105 to the output fibre 1106 by Fourier lens 1607. The position of Fourier lens 1107 inside the beam train may be altered as required to suit the system requirements.

Although the dispersion lens 1211 is described herein as cylindrical, it could also be acylindrical in order to control aberrations. This principle holds true for other elements described herein as cylindrical.

Further the dispersion lens 1211 could be split into two parts, for example two halves either side of the optical axis (line 1620 in FIGS. 13A, 15A and 16B), and each half optimised independently. Such a lens could be manufactured as a single freeform optical element. In this two part lens embodiment, the first half of the dispersion lens 1211 is used inside input optics 1101 (see FIG. 13A), to deliver angularly dispersed light from the dispersion element to LCOS array 1103, and also inside output optics 1102 (see FIG. 16B), to combine spatially separated beams routed by LCOS array 1105 onto a common point at the dispersion element. The second half of the dispersion lens 1211 is used inside intermediate optics 1104 (see FIG. 15A) to deliver spatially filtered light from LCOS array 1103 to the retroreflectors, and to deliver retroreflected light to LCOS array 1105.

Referring to FIGS. 13A, 15A and 16B, LCOS arrays 1103 and 1105 are used in off-normal incidence. This is necessary to fit Fourier and retroreflecting element 1402 into the system. The effect of of-normal incidence needs to be taken into account when specifying the LCOS cover glass, in particular the AR coating and layers used to index-match the transparent front electrode.

We now describe the system in reverse, to explain how it operates as a 1×N WSS.

Referring to FIG. 26, FIG. 16B now shows an embodiment for the input optics, 2601, for a 1×N WSS. Lens 1611 collimates input light in the dispersion plane while polarising beam splitter 1612 followed by half wave plate 1606 converts randomly polarised light into two separated parallel beams, polarised as required for high optical efficiency from dispersion element 1310. The series combination of the dispersion element 1310 with dispersion lens 1211 provides spatially separated wavelength components at first LCOS array, 1105 (which is 2602 in FIG. 26). The series combination of collimating lens 1611 followed by dispersion lens (and including the anamorphic effect of the dispersion element) provides the required beam waist in the dispersion plane at first LCOS array, while the required beam waist at the first LCOS array in the switch plane, is provided by Fourier lens 1607. Hence the required anamorphic transformation may be achieved between the input fibre or waveguide and the routing array.

In the 1×N WSS, LCOS array 1105 is the first LCOS array (2602 in FIG. 26), and applies routing holograms and may also apply fine attenuation to route input light to the spatial filter rows arranged to couple light through to the desired output port(s). In the 1×N WSS, LCOS array 1103 is the second LCOS array (2604 in FIG. 26). FIGS. 14A and 15A show an embodiment for the intermediate optics (2603 in FIG. 26), used to deliver light from the first LCOS array to the second LCOS array. In the switch plane (FIG. 14A) diffraction orders created by the routing hologram applied at LCOS array 1105 are spatially separated by Fourier element 1402 to be incident on the second LCOS array. The second LCOS array, 1103, applies spatial filtering to block the diffraction orders that would otherwise couple into the wrong output port, causing crosstalk. In the dispersion plane (FIG. 15A) the light processed by LCOS array 1105 propagates via dispersion lens 1211 to element 1402 which acts as a pair of retroreflectors in the dispersion plane. The retroreflected light passes back through dispersion lens 1211 to LCOS array 1103. The double pass through the dispersion lens maintains the spatial separation by wavelength in the dispersion plane so that required and unwanted diffraction orders may be processed independently for each wavelength component. Hence the intermediate optics acts as an imaging device in the dispersion plane, but a Fourier element in the switch plane.

FIGS. 13A and 12A show an embodiment for the output optics for a 1×N WSS, which delivers the selected light from each row of spatial filters, into an output fibre or waveguide, using a dispersion element, 1210 or 1310, to recombine wavelength components; cylindrical optics comprising a cylindrical microlens array in the switch plane, 1202, and a cylindrical focusing lens, 1212, to provide anamorphic transformation from the (unattenuated) beam shape at the spatial filter array to focus the output light into the required circular mode at the output fibres or waveguides; and polarisation diversity elements: a half wave plate, 1230, and a birefringent wedge, 1222, to recombine the polarisation components into the output fibres or waveguides.

Now to return to the intermediate optics, FIG. 14A: the purpose of the mirror tilt is to propagate the beams upwards in the switch plane, allowing the routing array and LCOS array to be implemented on the same physical device, also allowing the use of the same dispersion lens. Further options for propagating the beams upwards in the switch plane are as follows.

Figure 14B:
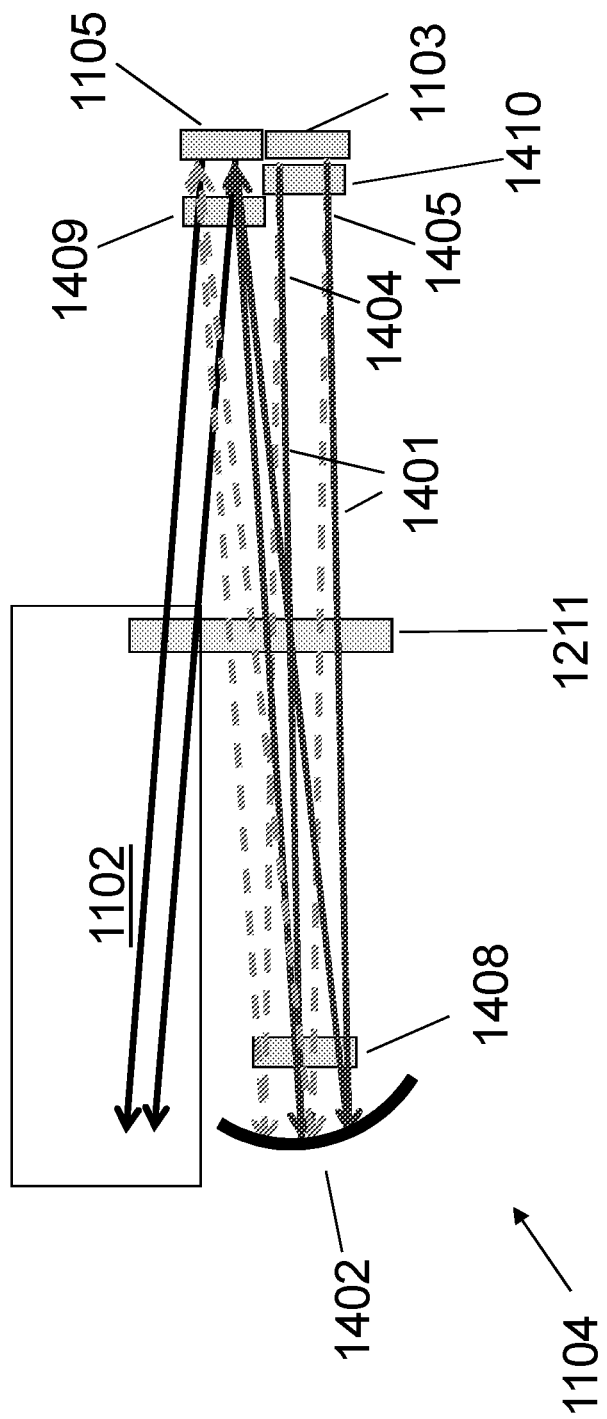
Figure 14C:
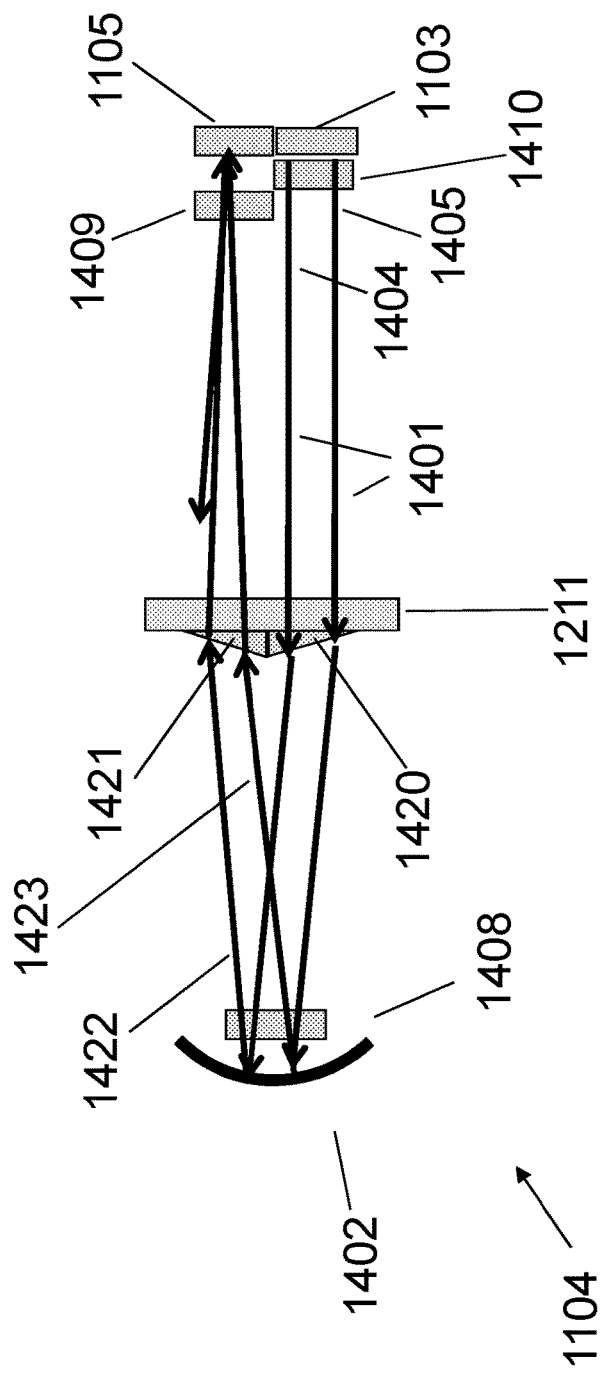

The first further option is to introduce a pair of narrow refractive wedges into the beam path, as shown for the switch plane in FIG. 14C. The first wedge 1420 tilts the beams 1404, 1405, reflected from spatial filter array 1103, up towards the equivalent cylindrical mirror, 1402, from where reflected beams 1422, 1423 propagate to the second wedge 1421, which corrects the beam tilt, before propagation to the common area on LCOS array 1105, where routing holograms are applied. FIG. 15C shows the dispersion plane view, a suitable position for these wedges is between the equivalent cylindrical mirror 1402, and the dispersion element, 1211, at a position inside the dispersion plane where the wavelength components propagating inside the intermediate optics, travelling between LCOS array 1103 and element 1402 do not intersect wavelength components inside the input optics, travelling between the dispersion element and LCOS array 1103. A suitable position for the second wedge is where the wavelength components propagating inside the intermediate optics do not intersect wavelength components propagating inside the output optics. With freeform optics it may be possible to combine these refractive wedges in the switch plane with the appropriate area of the dispersion lens, 1211, that has its focusing action in the dispersion plane. If polarisation gratings are used to implement the spatial filter array, rather than the amplitude modulation method, the tilt provided by the polarisation grating would tilt the selected beams up towards element 1402, replacing the need for first wedge 1420, while the rejected beams would be reflected specularly from the spatial filter array, to arrive underneath element 1402, where they may be blocked.

Figure 14D:
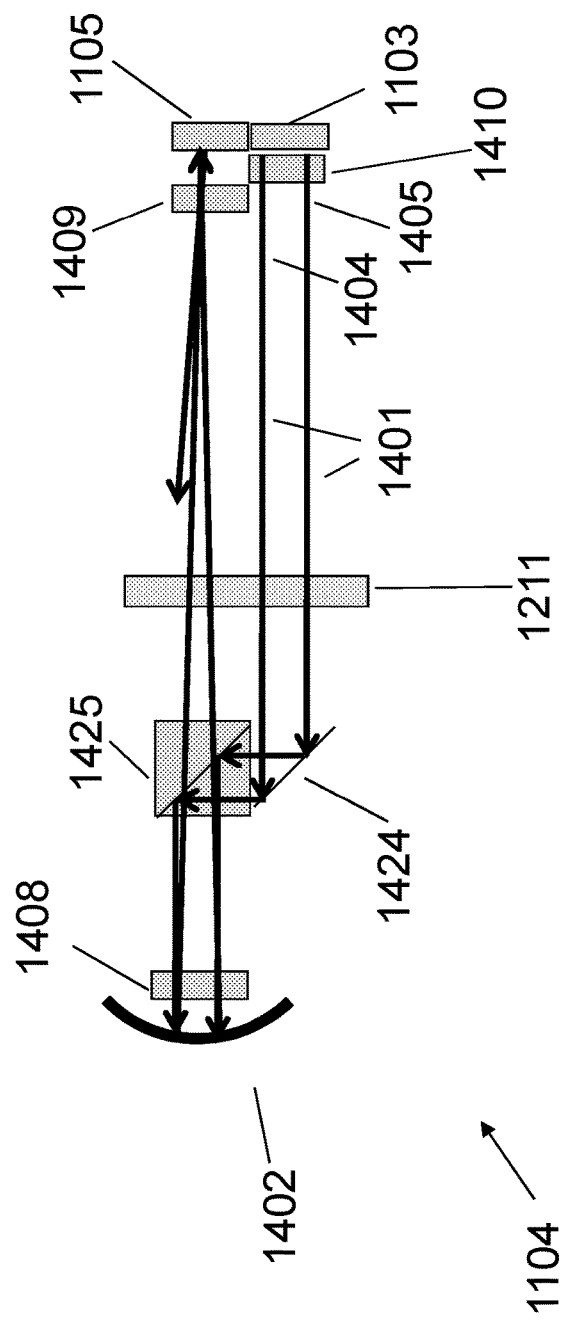

With reference to FIG. 14D, the second further option uses the polarisation management scheme for the LCOS arrays in which the light reflected from first LCOS array 1103 is polarised either in the switch plane or the dispersion plane. This allows the use of a turning mirror, 1424, and polarising beam splitter, 1425, in the beam path between the dispersion element 1211 and the quarter wave plate, 1408, in front of the retroreflecting Fourier element 1402. The effect of the retroreflection and quarter wave plate is to change the polarisation state so that on the reverse path through the polarising beam splitter, 1425, the beams pass straight through without turning. The rubbing direction on second LCOS array would need to be adapted accordingly, and there may need to be further polarisation manipulation between second LCOS array and the dispersion element in the output optics. It may also be necessary to introduce path compensation, because the path length between dispersion element, 1211 and the retroreflector, 1402, is asymmetric. The path compensation could use a pair of turning mirrors, or a compensator plate.

5.7 Further Embodiments Using Relay Lenses

Figure 12B:
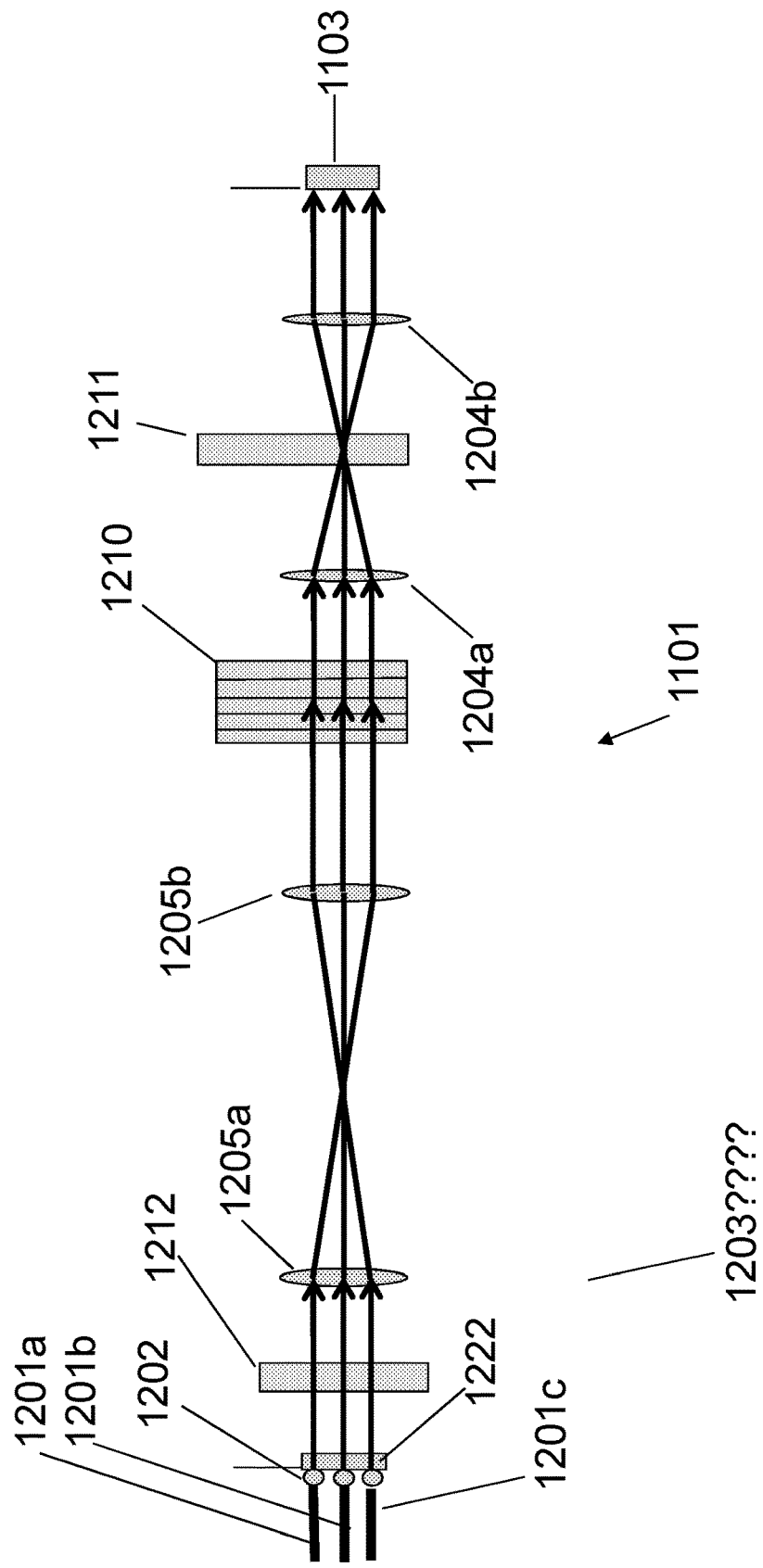

The fourth function of the input optics is to manage polarisation diversity. The following description is for an embodiment of the input optics 1101 which also separates polarisation components by angle in the dispersion plane, but includes relay lenses to manage the beam waists in the switch plane between the microlens array 1202 and the first LCOS array 1103. With reference to FIG. 12B, input beams pass through birefringent wedge 1222 and collimating lens in the dispersion plane 1212 to reach a pair of confocal relay lenses 1205a and 1205b that have a focusing effect in the switch plane but not in the dispersion plane. This pair of relay lenses 1205a and 1205b relay the beam waists formed by the microlens array 1202 to the dispersion element 1210, shown as a transmissive dispersion element. In the switch plane the beams are at or close to normal incidence at the dispersion element 1210. This arrangement allows the beams to be in significant off-normal incidence in the dispersion plane, which allows efficient use of a dispersion element such as a blazed grating or volume holographic grating. A second pair of relay lenses 1204a and 1204b that also have a focusing effect in the switch plane but not in the dispersion plane, relay the beam waists from the dispersion element 1210 via the dispersion lens 1211 to the first LCOS array 1103. The dispersion lens acts like a slab in the switch plane, hence the relay lens separation may need to be adjusted to compensate for slab effects. Although in the past, well-corrected cylindrical lenses were very expensive, moulded acylindrical lenses made from glass are becoming commercially available, e.g. from Alps, therefore a product using such relay lenses is now commercially viable.

The use of the relay lenses provides two advantages. Firstly spot radii may be used at the output beam waists from the cylindrical microlenses which are smaller than the embodiment of FIG. 12A, because the relay manages the beam waists so they are focused as required onto the first LCOS array 1103. Secondly relay lenses limit the worse case beam divergence through the system. A smaller spot radius leads to a lower height for this part of the system, potentially lowering the overall system height. Also, for a given height restriction, a smaller spot radius allows more ports to be included. Further, the relay lenses provide design flexibility between the spatial filter pitch at the first LCOS array 1103, and the pitch of the fibre separation at the inputs.

Figure 13B:
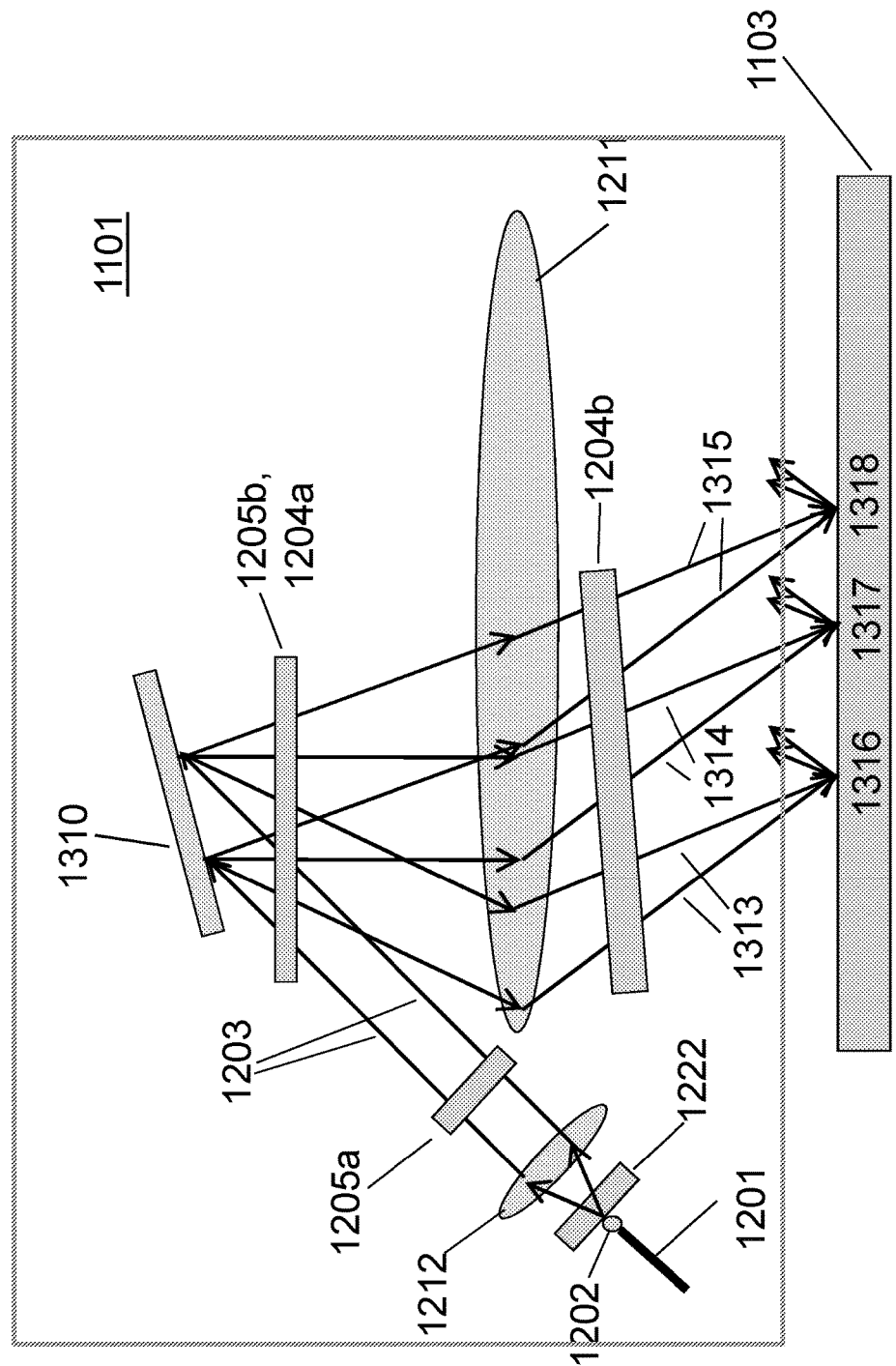

FIG. 13B shows an embodiment of FIG. 12B in the dispersion plane, but with a reflective dispersion element, 1310. FIG. 12B is drawn as if for each pair of relay lenses, the two lenses within the pair have the same focal length, hence each relay provides 1:1 magnification. FIG. 13B varies the magnification of each relay lens pair, to make it easier to fit the relay lenses within the optical layout. Using a dispersion element that is transmissive, rather than reflective, makes it easier to avoid collisions between relay lens 1205b and relay lens 1204a. This collision problem is solved in FIG. 13B by using the same lens as part of both relays, i.e. 1205b and 1204a are the same physical lens. The pairs of chief rays 1313, 1314 and 1315 after reflection from the first LCOS array, 1103 should not pass back through the relay lens 1204b. This may be facilitated by moving the position where they pass through the dispersion lens 1211, further off axis from the centre of the lens.

Referring to FIG. 11, the intermediate optics, 1104, for this system may use the embodiment previously shown in FIGS. 14A and 15A, while the output optics may use the embodiments shown in FIGS. 16A to 16C. These figures show that the beams do not pass through the relay lenses, except between the microlens array, 1202 and the first LCOS array, 1103.

The system becomes less crowded in the dispersion plane if polarisation diversity is managed in the switch plane. This also allows the beams at the second LCOS array 1105 to be separated according to their original polarisation state, allowing different attenuations to be applied to each component to compensate for polarisation dependent loss, PDL. Further, any aberration correction to compensate for the system optics may be optimised independently for the two polarisation components.

Figure 12C:
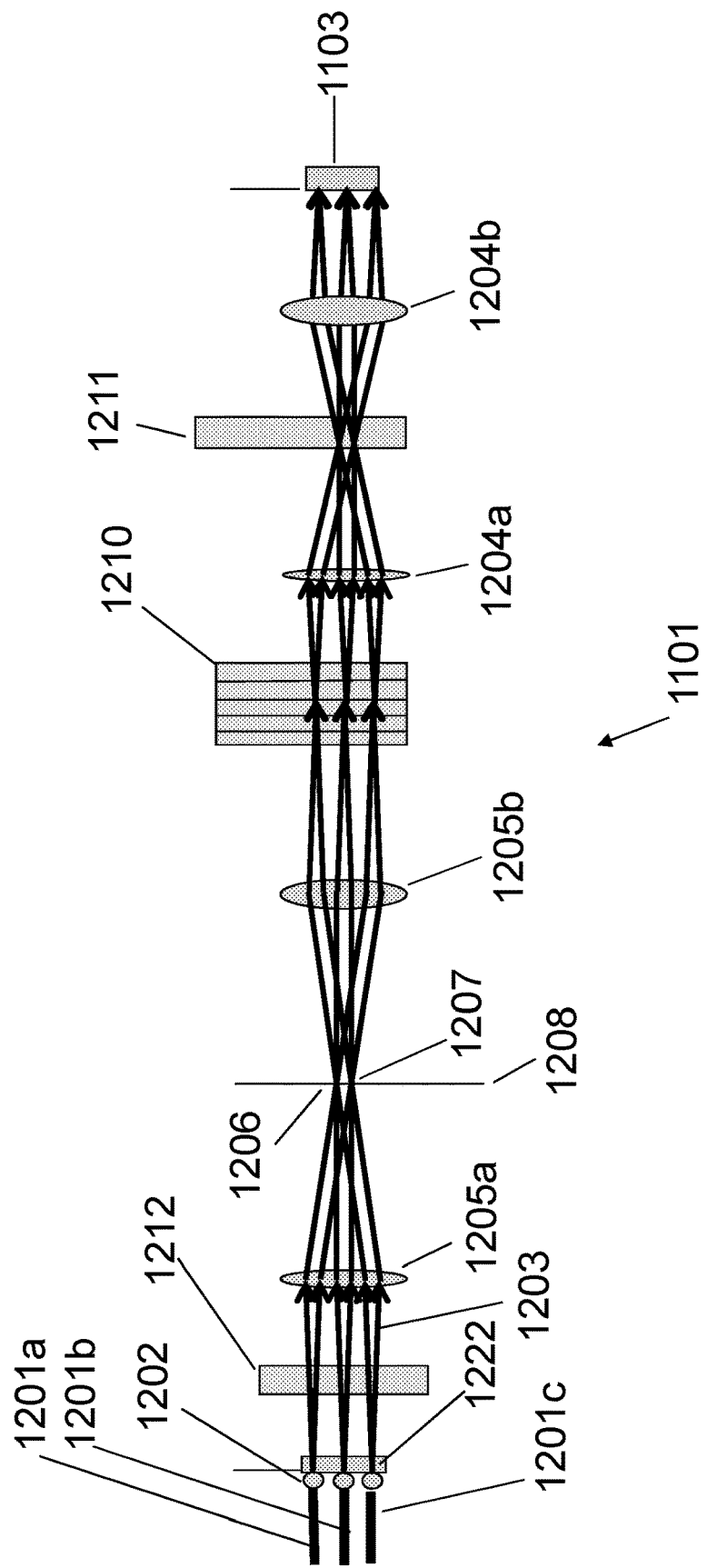
Figure 13C:
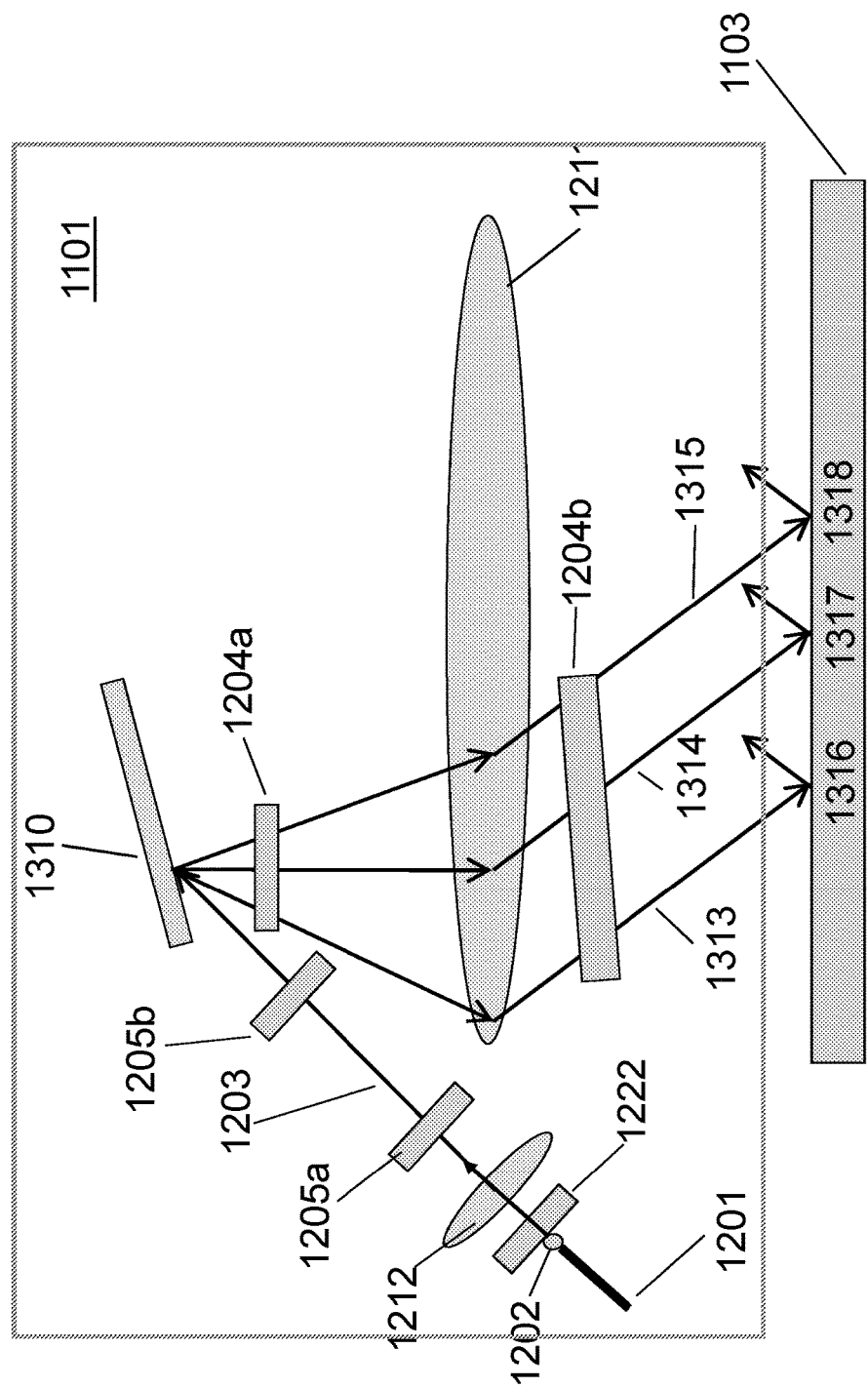

Hence in a further embodiment of the input optics 1101, shown in FIGS. 12C and 13C, the birefringent wedge 2222 separates the polarisation components by angle in the switch plane to form two sets of angularly diverging beams, shown as the chief rays. These angularly diverging beams 1203 from the birefringent wedge 1202 focus to two separate areas 1206 and 1207 at the joint focal plane 1208 of the relay lenses 1205a and 1205b. At one of these areas 1206 or 1207 there is a half wave plate (not shown) to rotate the polarisation components so all are parallel, and follow the optimum direction for the dispersion element 1210; 1310. The two sets of beams converge at equal but opposite angles to form beam waists at or close to the dispersion element 1210. Hence, whatever the input port and whatever the input polarisation state, the absolute value of the angle of incidence on the dispersion element, measured in the switch plane, is the same, so the input beams and their polarisation components are subject to the same dispersion across the LCOS arrays. In production, this angle may be measured by inputting a comb of wavelengths, and blocking one polarisation state from arriving at first LCOS array, 1103. Referring to FIG. 12C, given that the two polarisation are separated at the joint focal plane 1208 of the first pair of relay lenses, a viewing card or other suitable beam stopping device may be inserted into the beam path to block one state. Then at first LCOS array, 1103, wavefront sensing may be used as in PCT/GB2004/057149, modified as described earlier to work for an LCOS in amplitude modulating mode, to measure the position where the comb wavelengths land in the dispersion plane across the spatial filter array, for the unblocked polarisation state. The measurement may be repeated for both states and the birefringent wedge then tilted, or equivalent adjusting mechanism used, to provide a better result, until the dispersion for both polarisation states is the same.

The second pair of relay lenses 1204a and 1204b relays the beam waists from the dispersion element 1210 to the first LCOS array 1103 via the dispersion lens 1211, which is not intended to have a focusing effect in the switch plane. Additional optical elements to compensate for aberrations in the switch plane may be added to the system, or the compensation may be carried out at the LCOS routing array, which has the advantage that the compensation may be adapted according to the selected input and output ports. The two polarisation components from each input port are incident on first LCOS array at substantially the same position in the switch plane, hence they may be processed by the same row of spatial filters.

In another embodiment, other measures are used to separate the polarisation components in the switch plane, for example a polarising beamsplitter. Such an embodiment is however disadvantageous as it at least doubles the system height. There may of course be applications where no polarisation splitting is needed.

Intermediate optics, 1104 in FIG. 11, is used to pass beams between the spatial filters at the 1$^{st}$ LCOS array, 1103, and the routing holograms at the second LCOS array, 1105. Neither the intermediate optics, 1104, nor the output optics, 1102 uses the relay lenses. FIG. 14B shows the arrangement for the intermediate optics (1104 in FIG. 11) in the switch plane, for beams propagating between the first LCOS array 1103 and the second LCOS array 1105. The figure shows the chief rays for each pair 1404 and 1405 of polarisation components for the extreme ports. The chief rays for the first polarisation component are shown as solid lines, while the chief rays for the second (orthogonal) polarisation component are shown as dashed lines. From each row of spatial filters on the first LCOS array, a pair of beams that diverge angularly in the switch plane are reflected towards the optical element 1402 which acts as a curved tilted mirror, as described previously, and also as a Fourier element, to deliver parallel beams from the first LCOS array 1103 to a common position on second LCOS array 1105. Compared to FIG. 14A, there are two sets of parallel beams reflected from the first LCOS array 1103, hence the element 1402 focuses the light reflected from different spatial filter rows on first LCOS array 1103 to two common positions on second LCOS array, 1105. The position to which the beams are focused depends on their angle of incidence at 1402, which depends on their polarisation state at input to the switch. Hence the beams at the second LCOS array 1105 are separated according to their original polarisation state, so may be attenuated to compensate for polarisation dependent loss, PDL.

The angle (in the switch plane) at which the light is incident on the second LCOS array depends on the spatial filter row where it was processed on the first LCOS array, and hence depends on the particular input port. The second LCOS array applies routing holograms independently to each polarisation component, to route light from the selected port, at the required angle to couple into the output fibre or waveguide, via output optics 1102.

Also as shown in the figure, the angle of incidence at the second LCOS array 1105, depends on the input port, but is substantially the same for both polarisation components from the same input port. The LCOS arrays 1103 and 1105 should ideally be at the focal plane of the cylindrical mirror. From the geometry in the figure, this is not exactly possible unless the beam tilt required to reflect light between the two LCOS arrays is created elsewhere in the system, rather than at the cylindrical mirror, as would be clear to a skilled optical layout designer. This problem may be solved by using a pair of refractive wedges to tilt the beams travelling towards the cylindrical mirror, as shown in FIG. 14C. Aberrations in the switch plane may be corrected by phase compensation at the second LCOS SLM, 1105.

Figure 15B:
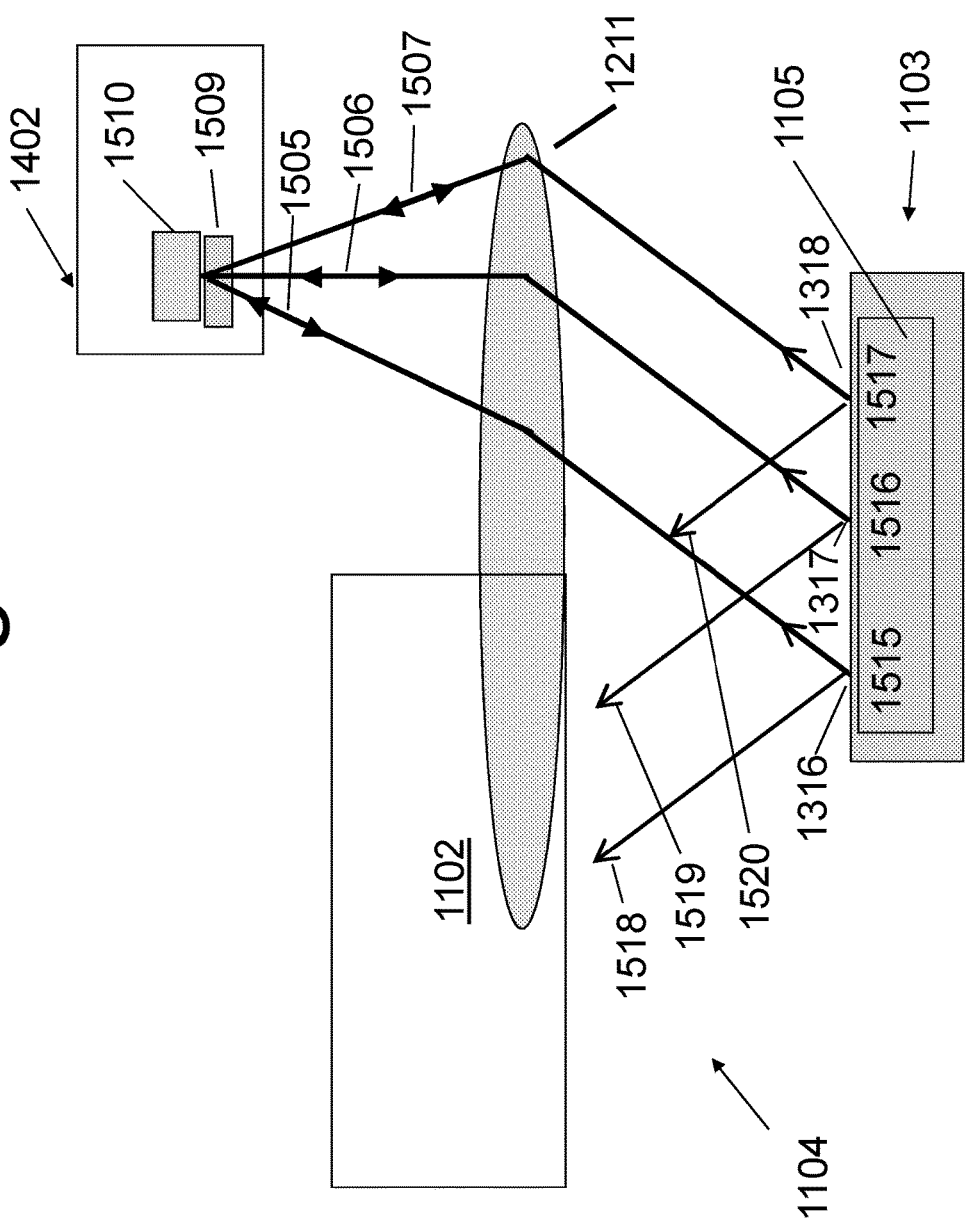

FIG. 15B shows the arrangement for the intermediate optics (1104 in FIG. 11) in the dispersion plane, for beams propagating between the first LCOS array 1103 and the second LCOS array 1105. Using diversity by angle at the LCOS in the switch plane, has reduced the complexity in the dispersion plane. For each of the 3 wavelength components shown, there is a pair of chief rays 1505, 1506, 1507, specularly reflected from the first LCOS array at positions 1316, 1317, 1318, to arrive via the dispersion lens 1211 at two common points, underneath each other in the switch plane, at the element 1402, which acts as a single retroreflector in the dispersion plane by means of retroreflector 1510, but a cylindrical mirror in the switch plane by means of cylindrical lens 1509. The retroreflected chief rays reach the second LCOS array at positions 1515, 1516 and 1517 via the dispersion lens 1211, to be routed and attenuated by holograms displayed on the second LCOS array and then reflected back towards output optics 1102 as pairs of chief rays 1518, 1519 and 1520, underneath each other in the switch plane.

Figure 16D:
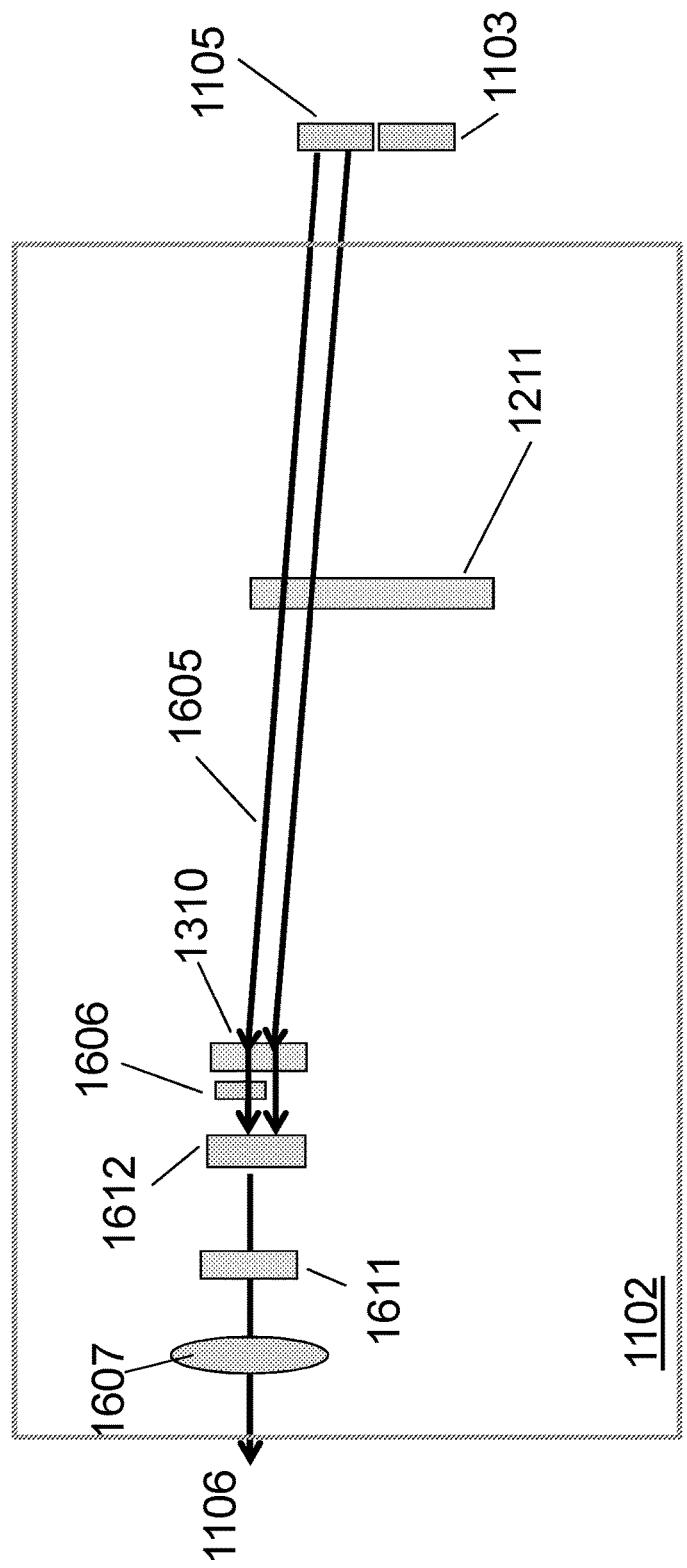
Figure 16E:
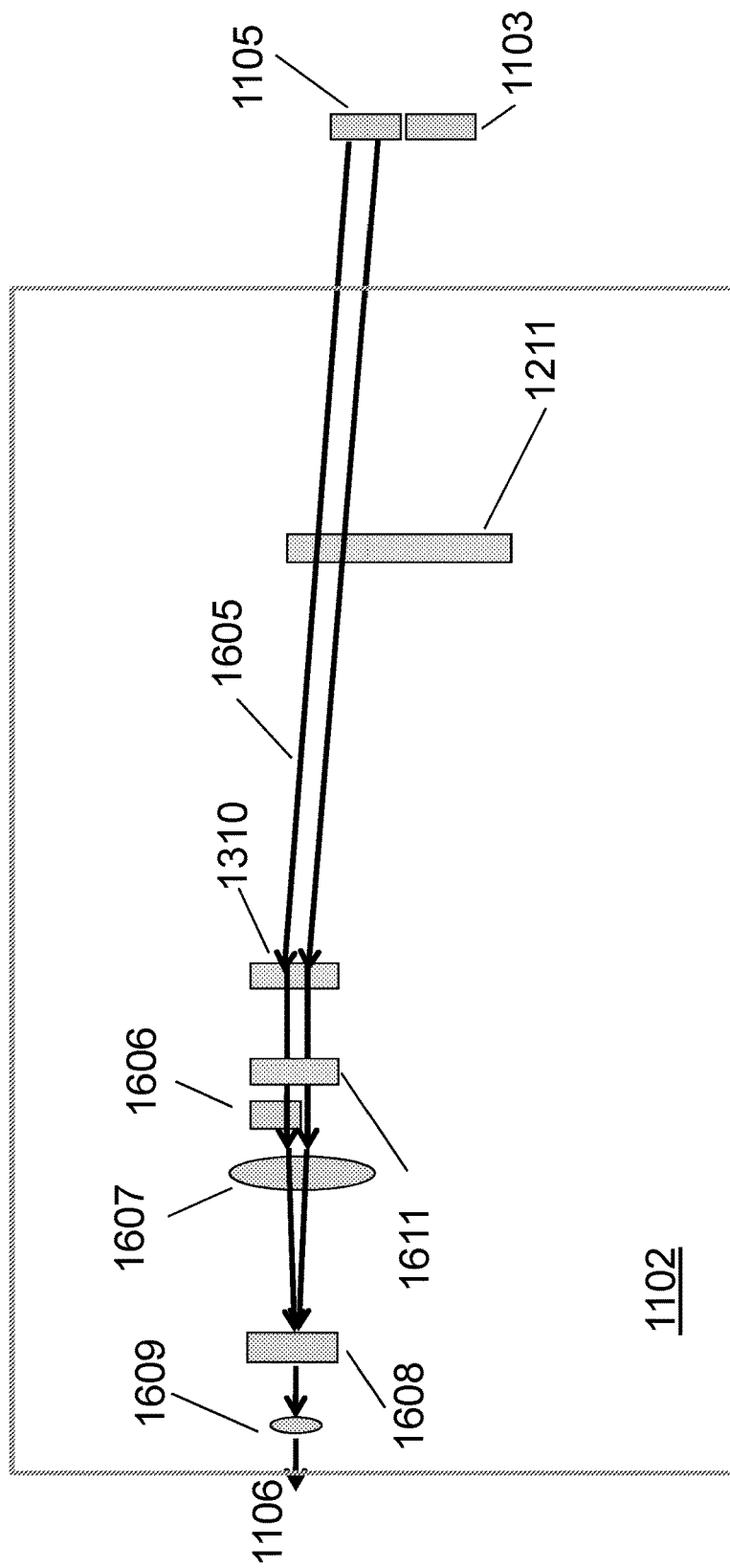

FIGS. 16D and 16E show first embodiment and second embodiments of the output optics 1102 in the switch plane. The absolute angle of incidence, measured in the switch plane at the dispersion element 1310 should be substantially the same as the absolute angle of incidence in the switch plane, used when the light was dispersed in the input optics 1101 (see FIG. 12C). This condition is required so that the dispersion equation is the same both times the light is dispersed, as required to multiplex the wavelength components back into common beams in the dispersion plane. After multiplexing the beams may be tilted to arrive at normal incidence on the remaining components in the beam train. In production, light may be backlaunched from the output fibre to measure where different wavelengths land on second LCOS array, 1105, using wavefront sensing. This measurement may be fedback to adjust the angle of incidence at the dispersion element for the backlaunched output beam, so that the backlaunched output beams at each wavelength overlap with forwards propagating beams from the input.

Referring to FIG. 16D, the dispersion element 1310 receives light from the second LCOS array 1105, via dispersion lens 1211. It outputs light in this embodiment to a windowed half wave plate 1606 which recreates two orthogonal polarisation components. Light exiting this passes to a polarising beam splitter assembly, 1612, that acts in reverse like a periscope combining element for both polarisation components, to direct both polarisation components via a focusing lens 1611 in the dispersion plane and a Fourier lens 1607 in the switch plane, to focus the output beam into output fibre or waveguide 1106. Between the Fourier lens 1607 and the output fibre 1106 there could also be an aperture (not shown) to act as a spatial filter to further reduce crosstalk.

FIG. 16E shows an alternative arrangement for the output optics. The wavelength components are combined by the dispersion element 1310 into common beams for each polarisation component, and the tilt is corrected. The two beam steered polarisation components then travel spatially separated to the windowed half wave plate 1606, which acts to recreate the orthogonality. A cylindrical combining lens 1607 converges the two beams towards the birefringent wedge, 1608, that combines the two beams and directs them into the cylindrical microlens 1609, used to form a focused beam waist in the switch plane to couple the light into the output fibre 1106. Cylindrical microlens 1609 also provides an additional spatial filtering mechanism, to reduce crosstalk from residual unwanted diffraction orders, or from the adjacent port. The collimating focusing lens 1611 forms a focused beam waist in the dispersion plane to couple the light into the output fibre 1106. The order of components 1606 and 1611 can be changed to suit the optical layout.

At the dispersion element the two originally orthogonally polarised components, have their polarisation linear and preferably aligned with the preferred orientation for the dispersion element. This may require additional polarisation manipulation between the second LCOS array 1105 used for beam steering, and the dispersion element, as described earlier.

Figure 16F:
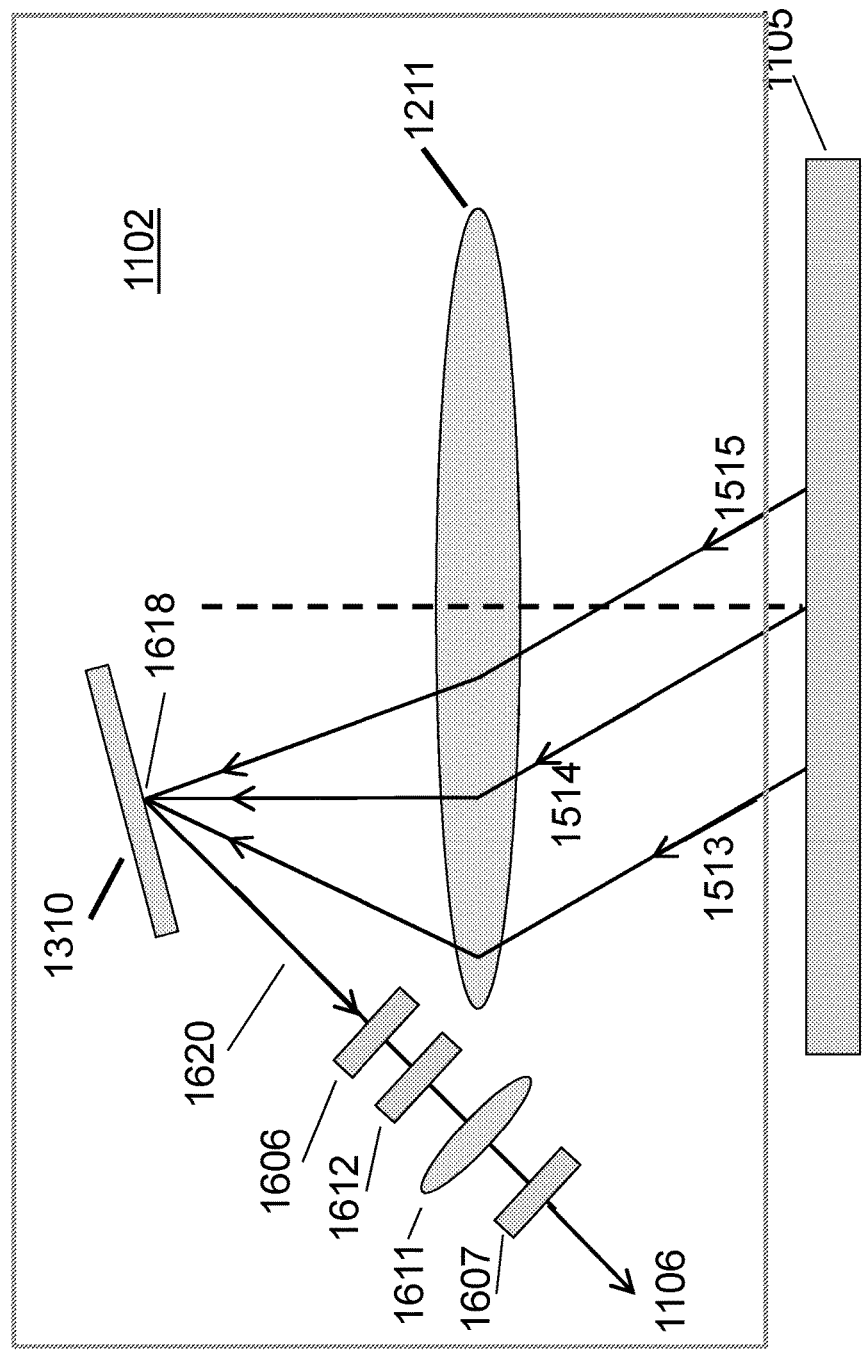

FIG. 16F shows a dispersion plane view of the embodiment of FIG. 16D. Separate wavelength components shown as chief rays 1513, 1514 and 1515 are shown reflected specularly from the second LCOS array 1105, and converged by the dispersing lens 1211 to be incident at a common point 1618 at the grating or equivalent dispersion element 1310, which also may act to correct the tilt in the switch plane, as discussed earlier. The symmetry of the optical system is arranged such that, in the dispersion plane, the light at each wavelength component approaches the dispersion element 1310 at the angle at which it was originally dispersed from the same element. Hence the wavelength components are remultiplexed into a common multiwavelength output beam 1620 for each polarisation component. The common beam 1620 passes through the half wave plate 1606 to recreate orthogonal polarisation components, then through the polarising beam splitter 1612 (used as a combiner). The combined beams are focused in the dispersion plane into the output fibre by focusing lens 1611. The combined beams are focused in the switch plane from LCOS array 1105 to the output fibre 1106 by the Fourier lens 1607.

The system also works in reverse, as a 1×N switch.

5.8 More Variations

When there is no attenuation applied by the routing array, it is important to achieve good optical throughput. To achieve optimised coupling efficiency, the output beam for the N:1 switch needs to be focused to form a beam waist at the end of the output waveguide.

Another important design goal is to reduce ripples in the filter response. One method to achieve this goal is for there to be an imaging relationship in the dispersion plane between the field at the LCOS and the field at the output fibre or waveguide. This is so that the truncated edges processed by the LCOS array, that are created by the edges of a routing hologram used to form an isolated channel or group of channels do not form significant sidelobes (e.g. from Fresnel near field effects) that would cause significant ripples in the filter response. This goal may be achieved when there is an imaging relationship between the beam waist at the output fibre and the position in the system where the beams are truncated, i.e. the LCOS routing array. Other optical arrangements may be possible to achieve the same goal.

With the arrangements shown in FIGS. 15A and B, the common point(s) from which the beams are dispersed, and the common point(s) from which the beams are retroreflected, are equidistant from the dispersion lens 1211. Hence these points must be at or close to the focal plane of the dispersion lens 1211. This sets the design constraint that the focal length of the equivalent Fourier element, 1402 has to be at or close to twice the focal length of the dispersion lens. Relaxing this constraint is advantageous because it eases manufacturing tolerances, and also opens up a broader range of design options to suit different design goals.

The variations to be discussed assume that polarisation diversity is achieved by separating incoming polarisation components by angle in the switch plane.

FIGS. 22 and 23 show other embodiments, otherwise identical to FIG. 15B except that in FIG. 22 the grating 1310 is moved closer to the dispersion lens 1211, so that the compound retroreflecting/Fourier element 1402 may be further away, and hence has an equivalent focal length more than twice that of the dispersion lens 1211. As shown in FIGS. 16A, and 16C to 16E, the beam deflection angle applied by the holograms on the second LCOS array 1105, required to steer the light to the output, varies according to the position of the spatial filters for the selected input port. The maximum beam deflection angle is set by the minimum practical phased ramp period. For a fixed minimum phase ramp period on the LCOS array, increasing the focal length of the Fourier element provides an increased physical range of input positions, hence allowing a greater port separation for a fixed number of ports, or an increased number of ports for a fixed port separation. Alternatively the configuration in FIG. 22 allows a larger minimum phase ramp period for a given array of ports. Hence this configuration is particularly suitable for switches with a large port count. Such an increase in minimum phase ramp period also allows for thicker LC layers, or increased optical efficiency, for example. As may be seen from the figure, the required aperture on the dispersing lens 1211 moves away from the input and output beams, which may also be desirable, at least to ease the closer position of the dispersion element (e.g. grating), 1310. This adaptability of the system eases the manufacturing tolerances, it also may ease the insertion of pellicles during manufacture to support wavefront sensing of the beams at the LCOS array. Experienced optical designers would know how to fold up the system to reduce the footprint. It may also be necessary to insert a compensation element between dispersion lens 1211 and compound retroreflecting Fourier element 1402, because the system has lost some of its symmetry compared to FIG. 15A. Another advantage, especially if the grating is a grism type structure, is that the configuration does not waste the space behind the effective front surface of the grating 1310. For a given footprint, it may allow the use of a longer focal length dispersion lens 1211, forming larger beams at the second LCOS array 1105 with consequent better thermal stability.

FIG. 23 shows the alternate variation to FIG. 22, in which the grating or dispersion element 1310 is moved further away from the dispersion lens 1211. Hence the compound retroreflecting Fourier element 1402 is moved closer to the dispersion lens 1211.

The variations shown in FIGS. 22 and 23 also enable increased flexibility to include relay lenses (not shown).

FIG. 24 shows the use of an alternative Fourier element, replacing the compound element 1402 formed of a retroreflector and cylindrical lens, with a tilted cylindrical mirror, 2400. Without the retroreflection the order of the wavelengths is reversed across the LCOS array, as will be explained. This means two gratings are needed, shown as 2401 and 2402 in FIG. 24, with flipped over orientations as shown in the diagram. Conveniently the back of the Fourier element, 2400, can be formed as a mirror to reflect the multiwavelength input beams, 2403, onto the input grating 2402. This mirror could be a plane mirror, or a focusing mirror. A focusing mirror could be used as a substitute for one of the relay lenses. Alternatively a separate mirror may be used. From here the beams shown as chief rays 2406, 2407, are dispersed by wavelength via the dispersion lens 1211 and across the LCOS array 2405, which implements the wavelength selective spatial filtering. In the dispersion plane, the beams are reflected specularly back through the dispersion lens 1211 and converge to a common point 2408, at the tilted cylindrical mirror, 2400. The beams are reflected specularly, such that the centre wavelength with chief ray 2406 is reflected (in the dispersion plane) back along its original path, via the beam steering LCOS array 2410, to the output grating 2401. However the non-central wavelength with chief ray 2407 is reflected along a different path in the dispersion plane, as chief ray 2409. This is the mechanism by which the order of the wavelengths is reversed. Potentially this embodiment allows a narrower footprint, because the space to the right of the dispersion elements, 2401 and 2402, and behind the tilted cylindrical mirror, 2400, is available for one of the relay lenses, and the input micro-optics.

5.9 Compound Filter Mechanism

In this section we consider the compound filtering effect of the spatial filters combined with the routing hologram.

In particular, when the shape of the group of pixels assigned to create a channel is irregular, like that shown for example in FIGS. 32 and 33, the groups of pixels assigned to the open and closed "portholes" at the first LCOS may be adapted accordingly to avoid compromising the filter performance.

This may be understood by analysing the filter response for the switch. We do this by adapting the theory from section 5.4 that showed how to use the attenuation method of FIG. 4 (that is the fine attenuation method implemented at the routing array for example by truncating beams) with irregular groups of pixels to achieve fine tuning of the centre wavelengths of the channels. In this theory, the switched spectrum at a wavelength L between the selected input and output ports, S(L), is given by an overlap integral carried out at the routing pixel array:

$$S(L) = a_1^2 \left| \begin{array}{l} P1(v1, v2) \int_{u1}^{u2} F2(u, L)B2*(u, L)du + \\ P2(v3) \int_{u2}^{u3} F2(u, L)B2*(u, L)du \int_{-\infty}^{vMAX} F1(v)B1(v)dv \end{array} \right|^2 \quad (10)$$

where u represents position in the dispersion plane. In equation (10), different to the version in equation (6), we maintain the distinction between the field components of the forwards propagated beam, $F2(u,L)$ in the dispersion plane and $F1(v)$ in the switch plane, and the field components of the backwards propagated beam, $B2(u,L)$ in the dispersion plane and $B1(v)$ in the switch plane. The first integral in equation (10) is across the dispersion plane (that is over u) over the regular portion of the group of pixels assigned to route or attenuate the channel, corresponding to subgroup 3302 in FIG. 33, and the second integral in equation (10), also across the dispersion plane (over u) is over the part-column, corresponding for example to subgroup 3304 in FIG. 33.

We start by analysing the N:1 switch. The network scalability tends to be much more affected by the passbands of signals inside express channels, than the passbands experienced by a signal when it is added or dropped. This is because the signal is only added once and dropped once, whereas it passes through one or more express channels in every node between its source node and destination node. Hence in a first embodiment we discuss a method to configure the spatial filter array that maintains wide channel passbands, but accepts some increase in crosstalk around channel boundaries; preferably this crosstalk falls outside the user passbands. This method would be suitable for express channels.

FIG. 35 shows the spatial filter array, adapted for the pixel group assignment shown in FIG. 33. In these figures it is assumed that we are using the switch architecture with the retroreflector in the dispersion plane. The analysis may be adapted easily if the alternate architecture shown in FIG. 24, with a mirror instead of a retroreflector is used.

As in previous figures, the LCOS array 1103 is divided into rows of spatial filters 3501 to 3506, each row is assigned to filter spatially the signals entering the switch from one of the input ports. Also shown are spare rows 3507 and 3508, which could be LCOS pixels to allow alignment tolerances, or assigned to spatial filters for further inputs. Again, as in previous figures, the LCOS array 1103 is divided into columns of spatial filters 3509, 3510, 3511: each column is assigned to filter spatially the signals entering the switch with a particular centre wavelength. In the example shown, the 3 adjacent channels are equally spaced, but the invention is not so restricted. Outside the area occupied by the columns of spatial filters for these 3 channels, there would be the columns of spatial filters for the rest of the channels passing through the switch. Unshaded ellipses represent incident beams at selected wavelengths from each input, these signals are desired to be routed through the switch. The shaded ellipses represent incident beams from non-selected wavelengths: these signals are desired to be blocked by the switch. For example in column 3510, corresponding to the second channel, row 3504 of the spatial filter receives a desired beam 3512 from the corresponding input port, while the other incident beams from the same input port but in adjacent channels, shown as shaded ellipses, 3513 and 3514, are desired to be blocked by the spatial filter array.

Now consider the relationship between the beams at the filter array (FIG. 35) and the routing array (FIG. 33). The optics is arranged so that in the dispersion plane, the beam components are imaged from the spatial filter array to the routing array, while in the switch plane, there is a Fourier transform relationship between the beam component at the spatial filter array and at the routing array. With rectangular apertures, we can treat the propagation of the two components as separable. Hence the width of the vertical aperture applied by the spatial filter affects the field peak at the routing array but the shape of the beam, measured across the dispersion plane, is not altered. However, if we vary the vertical aperture applied to a beam, across a region of the dispersion plane at the spatial filter, this will change the shape and distribution of the resulting beam at the routing array, as measured across the dispersion plane, and will therefore affect the switched spectrum, S(L), as given by the integral expression in equation (10).

In the absence of any spatial filtering, and for perfect imaging, the incident field component in the dispersion plane at the routing array, that is $F2(u,L)$, will be a perfect image of the incident field component in the dispersion plane at the spatial filter array, across all values of u. We can maintain wide channel passbands, despite spatial filtering, by selecting the shape of the open portholes to be rectangular so as to maintain the shape and distribution of the incident field $F2(u,L)$ across values of u where it lands inside the irregular pixel groups 3201, 3202 and 3203 shown in FIG. 33. In other words, in the preferred embodiment to achieve wide channel passbands, the shape of the pixel groups at the spatial filter array is regular, as shown in FIG. 35.

We also need to select the appropriate lower and upper column boundaries for the rectangular open portholes at the spatial filter array. Due to the imaging relationship in the dispersion plane, there is a 1:1 correspondence between positions on the routing array and positions on the spatial filter array. Specifically, let positions u1 to u6 at the routing array shown in FIG. 33, be imaged from positions u1' to u6' at the spatial filter array shown in FIG. 35. Start by considering the position u1', which is the theoretical ideal position for the lower column boundary. Although u1 at the routing array is at a pixel column boundary, u1' is unlikely to be: in a real system there will be alignment tolerances such that u1' is likely to be partway between columns. To minimise the impact of the spatial filtering outside the open porthole, on the field at the routing array for the selected wavelength, we may therefore choose the lower column boundary for the open porthole to be the closest column boundary that is at, or just below, u1'. Similarly the upper column boundary which would ideally be at u3', in practice we may minimise the impact of the spatial filtering outside the open porthole by selecting the column boundary that is at, or just above u3'. Hence, as shown in FIG. 35, selected beams 3512, 3515 and 3516 are all "passed" by rectangular open portholes 3517, 3518 and 3519, where the boundaries are at or just outside the imaged positions, u1' to u6', of the relevant column boundaries at the routing array. In this way we aim to maintain the values of the integrals in the expression (equation (10)) for the switched spectrum, S(L).

As shown in FIG. 35, we may optimise the open portholes in this way, without reducing the open portholes for an adjacent channel selected from another port. So there is not an apparent trade-off between adjacent channel open portholes. However, the effect is to reduce the width of the spatial filters, "closed portholes", applied to block unwanted signals. Hence in this approach there is likely to be an increase in crosstalk, in other words a reduction in port isolation, at wavelengths close to channel boundaries. These effects and tradeoffs are discussed in more detail in section 5.10.

In a second embodiment we may sacrifice passband for improved port isolation close to channel boundaries by resolving to column boundaries at or inside the imaged positions, u1' to u6', of the relevant column boundaries at the routing array. This would be suitable for added or dropped channels, as will be discussed in section 5.10.

In a third embodiment we may deliberately shape the vertical aperture at the spatial filter array, to add flexibility to the control of the filter shape by shaping the incident field at the routing array.

In the discussion for the N:1 switch, the forward propagated beam $F2(u,L)$ has propagated from the input fibre or waveguide to the routing array, via the spatial filter array, at wavelength L, whereas the backwards propagated beam $B2(u,L)$ has propagated from the output fibre or waveguide to the routing array. We now consider the 1:N switch. In this arrangement the signals are processed by the routing array before arriving at the spatial filter array. However, we may still calculate the switched spectrum S(L) at the routing array. In this case it is the backwards propagated beam, $B2(u,L)$, that has propagated via the spatial filter array to the routing array. The physics of how the spatial filter affects the beam it processes is the same for both switches: to avoid changing the shape and distribution of $F2(u,L)$ or $B2(u,L)$ across an irregular group of pixels assigned to route the beam for that channel, we may use a rectangular open porthole at the spatial filter, as for the N:1 switch. To minimise the impact of spatial filtering we assign column boundaries on the spatial filter array at or outside the imaged positions of the corresponding outer column boundaries at the routing array. While this is desirable for express channels, for added or dropped channels we may reduce the width (in the dispersion plane) of the open portholes to reduce crosstalk at and around channel boundaries. Further we may deliberately vary the vertical width of the open porthole to act as an additional filter shaping mechanism.

In a practical system we need a method to achieve the assignment of groups efficiently, given the phase side effect of the spatial filtering mechanism, as described earlier, we can use wavefront sensing as described in PCT/GB2004/057149 to measure the dispersion equation for the assembled switch.

5.10 Crosstalk Control Examples for a 1×N WSS

Operation of a 1×N optical switch is now discussed, and in particular, how it works to control various crosstalk mechanisms.

FIG. 26 shows a block diagram of a 1×N optical switch, which is like the block diagram for the N×1 device, FIG. 11, but in reverse. The device has a single multiwavelength input, 2600, in this embodiment from an optical fibre. The input is coupled to input optics, 2602, which has example embodiments that are identical to the embodiments for the output optics 1102 for the N×1 optical switch device, but used in reverse. The input light is processed by a first LCOS array, 2603. This is also referred to herein as a routing array. It carries out routing and configures the channel spectrum, as described earlier, and is thus equivalent to the second LCOS array 1105 previously described. This first LCOS array, 2603, may also attenuate the light, preferably using the truncated beam methods described earlier (see FIGS. 4 and 7) to achieve a fine attenuation effect. Intermediate optics, 2603, is used to direct the routed light to a second LCOS array, 2604. This is also referred to herein as a spatial filter array. It implements a set of wavelength selective spatial filters, one filter per configured channel per output port, similar to the first LCOS array 1103 previously described. Sub channel filtering may also be applied, if desirable, by applying the spatial filtering to a subset of the columns used to filter the whole channel. The intermediate optics may be identical to the previously described optics 1104 but used in reverse. Output optics, 2605, is used to relay the filtered light to the output ports, 2606.

At the second LCOS array, 2604, shown in FIG. 28, a group of pixels is assigned to each desired wavelength channel, taking into account whether the image is inverted or offset in the dispersion plane, due to practical tolerances. To aid the explanation, FIG. 28 assumes that none of the beams have been deliberately attenuated, and the optical system is perfect, hence the beams do not have sidelobes. Hence each beam is Gaussian-like in its amplitude profile.

The position of each of the incident beams incident on the LCOS array 2604 is determined by the focal length of the cylindrical mirror used as a Fourier element, and the component of the diffraction orders in this direction. For example, if a beam has been routed perpendicular to the dispersion plane with period Lv, and routed in the dispersion plane with period Ld, the positions of the beams at the second LCOS array are separated by f.L/Lv, where L is wavelength and f is the focal length of the Fourier element. The period Ld will affect the angle at which the beams approach the second LCOS array 2604, but if properly imaged, the position at the second LCOS array will be independent of Ld. This property turns out useful to block the effects of scattering from the output ports.

Now considering all the wavelength channels, the second LCOS array 2604 has a 2D array of incident beams. Each column of the 2D array has been created from the incident light in a particular wavelength channel that entered the WSS from the communications system. Up each column the diffraction orders created by the hologram applied to the light in each input channel are spatially separated. If we are unicasting, not multicasting, we only want a single one of the incident beams in any particular channel, to propagate to the output fibre. Therefore the second LCOS array forms a convenient space and wavelength filter, to remove the light likely to create crosstalk, as will be described.

If we are multicasting, there will be several wanted diffraction orders. For example if we desire to apply a drop and continue function to the channel, we need to route the input light to two outputs. In this case the routing array creates two strong diffraction orders, the corresponding incident beams are not blocked, but the unwanted diffraction orders would be blocked. The net effect is to create two open portholes for the corresponding channel. This makes it easier to design drop and continue holograms, because the required crosstalk control for such routing holograms can be difficult to achieve.

This filtering may be applied to twelve potential sources of crosstalk. To simplify the explanation and diagrams, open and closed portholes are shown as being of the same width in the column of portholes used to filter each channel. In practice the porthole widths for adjacent channels may be varied to provide the required channel passbands in a flexspectrum system. Further, the porthole widths applied at different positions in the switch plane, but the same position in the dispersion plane, may be varied to support the use of an irregular group of pixels at the routing array, to tune passband edges and centre wavelengths, as described previously in section 5.9, in conjunction with FIG. 35.

The first source of crosstalk is shown in FIG. 28. An unwanted diffraction order, 2813, lands across approximately the same set of rows, 2804, as the intended output, 2814, for the adjacent wavelength channel which is associated with the set of columns, 2810. The column 2809 also has an unwanted diffraction order 2815 landing across approximately the same rows. Prior LCOS WSS do not have spatial filtering by this second LCOS SLM, hence after the signals at different wavelengths have been remultiplexed by the diffraction grating, these unwanted diffraction orders will couple into the same output fibre as the selected output for the wavelength channel associated with the set of columns 2810.

In embodiments, blocking of the diffraction orders 2813 and 2815 takes place, and the blocking prevents this crosstalk from reaching the device output, hence the crosstalk at the device output is suppressed.

The channel associated with the set of columns 2809 has its main diffraction order 2816 at a different set of rows 2803: hence this order will couple into a different output fibre to the main order 2814 associated with the adjacent channel. Blocking of the diffraction order 2815 with the spatial filter does not block the main order 2814, nor does it block the main order 2816.

Hence, spatial filtering method allows outputs on all ports simultaneously; further the spatial filtering is applied independently to all wavelength channels.

FIG. 27 is another view of the second LCOS SLM, 2604. This view shows just the wanted diffraction orders, 2701, 2702 and 2703 for a set of three adjacent channels, each configured (at the first LCOS SLM) to route to a different output port. Each channel again has assigned its own set of columns, 2704, 2705 and 2706. The wanted diffraction orders are accompanied by ripply tails (see 3403, FIG. 34) up each column, 2707, 2708 and 2709 created by the amplitude discontinuities shown in FIG. 5. In a conventional WSS these ripply tails would act as a second source of crosstalk. This is because in a conventional WSS the vertical radiation patterns shown would be overlaid at the grating or grism before remultiplexing, hence the tail 2707 associated with diffraction order 2701 would cause crosstalk into the output port for the centre channel, the tail 2708 associated with the centre channel would cause crosstalk into the output port for the channel associated with the set of pixel columns 2704, as would the tail 2709 associated with the diffraction order 2703. Spatial filtering at the second LCOS array may be used to block these tails independently for each channel, thereby removing the penalties associated with the fine attenuation method.

The fine attenuation method also creates ripply tails on the unwanted diffraction orders created by the routing hologram. Further the unwanted light that is specularly reflected into the zero order, to create this attenuation, also has ripply beam tails.

FIG. 29 is a further view of the second LCOS SLM, 2604, and shows the effect of these ripply tails. This view shows the main output (but not the ripply tails) for the wanted diffraction orders 2912, 2913 and 2914 for a set of three adjacent channels, each configured (at the first LCOS SLM) to route to a different output port. Each channel again has assigned its own set of columns, 2909, 2910 and 2911. The unwanted diffraction orders 2915, 2916 and 2917 are accompanied by ripply tails 2918, 2919 and 2920, created by the amplitude discontinuities shown in FIG. 5. A portion of each of the ripply tails lands on the same set of rows as the wanted diffraction order that arrives on the same set of columns. For example part of ripply tail 2920 landing on the set of columns 2910 lands on the same set of rows 2904 as the wanted diffraction order 2913, and is therefore coupled into the same output port. A 1×N switch has a single multiwavelength input beam, hence there may not be two signals at identical wavelengths entering the switch. Therefore this ripply tail 2920 is from the same signal as the wanted diffraction order 2913. Hence its effect is to modify the attenuation applied to the signal, which may be calculated or calibrated experimentally. As in FIG. 27, spatial filtering is applied to block ripply tails independently for each channel, to suppress the wrong wavelengths from being coupled into an output port.

The ripply tails are distributed up and down the switch plane, but not across the dispersion plane. In a conventional WSS the ripply tails from the zero order would act as a third source of crosstalk, and the ripply tails from other unwanted diffraction orders, would act as a fourth source of crosstalk. This is because in a conventional WSS the vertical radiation patterns shown would be overlaid at the grating before remultiplexing. Crosstalk that would be created in a conventional WSS by these ripply tails may be suppressed by spatial filtering, because spatial filtering at the second LCOS array may be used to block or at least suppress these tails independently for each channel.

The fifth source of crosstalk that may be controlled by the wavelength selective spatial filter is crosstalk from the adjacent port. In particular the spatial filter may be used to suppress wavelength-dependent adjacent port crosstalk. Whereas in FIGS. 28 and 29, the wanted diffraction orders 2812, 2814, 2816, 2912, 2913 and 2914 are shown arriving substantially at the centres of the associated sets of rows 2801, 2804, 2803, 2903, 2904 and 2901, wavelength dependence of the transverse offset created by a routing hologram will cause an associated dependence in the position in the switch plane at the second LCOS array, which increases the level of adjacent port crosstalk. This is shown in FIG. 30 which shows another view of the second LCOS array, 2604.

Referring to FIG. 30, this view shows just the wanted diffraction orders, 3012, 3013 and 3014 for a set of three adjacent channels. Each of these wanted diffraction orders 3012, 3013 and 3014 lands partially outside the set of rows 3002, 3003 and 3004, for the intended and respective output port. For example the set of rows 3002 may be associated with a second output port, the set of rows 3003 may be associated with a third output port, and the set of rows 3004 may be associated with a fourth output port. Assume there is a microlens that acts as a spatial filter in the switch plane, aligned with each output port. Referring back to FIG. 26, suitable embodiments for the output optics, 2605, for a 1×N WSS are the proposed input optics, 1101, for the N×1 WSS. Example embodiments are therefore FIGS. 12A-D (shown in the switch plane), and FIGS. 13A-C (shown in the dispersion plane), but used in reverse. These embodiments all show the use of a cylindrical microlens array, 1202, acting in the switch plane. After multiplexing selected wavelength components into a set of common output beams, light selected by the set of rows 3002 would be blocked by the microlens aligned with the third port. However light selected by the set of rows 3003 is coupled by this same microlens at least partially into the third port. Therefore the portion 3015 of wanted diffraction order 3012 that lands on the set of rows 3003 will create adjacent port crosstalk, as will the portion 3016 of wanted diffraction order 3014 that lands on the set of rows 3003. In a conventional WSS, the vertical radiation patterns shown are overlaid at the grating before remultiplexing, hence these portions 3015 and 3016 will cause adjacent port crosstalk. Similarly the portions of the wanted diffraction orders landing on other sets of columns (not shown) and the same set of rows 3003 will not be spatially filtered by the microlens aligned with the third port; they will be coupled by this microlens at least partially into the third port. FIG. 30 shows an example where the adjacent port crosstalk is from both adjacent channels. Hence the crosstalk from the adjacent port, caused by wavelength-dependent offset, will interfere constructively with the crosstalk from adjacent channels, caused by the switch channel filter function. This constructive interference raises the level of crosstalk suppression required from the filter function, leading to a more demanding optical design. It also limits the wavelength range of the routing holograms, leading to spectral notches where the relative phase at the output from different routing holograms is optimised, as described earlier. Hence a method to suppress this constructive interference is desirable. The second LCOS array provides such a method, by blocking the beam portions 3015 and 3016 that would otherwise be coupled by the microlens at least partially into the third port. This functionality to improve crosstalk and relax design constraints would not be available from the non-integrated combination of a 1×N WSS, with a wavelength blocker in series with each of the N outputs. Another benefit of this technique, is it may allow output ports to be packed closer together, for the same incident beam sizes at the outputs.

The sixth source of crosstalk that may be controlled by the wavelength selective spatial filter is unwanted diffraction orders caused by multiple reflections inside the liquid crystal layer. Typically these reflections are created by the front electrode material. A single reflection from the front electrode after phase modulation creates a strong secondary order, from the main diffraction order created by the routing hologram. For example if the main order is coupled into a port at transverse offset Y in the switch plane, measured with respect to the zero order, the secondary order created by a single reflection from the front electrode will be coupled into any port at or close to transverse offset 2Y.

Prior art seeks to suppress this crosstalk by adapting the routing hologram. The second LCOS array provides the option to treat this strong secondary diffraction order like any other unwanted diffraction order, and block this order by spatial filtering.

The seventh source of crosstalk that may be controlled by the wavelength selective spatial filter is created by the irregular hologram boundaries shown in FIG. 42. While inside each of the two adjacent routing holograms, 4201 and 4202, crosstalk may be well controlled by optimising the phase distribution, at and close to the hologram boundary 4203, this optimisation is lost. (Ignore the step 4204, this is deliberate and not relevant to the crosstalk explanation). Crosstalk at wavelengths where the beam lands across the irregular hologram boundary is not well controlled. This can cause the wavelength-dependent strength of the unwanted diffraction orders, to peak at channel boundaries.

The transition region may create additional diffraction orders that would otherwise be suppressed.

FIG. 31 is drawn to illustrate this theory, and shows a view of the second LCOS array, 2604, with a worst case example effect of these spectral peaks on diffraction orders likely to cause crosstalk, for a set of 3 adjacent channels (adjacent in terms of frequency). The view shows the wanted diffraction order, 3012, landing on the second LCOS array, 2604, at the set of rows 3004 for a first output port (in this case output number 4), and the wanted diffraction orders, 3013 and 3014, landing at the set of rows 3003, for a second output port (in this case output number 3). Light at wavelengths at and around the channel boundaries will land (on both arrays) across the boundaries between the sets of columns. For example, FIG. 31 shows incident diffraction orders 3015, 3016 and 3019 landing across the boundary between the set of columns 3009 and the set of columns 3010, and incident diffraction orders 3017, 3018 and 3020, landing across the boundary between the set of columns 3010 and the set of columns 3011. FIG. 31 shows that at the centre of these 3 sets of columns, 3009 to 3011, the incident diffraction orders 3015 to 3020 are absent, because in the associated regions of the routing array, the crosstalk is better controlled. With the scenario illustrated in the figure, the output spectrum would show peaks in the crosstalk at wavelengths at and around the channel boundaries. Spatial filtering at the LCOS array may be applied to block at least partially the unwanted diffraction orders 3015 to 3020 from the output ports: in practice some of the unwanted diffraction may overlay the set of rows and columns for the wanted diffraction order at the second LCOS array, 2604, that is they would appear inside the open "porthole". Therefore it is important to consider how to apply the spatial filtering, and the consequent effect on the filter function, as discussed earlier.

Now consider FIG. 31. The whole of unwanted diffraction orders 3019 and 3020 may be blocked by the spatial filter array without affecting the passbands for the selected beams 3012 to 3014, because such blocking does not affect the size of the open portholes. The parts of unwanted diffraction orders 3014 to 3018 outside the open portholes may also be blocked without affecting passbands, therefore these orders may be at least partially suppressed.

However, if we block the portions of the diffraction orders 3015 and 3018 that land inside the set of columns 3010, we will modify the filter response for the centre channel, as discussed earlier.

In some cases such blocking may be desirable because it acts like a guard band. Guard bands were disclosed in WO03021341. Their function is to block light landing at and close to hologram boundaries from the outputs. One effect is to narrow the channel passband. Associated with this narrowing, the adjacent channel extinction improves. In general, guard bands provide an additional degree of freedom in the design of the filter function. In a WSS with wavelength selective spatial filtering, guard bands may be created at the first LCOS array or at the second LCOS SLM, or at both LCOS SLMs. This provides a further degree of freedom in the filter design. In particular, guard bands applied at the second LCOS array can spatially filter scattering from line disclinations at the first LCOS array, where these disclinations appear at the boundaries between two sets of columns, each assigned to create a different output channel at a different output port. If the centre channel is a dropped channel, crosstalk suppression may be more useful than passband, so spatial filtering could be applied to block parts of the unwanted diffraction orders 3015 and 3018 landing inside the open porthole for selected order 3012.

If it is undesirable to apply guard bands at the second LCOS SLM, 2604, because for example the centre channel is an express channel, the blocking of unwanted orders 3015 and 3018 should be confined to the set of columns 3009 and 3011, respectively. Similarly the blocking of unwanted orders 3016 and 3017 should be confined to the set of columns 3010. Hence the spatial filtering acts to reduce the coupling of unwanted orders 3015 to 3018, into the output ports, but some light will leak through the open porthole.

An eighth source of crosstalk that may be controlled by spatial filtering, arises from the wavelength-dependence of crosstalk from unwanted orders. Controlling such crosstalk is another reason to vary phase ramp periods across the routing array, so as to control the wavelength dependence of where the unwanted diffraction orders land.

A ninth source of crosstalk that may be controlled by spatial filtering, arises from transient diffraction orders while the liquid crystal director field that creates the routing hologram changes from an initial state to the desired state. In a first method all portholes are closed for light incident on the second LCOS SLM, 2604, at wavelengths inside the channel to be reconfigured. Then the routing hologram applied to the channel to be reconfigured may be turned off quickly. This may use the transient nematic effect. The new routing hologram may be applied, to direct the light inside the reconfigured channel to the new output port. Then the porthole may be opened for the new output. In a second method the porthole for the new output port is opened, but the portholes for all other output ports (except perhaps the old output port) are closed. This allows the switch transient to be monitored.

A tenth source of crosstalk that may be controlled by spatial filtering, occurs when a routing hologram is scrolled, as described in WO0125848. In a first embodiment we may scroll the holograms for a nematic LCOS SLM. Although with perfect LC drive signals applied to nematic liquid crystal, we do not need to scroll the holograms to achieve DC balancing, in a practical device there may be a residual tiny DC component in the applied field. Further, in the flyback region there are very strong fields between adjacent pixels, which if left applied for a long time, could lead to image sticking, that is electroplating, due to the presence of impurity ions in the liquid crystal. The usual rule of thumb of driving at 1 kHz DC balance is calculated for the whole cell gap, that is the thickness of the LC layer, which is ~50 times wider than the inter pixel gap. By scrolling the holograms, the strong flyback fields are shifted to a different pair of adjacent pixels.

An eleventh source of crosstalk that may be controlled by spatial filtering, occurs when spacers are used to control the cell thickness. Such spacers are likely to cause scattering. In the dispersion plane, such scattering from the routing array is imaged back onto the same set of columns where it was created. Therefore as may be shown, the scattering may be blocked from coupling into the output port associated with an adjacent (or non-adjacent) output channel.

A twelfth source of crosstalk that may be controlled by spatial filtering, occurs when there are defects in the VLSI, for example faults with individual pixels in the flyback region of a phase ramp, faults affecting a whole row, or part of a row, or a whole column, or part of a column. Drive defects mean that the optimised holograms may not be applied accurately. A method to suppress crosstalk caused by such defects, means that more VLSI defects may be tolerated, increasing the number of useable devices per wafer, and hence reducing LCOS costs.

5.11 Final Review of Advantages

Some described embodiments have a number of clear advantages over prior devices:— i) birefringent wedges and half wave plates may be used to manage the polarisations from the inputs, rather than polarising beam splitters. This compresses the height of the system by a factor of two.

ii) the input optics can be different to the output optics. This allows more design flexibility which allows further height compression, and hence relaxes the requirement for a large beam deflection from the LCOS. If a large beam deflection is not needed, a less birefringent liquid crystal material may be used, with therefore lower ionic content. Lower ionic content means better long-term phase stability which means a lower LCOS refresh rate which reduces the power consumption. Lower ionic content also improves long-term reliability.

iii) the design flexibility achieved by using different optics at the input and output (and compressed height) permits two stage multi-wavelength processing using two separate areas of the same LCOS device; that is the signals are separated by wavelength and processed twice by an LCOS device.

iv) in the N×1 WSS the first stage processing allows wavelength dependent spatial filtering to block all non-selected signals from reaching the second stage of processing. Hence at the second stage, if the blocking is perfect, it is impossible for crosstalk to be created by the optical processing. In a practical switch, the two stage processing creates two opportunities to control crosstalk, hence the crosstalk suppression required from each stage is reduced.

v) in the N×1 WSS the second stage processing may be identical to that applied by the LCOS in the conventional LCOS WSS architecture in that holograms are applied to route and attenuate optical signals and create the optical channel spectrum. However, the two stage processing allows a simple geometric attenuation method to provide fine control of attenuation, which eases control complexity and saves hologram training costs. Without two-stage processing, this attenuation method would have to be used with caution, because it creates a crosstalk floor. Further, the first stage processing provides a coarse attenuation method. Together, the first and second stage processing provide a robust and simple attenuation method.

vi) In a 1×N WSS, the first stage processing may be identical to that applied by the LCOS in the conventional LCOS WSS architecture, applying holograms to route and attenuate the beams, and selecting the shape, size and position of groups of pixels to which the holograms are applied, to create the required channel spectra, also blocking selected wavelength channels. The second stage processing allows wavelength dependent spatial filtering which suppresses crosstalk from unwanted diffraction orders, from attenuation methods and from vignetting. This suppression allows further design freedom with the choice of attenuation method, the maximum required beam deflection, also some further height compression. It also relaxes the LCOS tolerances, the processing costs during manufacture, and allows scrolling to combat image sticking, thus allowing faster reconfiguration. The second stage processing may also include attenuation and channel blocking.

vii) There is more flexibility in the location of the grating compared to the focal plane of the lens used to focus the wavelength-dispersed beams onto the LCOS array For both 1×N and N×1 devices, the signals for independent channels are processed independently, at both LCOS arrays. Hence the optical pathway for each switch channel is focused to separate, non-overlapping locations in the dispersion plane, using imaging in the dispersion plane.

For the 1×N device, the optical pathway from the input arrives first at the LCOS routing array. Then the diffraction orders created by the routing holograms on the LCOS routing array are focused to separated locations on the LCOS Spatial Filter, where this separation occurs in the switch plane. To convert angle to offset in this way, a Fourier focusing element is provided in the switch plane.

For the N×1 device, the optical pathways from the inputs arrive first at the LCOS spatial filter array. Then the selected optical pathway for each polarisation component arrive at or close to the centre of the LCOS routing array associated with the respective polarisation component. A deflection angle is applied with the routing array, to control the offset, in the switch plane, of the optical pathway at the output, so that the selected optical pathway is coupled into the output. Using a Fourier focusing element in the switch plane, means that offset in the switch plane at the spatial filter array, caused by arriving from a different input port, is converted to angle of incidence in the switching plane, at the LCOS routing array. Hence selected signals from different inputs arrive at different angles, so that to reach the output, the applied deflection angle must be adapted. Therefore the deflection angle applied by the routing array in the switch plane acts as a secondary selection mechanism, and also a routing mechanism.

Hence both devices require that the intermediate optics provides an imaging function in the dispersion plane, and a Fourier transform function in the switch plane. This is afforded by the use of anamorphic optics in some described embodiments.

While the embodiments described use a common diffraction grating or grism to separate and recombine wavelength channels from and to common beams, the same two stage switching principle could be implemented using Arrayed Waveguide Gratings.

Further applications include test and measurement, and also spectroscopy. In some applications it will be clear that devices embodying the invention will not receive wavelength channels but rather a continuum of wavelengths.

The invention is not restricted to the specific details of the described embodiments but extends to the full scope of the appended claims.

The invention claimed is:

1. A switch device having a spatial light modulator, a dispersion device for spatially dispersing light onto the spatial light modulator, the switch device having a switch plane, a dispersion plane and optics, wherein the dispersion plane is defined as the plane across which light is dispersed by the dispersion device, wherein the switch plane is disposed orthogonal to the spatial light modulator and the dispersion plane and wherein the optics are configured to provide an imaging function in the dispersion plane, and a Fourier transform function in the switch plane, wherein the spatial light modulator has a first portion for spatially filtering light and a second portion for routing light.

2. A switch device according to claim 1, wherein the spatial light modulator comprises an LCOS SLM.

3. The switch device according to claim 1, wherein there is a single spatial light modulator, having a front electrode, wherein the front electrode is split to allow RMS voltages to be controlled independently for the first and second portions.

4. The switch device of claim 1, further having plural switch inputs, a switch output and input optics, each switch input being configured to receive plural input wavelength channels, the input optics configured to separate the input signals by wavelength and input port and direct the separated input signals to the first portion of the spatial light modulator, wherein the first portion of the spatial light modulator is configured to carry out wavelength-dependent spatial filtering to block at least some of the non-selected signals from each input and to output selected signals to the second portion of the spatial light modulator wherein the second portion of the spatial light modulator is configured to receive selected wavelengths from the first portion of the spatial light modulator and to route the selected wavelengths to the switch output.

5. The switch device of claim 1, having plural input ports, the device configured such that spatial filtering is carried out independently, per channel-port combination, whereby at least one of the non-selected signals in a wavelength channel in at least one input port is blocked by the first portion of the spatial light modulator.

6. The switch device of claim 1 wherein the spatial light modulator is reflective, the switch device further, having a focusing arrangement configured to spatially distribute light by wavelength in wavelength groups onto the reflective spatial light modulator, the switch device being configured so that reflected light from at least one of the wavelength groups passes through a device that has a focusing action in the dispersion plane to an optical device that acts as a retroreflector in the dispersion plane and a mirror in the switch plane.

7. The switch device of claim 1, having a single input port and plural output ports.

8. The switch device of claim 1, wherein the optics are configured to form a retroreflector configured to reflect light back along an incident path regardless of direction of incidence in the dispersion plane and to act as a mirror configured to reflect light with an angle of reflection equal to an angle of incidence with respect to a normal, in the switch plane.

9. The switch device of claim 8, configured such that light from the first portion of the spatial light modulator travels through one of a mirror and a lens to a reflecting device and returns via said one of a mirror and a lens to the second portion of the spatial light modulator to be imaged in the dispersion plane.

10. The switch device of claim 8, wherein the optics comprise a cylindrical lens disposed such that the optics act as a curved mirror in the switch plane and a retroreflector in the dispersion plane.

11. The switch device of claim 1, wherein the optics comprise a cylindrical lens and a retroreflector.

12. The switch device of claim 1, wherein the optics are configured to act as a tilted cylindrical mirror in the switch plane to pass light from the first portion to the second portion.

13. The switch device of claim 1, having a pair of refractive wedges in the beam path to pass beams from the first portion to the second portion.

14. The switch device of claim 1, wherein the optics comprise an equivalent Fourier element for performing the Fourier transform function, the Fourier element having a focal length substantially twice the focal length of the dispersion device.

15. The switch device of claim 1, wherein the optics comprise an equivalent Fourier element for performing the Fourier transform function, the Fourier element having a focal length more than twice the focal length of the dispersion device.

16. The switch device of claim 1 wherein the optics comprise an equivalent Fourier element for performing the Fourier transform function, the Fourier element having a focal length less than twice the focal length of the dispersion device.

17. The switch device of claim 1, wherein the first portion of the spatial light modulator is configured to provide relatively coarse attenuation of unwanted light and the second portion of the spatial light modulator is configured to provide a relatively fine attenuation of unwanted light.

18. The switch device of claim 1, wherein at least the first portion of the spatial light modulator is pixellated.

19. A method of controlling light using a spatial light modulator device, the spatial light modulator device having a first portion acting as a spatial filter and a second portion acting as a routing device in a switch having a dispersion plane for spatially dispersing light and a switching plane, wherein the switching plane is disposed orthogonal to the dispersion plane, the method comprising performing an imaging function in the dispersion plane and performing a Fourier transform function in the switching plane.

20. The method of claim 19, wherein the spatial light modulator device comprises a single spatial light modulator comprising said first and second portions.

21. The method of claim 19 further comprising spatially filtering light by the first portion to block unwanted light thereby to reduce crosstalk.

22. The method of claim 21 further comprising spatially filtering light at the first portion to block unwanted orders that cause transient crosstalk when switching holograms on or off.

23. The method of claim 21 further comprising spatially filtering light at the first portion to suppress wavelength-dependent adjacent port crosstalk.

24. The method of claim 21 further comprising spatially filtering light at the first portion to suppress crosstalk spikes created at hologram boundaries.

25. The method of claim 21 further comprising spatially filtering light at the first portion to reduce crosstalk from spacers used to control a cell gap in the spatial light modulator.

26. The method of claim 21 further comprising spatially filtering light at the first portion to reduce sensitivity to temperature.

27. The method of claim 21 further comprising spatially filtering light at the first portion to block unwanted diffraction orders.

28. The method of claim 21 further comprising spatially filtering light at the first portion to allow the use of symmetric orders.

29. The method of claim 19, comprising using at least one of the first and second portions to provide attenuation of light.

30. The method of claim 19, comprising assigning plural rows of the first portion of the spatial light modulator to a corresponding plurality of separated wavelength channels, wherein each row is a respective group or array of modulating elements of the first portion of the spatial light modulator and is assigned to a respective input port.

31. The method of claim 9, comprising assigning plural rows of the first portion of the spatial light modulator to a corresponding plurality of separated wavelength channels, wherein each row is a respective group or array of modulating elements of the first portion of the spatial light modulator and is assigned to a respective output port.

32. A switch device having a spatial light modulator, a dispersion device for spatially dispersing light onto the spatial light modulator, the switch device having a switch plane, a dispersion plane and optics, wherein the dispersion plane is defined as the plane across which light is dispersed by the dispersion device, wherein the switch plane is disposed orthogonal to the spatial light modulator and the dispersion plane and wherein the optics are configured to provide an imaging function in the dispersion plane, and a Fourier transform function in the switch plane, wherein the spatial light modulator has a portion for spatially filtering light and a portion for routing light, the switch further having a single switch input, plural switch outputs and input optics, the single input being configured to receive plural input wavelengths, the input optics to separate the input wavelengths and direct the separated input wavelengths to the portion for routing light, wherein the portion for routing light is configured to receive selected wavelengths from the single input and to route the selected wavelengths via the optics to the portion for spatially filtering light, the portion for spatially filtering light being configured to block independently, for each wavelength channel or signal band, separated diffraction orders from a routing hologram of the portion for routing light that are not required to propagate to one or more of the switch outputs and to pass selected signals to desired switch outputs.

33. A switch device having plural spatial light modulators, a switch input, a switch output and a dispersion device for spatially dispersing light from the switch input onto a first spatial light modulator, wherein the switch device has a switch plane, a dispersion plane and optics, wherein the dispersion plane is defined as the plane across which light is dispersed by the dispersion device, wherein the switch plane is disposed orthogonal to the spatial light modulators and the dispersion plane and wherein the optics are configured to provide an imaging function in the dispersion plane and a Fourier transform function in the switch plane, wherein a first spatial light modulator is configured to spatially filter light for selectively blocking at least one signal of at least one wavelength of the light and a second spatial light modulator is configured for selectively routing light, to a switch output.

34. A switch device having plural spatial light modulators, a switch input, and a dispersion device for spatially dispersing light from the switch input onto a first spatial light modulator, the switch device having a switch plane, a dispersion plane and optics, wherein the dispersion plane is defined as the plane across which light is dispersed by the dispersion device, wherein the switch plane is disposed orthogonal to the spatial light modulator and the dispersion plane and wherein the optics are configured to provide an imaging function in the dispersion plane, and a Fourier transform function in the switch plane, wherein the first spatial light modulator is for spatially filtering light and a second spatial light modulator is for routing light, the switch having a single switch input, plural switch outputs and input optics, the single input being configured to receive plural input wavelengths, the input optics to separate the input wavelengths and direct the separated input wavelengths to the portion for routing light, wherein the second spatial light modulator light is configured to receive selected wavelengths from the single input and to route the selected wavelengths via the optics to the first spatial light modulator for spatially filtering light, the first spatial light modulator for spatially filtering light being configured to block independently, for each wavelength channel or signal band, separated diffraction orders from a routing hologram of the second spatial light modulator for routing light that are not required to propagate to one or more of the switch outputs and to pass selected signals to desired switch outputs.

\* \* \* \* \*